(12) United States Patent
Cummings

(10) Patent No.: US 11,443,380 B2
(45) Date of Patent: Sep. 13, 2022

(54) SYSTEM AND METHOD OF PROVIDING AND RECORDING PERSONALIZED CONTEXT-SPECIFIC ADVICE IN THE FORM OF AN ARTIFICIAL INTELLIGENCE VIEW OF A HIERARCHICAL PORTFOLIO

(71) Applicant: Mark Cummings, Modesto, CA (US)

(72) Inventor: Mark Cummings, Modesto, CA (US)

(*) Notice: Subject to any disclaimer, the term of this patent is extended or adjusted under 35 U.S.C. 154(b) by 79 days.

(21) Appl. No.: 16/796,249

(22) Filed: Feb. 20, 2020

(65) Prior Publication Data
US 2021/0264520 A1    Aug. 26, 2021

(51) Int. Cl.
| | |
|---|---|
| *G06Q 40/06* | (2012.01) |
| *G06Q 20/06* | (2012.01) |
| *G06Q 20/36* | (2012.01) |
| *G06Q 20/10* | (2012.01) |
| *G06Q 40/00* | (2012.01) |
| *G06N 20/00* | (2019.01) |

(Continued)

(52) U.S. Cl.
CPC ............ *G06Q 40/06* (2013.01); *G06N 20/00* (2019.01); *G06Q 20/065* (2013.01); *G06Q 20/102* (2013.01); *G06Q 20/3678* (2013.01); *G06Q 40/04* (2013.01); *G06Q 40/12* (2013.12); *H04L 9/32* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 7,818,233 B1 * | 10/2010 | Sloan ................... | G06Q 20/10 705/37 |
| 7,831,494 B2 * | 11/2010 | Sloan ................... | G06Q 40/06 705/37 |
| 9,710,757 B2 | 7/2017 | Gilon et al. | |

(Continued)

OTHER PUBLICATIONS

Amsden, Z. et al., "The Libra Blockchain," Libra Association, Sep. 2019.

(Continued)

*Primary Examiner* — Bruce I Ebersman
*Assistant Examiner* — Matthew Cobb
(74) *Attorney, Agent, or Firm* — Sheppard Mullin Richter & Hampton LLP

(57) ABSTRACT

In an intelligent system for providing and recording personalized context-specific financial advice, a method may comprise receiving, from a client device, a request for advice regarding a hierarchical portfolio of assets owned by an investor. The method may further comprise generating, based on the output of a neural network machine learning model, artificial intelligence suggestions for changing the hierarchical portfolio, assembling the AI suggestions and suggestion locations into an actionable artificial intelligence view of the hierarchical portfolio, and transmitting the AI view to the client device. The method may further comprise making a cryptocurrency payment related to service fees associated with the AI view via a blockchain network. The method may further comprise submitting placed transactions associated with the AI suggestions to an electronic trading platform, generating a revised hierarchical portfolio, and recording the AI view on a blockchain, thereby establishing or maintaining a portable financial record for the investor.

39 Claims, 24 Drawing Sheets

(51) Int. Cl.
*H04L 9/32* (2006.01)
*G06Q 40/04* (2012.01)

(56) References Cited

U.S. PATENT DOCUMENTS

| | | | |
|---|---|---|---|
| 9,953,350 | B2 | 4/2018 | Pugazhendhi et al. |
| 10,223,749 | B2 | 3/2019 | Greenshields et al. |
| 10,362,353 | B2 | 7/2019 | Kerns et al. |
| 10,540,639 | B2 | 1/2020 | Brock et al. |
| 2003/0149657 | A1* | 8/2003 | Reynolds ............... G06Q 40/08 705/38 |
| 2009/0276368 | A1* | 11/2009 | Martin ................... G06Q 40/02 705/36 R |
| 2010/0332411 | A1* | 12/2010 | Rachev ................. G06Q 40/06 705/36 R |
| 2013/0238487 | A1* | 9/2013 | Biske ..................... G06Q 40/02 705/39 |
| 2015/0178848 | A1 | 6/2015 | Bossaert et al. |
| 2016/0239918 | A1* | 8/2016 | Lambur ................. G06Q 50/01 |
| 2017/0116308 | A1* | 4/2017 | Alberg ............. G06F 16/24556 |
| 2017/0236104 | A1 | 8/2017 | Biton |
| 2017/0286857 | A1 | 10/2017 | Gaon et al. |
| 2017/0323384 | A1 | 11/2017 | Dintenfass et al. |
| 2017/0329788 | A1* | 11/2017 | Grasselt ............. G06F 16/3344 |
| 2018/0089762 | A1* | 3/2018 | Lopez de Prado .... G06Q 40/06 |
| 2018/0130133 | A1 | 5/2018 | Decanini et al. |
| 2018/0330434 | A1 | 11/2018 | Dubey et al. |
| 2019/0066228 | A1 | 2/2019 | Wright |
| 2019/0090010 | A1 | 3/2019 | Kerns et al. |
| 2019/0114347 | A1 | 4/2019 | Johansen et al. |
| 2019/0122444 | A1 | 4/2019 | Teegan |
| 2019/0132138 | A1 | 5/2019 | Finlow-Bates et al. |
| 2019/0149633 | A1 | 5/2019 | Evans et al. |
| 2020/0151815 | A1* | 5/2020 | Whitfield ............... G06Q 50/01 |
| 2021/0133881 | A1* | 5/2021 | Egger ................... G06N 10/00 |

OTHER PUBLICATIONS

Buterin, V., "Merkling in Ethereum," Ethereum Blog [Online], Nov. 2015.

Li, F.F., Karpathy, A., Johnson, J., "CS231n Winter 2016: Lecture 5: Neural Networks Part 2," Stanford University, Jan. 2016.

Linke, B., "The Fundamentals of an ECDSA Authentication System," Maxim Integrated Products [Online], Jul. 2014.

Pérez Jiménez, C., "Analysis of the Ethereum State," Universitat Oberta de Catalunya, Jan. 2018.

Sward, A., Vecna, I., Stonedahl, F., "Data Insertion in Bitcoin's Blockchain," Ledger [Online], vol. 3, Apr. 2018.

* cited by examiner

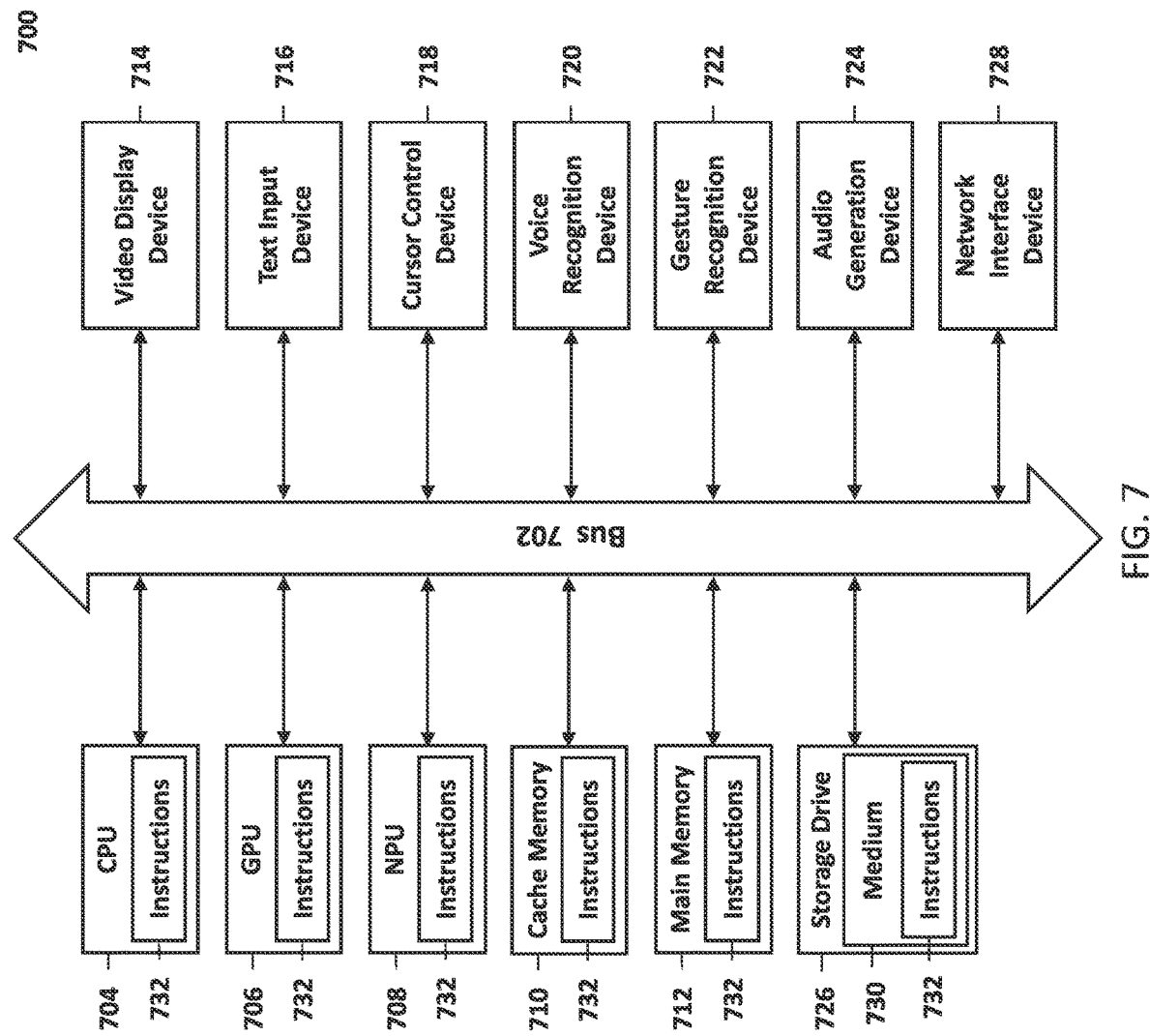

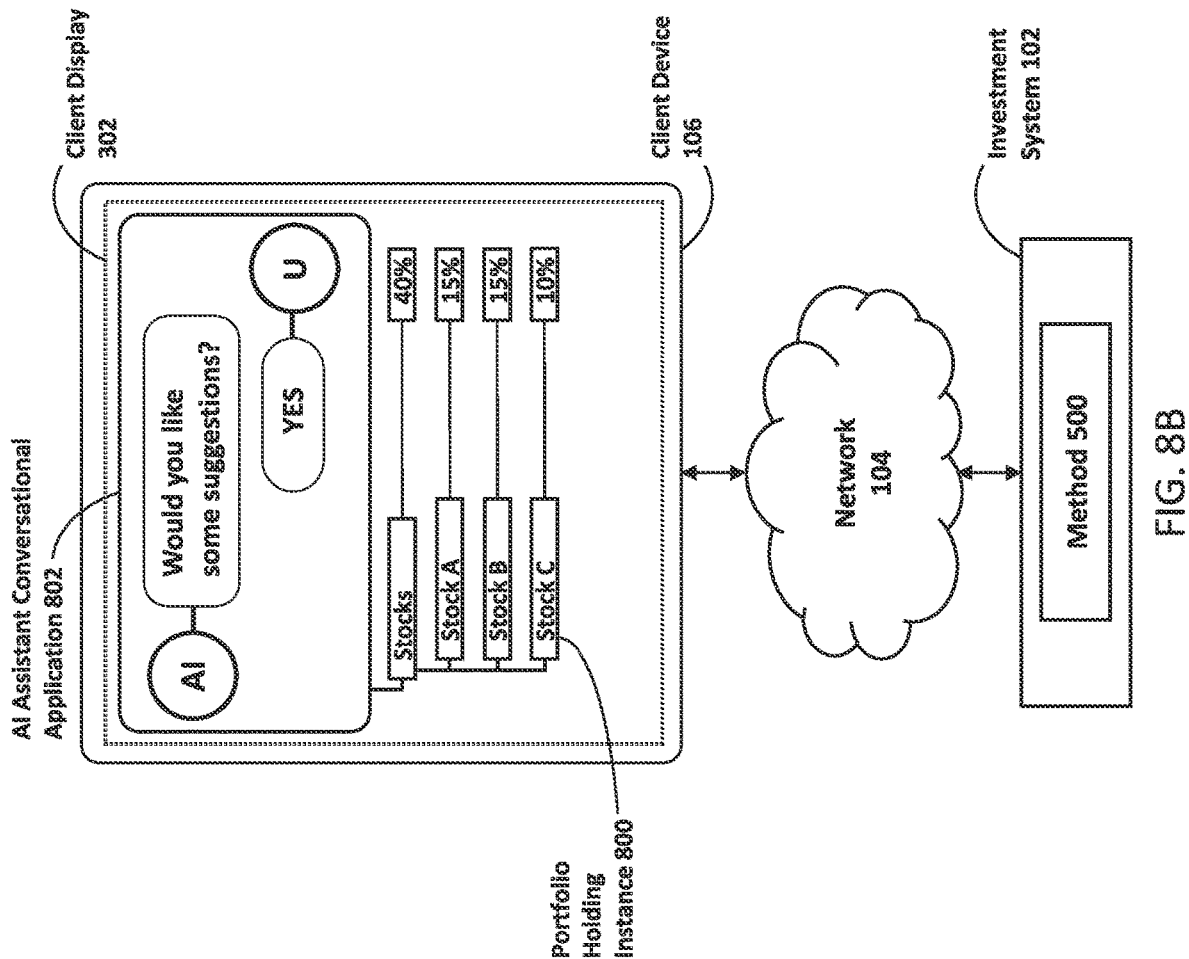

SYSTEM AND METHOD OF PROVIDING AND RECORDING PERSONALIZED CONTEXT-SPECIFIC ADVICE IN THE FORM OF AN ARTIFICIAL INTELLIGENCE VIEW OF A HIERARCHICAL PORTFOLIO

TECHNICAL FIELD

The present technology relates in general to intelligent systems for managing hierarchical financial information and more specifically to a system, method, and medium for providing and recording context-specific financial advice generated through artificial intelligence, human intelligence, or a combination thereof.

BACKGROUND

For many investors today, asset portfolios are difficult to manage. These portfolios are frequently scattered across numerous accounts and financial firms where they are recorded in proprietary formats making it difficult for an investor to readily organize assets into a clearly understandable structure. In addition to structural complexities, investors may also face competing approaches for allocating funds across individual assets and asset classes making portfolios difficult to optimize without assistance. To avoid such difficulties, investors may pay a financial professional a fee to provide financial advice. However, while these financial advisors and their firms are typically well equipped to help their clients manage structural and allocation complexities, they currently lack scalable and efficient systems and methods for providing personalized context-specific financial advice to their clients. Such deficiencies may lead to an ineffective or inconsistent user experience for clients and advisors, poor or uncompetitive client portfolio performance, or an impaired or diminished asset gathering capacity for the firm, thereby resulting in lower returns on the firm's assets under management (AUM) and potential damage to its reputation among clients and industry peers. In addition, data protection, privacy, and portability laws (e.g., GDPR, CCPA, etc.) being proposed, enacted, and enforced by state, national, or supranational governments and regulators may provide catalysts for financial firms to collaborate on new and innovative approaches for securely storing, accessing, and exchanging financial information in order to comply with such regulations.

SUMMARY

The present technology is made in view of the aforementioned deficiencies in prior art and emerging catalysts for new approaches for securely storing and managing financial information. Accordingly, certain embodiments of the present technology may pertain to an intelligent investment system and method for providing recurring context-specific financial advice in the form of a series of artificial intelligence views of a hierarchical portfolio and recording, in partially or fully encrypted form, the series of AI views of the hierarchical portfolio, including references to snapshots of specific states of the hierarchical portfolio, on a blockchain, thereby establishing and maintaining a portable financial record for an investor that is immutable, permanent, and securely accessible by the investor or trusted advisors of the investor via a smart computing device.

For example, an investor (e.g., individual investor or institutional investor) who owns a portfolio of assets (e.g., stocks, bonds, cash, real estate, etc.) organized along hierarchical dimensions (e.g., asset class, geography, style, theme, factor, sector, category, classification, etc.) may submit a request for financial advice (e.g., restructuring advice, allocation advice, positioning advice, etc.) to an intelligent investment system over a network (e.g., local area network, wide area network, internet, etc.) via a smart computing device (e.g., smartphone, smart glasses, tablet, laptop, workstation, etc.) using various communication standards (e.g., NFC, Bluetooth, Wi-Fi, 3G, 4G, 5G, etc.). The intelligent investment system may receive the request with the investor's hierarchical portfolio enclosed or referenced, process its contents, and generate a set of artificial intelligence suggestions for optimizing the structure or content of the portfolio subject to constraints or conditions related to user data (e.g., age, risk tolerance, investment objectives, etc.), economic data (e.g., global GDP growth rates, interest rates, inflation rates, etc.), or market data (e.g., equity valuations, commodity prices, corporate debt levels, etc.). The AI suggestions may be based on outputs from one or more machine learning models (e.g., neural networks, regression models, decision trees, etc.) configured to recommend hierarchical portfolios given user, economic, and market data inputs, thus making the financial advice personalized (i.e., related to user data) in addition to being context specific (i.e., related to positions within the hierarchical portfolio).

To provide the investor with context-specific financial advice, the investment system may first determine locations for the AI suggestions that precisely position each AI suggestion within the context (e.g., near or upon a portfolio item, portfolio holding instance, portfolio item attribute, etc.) of the hierarchical portfolio owned by the investor and then suitably format (e.g., text, image, video, voice, etc.) and assemble the AI suggestions, including their locations, into an AI view of the hierarchical portfolio. Each AI suggestion contained within the AI view may further provide recommended asset transactions (e.g., buy, sell, or transfer orders) for the investor to consider and ultimately place for execution via an electronic trading platform. The investment system may route the AI view, including recommended transactions, for review and approval by a financial advisor or team of financial professionals (e.g., financial review board, or FRB). Upon approval, the investment system may transmit the approved AI view to the investor's smart device for overlay on the hierarchical portfolio, whereupon the investor may make, via the investment system, a cryptocurrency payment over a blockchain network (e.g., Bitcoin network, Ethereum network, etc.) in the native cryptocurrency (e.g., BTC, ETH, etc.) of the blockchain network to the financial firm or financial advisor providing the financial advice for service fees (e.g., generation fees, approval fees, recording fees, etc.) associated with the AI view.

After receiving and reviewing the context-specific financial advice in the form of the approved AI view of the hierarchal portfolio, the investor may select and act upon (e.g., accept, reject, place, etc.) individual AI suggestions and recommended transactions. Upon the selection and acceptance of AI suggestions by the investor and successful execution and confirmation of placed transactions by an electronic trading platform, the investment system may generate and present to the investor a revised hierarchical portfolio that incorporates the accepted AI suggestions and confirmed transactions. By doing so, the investment system transforms the hierarchical portfolio from its prior revision level to its revised revision level, wherein the former is referred to as the prior hierarchical portfolio and the latter the revised hierarchical portfolio. Next, the investment system may update the AI view to include accepted or rejected AI suggestions, off-chain or on-chain references to snapshots of specific states (i.e., prior and revised states) of the hierarchical portfolio, and a reference (e.g., hash value) to the immediately preceding AI view, whereupon it may fully or partially encrypt the updated AI view.

Finally, the investment system may permanently record the encrypted AI view, including references to a snapshot of the state of the prior hierarchical portfolio and a snapshot of the state of the revised hierarchical portfolio, to a blockchain (e.g., private blockchain, public blockchain, hybrid blockchain, etc.), thereby establishing (i.e., newly creating) or maintaining (i.e., appending to) a portable financial record for the investor that is secure, immutable, and permanent. The process of providing and recording financial advice regarding the hierarchical portfolio owned by the investor may recur over a number of years, decades, or generations. This process may also apply to other hierarchical portfolios owned by the investor. As a result, the investor's portable financial record may contain multiple hierarchical portfolios, where each hierarchical portfolio is associated with a corresponding sequence of encrypted AI views containing context-specific financial advice related to the hierarchical portfolio. Given its inherent capacity to securely, immutably, and permanently record multiple sequences of AI views of multiple hierarchical portfolios over long periods of time, the portable financial record may serve as an analytical foundation for tracing, tracking, and analyzing the complete history of context-specific financial advice (i.e., all of the AI views of the hierarchical portfolios owned by the investor) provided to, accepted by, and acted upon by the investor. This fundamental advantage of the present technology enables the investor or trusted advisors of the investor to make better financial decisions based on knowledge and insights accumulated over time in the blockchain-based portable financial record.

BRIEF DESCRIPTION OF THE DRAWINGS

The drawings listed below illustrate various embodiments of the present technology described in this disclosure by way of non-limiting and non-exhaustive examples. Reference numbers within the drawings are used to call out processing steps or components. Related components share similar reference numbers and the leading digits of a component reference number indicate the figure in which the component first appeared.

FIG. 7 is a schematic diagram of a machine in the form of an example computer system according to an exemplary embodiment.

FIG. 8B is an illustration of a client device displaying an example conversational application for interacting with a user according to an exemplary embodiment.

The detailed description below, along with the accompanying drawings listed above, explain and illustrate the features, capabilities, and advantages of the preferred and alternative embodiments of the present technology.

DETAILED DESCRIPTION

In various embodiments, a system, method, and medium to provide and record context-specific advice in the form of a view of a hierarchical portfolio are disclosed. As disclosed, the context-specific advice may be context-specific financial advice, the view may be an artificial intelligence view, and the hierarchical portfolio may be a hierarchical portfolio of assets. As further disclosed, the context-specific financial advice may include restructuring, allocation, positioning, or consolidation advice; the artificial intelligence view may include artificial intelligence suggestions generated based on the outputs of a machine learning model, such as a deep neural network model; and the hierarchical portfolio of assets may include stock, bond, cash, or alternative assets. The Detailed Description section is partitioned into six subsections: 1) Intelligent Investment System Architecture, 2) AI Views of a Hierarchical Portfolio, 3) Actionable AI Views of a Hierarchical Portfolio, 4) Recording an AI View on a Blockchain, 5) Portable Personal and Multigenerational Financial Records, and 6) Neural Network Models for Generating Recommended Portfolios. These subsections and their respective titles are provided for organizational and readability purposes only and are not to be interpreted or used to limit the meaning or scope of the appended claims. While the present technology is described herein using specific example embodiments, it is to be understood that the present technology is not limited to these embodiments. The detailed description and accompanying drawings are therefore to be regarded in an illustrative sense, rather than a restrictive sense.

Intelligent Investment System Architecture

Figure 1:
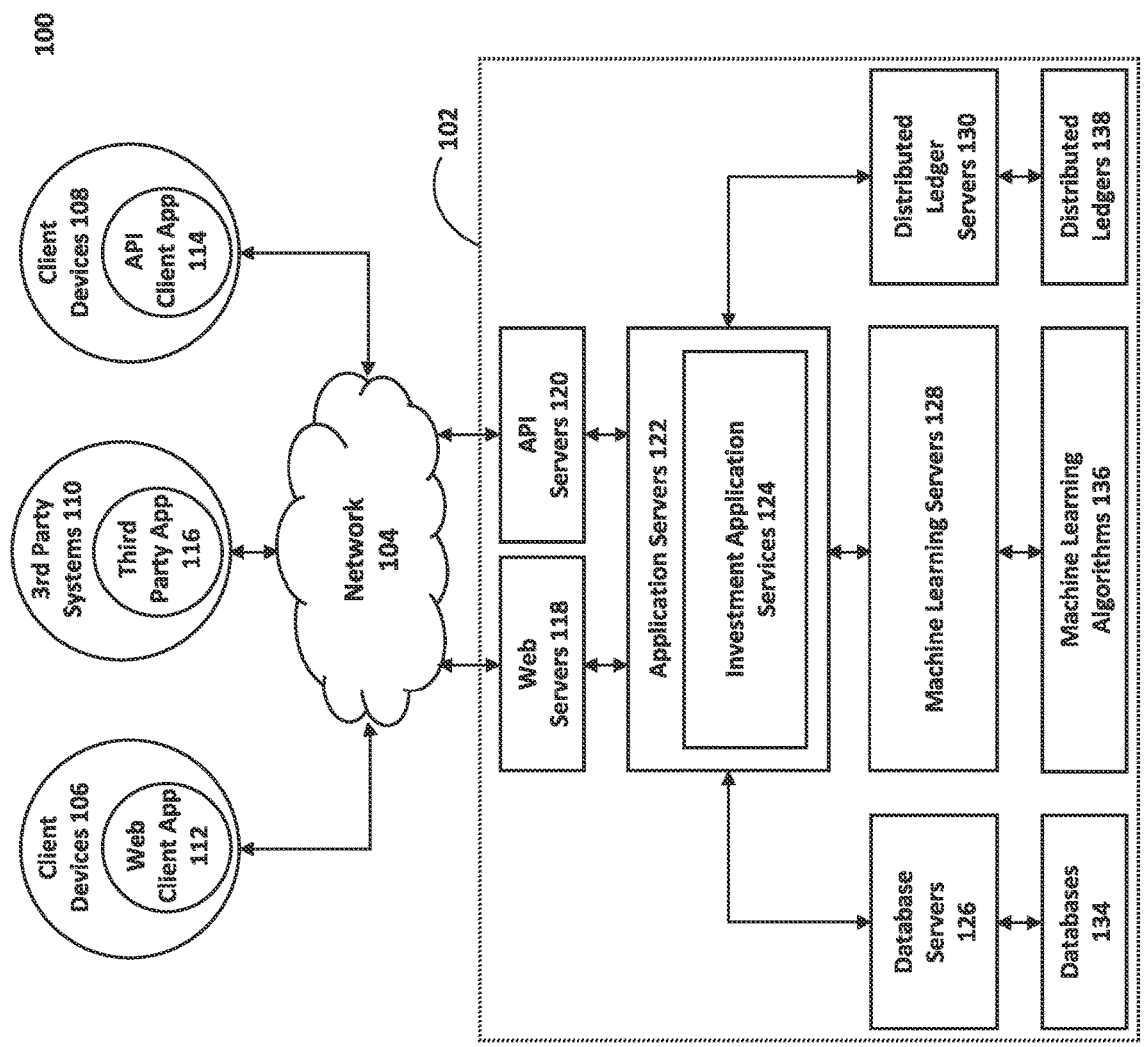
FIG. 1 is a network diagram of a network system having a client-server architecture for securely exchanging data between nodes of a network according to an exemplary embodiment.

FIG. 1 is a network diagram of a network system 100 having a client-server architecture for securely communicating and exchanging data between nodes of a network according to an exemplary embodiment. For example, the network system 100 may contain an intelligent investment system 102 communicating and exchanging data, via a network 104, with one or more client devices 106, 108, and third-party systems 110. The exchanged data may relate to a variety of core services provided by the intelligent investment system 102, including managing financial information, administering user accounts, or providing financial advice. Network 104 may be an intranet, an extranet, the internet, a personal area network (PAN), local area network (LAN), metro area network (MAN), or wide area network (WAN). Users of client devices 106 and 108 and third-party systems 110 may include, but are not limited to, individuals, organizations, firms, service providers, exchanges, or institutions. Individual users may include retail investors, institutional investors, fund managers, investment strategists, portfolio managers, risk managers, traders, investment brokers, financial advisors/planners, wealth/asset managers, family office managers, trustees, compliance officers, investment officers, tax accountants, legal advisors, financial officers, financial/industry analysts, bank managers, credit analysts, loan officers, real estate agents/brokers, private bankers, investment bankers, or government regulators.

Intelligent investment system 102 may contain one or more web servers 118 and one or more API servers 120 that communicate with and provide secure access to one or more application servers 122. The application servers 122 may be dedicated or shared machines that communicate with one another via a high-speed LAN (e.g., LAN variant of network 104) and configured in an application server cluster to improve availability and scalability. The web servers 118 provide secure access to the application servers 122 via web interfaces. For example, a web client application 112 (e.g., a web browser application) running on the client device 106 may securely access application server 122 within intelligent investment system 102 via web server 118. Similarly, the API servers 120 provide secure access to application servers 122 via application programming interfaces (APIs). For example, an API client application 114 running on the client device 108 or a third-party application 116 running on the third-party system 110 (e.g., a third-party server or client device) may securely access application server 122 via API server 120. The purpose of the various client applications within network system 100, such as the web client application 112, API client application 114, and third-party application 116, is to enable users (e.g., individual users, system administrators, or third-party users) and systems (e.g., first-party or third-party systems) to exchange (i.e., send and receive) data (e.g., portfolio data, market data, financial advice, etc.), via network 104, with intelligent investment system 102 by interactively or programmatically exercising its functions.

Intelligent investment system 102 may further contain one or more database servers 126, one or more machine learning servers 128, and one or more distributed ledger servers 130 that facilitate respective access to one or more databases 134 (e.g., relational databases or non-relational databases), one or more machine learning algorithms 136 (e.g., shallow/deep neural networks, linear/non-linear regression models, decision trees, etc.), and one or more distributed ledgers 138 (e.g., private permissioned blockchains, public non-permissioned blockchains, etc.). The databases 134, machine learning algorithms 136, and distributed ledgers 138 may manage, process, and store data pertaining to various asset classes, including but not limited to equities, bonds, commodities, currencies, cash, real estate, artwork, personal property, or cryptocurrencies. In some embodiments, application servers 122 may be locally coupled (e.g., over a LAN or an intranet) to one or more database servers 126, machine learning servers 128, or distributed ledger servers 130. In other embodiments, application servers 122 may be remotely coupled (e.g., over a WAN or the internet) to the database servers 126, machine learning servers 128, or distributed ledger servers 130. In various embodiments, the database servers 126 and machine learning servers 128 may be part of a centralized network with a client-server architecture, while the distributed ledger servers 130 may be part of a decentralized network with a peer-to-peer architecture, such as a blockchain network described in more detail below.

As defined herein, a blockchain network is a decentralized network with a peer-to-peer (P2P) architecture. The blockchain network comprises a number of globally distributed computing nodes communicating with one another, via a blockchain network protocol, as peers over a global network, such as the internet. Each computing node (i.e., peer) in the blockchain network comprises memory, processing, storage, and communication resources; stores a complete or partial copy of the blockchain of the blockchain network; and may act as a server (e.g., providing resources, responding to queries, etc.) or a client (e.g., consuming resources, making queries, etc.) to other peers in the blockchain network. In addition, in order to synchronize the nodes, each node may run blockchain network client software. The client software may be configured to operate in various modes, including lite mode, full mode, and full archive mode, wherein the mode of operation determines the capabilities of the node (e.g., perform transaction, state, or block validation; respond to queries for current or past transactions; respond to queries for current or past state, etc.) and the specific portions of the blockchain that are copied to and stored within the storage resources of the node. For example, when configured to operate in full mode, the blockchain network client software stores a copy of the complete transaction history of the blockchain within the one or more storage devices of the node. Similarly, when configured to operate in lite mode, the node stores only a copy of the block headers of the blockchain, and when configured to operate in full archive mode, the node stores not only a copy of the complete transaction history of the blockchain, but also a copy of the complete state history of the blockchain. A node in the blockchain network is said to be a lite, full, or full archive node when it runs blockchain network client software configured to operate in lite, full, or full archive mode, respectively. For example, a node of the blockchain network running blockchain network client software configured for full archive mode operation is said to be a full archive node.

In various embodiments, distributed ledger server 130 may serve as node of a blockchain network and store, within distributed ledger 138, a partial or complete copy of the blockchain. In some embodiments, distributed ledger server 130 may serve as a full node of a public or private blockchain network and store, within distributed ledger 138, a complete copy of all current and historical transactions recorded on the respective public or private blockchain. In other embodiments, the distributed ledger server 130 may serve as a full archive node of a public or private blockchain network and store, within distributed ledger 138, a complete copy of all current and historical transactions recorded on the respective public or private blockchain as well as a complete copy of all current and historical states of the respective public or private blockchain.

The data exchanged between client applications (e.g., client applications 112, 114, and 116) and intelligent investment system 102 and stored within various data sources (e.g., data sources 134, 136, and 138) may include, but are not limited to, global financial data, user data, portfolio data, or financial advice. Global financial data may include, but are not limited to, market data, news and events, sentiment assessments, market forecasts, monetary and fiscal policy statements, volatility and liquidity measures, interest and inflation rates, economic forecasts, national deficit levels, national and global debt levels, macroeconomic data and reports, national and global gross domestic product (GDP) rates, industry analyst research and reports, microeconomic data and reports, corporate filings and reports, corporate debt levels, financial analyst research and reports, or independent research and case studies, as well as various risks and uncertainties related to geopolitics, markets, corporations, institutions, and regional, national, or global economies. User data may include, but are not limited to, user profile, financial goals, investment objectives and preferences, time horizon, risk tolerance, income estimates, inheritance, financial statements and accounts, life events, risks, or liability and expenses. Portfolio data may include, but are not limited to, portfolio dimensions (e.g., class, theme, category, risk, or rank), portfolio structures, portfolio positions, portfolio holdings, or portfolio allocations. Financial advice may include, but is not limited to, portfolio structuring, restructuring, positioning, allocation, tuning, consolidation, partitioning, harvesting, or distribution advice.

The application servers 122 of intelligent investment system 102 may host one or more investment application services 124, which provide investment-related functions to users and systems that access intelligent investment system 102. For example, investment application services 124 may provide functions for maintaining a user profile and managing assets; structuring and navigating a hierarchical portfolio of assets; reviewing, approving, and annotating suggestions for optimizing a hierarchical portfolio; viewing and accepting approved financial advice within the context of a hierarchical portfolio; or storing and tracking data, metadata, or changes related to portfolio structures, portfolio assets, portfolio suggestions, portfolio views, portfolio approvals, or portfolio advice. These functions are described in more detail in FIG. 2.

Figure 2:
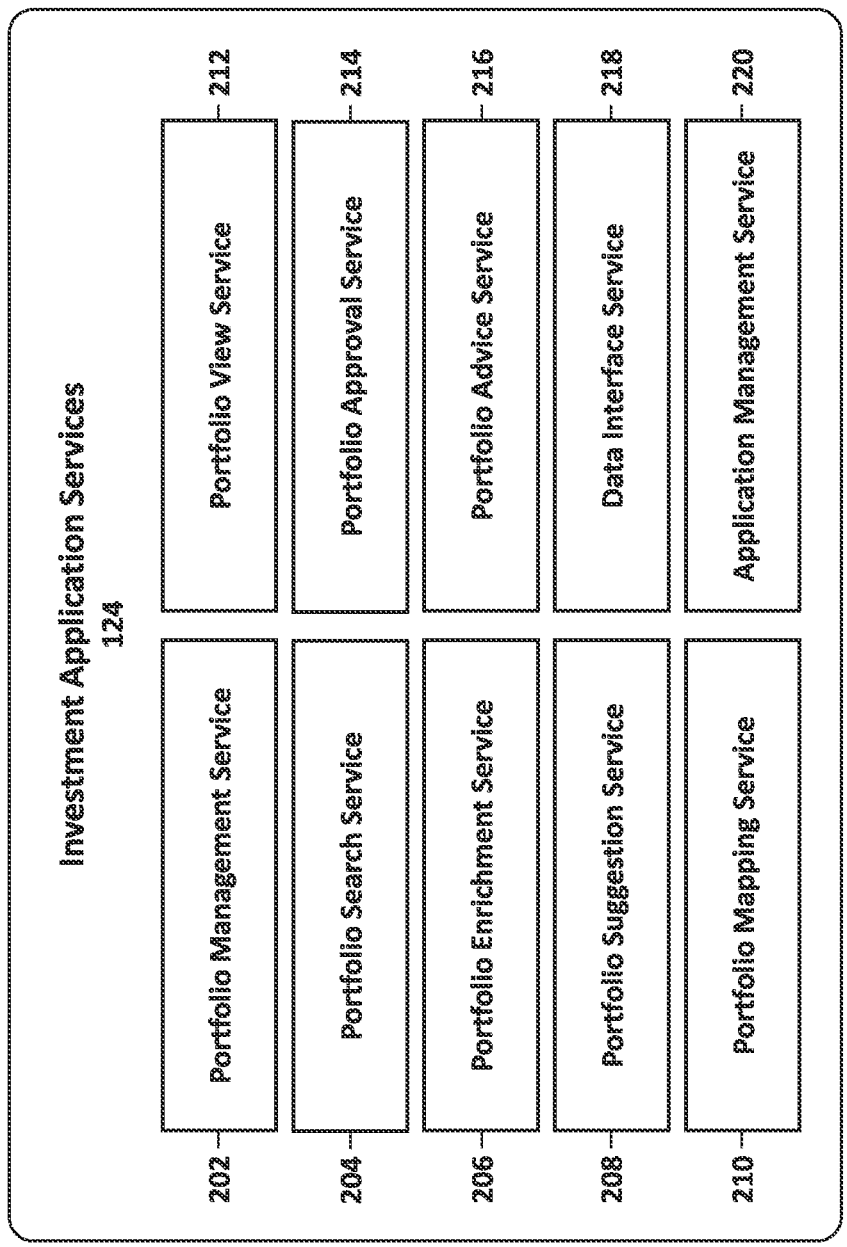
FIG. 2 is a block diagram of a collection of investment application services provided by an intelligent investment system according to an exemplary embodiment.

FIG. 2 is a block diagram of a collection of investment application services 124 provided by an intelligent investment system 102 according to an exemplary embodiment. Investment application services 124 may run on and directly access one or more application servers 122 within intelligent investment system 102. Investment application services 124 may further access databases 134, machine learning algorithms 136, and distributed ledgers 138 via database servers 126, machine learning servers 128, and distributed ledger servers 130, respectively. Access to servers 122, 126, 128, and 130 enables investment application services 124 to communicate and exchange data, via application and data interfaces, with each other and with data sources 134, 136, and 138. Investment application services 124 may include a number of services, including a portfolio management service 202, portfolio search service 204, portfolio enrichment service 206, portfolio suggestion service 208, portfolio mapping service 210, portfolio view service 212, portfolio approval service 214, portfolio advice service 216, data interface service 218, and application management service 220.

The portfolio management service 202, in an embodiment, enables users to create, import, view, navigate, modify, or delete portfolio structures (i.e., multi-level hierarchies of financial information) and portfolio content (i.e., data attributes and corresponding data attribute values). For example, a user of intelligent investment system 102 and more specifically of portfolio management service 202 may utilize client device 106 to create, navigate, and edit a hierarchically structured portfolio of assets. Utilizing portfolio management service 202, the user may create a new portfolio hierarchy or modify (i.e., revise) an existing portfolio hierarchy via user interface functions or through an import function. The newly created portfolio hierarchy or the modified existing portfolio hierarchy may include multiple levels, with each level signifying an important analytical dimension. Analytical dimensions may include, but are not limited to, user, organization, time, custodian, account, asset class, geography, style, theme, smart factor, sector, category, risk classification, rank, or fund. The user may then navigate the new or modified hierarchical portfolio (which may exceed the boundaries of the display of client device 106) by scrolling vertically or horizontally, zooming in or out, or expanding or collapsing nodes in the hierarchy via user gestures, voice commands, or user interface icons. The user may further choose to edit a) the structure of the hierarchical portfolio by changing the relationship between nodes in the hierarchy (e.g., removing a child node from its parent node in the hierarchy and adding it to a different parent node) or b) the content of the hierarchical portfolio by changing the data attribute values of one or more data attributes of one or more nodes in the hierarchy (e.g., altering the value of an allocation amount attribute or a portfolio holding name attribute).

The portfolio search service 204, in an embodiment, performs search techniques (e.g., breadth first or depth first search) on a hierarchical portfolio (e.g., a hierarchical portfolio contained or referenced in a request submitted from a client device, such as a hierarchical portfolio created or modified by portfolio management service 202) to identify both portfolio holdings and portfolio holding instances. For example, while searching the hierarchical portfolio, portfolio search service 204 may identify numerous unique stock holdings, bond holdings, and exchange traded fund (ETF) holdings. For each unique stock, bond, and ETF holding identified, portfolio search service 204 may further identify one or more stock, bond, or ETF holding instances, respectively, along different pathways to unique structural positions (i.e., path-based locations) in the hierarchical portfolio. Across all portfolio holdings represented within the hierarchical portfolio, portfolio search service 204 may identify hundreds, or even thousands in the case of large complex portfolio hierarchies, of portfolio holding instances spanning various asset classes (e.g., equities, bonds, currencies, cash, etc.) and pooled investment vehicles (mutual funds, ETFs, hedge funds, etc.). During the search process, portfolio search service 204 may extract path-dependent attributes (i.e., attributes related to location within the hierarchy) and path-independent attributes (i.e., attributes unrelated to location within the hierarchy) of each portfolio holding instance to help other portfolio services of investment application services 124 process the client request for financial advice. The portfolio search service 204 may further perform breadth-first or depth-first search techniques on the hierarchical portfolio determine the structural positions (e.g., hierarchical paths) of unique portfolio holding instances. It may also perform where-used search techniques to determine the structural position of related portfolio items (i.e., portfolio items within the hierarchical portfolio along an upward traversal path starting from a portfolio holding instance). For example, starting from a portfolio holding instance within the hierarchical portfolio, the portfolio search service may perform a where-used search to determine several portfolio items related to the portfolio holding instance, such as its parent, the parent of its parent, all the way up to the top-level node (i.e., root node) of the hierarchical portfolio.

The portfolio enrichment service 206, in an embodiment, compares one or more portfolio holdings (e.g., portfolio holdings identified by portfolio search service 204) to a database 134 of commonly held assets with associated data attributes and data attribute values. The database 134 may contain global financial data comprising a corpus of commonly held stocks, bonds, currencies, or commodities with associated market data attributes and data attribute values. The market data attributes may include, but are not limited to, 52-Week High, 52-Week Low, Actual EPS, Beta, Currency, Description, Estimated EPS, Forward P/E Ratio, Market Capitalization, Market Data Date, Market Data Time, Market Price, Maturity Date, Symbol, Trailing P/E Ratio, and Yield. Using the results of the comparisons, portfolio enrichment service 206 may augment each portfolio holding with additional data attributes and data attribute values from database 134. In other embodiments, portfolio enrichment service 206 may generate portfolio candidate holdings (e.g., holdings not yet included in a portfolio of assets) and then compare these candidate holdings to a database 134 containing commonly held assets with associated data attributes and data attribute values. Using the results of the comparisons, portfolio enrichment service 206 may augment each portfolio candidate holding with additional data attributes and data attribute values from database 134.

The portfolio suggestion service 208, in an embodiment, compiles a data input package suitable for processing by machine learning algorithms (e.g., machine learning algorithms 136) running as trained machine learning models on one or more machine learning servers (e.g., machine learning servers 128). The data input package may contain, but is not limited to, relevant user data (e.g., user profile, financial goals, investment objectives, income estimates, life events, liabilities, expenses, etc.) associated with the user submitting the request for financial advice, as well as global financial data (e.g., market data, news and events, sentiment, forecasts, policy statements, macroeconomic data, industry reports, microeconomic data, corporate filings, analyst research, etc.) typically unrelated to the user. Once the compilation process is complete, portfolio suggestion service 208 may submit the data input package to one or more machine learning models (e.g., decision tree, regression, or neural network models) narrowly focused within the domain of financial services and specifically designed and trained to provide financial guidance in the form of suggestions. A particular fully trained machine learning model (e.g., neural network model 1500) may subsequently process the data input package and recommend a suitable hierarchical portfolio for the user. Portfolio suggestion service 208 may subsequently generate one or more artificial intelligence suggestions (AI suggestions) for changing the current structure and content of the user's hierarchical portfolio into the structure and content of the hierarchical portfolio recommended by the model. Portfolio suggestion service 208 manages and provides access to AI suggestions to other services within investment application services 124.

The portfolio mapping service 210, in an embodiment, maps individual AI suggestions (e.g., AI suggestions from portfolio suggestion service 208) to precise structural positions within a portfolio hierarchy (e.g., the portfolio hierarchy of a hierarchical portfolio submitted by a user of investment system 102). Each individual AI suggestion may pertain (i.e., map) to a portfolio item in the portfolio hierarchy or to an individual attribute of a portfolio item in the portfolio hierarchy. A portfolio item represents any node in the portfolio hierarchy, whereas a portfolio holding instance, a more specific form of a portfolio item, represents a leaf node (i.e., lowest-level node) in the portfolio hierarchy. The map of individual AI suggestions to precise structural positions within the hierarchical portfolio is referred to as location data. Location data may include, but is not limited to, AI suggestion identifiers (i.e., unique ID) and AI suggestions locations (i.e., precise structural positions within the portfolio hierarchy). Each AI suggestion location may be specified by a hierarchical path to a portfolio item or a portfolio item attribute with or without relative offsets. Relative offsets may include, but are not limited to, a two-dimensional (x, y) display offset (e.g., x pixels from the left edge and y pixels below the top edge of a portfolio item, portfolio holding instance, portfolio item attribute, portfolio holding instance attribute), a three-dimensional (x, y, z) display offset (e.g., x, y, and z spatial coordinates for augmented reality (AR), mixed reality (MR), or virtual reality (VR) applications and displays), or a justification offset (e.g., left, center, right, top, middle, bottom). For example, an AI suggestion may offer a user financial advice pertaining to a portfolio holding instance with a structural position specified by the hierarchical path: root node\first-level element\second-level element\ . . . \portfolio holding instance. The AI suggestion may be mapped to a precise structural position within the portfolio hierarchy by prepending the hierarchical path of the portfolio holding instance to the relative offset: \right (e.g., right justification relative to name of the portfolio holding instance displayed to the user on the client device), resulting in the following AI suggestion location: root node\first-level element\second-level element\ . . . \portfolio holding instance\right. Portfolio mapping service 210 manages and provides access to location data to other services within investment application services 124.

The portfolio view service 212, in an embodiment, assembles an artificial intelligence view (AI view) for overlay upon a hierarchical portfolio (e.g., a hierarchical portfolio contained or referenced in a request submitted by a user of investment system 102) by combining AI suggestions (e.g., AI suggestions from portfolio suggestion service 208) and location data (e.g., location data from portfolio mapping service 210). Within the assembled AI view (i.e., overlay layer), individual AI suggestions are organized by positions (i.e., locations) corresponding to the portfolio items to which they refer. This organizational process enables AI suggestions to be received, viewed, and understood by users in the context of the underlying hierarchical portfolio. For example, within an AI view overlaid upon a hierarchical portfolio displayed on a client device (e.g., client devices 106 or 108 or third-party systems 110), a first AI suggestion may be positioned, using location data from a mapping service (e.g., portfolio mapping service 210), near a first portfolio item to which it refers or a first portfolio item attribute to which it refers. Similarly, in the same AI view, a second AI suggestion may be positioned near a second portfolio item or a second portfolio item attribute to which it refers. The process of positioning AI suggestions relative to portfolio items and portfolio item attributes is described in more detail in FIG. 4.

In some embodiments, the AI view assembled by portfolio view service 212 may be interactive, and one or more different types of AI views may be assembled depending on requests from the user for specific types of financial advice. For example, in response to a user request for restructuring advice, a restructuring AI view containing suggestions for restructuring the hierarchical portfolio, or portions thereof, may be assembled and presented. The restructuring AI view may offer suggestions for eliminating existing branches from or adding new branches to the hierarchical portfolio. In response to a user request for allocation advice, an allocation AI view containing suggestions for allocating funds to the hierarchical portfolio, or portions thereof, may be assembled and presented. The allocation AI view may offer suggestions for reducing exposure (i.e., decreasing funds) or adding exposure (i.e., increasing funds) to existing portfolio holding instances contained in the hierarchical portfolio. It may also offer suggestions for establishing exposure (i.e., initial funds) to portfolio candidate holdings not included in the hierarchical portfolio. In response to a user request for positioning advice, a positioning AI view containing suggestions for positioning portfolio holding instances within the hierarchical portfolio, or portions thereof, may be assembled and presented. The positioning AI view may offer suggestions for repositioning (i.e., moving) an existing portfolio holding instance from its existing position (i.e., location) to another position within the portfolio hierarchy. It may also offer suggestions for positioning (i.e., placing) a portfolio candidate holding in a specific position within the portfolio hierarchy. In response to a user request for consolidation advice, a consolidation AI view containing suggestions for consolidating portfolio holding instances within the hierarchical portfolio, or portions thereof, may be assembled and presented. The consolidation AI view may offer suggestions for consolidating (i.e., combining) identical or similar portfolio holding instances from different positions (i.e., locations) to a consolidated (i.e., single) position within the portfolio hierarchy. In other embodiments, additional types (e.g., structuring, tuning, partitioning, harvesting, distribution, etc.) of AI views may be provided without departing from the scope of this disclosure.

In some embodiments, in response to a succession of user requests for specific types of financial advice, portfolio view service 212 may change the visibility state of different types of AI views previously assembled. For example, a request for positioning advice from a user may cause the state of a newly assembled positioning AI view to become visible and any other types AI views (e.g., restructuring, allocation, or consolidation) previously assembled to become temporarily invisible. Portfolio view service 212 manages and provides access to AI views to other services within investment application services 124.

The portfolio approval service 214, in an embodiment, submits an AI view (e.g., an AI view assembled by portfolio view service 212) for examination and approval by a financial review board (FRB) comprised of one or more investment professionals (e.g., financial advisors) authorized to provide financial advice to financial clients (e.g., customers of financial advisors). Each FRB team member may utilize a client device (e.g., client device 106 or 108 or third-party system 110) to access intelligent investment system 102 and portfolio approval service 214 to view an AI view submitted for review in the context of an underlying hierarchical portfolio (e.g., a hierarchical portfolio submitted by a financial client requesting financial advice). Once the AI view is reviewed, the FRB team may reject the AI view, approve some of the AI suggestions within the AI view, approve the AI view as is, or release the AI view for publication to the financial client who submitted the request for financial advice. Portfolio approval service 214 manages and provides access to reviewed AI views to other services within investment application services 124.

The portfolio advice service 216, in an embodiment, produces a publishable AI view (i.e., an AI view suitable for publication to a financial client) by redacting any rejected AI suggestions from the AI view reviewed by FRB team members via portfolio approval service 214. It may also enable financial professionals, typically members of the FRB, to add annotations to the set of unredacted (i.e., approved) AI suggestions within the publishable AI view. Portfolio advice service 216 publishes AI views that have been reviewed, approved, and optionally annotated to financial clients. It may further provide the ability to persist, through a data interface service (e.g., data interface service 218), a published AI view (i.e., an AI view containing professionally reviewed, approved, and optionally annotated AI suggestions published to a financial client) to a private or public blockchain (e.g., private or public distributed ledger 138) via a private or public blockchain server (e.g., private or public distributed ledger server 130) for the purpose of establishing or maintaining a personal financial record (PFR) of financial advice provided to the financial client by one or more financial advisors and firms over time.

In some embodiments, portfolio advice service 216 may produce an unpublishable AI view (i.e., an AI view unsuitable for publication to a financial client) by retaining one or more rejected AI suggestions within the AI view reviewed by FRB team members via portfolio approval service 214. It may also enable financial professionals tasked with providing supervised learning for machine learning algorithms (e.g., machine learning algorithms 136) to add annotations to both the set of approved AI suggestions and the set of rejected AI suggestions within the unpublishable AI view. Portfolio advice service 216 may further provide the ability to persist, through a data interface service, an unpublished AI view (i.e., an AI view not published to a financial client that contains professionally reviewed, approved or rejected, and optionally annotated AI suggestions) to a private blockchain via a private blockchain server for the purpose of continuous supervised learning, rather than establishing or maintaining a personal financial record for the financial client. In other embodiments, alternative machine learning approaches, such as unsupervised learning without direct feedback from FRB team members or reinforcement learning with both positive and negative rewards, may be utilized without departing from the scope of this disclosure.

In various embodiments, portfolio advice service 216 may generate a redlined hierarchical portfolio that visually depicts proposed changes (e.g., proposed additions, deletions, and updates) to the structure or content of the hierarchical portfolio resulting from one or more AI suggestions displayed on the client device. The redlined hierarchical portfolio may be configured to be displayed to a user of intelligent investment system 102 in a read-only mode or in an edit mode. When displayed to the user in edit mode, the redline hierarchical portfolio may be utilized, by the user, to make customized changes (i.e., user-generated changes) to any portion of the structure or content of the hierarchical portfolio. Customized changes created by the user while in edit mode may be saved, by the user, to intelligent investment system 102 prior to or upon exiting edit mode. The operation to save one or more customized changes may cause intelligent investment system 102 to automatically generate, classify (e.g., restructuring, allocation, positioning, consolidation, etc.), and locate (i.e., map to a precise structural position within the hierarchical portfolio) one or more new suggestions, where each new suggestion comprises one or more of the customized changes saved and implicitly accepted by the user. Portfolio advice service 216 manages and provides access to published AI views, unpublished AI views, and redlined hierarchical portfolios (containing changes proposed by the system or customized changes proposed by a user) to other services within investment application services 124.

The data interface service 218, in an embodiment, provides secure access via an internal or external network (e.g., network 104) to one or more data sources (e.g., databases 134, machine learning algorithms 136, or distributed ledgers 138) and stores, retrieves, and manages data on behalf of other services within investment application services 124. In some embodiments, the data sources may be either internal or external to intelligent investment system 102. In some embodiments, the data sources may be first-party or third-party data sources.

The application management service 220, in an embodiment, provides application configuration services and user data management services for application administrators and application users of intelligent investment system 102. Application administrators may utilize application management service 220 to customize the look and feel of the application, configure application objects and process flows, setup and maintain integrations to data sources, manage user accounts, and establish roles and privileges for accessing application objects. An application administrator may be an internal administrator (e.g., a system admin inside the firewall of a financial firm) or an external administrator (e.g., a system admin outside the firewall of a financial firm). An application administrator may also be a first-party administrator (e.g., a system admin employed by a financial firm) or a third-party administrator (e.g., a system admin employed by a supplier to or partner of a financial firm).

Application users may utilize application management service 220 to open new accounts, manage existing accounts, transfer or link to third-party accounts, and maintain a wide variety of user data, including user profile information, financial goals, investment objectives, investment preferences, time horizon, risk tolerance, income estimates, inheritance, financial records, life events, risks, liabilities and expenses. User profile information may comprise a public or semi-public user profile (e.g., contact information, gender, location, interests, favorites, schools, profession, work experience, etc.), private user profile (e.g., user name, primary address, date of birth, email address, spouse, beneficiaries, family members, investment experience, etc.), or confidential user profile (e.g., academic record, credit scores, criminal record, driving record, etc.). Financial goals may include education, family, home, business, legacy, or retirement goals. Investment objectives may include income, growth, speculation, or blended objectives. Investment preferences may comprise smart beta (e.g., volatility, value, quality, size, or momentum factors), ESG (e.g., environmental, social, or governance factors), or tilt (e.g., technology, healthcare, financial sector tilts) preferences. Time horizon may include short, medium, or long-term periods. Risk tolerance may include aggressive, moderate, or conservative postures. Income estimates may comprise active income estimates (e.g., wages, tips, commissions, bonuses, stock option sales, etc. from full-time, self, or part-time employment), passive income estimates (e.g., real estate rentals, equipment leasing, non-participatory businesses, etc.), portfolio income estimates (e.g., taxable interest, tax-exempt interest, dividends, annuities, capital gains and losses, investment property or undeveloped land sales, participatory businesses, collectables, lotteries, royalties, etc.), or retirement income estimates (e.g., social security benefits, pensions, individual retirement account (IRA) distributions, non-principal trust distributions, etc.). Inheritance may include personal items, artwork, valuables, real estate, other physical assets, savings and checking accounts, brokerage accounts, retirement accounts, trusts, other paper assets, intellectual property, other intangible assets, unpaid bills, unpaid taxes, or other unpaid liabilities. Financial records may include 401(k), annuity, checking, brokerage, insurance, IRA, money market, pension, savings, social security, tax return, treasury, or trust statements or accounts. Life events may comprise positive life events (e.g., college, new job, marriage, moving, baby, promotion, new car, new home, remodeling, retirement, etc.) or challenging life events (e.g., financial loss, illness, job loss, sibling support, parent support, long-term care, hospice, funeral, etc.). Risks may include employment, health, housing, liquidity, longevity, or property risks. Liability and expenses may comprise historical, current, and estimated obligations and costs related to cost of living (e.g., clothing, dues, food, fuel, home products, internet, personal products, phone, rent, trash, utilities, etc.), discretionary items (e.g., activities, cable, clubs, dining, electronics, entertainment, fitness, gifts, hobbies, luxuries, sports, subscriptions, travel, vacations, etc.), healthcare (e.g., dental, emergency, hearing, medications, nursing, operations, vision, etc.), insurance (e.g., boat, car, health, home, life, rental, umbrella, valuables, etc.), leases and loans (e.g., auto, credit card, home, line of credit, personal, property, etc.), legal matters (e.g., alimony, child support, divorce, foreclosures, liens, litigation, etc.), maintenance (e.g., auto, boat, home, rental property, etc.), professional services and fees (e.g., accounting, asset management, estate planning, financial planning, health management, legal, private banking, tax preparation, trust management, etc.), or taxes (e.g., income taxes, property taxes, short-term and long-term capital gains taxes, etc.).

Application users may further utilize application management service 220 to a) store specific user data parameter values (e.g., top financial goal is to buy a home, moderate growth investment objective, long time horizon, low risk tolerance, etc.) to be utilized when running investment system 102 in a collaborative mode, b) define and store one or more scenarios comprising preconfigured sets of user data parameter values to be utilized when running investment system 102 in a scenario mode, or c) store values of constraint parameters, specifying an asset or subset of assets of interest to a user, to be utilized when running investment system 102 in a focused mode. An application user may be an internal or external user and may also be a first-party or third-party user. Collaborative mode, scenario mode, and focused mode are described in more detail as part of the description of FIG. 9.

While, in various embodiments, portfolio view service 212, approval service 214, and advice service 216 within investment application services 124 of investment system 102 respectively assemble, approve, and publish an approved AI view of a hierarchical portfolio, in other embodiments, these services may respectively assemble, approve, and publish an approved non-AI view of a hierarchical portfolio. The non-AI view may also be referred to as the human view. In such cases, the approved non-AI view (i.e., approved human view) may contain only human-authored suggestions (e.g., suggestions authored by a financial advisor or by one or more FRB team members) for changing the structure or content of the hierarchical portfolio, rather than suggestions generated based on portfolio recommendations from machine learning models. To operate in such a mode and provide approved human views, rather than approved AI views, of a hierarchical portfolio, application management service 220 of investment system 102 may be configuring to display redlined hierarchical portfolios in edit mode to users who have the role of a financial advisor or FRB team member. For example, for a financial advisor or FRB member to author a human view of a hierarchical portfolio, the redline hierarchical portfolio may be utilized to make customized changes to a portion of the structure or content of the hierarchical portfolio. Upon saving these customized changes, intelligent investment system 102 may first create a new human view and then generate, classify, and locate within the human view one or more suggestions corresponding to the one or more customized changes authored by the financial advisor or FRB member. The new human view may subsequently be routed for approval in the same manner as an AI view.

In various embodiments, intelligent investment system 102 may be configured to operate in one of several modes: 1) pure human view mode, 2) combined human-AI view mode, or 3) pure AI view mode. In the first mode, intelligent investment system 102 provides a view of a hierarchical portfolio containing only human-authored suggestions. In the second mode, it provides a view of a hierarchical portfolio containing and combing both human-authored and AI-generated suggestions, and in the third mode, it provides a view of a hierarchical portfolio containing only AI-generated suggestions. It is to be understood that since investment system 102 is an intelligent system (i.e., AI-powered system) and that intelligent systems, typically, take time to learn how to generate optimal outputs (e.g., classifications, suggestions, recommendations, etc.) from a set of given inputs (e.g., user data, hierarchical portfolio, global financial data, etc.) based on supervised, unsupervised, reinforcement learning techniques applied to very large sets of diverse domain-specific training data, intelligent investment system 102 may operate in mode 1 (e.g., pure human view mode) for a first period of time, followed by mode 2 (e.g., combined human-AI view mode) for a second, and likely substantial, period of time, and ultimately in mode 3 (e.g., pure AI view mode) thereafter. Throughout this disclosure, the term AI view may be used to refer to a combined human-AI view (containing both human-authored and AI-generated suggestions) or a pure AI view (containing only AI-generated suggestions), wherein the context in which the term is utilized will clarify its intended meaning to one skilled in the art.

AI Views of a Hierarchical Portfolio

Figure 3:
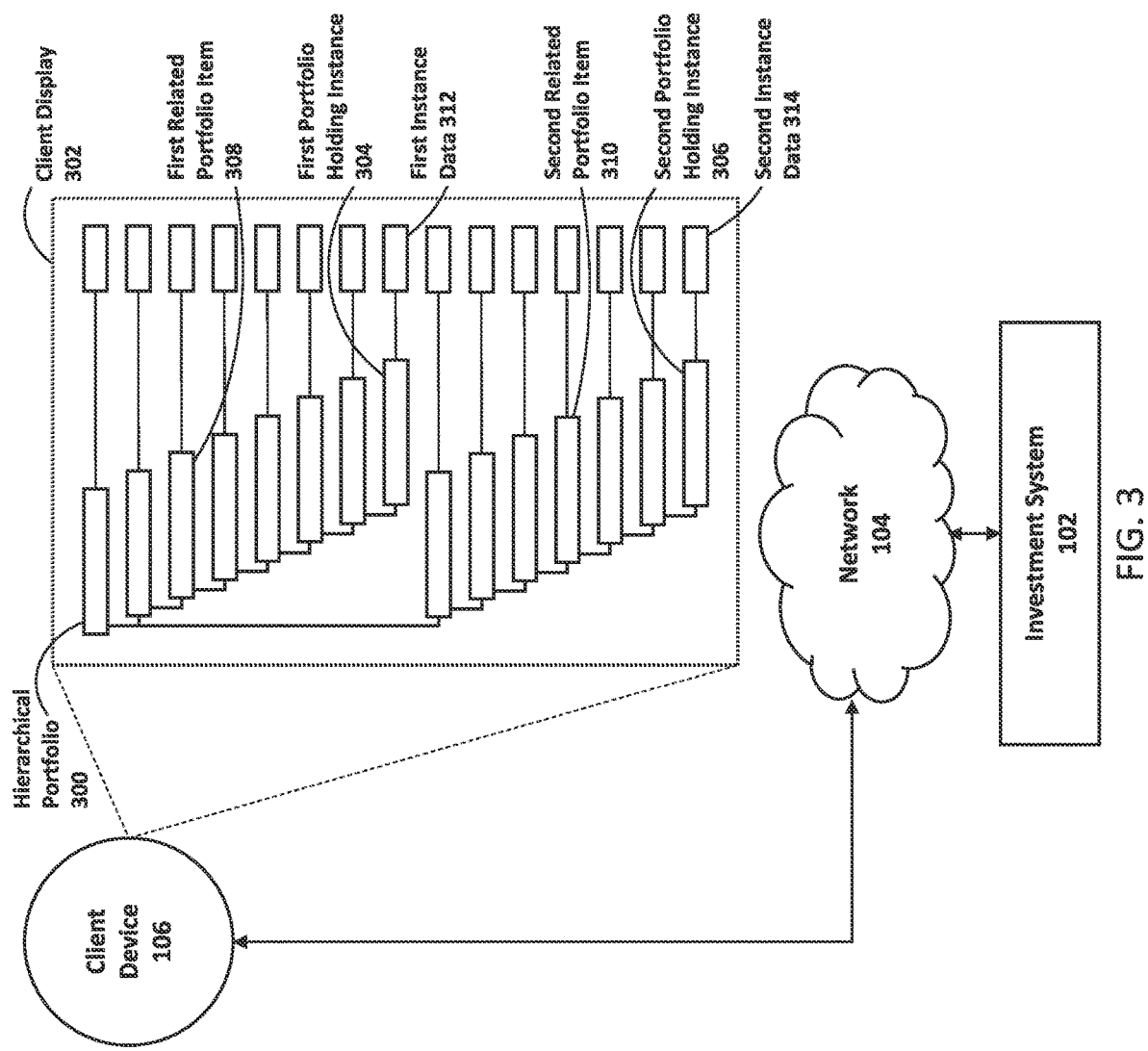
FIG. 3 is an illustration of a hierarchically organized portfolio presented on a display of a client device connected to an intelligent investment system via a network according to various embodiments.

FIG. 3 illustrates a client device 106 connected to intelligent investment system 102 via network 104. In various embodiments, the client device 106 may take on many different form factors (e.g., smartphone, tablet, laptop, workstation, smart TV, smart whiteboard, wall computer, smart glasses, etc.). The client device may include one or more applications, processors, displays, input devices, and network interfaces. The applications may be configured to perform the various functions and methods discussed herein. The processors (e.g., central processing units, graphics processing units, neural processing units, etc.) may locally execute applications and render display images, or they may facilitate remote execution and rendering of applications and display images. The display, or displays (e.g., dual-display workstations or smart glasses or multi-display whiteboards or wall computers), of the client device may be controlled through various gestures (e.g., finger, hand, head, body, or eye) or commands (e.g., text or voice) via a combination of input devices (e.g., touchscreen, mouse, stylus, gesture recognition sensor, eye tracking sensor, keyboard, or microphone). The network interfaces of the client device may support multiple communication standards (NFC, Bluetooth, Wi-Fi, Ethernet, Fiber Channel, 3G, 4G, 5G, etc.) to transmit and receive data to and from intelligent investment system 102.

FIG. 3 further depicts a hierarchical portfolio 300 presented on a client display 302 of client device 106. In various embodiments, the hierarchical portfolio 300 represents multiple portfolio holdings organized in a hierarchical investment structure. Portfolio holdings (e.g., stocks, bonds, or other assets; mutual funds, ETFs, or other pooled investment vehicles) may be located at various positions within the hierarchical investment structure. For example, hierarchical portfolio 300 may contain a first portfolio holding instance 304 (e.g., an instance of the stock of Google) of a particular portfolio holding (e.g., the stock of Google) and a second portfolio holding instance 306 (e.g., an instance of the stock of Apple) of a different portfolio holding (e.g., the stock of Apple). In addition, a specific portfolio holding itself may be located at several different positions within the hierarchical portfolio structure. For example, hierarchical portfolio 300 may contain a first portfolio holding instance 304 (e.g., a first instance of the stock of Tesla) of a specific portfolio holding (e.g., the stock of Tesla) and a second portfolio holding instance 306 (e.g., a second instance of the stock of Tesla) of the same portfolio holding (e.g., the stock of Tesla). Since the first and second portfolio holding instances 304, 306 are positioned several levels below the top node of the portfolio hierarchy, they may each be associated with multiple related portfolio items along the upward traversal path to the top node. For example, within hierarchical portfolio 300, a first related portfolio item 308 (e.g., an economic sector, such as the technology sector) is shown to be associated with first portfolio holding instance 304 (e.g., the first instance of Tesla stock) and a second related portfolio item 310 (e.g., a market capitalization valuation level, such as the large-cap valuation level) is shown to be associated with second portfolio holding instance 306 (e.g., a second instance of Tesla stock).

Portfolio holding instances may further contain or reference portfolio holding instance data. For example, first portfolio holding instance 304 (e.g., a first instance of Tesla stock) may contain or reference first portfolio holding instance data 312, which include data attributes (e.g., stock symbol, shares owned, cost basis, and market value) and corresponding data attribute values (e.g., TSLA, number of shares purchased, purchase amount in dollars, and current market value in dollars) associated with first portfolio instance 304. Similarly, second portfolio holding instance 306 (e.g., a second instance of Tesla stock) may contain or reference second portfolio holding instance data 314, which include data attributes (e.g., the same, or similar, data attributes as the first instance of Tesla stock) and corresponding data attribute values (e.g., likely with several different data attribute values compared to the first instance of Tesla stock) associated with second portfolio instance 306.

Figure 4:
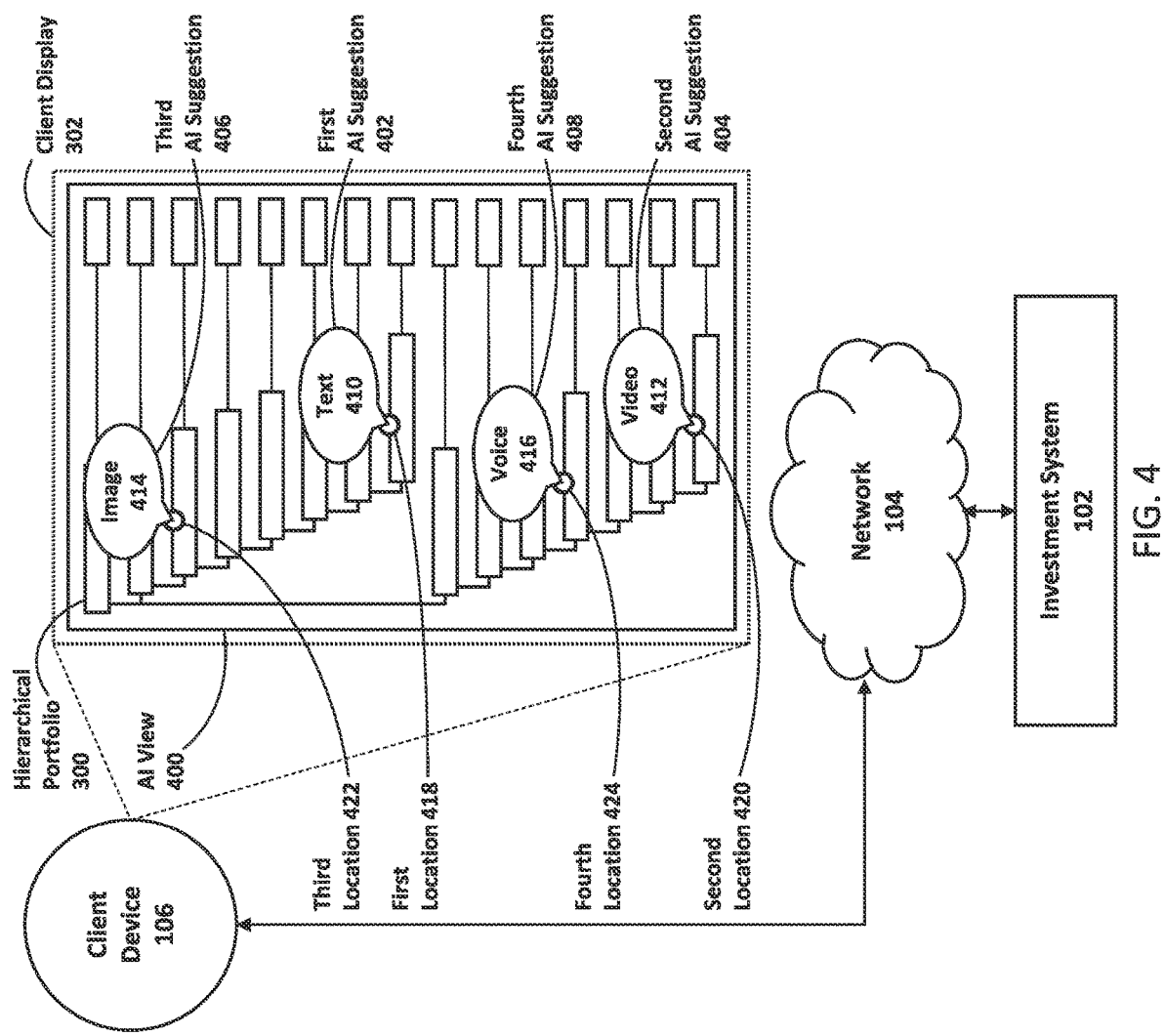
FIG. 4 is an illustration of an artificial intelligence view (AI view) of a hierarchical portfolio presented on a display of a client device according to various embodiments.

FIG. 4 is an illustration of an artificial intelligence view 400 of hierarchical portfolio 300 presented on client display 302 of client device 106 connected to intelligent investment system 102 via network 104. In various embodiments, the AI view provides context-specific suggestions for optimizing the structure or content of an underlying hierarchical portfolio. For example, AI view 400 is shown to provide several context-specific AI suggestions for optimizing underlying hierarchical portfolio 300, including a first AI suggestion 402 and a second AI suggestion 404. The first AI suggestion 402 is presented in the context of the portfolio holding instance to which it refers (i.e., first portfolio holding instance 304). Similarly, the second AI suggestion 404 is presented in the context of the portfolio holding instance to which it refers (i.e., second portfolio holding instance 306). In addition, AI view 400 is shown in this example to further provide a third AI suggestion 406 presented in the context of the related portfolio item to which it refers (i.e., first related portfolio item 308) and a fourth AI suggestion 408 presented in the context of the related portfolio item to which it refers (i.e., second related portfolio item 310).

In various embodiments, the AI view further provides precise AI suggestion locations with respect to the underlying hierarchical portfolio. For example, a first AI suggestion location 418 is shown to determine the precise position of AI suggestion 402 within hierarchical portfolio 300. Similarly, second, third, and fourth AI suggestion locations 420, 422, and 424 are shown to respectively determine the precise positions of AI suggestions 404, 406, and 408 within hierarchical portfolio 300.

In some embodiments, individual AI suggestions may be presented to a user utilizing a specific media type. For example, AI suggestion 402 is presented to the user as a text message 410. Similarly, AI suggestions 404, 406, and 408 are presented to the user as a video message 412, an image message 414, and a voice (i.e., audio) message 416, respectively. Supported media types may include, but are not limited to, standard internet media types, such as application, audio, image, model, text, and video, as well as various corresponding subtypes. In other embodiments, individual AI suggestions may be presented to a user using any combination of media types. For example, a first AI suggestion may be presented to the user in the form of a first message containing text (e.g., text/plain) and images (e.g., image/jpeg, image/png, etc.); a second AI suggestion may be presented to the user in the form of a second message containing an animation (e.g., image/gif) with audio (e.g., audio/aac); a third AI suggestion may be presented to the user in the form of a third message containing video (video/mp4) with associated hypertext (i.e., text/html); and a fourth AI suggestion may be presented to the user in the form of a fourth message containing a 3D model (i.e., model/x3d+xml) or a hologram with an associated title, caption, and description in JavaScript Object Notation (JSON) format (i.e., application/json).

Figure 5:
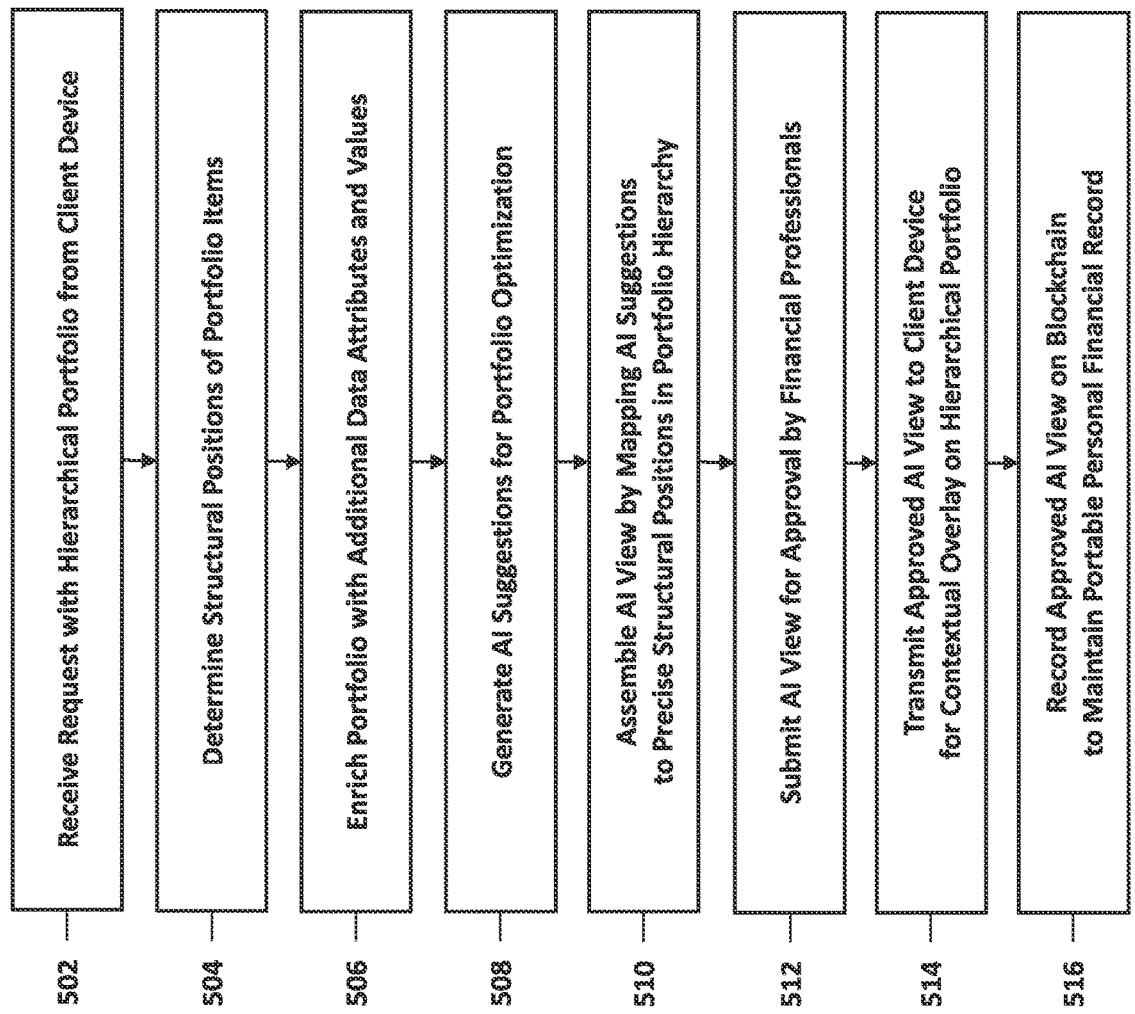
FIG. 5 is a flowchart of an example method for providing an AI view of a hierarchical portfolio according to an exemplary embodiment.

FIG. 5 is a flowchart of an example method 500 for providing an AI view of a hierarchical portfolio displayed on a client device according to an exemplary embodiment. The method 500 may be started upon receiving a request for advice from a client device. As shown in this example, method 500 may include operations comprising: receiving a request containing or referencing a hierarchical portfolio from the client device 502, determining structural positions of relevant portfolio items 504, enriching the hierarchical portfolio with additional data attributes and data values 506, generating AI suggestions for optimizing the relevant structure or content of the hierarchical portfolio 508, assembling an AI view by mapping AI suggestions to precise structural positions in the hierarchical portfolio 510, submitting the AI view for review and approval by one or more financial professionals 512, transmitting the AI view to the client device for contextual overlay on the hierarchical portfolio 514, and permanently recording the AI view on a private or public blockchain 516 to establish or maintain a portable personal financial record of investment advice provided to a financial client over time.

At block 502, in an embodiment, a request containing or referencing a hierarchical portfolio is received from a client device via network 104 by application server 122. The hierarchical portfolio may be from a portfolio stored on the client device or accessed remotely by the client device. For example, an application (e.g., web client application 112) may be run on a client device (e.g., client device 106) that provides access to a hierarchical portfolio by prompting the user to open a file (e.g., a local or remote document), click on a hyperlink (e.g., a link to a local or remote resource), or launch a service (e.g., portfolio management service 202). In various embodiments, the hierarchical portfolio is displayed on the client device and guidelines are provided to help the user navigate the structural elements of the hierarchical portfolio prior to submitting it as part of a request for advice from an AI-enhanced investment system (e.g., intelligent investment system 102). For example, an application (e.g., API client application 114) running on a client device (e.g., client device 108) may guide the user from a top-level element (i.e., root-level node) of the hierarchical portfolio to first-level elements by enabling the user to expand the top-level element by clicking on an expansion symbol or icon. Similarly, the application may guide the user to explore second-level elements by expanding any of the first-level elements. The application may continue to guide the user to explore increasingly lower-level elements until a leaf-level element (i.e., bottom-level node) has been reached. In various embodiments, a leaf-level element may represent a portfolio holding instance, and a non-leaf-level element may represent an aggregation (i.e., grouping) of various portfolio holding instances.

In an embodiment, at block 504, the hierarchical portfolio contained or referenced within the request received in block 502 is searched by a search service (e.g., portfolio search service 204) to identify unique portfolio holdings and unique portfolio holding instances and to determine the structural positions (e.g., hierarchical paths) of the unique portfolio holding instances. For example, the search service may identify a first portfolio holding (e.g., the stock of Google) and a first portfolio holding instance (e.g., an instance of Google stock) and determine its structural position in the form of a first hierarchical path (e.g., stock\technology\united states\mega-cap\growth\fidelity\google) by traversing many levels (e.g., asset class, sector, geography, market capitalization level, investment style, brokerage firm, and equity identifier) of the hierarchical portfolio. The search service may further identify a second portfolio holding (e.g., the 30-year U.S. Treasury Inflation Protected Security, TIPS, bond maturing in 2045) and a second portfolio holding instance (e.g., an instance of the 30-year U.S. TIPS 2045 bond) and determine its structural position in the form of a second hierarchical path (e.g., bond\trust1\us treasury\30-year tips\2045\treasury direct\confirmation number) by traversing many levels (e.g., asset class, trust, sovereign bond issuer, bond type, maturity date, auction platform, and confirmation number) of the hierarchical portfolio.

In various embodiments, at block 504, the hierarchical portfolio may be further searched to determine structural positions of related portfolio items (i.e., structural elements within the hierarchical portfolio along an upward traversal path starting from a leaf-level element up to the top-level element of the hierarchy). For example, the search service may further identify a third portfolio holding (e.g., the GLD exchange traded fund, an ETF which tracks the price of gold) and a third portfolio holding instance (e.g., an instance of GLD) and determine its structural position in the form of a third hierarchical path (e.g., commodity\trust1\gold\morgan stanley\gld) by traversing downward through many levels (e.g., asset class, trust, commodity type, and custodian) of the hierarchical portfolio. Next, starting from the leaf-level element representing the third portfolio holding instance (e.g., the instance of GLD), the search service may traverse upward in the portfolio hierarchy by one level to ascertain a fourth hierarchical path (e.g., commodity\trust 1\gold\morgan stanley) that determines the structural position of a related portfolio item (e.g., a custodian, Morgan Stanley, holding the instance of GLD) representing the parent of the third portfolio holding instance. The search service may continue to traverse upward through additional levels of the portfolio hierarchy to ascertain other hierarchical paths that determine the structural positions of other portfolio items related to the third portfolio instance, such as a related portfolio item (e.g., a commodity type, gold, containing the custodian, Morgan Stanley, holding the instance of GLD) representing the parent-of-the-parent of the third portfolio holding instance.

In an embodiment, at block 506, unique portfolio holdings identified in block 504 are enriched by an enrichment service (e.g., portfolio enrichment service 206) with additional data attributes and data attribute values. In some embodiments, portfolio candidate holdings that are similar to one or more portfolio holdings within the hierarchical portfolio are also included in the enrichment process. For example, both the set of attributes associated with portfolio holdings included within the hierarchical portfolio and the set of attributes associated with portfolio candidate holdings not yet included within the hierarchical data may be augmented by the enrichment service with additional data attributes and populated with the most current data attribute values using publicly or privately available market data (e.g., 52-week high, 52-week low, actual EPS, beta, estimated EPS, forward P/E ratio, trailing P/E ratio, market capitalization, maturity date, yield, etc.) or other global financial data (e.g., news, events, sentiment analyses, forecasts, policy statements, economic data, corporate filings, analyst research, etc.).

In an embodiment, at block 508, individual AI suggestions for optimizing the hierarchical portfolio subject to data constraints and conditions, such as user data constraints and global financial data conditions, are generated based on the enriched hierarchical portfolio from block 506. For example, an AI-powered suggestion service (e.g., portfolio suggestion service 208) employing one or more machine learning algorithms (e.g., machine learning algorithms 136) may use the enriched hierarchical portfolio (e.g., the hierarchical portfolio augmented with enriched portfolio holding and candidate holding data) provided by block 506 to generate portfolio restructuring, allocation, positioning, or consolidation suggestions subject to constraints and conditions related to a) user data defined and stored within a user data management service (e.g., application management service 220) and accessible via one or more application servers (e.g., application servers 122) and b) global financial data stored within one or more databases (e.g., databases 134) and accessible via one or more database servers (e.g., database servers 126). This process is described in more detail in FIG. 6.

In an embodiment, at block 510, an AI view of the hierarchical portfolio is assembled based on the AI suggestions from block 508 and location data provided by a mapping service (e.g., portfolio mapping service 210). For example, a view service (e.g., portfolio view service 212) may be utilized to assemble an AI view comprising AI suggestions from block 508 and location data from the mapping service. The location data may contain individual AI suggestion identifiers and corresponding AI suggestion locations. Each AI suggestion location in the location data may be specified by a hierarchical path to a portfolio item or a portfolio item attribute with or without a display offset (e.g., 2D or 3D) or a justification offset (e.g., left, right, top, bottom, etc.), thereby enabling each AI suggestion to be mapped to a precise structural position within the hierarchical portfolio. The mapping service may utilize the structural positions determined in block 504 as a valid source for hierarchical paths of portfolio items. It may utilize these paths directly or augment them with portfolio item attributes or relative offsets (e.g., display or justification offsets) to construct AI suggestion locations that precisely place AI suggestions in the proper context within the hierarchical portfolio.

In an embodiment, at block 512, the AI view of the hierarchical portfolio assembled in block 510 is routed via a collaborative approval service (e.g., portfolio approval service 214) for review by a financial review board (FRB). The FRB may include the financial advisor of the financial client who a) owns the hierarchical portfolio and b) has made a request for financial advice via a client device (e.g., client device 106), where the request contains or references the hierarchical portfolio. The FRB may further comprise one or more financial professionals skilled in hierarchical portfolio optimization and authorized to validate and optionally annotate the AI suggestions contained within the AI view. To do so in an efficient manner, each FRB team member may utilize a client device (e.g., client devices 106, 108, 110) to access portfolio approval service 214 of intelligent investment system 102 in order to review the AI view in the context of the underlying hierarchical portfolio owned by the financial client requesting financial advice. During the review process, the state of the AI view may be changed by the collaborative approval service to reflect the assessment of the review board. AI view states may include, but are not limited to, pending, submitted, on hold, canceled, rejected, approved, released, and published. For example, a first AI view routed through the collaborative approval service may be reviewed and subsequently rejected by the review board, thus changing its state to rejected. Similarly, a second AI view may be reviewed and approved by the review board, thus changing its state to approved.

In an embodiment, at block 514, an approved AI view from block 512 is transmitted to the client device for contextual overlay on the hierarchical portfolio displayed on the client device via an AI-assisted investment advice service (e.g., portfolio advice service 216). In various embodiments, an application server (e.g., application server 122) determines, based on location data from a mapping service (e.g., portfolio mapping service 210), the positions (i.e., locations) upon which to overlay the AI suggestions, contained within the AI view, on the hierarchical portfolio displayed on the client device. The application server may further determine the most suitable media type for presenting AI suggestions to the user. For example, an AI view (e.g., AI view 400) may include an AI suggestion (e.g., AI suggestion 402) in the form of a text message (e.g., text 410) containing financial advice for allocating funds to a specific portfolio holding instance (e.g., first portfolio holding instance 304). This text message may then be presented in the proper context to the user by positioning the message at the location (e.g., first AI suggestion location 418) of the portfolio holding instance to which it refers when the AI view is overlaid on the hierarchical portfolio (e.g., hierarchical portfolio 300) within the display (e.g., client display 302) of a client device (e.g., client device 106). Similarly, the AI view may include other AI suggestions (e.g., AI suggestions 404, 406, and 408) in the form of video, image, and voice messages (e.g., video 412, image 414, and voice 416) containing investment advice for other portfolio items. These video, image, and voice messages may then be presented in the proper context to the user by positioning the messages at the locations (e.g., second, third, and fourth locations 420, 422, and 424) of the portfolio items (e.g., second portfolio holding instance 306, first related portfolio item 308, and second related portfolio item 310) to which they respectively refer when the AI view is overlaid on the hierarchical portfolio displayed on the client device.

In various embodiments, individual AI suggestions may be visible or invisible to a user depending upon the expansion state of the underlying portfolio hierarchy. For example, when the top-level node of the portfolio hierarchy is fully contracted, no AI suggestions may be visible to the user. Furthermore, when the top-level node and all lower-level nodes of the portfolio hierarchy are fully expanded, all AI suggestions may be visible to the user when scrolling through the portfolio hierarchy presented on the client display of the client device.

In various embodiments, individual AI suggestions may be accessible or inaccessible to a user depending upon the user's role and associated privileges. For example, a user with the role of financial advisor (and the associated privileges to access all AI suggestions for optimizing the portfolios of the financial clients whom they serve) may access both the approved and rejected AI suggestions contained within an AI view overlaid on a financial client's portfolio presented on the client display of the financial advisor's client device. In contrast, another user with the role of financial client (and the associated privileges to access only approved AI suggestions for optimizing their portfolio) may access only the approved AI suggestions within an AI view overlaid on their portfolio presented on the client display of their client device.

In an embodiment, at block 516, an approved AI view is permanently recorded via a data interface service (e.g., data interface service 218) on a private blockchain (e.g., private distributed ledger 138) via a private blockchain server (e.g., private distributed ledger server 130) or a public blockchain (e.g., public distributed ledger 138) via a public blockchain server (e.g., public distributed ledger server 130) for the purpose of preserving, tracking, and analyzing approved financial advice published to financial clients (i.e., customers) and for future or immediate use in training the machine learning algorithms (e.g., machine learning algorithms 136) of an AI-enhanced investment system (e.g., intelligent investment system 102) via supervised learning techniques with positive examples.

In some embodiments, at block 516, a rejected AI view (e.g., an AI view rejected by the FRB team in its entirety) or a partially rejected AI view (e.g., an AI view containing one or more AI suggestions rejected by the FRB team) is permanently recorded via a data interface service on a blockchain (e.g., private blockchain) via a blockchain server (e.g., private blockchain server machine running private blockchain client software) for the purpose of preserving, tracking, and analyzing financial advice not published to financial clients and for principal use in training the machine learning algorithms of an AI-enhanced investment system via supervised learning techniques with negative examples. In various embodiments, other machine learning approaches (e.g., unsupervised learning or reinforcement learning) of may be utilized without departing from the scope of this disclosure.

In various embodiments, intelligent investment system 102 may be configured to 1) record all types of AI views to a blockchain in order to optimize training machine learning models or 2) record only approved AI views to a blockchain in order to establish and maintain portable financial records. In the former case, the process of persisting and immutably preserving all types of AI views (i.e., approved, rejected, and partially rejected AI views) of a hierarchical portfolio within a blockchain (e.g., private, public, or hybrid blockchain) provides network-based AI-enhanced investment systems (e.g., intelligent investment system 102 of network system 100) with an immutable (i.e., unchangeable) source of invaluable private training data. This process ensures the integrity (i.e., uncompromised state) of the compounding corpus of training data, enables continuous improvement in the performance (e.g., predictive accuracy) of the underlying machine learning models, and amplifies a firm's ability to provide better financial advice to its clients over time. In the latter case, the process of persisting and immutably preserving only approved AI views of a hierarchical portfolio within a blockchain enables network-based AI-enhanced investment systems to provide a financial client with a portable personal financial record (PFR) of financial advice provided over time by one or more financial advisors and firms. Given its capacity to store such advice over long periods of time, the PFR may serve as an analytical foundation for tracing, tracking, and analyzing financial advice and performance across multiple dimensions, including but not limited to portfolio, trust, fund, asset class, geography, style, theme, factor, sector, category, classification, rank, custodian, account, holding instance, holding, manager, advisor, firm, and time, thereby offering the financial client or trusted advisors of the financial client a fundamental advantage: the ability to make better financial decisions based on knowledge and insights accumulated within the PFR over time. The PFR is described in more detail in the subsection of the detailed description entitled Portable Personal and Multi-generational Financial Records.

Figure 6:
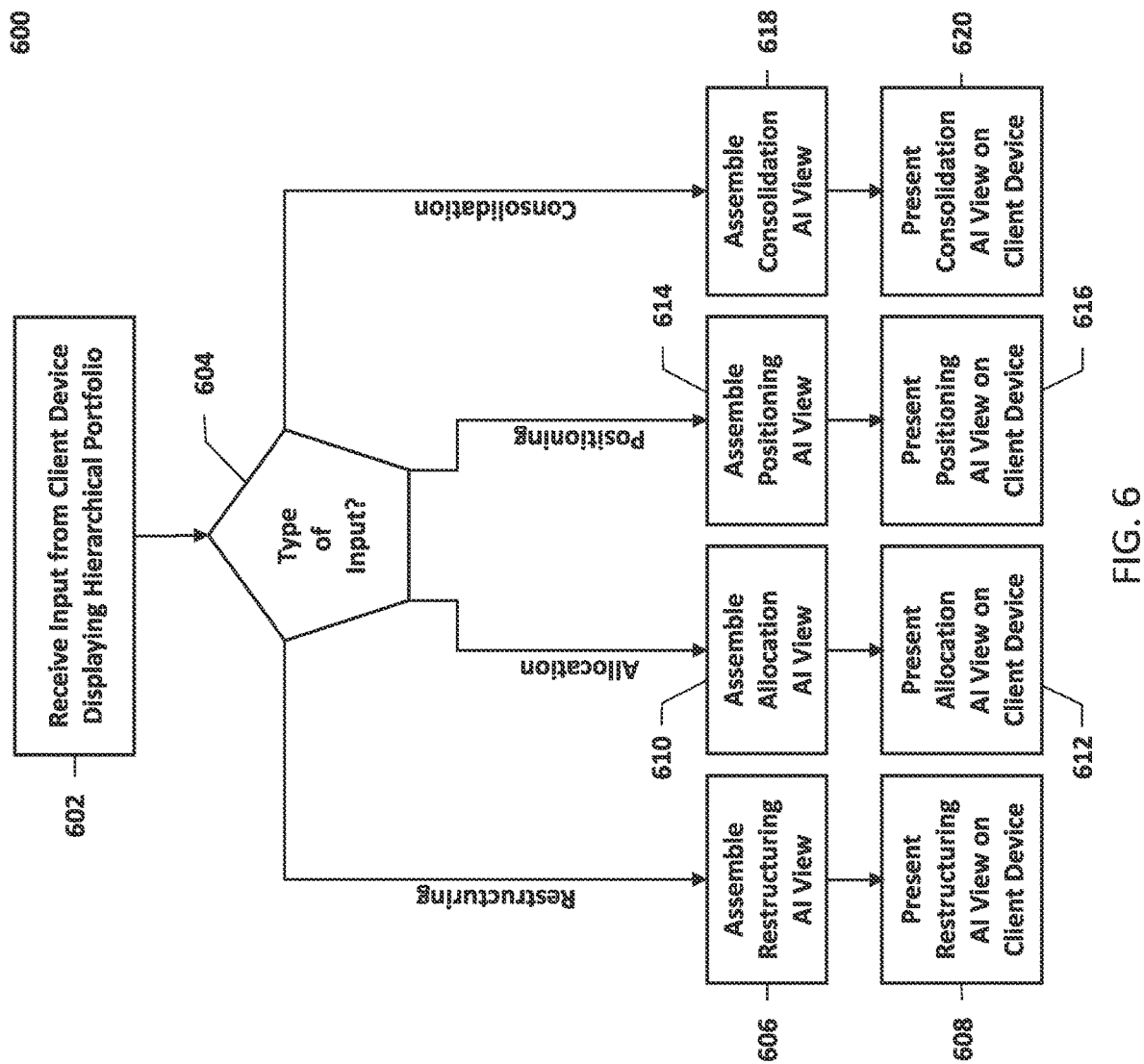
FIG. 6 is a flowchart of an example method for processing inputs received from a client device on an application server according to an exemplary embodiment.

FIG. 6 is a flowchart of an example method 600 for processing inputs received from a client device on an application server according to an exemplary embodiment. The method 600 may be started after transmitting an AI view from the application server to the client device, as discussed in method 500, or run independently. The inputs may be classified into one of a number of predefined input types (e.g., restructuring, allocation, positioning, or consolidation advice), with each input type representing a request for a specific kind of financial advice related to the hierarchical portfolio. As shown in this example, method 600 may include operations comprising: receiving an input from a client device displaying a hierarchical portfolio 602 and determining the type of the input 604; assembling a restructuring artificial intelligence view (i.e., restructuring AI view) of the hierarchical portfolio 606 and subsequently transmitting and presenting the restructuring AI view of the hierarchical portfolio on the client device 608 if the input type is restructuring; assembling an allocation artificial intelligence view (i.e., allocation AI view) of the hierarchical portfolio 610 and subsequently transmitting and presenting the allocation AI view of the hierarchical portfolio on the client device 612 if the input type is allocation; assembling a positioning artificial intelligence view (i.e., positioning AI view) of the hierarchical portfolio 614 and subsequently transmitting and presenting the positioning AI view of the hierarchical portfolio on the client device 616 if the input type is positioning; and assembling a consolidation artificial intelligence view (i.e., consolidation AI view) of the hierarchical portfolio 618 and subsequently transmitting and presenting the consolidation AI view of the hierarchical portfolio on the client device 620 if the input type is consolidation. Additional input types, such as structuring (e.g., assembling a new portfolio), tuning (e.g., optimizing allocation levels), partitioning (e.g., splitting existing nodes), harvesting (e.g., securing gains), or distribution (e.g., required or nonrequired withdrawals) may be employed without departing from the scope of this disclosure.

In an embodiment, at block 602, an input is received from a client device displaying a hierarchical portfolio. The input may be classified into a number of predefined input types, with each input type representing a request for a specific kind of financial advice related to the hierarchical portfolio. In various embodiments, the input may be received from a conversational messaging application or a personal artificial intelligence assistant (i.e., AI assistant) running on the client device that prompts the user for the input. The prompts may include, but are not limited to, a button selection prompt, menu selection prompt, text message prompt, or voice prompt. User responses to these prompts may include, but are not limited to, a button selection response, menu selection response, text message response, or voice response. User response mechanisms or methods may include, but are not limited to, a mouse, finger gesture, stylus, trackpad, hand gesture, remote control, head gesture, laser pointer, eye gesture, keyboard, or voice command.

In an embodiment, at decision block 604, it may be determined based on the input type from block 602, that the request from the user is for restructuring advice related to the hierarchical portfolio displayed on the client device. Accordingly, at blocks 606 and 608, advice for restructuring the hierarchical portfolio is generated, assembled, transmitted, and presented. More specifically, at block 606, the hierarchical portfolio, or portions thereof, may be enriched by portfolio enrichment service 206, relevant user data (e.g., user profile, investment objectives, income estimates, liabilities, expenses, etc.) and global financial data (e.g., market data, economic data, policy statements, analyst research, forecasts, reports, etc.) may be compiled into a data input package by portfolio suggestion service 208, and the contents of the data input package may be submitted to one or more machine learning (ML) models, such as a trained multilayer neural network model 1500, running on one or more local or remote machine learning servers, such as machine learning servers 128. The one or more ML models may be configured to recommend one or more suitable hierarchical portfolios based on the user data and global financial data contained within the data input package. Based on the one or more recommended hierarchical portfolios from the one or more ML models, portfolio suggestion service 208 may subsequently generate AI suggestions for optimally restructuring the hierarchical portfolio subject to user and global financial data constraints. Next, the AI restructuring suggestions are assembled into a restructuring AI view and routed to one or more financial professionals (e.g., a financial advisor or financial review board) authorized to validate and approve restructuring AI views (i.e., views containing AI restructuring suggestions). Finally, at block 608, the professionally approved restructuring advice, in the form of an approved restructuring AI view, is transmitted to the client device and presented to the user in the context of the hierarchical portfolio.

Similarly, in an embodiment, at decision block 604, it may be determined based on the input type from block 602 that the request from the user is for allocation, positioning, or consolidation advice related to the hierarchical portfolio displayed on the client device. Accordingly, at blocks 610 and 612, blocks 614 and 616, or blocks 618 and 620, advice is generated, assembled, transmitted, and presented for allocating funds, positioning holdings, or consolidation assets within the hierarchical portfolio, respectively. More specifically, at blocks 610, 614, or 618, the hierarchical portfolio, or portions thereof, may be enriched by portfolio enrichment service 206, relevant user data and global financial data may be compiled into a data input package by portfolio suggestion service 208, and the contents of the data input package may be submitted to one or more ML models, such as neural network model 1500 running on machine learning servers 128, configured to recommend one or more suitable hierarchical portfolios based on the contents of the data input package. Based on the one or more recommended hierarchical portfolios, portfolio suggestion service 208 may subsequently generate AI suggestions for optimally allocating funds, positioning holdings, or consolidating assets, respectively, within a hierarchical portfolio subject to user and global financial data constraints. Next, the AI allocation, positioning, or consolidation suggestions, are assembled into corresponding allocation, positioning, or consolidation AI views and routed to one or more financial professionals authorized to validate and approve allocation, positioning, or consolidation AI views (i.e., views containing AI allocation, positioning, or consolidation suggestions). Finally, at blocks 612, 616, or 620, the professionally approved allocation, positioning, or consolidation advice, in the respective form of an approved allocation, positioning, or consolidation AI view, is transmitted to the client device and presented to the user in the context of the hierarchical portfolio.

FIG. 7 shows a schematic diagram of a machine in the form of an example computer system 700 according to an exemplary embodiment. The computer system 700 may be deployed within a network system (e.g., network system 100) with a client-server architecture where it may operate as a client machine (e.g., machines 106, 108, and 110), a server machine (e.g., machines 126 and 128) or both a server and client machine (e.g., machines 118, 120, and 122) connected to other machines via a network (e.g., network 104). Computer system 700 may also be deployed within a network environment with a peer-to-peer architecture where it may operate as peer machine (e.g., machine 130) connected to other peer, client, or server machines. In some cases, computer system 700 may operate as standalone machine unconnected to other machines (e.g., a client machine or a server machine operating in an offline mode with a cached data set). Computer system 700 may execute instructions to perform the various methods or functions presented in this disclosure, including method 500, method 600, method 900, method 1300, and neural network functions 1500. Computer system 700 may take the form of any type of machine where its operations are governed by executable instructions, including a smart watch, smartphone, tablet, or smart glasses; a gaming console or smart television; a personal computer (PC) laptop, PC desktop, or PC workstation; a smart projector, smart whiteboard, or wall computer; a network router, switch, or bridge; a PC server, mainframe, or supercomputer; an augmented reality (AR), virtual reality (VR), or mixed reality (MR) headset. The machine may be configured support various operating systems, including, but not limited to, wearable operating systems (e.g., Apple watchOS, Wear OS by Google, etc.); mobile operating systems (e.g., Android, Apple iOS, etc.); smart screen and television operating systems (e.g., Amazon Fire OS, Apple tvOS, Android TV, etc.); vehicle operating systems (e.g., Android Auto, Apple CarPlay, etc.); tablet, laptop, and desktop operating systems (e.g., Apple iPadOS, Google Chrome OS, Microsoft Windows, Apple macOS, Linux, etc.); and server operating systems (e.g., Red Hat Enterprise Linux Server, Microsoft Windows Server, etc.).

In addition to being configured to operate as single machine, computer system 700 may also be configured to operate within a cluster of machines that individually or collectively execute a set of instructions to perform the methods or functions discussed herein. The single machine or cluster of machines may be owned by a first party, such as a financial services firm, or by a third party, such as a cloud service provider. Cloud service providers may include, but are not limited to, Amazon Web Services, Microsoft Azure, Google Cloud Platform, VMware Cloud, IBM Cloud, Oracle Cloud, Alibaba Cloud, and Salesforce Platform. The machine or cluster of machines may be hosted within a datacenter operated by a first party, such as an on-premises data center operated by a financial services firm, or by a third party, such as a global, national, regional, or local data center operated by a cloud service provider. The machine or cluster of machines may be configured support single-tenant or multi-tenant operations within a private cloud providing dedicated cloud resources (e.g., compute, storage, networking, security, etc.) for a single tenant (i.e., a business, such as a financial service firm), a public cloud providing shared cloud resources across multiple tenants, a hybrid cloud providing both dedicated and shared cloud resources by combining the dedicated resources of a private cloud with the shared resources of a public cloud, or a multi-cloud environment providing dedicated or shared cloud resources spanning a plurality of cloud service providers. The machine or cluster of machines may be further configured support various virtual machine hypervisors (e.g., Red Hat KVM, VMware ESXi, Microsoft Hyper-V, etc.) or container engines and orchestrators (e.g., Docker Engine, Google Kubernetes Engine, Amazon Elastic Kubernetes Service, Microsoft Azure Kubernetes Service, etc.).

As illustrated, computer system 700 comprises several core components and peripheral components that communicate over a bus 702. The bus 702 may be a high-speed back-side bus (BSB) connecting processors and cache memory, a front-side bus (FSB) connecting processors with main memory and peripheral devices, or other bus, such as a low pin count (LPC) bus, advanced graphics port (AGP), peripheral component interconnect (PCI), serial advanced technology attachment (SATA), or universal serial bus (USB). The core components of computer system 700 may include one or more central processing units (CPUs) 704, graphics processing units (GPUs) 706, or neural processing units (NPUs) 708; a cache memory 710 (e.g., static random-access memory, or SRAM); and a main memory 712 (e.g., dynamic random-access memory, or DRAM). The peripheral components of computer system 700 may include a video display device 714 (e.g., an organic light emitting diode (OLED) or liquid crystal display (LCD) screen), text input device 716 (e.g., hardware keyboard or software keyboard), cursor control device 718 (e.g., mouse, trackball, trackpad, laser pointer, game controller, TV remote control, AR/VR/MR remote controller, or touchscreen), voice recognition device 720 (e.g., microphone or microphone array), gesture recognition device 722 (e.g., a finger, hand, eye, head, or body motion detector), audio generation device 724 (e.g., internal speaker, bone conduction headset, earbuds, headphones, or external speakers), storage drive device 726, or network interface device 728 (e.g., network interface card (NIC), motherboard-embedded network interface controller, or other such communication device). The storage drive device 726 may be, but is not limited to, a solid-state drive (SSD), flash memory card, USB flash drive, optical disk drive (ODD), hard disk drive (HDD), or magnetic tape cartridge.

Furthermore, storage drive device 726 of computer system 700 may include a computer-readable medium 730 that stores data structures and instructions 732 that, when executed by the one or more processors 704, 706, or 708, cause the system to perform one or more of the methods or functions discussed herein. As illustrated in FIG. 7, the data structures and instructions 732 may also be partially or completely stored within other forms of computer-readable media, including the computer-readable media of the main memory 712, cache memory 710, and local caches of the CPUs 704, GPUs 706, or NPUs 708 of computer system 700. The computer-readable media accessible by the processors 704, 706, or 708 of computer system 700 may include, but are not limited to, the computer-readable media of random access memory units (e.g., dynamic memory or static memory units), level-one caches (e.g., local CPU, GPU, or NPU caches), and storage devices (e.g., solid-state, magnetic, or optical storage devices). It may further include the computer-readable media of peer or server computers (e.g., centralized or distributed file, database, caching, application, machine learning, or blockchain servers) accessible via a network through network interface device 728 utilizing one or more standard transfer protocols, such as hypertext transfer protocol (HTTP) or secure HTTP (HTTPS).

As described in this subsection of the detailed description, a key capability of the present technology is to provide context-specific advice in the form of a view of a hierarchical portfolio, wherein the advice may be financial advice, the view may be an AI view, the hierarchical portfolio may be a hierarchical portfolio of assets, and the hierarchical portfolio may be owned by a financial client or a multigenerational family. The financial client may be a) an individual investor, such a retail investor, individual trustee, accredited investor, high-net-worth investor, angel investor, or private investor, or b) an institutional investor, such as an endowment, foundation, trust fund company, private equity fund, real estate investment trust, corporate fund, hedge fund, commercial bank, insurance company, pension fund, investment bank, mutual fund company, or asset management company, wherein the former is referred to herein as an individual financial client and the latter as an institutional financial client. The multigenerational family may be represented by a) one or more designated members of the multigenerational family acting in the capacity of an individual financial client or b) one or more agents appointed by members of the multigenerational family to act in the capacity of an institutional financial client on behalf of the multigenerational family.

An important advantage of the present technology associated with this key capability is the ability for a user of intelligent investment system 102 to see all of the financial advice regarding the hierarchical portfolio of assets in a single view (i.e., the AI view) overlaid upon the hierarchical portfolio owned, legally or beneficially, by the individual financial client, the institutional financial client, or the multigenerational family. The user may be the individual financial client who owns the hierarchical portfolio or one or more advisors (e.g., financial advisors/planners, investment bankers, investment brokers, legal advisors, private bankers, real estate agents/brokers, tax accountants, wealth/asset managers) to the individual financial client. The user may also be the institutional financial client that owns the hierarchical portfolio or one or more advisors to the institutional financial client, wherein the institutional financial client is represented, within intelligent investment system 102, by one or more of its employees (e.g., bank managers, brokers, compliance officers, credit analysts, family office managers, financial officers, financial/industry analysts, fund managers, investment officers, investment strategists, loan officers, portfolio managers, risk managers, traders, etc.) authorized to access advice regarding the hierarchical portfolio. In addition, the user may be an authorized employee of the financial firm providing the financial advice to the individual or institutional financial clients. Furthermore, the user may be an individual financial client (e.g., individual trustee) representing the multigenerational family that owns the hierarchical portfolio or one or more advisors to the individual financial client or multigenerational family. The user may also be an authorized employee working for an institutional financial client (e.g., independent trustee) representing the multigenerational family that owns the hierarchical portfolio or one or more advisors to the institutional financial client or multigenerational family. Finally, the user may be a local, state, regional, federal/national, or supranational government regulator.

In brief, the user may be an individual financial client; an institutional financial client represented by one or more of its authorized employees; an advisor to an individual financial client, an institutional financial client, or a multigenerational family; an authorized employee working for a financial firm providing financial advice to individual or institutional financial clients; or a government regulator. However, in many cases, the collaborative dialog enabled and encouraged by intelligent investment system 102 may take place primarily among financial clients and their financial advisors, as described in more detail below.

Another important advantage associated with the key capability of the present technology to provide an AI view of a hierarchical portfolio is the ability for a user to visually identify specific areas of the hierarchical portfolio that may require immediate attention (i.e., attention areas) via the presence of one or more AI suggestions or one or more clusters of AI suggestions contained and precisely located within the AI view. Once such AI suggestions or clusters of AI suggestions have been identified, the user may quickly locate, zoom in on, or directly drill into one or more of these AI suggestions in order to ask and get answers to several key questions regarding the attention areas:

What needs attention? Answer: Suggestion Description, Suggestion Type, and Suggestion Location attribute values of the one or more AI suggestions.

Why does it need attention? Answer: Reason for Suggestion (including the intent behind the suggestion and insights related to global events, opportunities and risks, competitive positioning, catalysts, valuation, and investment lifecycle phase and attractiveness) attribute value of the one or more AI suggestions.

How should it be addressed? Answer: Recommended Transaction and Brokerage attribute values of one or more transactions associated with the one or more AI suggestions.

When should it be addressed? Answer: Level of Urgency attribute value of the one or more AI suggestions.

Who should be contacted, if needed, to help address it? Answer: Wealth Management Advisor, Wealth Management Firm, and Approved By attribute values of the AI view.

The answers to these questions, in the form of attributes and attribute values associated with the AI view and AI suggestions contained within the AI view, are specifically designed to help the one or more users of the AI view, including the financial client and financial advisors to the financial client as well as other employees authorized to review the AI view, to a) develop a better understanding of the opportunities for optimizing the structure or content of the hierarchical portfolio, b) encourage collaboration and discussion among users to share their knowledge or concerns about these opportunities including any potential risks associated therewith, and c) instill a high degree of confidence in the financial client to be able to make, with or without additional assistance of a financial advisor, one or more decisions (e.g., accept AI suggestions, reject AI suggestions, place buy orders, place sell orders, etc.) to capitalize on these opportunities in a timely fashion.

In brief, the key capability of the present technology to provide an AI view of a hierarchical portfolio offers two important advantages from the perspective of a financial client or financial advisor to the financial client: 1) A single big-picture view of all financial advice related to the hierarchical portfolio and 2) Visual identification of attention areas within the single view, including answers to key questions required to confidently make a financial decision.

From the perspective of a financial firm (e.g., private bank, brokerage firm, investment bank, trust fund company, commercial bank, insurance company, asset management company, etc.) providing AI views via an intelligent investment system (e.g., intelligent investment system 102), an important advantage associated with the key capability of the present technology to provide an AI view of a hierarchical portfolio is the ability for the financial firm to drive higher engagement levels with the individual and institutional financial clients that it serves by providing automated personalized context-specific financial advice based on various planned reviews or random events, such as periodic portfolio reviews (e.g., weekly reviews, monthly reviews, quarterly reviews, etc.), corporate events (e.g., earnings events, management events, merger or acquisition events, etc.), and global events (e.g., microeconomic events, geopolitical events, macroeconomic events, etc.).

Another important advantage associated with this key capability is the ability for the financial firm to reduce the labor costs required to serve its financial clients due to the inherent self-service nature of the AI view, wherein the presence and participation of a financial advisor may be necessary only when a financial client requests additional assistance beyond what is provided by the AI view and its accompanying AI assistant, such the AI assistant enabled within conversational application 802. Moreover, at the point where a financial client needs and requests additional help regarding a hierarchical portfolio, the conversation between a financial advisor and the financial client is synchronized from start to finish with both parties being precisely on the same page regarding the financial advice provided to the financial client by the financial firm, namely the AI view of the hierarchical portfolio overlaid upon the hierarchical portfolio, thereby providing an additional advantage to the financial firm. More specifically, this conversation synchronization advantage may enable the financial firm to improve the efficiency of the dialog between a financial advisor and a financial client, the perceived competency of the financial advisor from the perspective of the financial client, and the overall user experience from the perspective of both the financial client and the financial advisor.

These advantages (i.e., higher engagement levels, reduced labor cost, and conversation synchronization) similarly apply a financial firm that serves a multigenerational family, wherein for any generation of the multigenerational family and any specific period of time within the generation, one or more members of the multigenerational family may be designated to act in the capacity of an individual financial client (e.g., individual trustee or executor) or to appoint, at their discretion, one or more agents to act in the capacity of an institutional financial client (e.g., a corporate/independent trustee) on behalf of the multigenerational family.

Actionable AI Views of a Hierarchical Portfolio

Figure 8A:
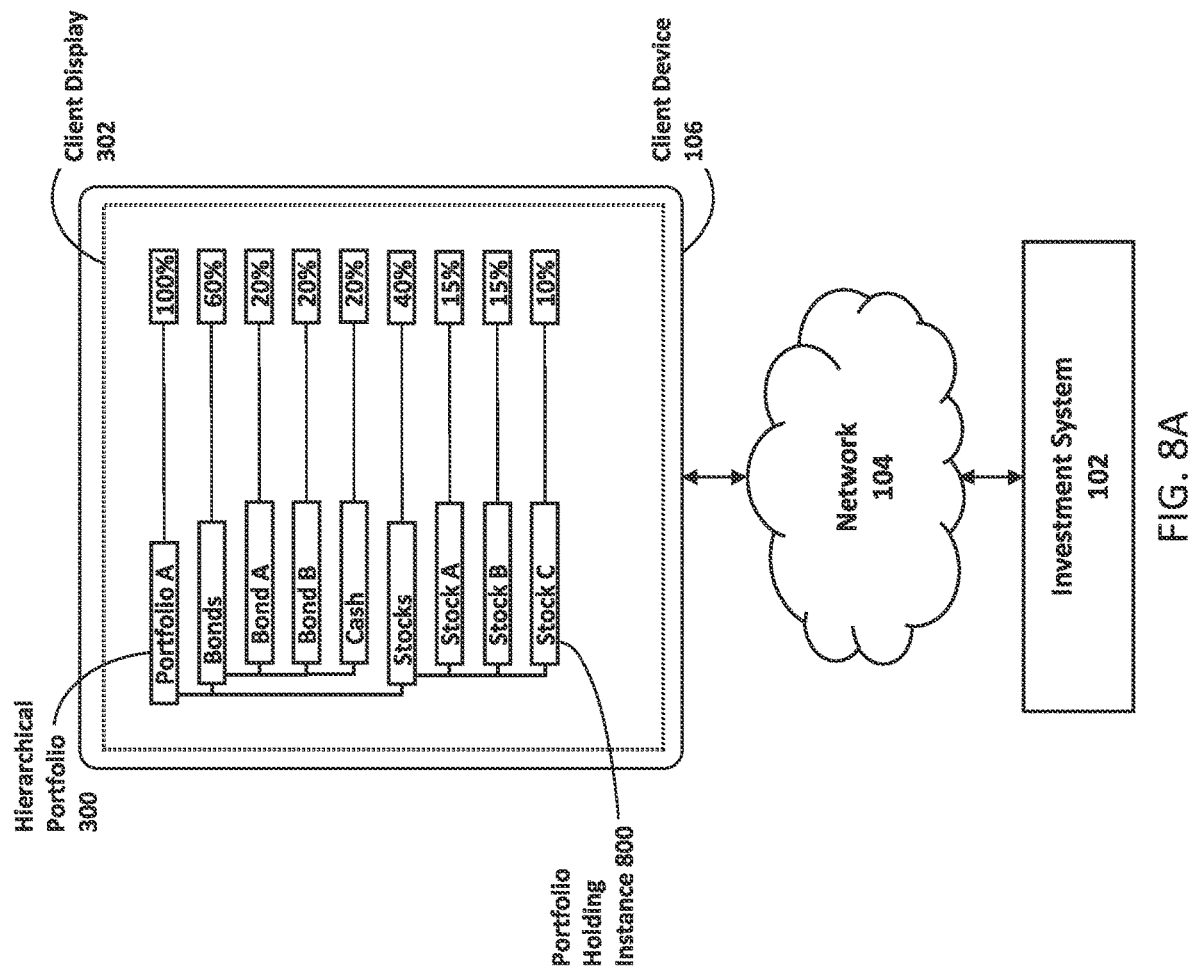
FIG. 8A is an illustration of a client device displaying an example hierarchical portfolio according to an exemplary embodiment.

FIG. 8A is an illustration of a client device displaying an example hierarchical portfolio of assets and communicating with an intelligent investment system over a network according to an exemplary embodiment. The client device 106 (e.g., smart device, such as a tablet, laptop, desktop, wall computer, smart television, or smart glasses) displays the example hierarchical portfolio 300 to a user (e.g., financial client, financial advisor, etc.) via a client display 302 (e.g., LCD screen or touchscreen, OLED screen or touchscreen, or holographic waveguides) and communicates with intelligent investment system 102 via network 104 (e.g., LAN, WAN, or internet). The hierarchical portfolio 300 may be organized by asset class (e.g., bonds, stocks, etc.) and then by individual assets (e.g., bond A, B, stock A, B, etc.), in which case each individual asset within the hierarchical portfolio is located under the asset class to which it belongs. For example, portfolio holding instance 800 (e.g., stock C) is located under the asset class to which it belongs (e.g., stocks) within hierarchical portfolio 300 (e.g., portfolio A). As used herein, the term hierarchical portfolio may be applied to hierarchical portfolio of assets, as described above. However, it may also be applied to a hierarchical portfolio of liabilities or a hierarchical portfolio of assets and liabilities without departing from the scope of this disclosure.

FIG. 8B is an illustration of a client device displaying an example conversational application for interacting with a user and communicating with an intelligent investment system over a network according to an exemplary embodiment. The client device 106 displays a conversational application 802 via a client display 302 and communicates with example method 500 within intelligent investment system 102 via network 104. The conversational application running on the client device may enable an AI assistant and a user to interact with one another via a series of voice or text messages. For example, after observing a user reviewing a portfolio structure containing various asset classes, an AI assistant may utilize conversational application 802 to directly ask the user via text message, "Would you like some suggestions?" The user, in turn, may utilize conversational application 802 to respond to the AI assistant, "Yes" via a text message or a voice command. In the case of an affirmative response (e.g., yes, ok, sure, etc.) from the user, the AI assistant may submit a request for financial advice to intelligent investment system 102 on behalf of the user, with the request including a data payload containing or referencing hierarchical portfolio 300.

In an embodiment, a client application, such as web client application 112, running on a client device, such as client device 106, working in conjunction with an AI assistant, may prepare a request (e.g., HTTP or HTTPS request) for advice including a data payload containing or referencing (i.e., containing, referencing, or both containing and referencing) a hierarchical portfolio, such as hierarchical portfolio 300. More specifically, web client application 112 may construct and format the data payload of the request, encode the formatted data payload, add the encoded and formatted data payload to the body of the request, set values for request header attributes, and submit the completed request for advice to an investment system, such as intelligent investment system 102. For example, in a first case where the body of the request includes an encoded and formatted data payload that contains hierarchical portfolio 300, a web client application 112 may employ a client-side programming language (e.g., JavaScript) to construct and format the data payload by serializing an object representation (e.g., JavaScript object representation) of hierarchical portfolio 300 to a formatted character stream using a standard character-based data-exchange format, such as JSON. Then, the formatted data payload may be encoded (i.e., converted into a byte stream) using a standard encoding method, such as UTF-8. Subsequently, the resulting encoded and formatted payload may be added to the body of the request. Next, the content-type attribute (i.e., Content-type) in the header of the request may be set to an appropriate value (e.g., Content-type: application/json; charset=utf-8) in order to indicate to the receiving system the format (e.g., JSON) and encoding (e.g., UTF-8) of the data payload within the request body. Finally, the completed request for advice, including data containing hierarchical portfolio 300, may be submitted to intelligent investment system 102.

Similarly, in a second case where the body of the request includes an encoded and formatted data payload that references hierarchical portfolio 300, web client application 112 may construct and format the data payload by serializing, to a formatted character stream, an object representation of a reference (e.g., Universal Resource Identifier, or URI, Universal Resource Locator, or URL, etc.) to hierarchical portfolio 300. Then, the formatted data payload may be encoded using a standard encoding method and subsequently the resulting encoded and formatted data payload may be added to the body of the request. Next, the content-type attribute in the header of the request may be set to an appropriate value in order to indicate to the receiving system the format and encoding of the data payload. Finally, the completed request for advice, including data referencing hierarchical portfolio 300, may be submitted to intelligent investment system 102.

Moreover, in a third case where the body of the request includes a data payload comprising a first formatted and encoded section, or part, containing hierarchical portfolio 300 and a second formatted and encoded section, or part, referencing hierarchical portfolio 300, web client application 112 may construct, format, and encode the first and second parts of the data payload utilizing the techniques described in the first and second cases above, respectively. Subsequently, the resulting encoded and formatted parts of the data payload may be added to the body of the request. Next, the content-type attribute in the header of the request may be set to an appropriate value (e.g., Content-type: multipart/form-data; charset=utf-8; boundary=unique-boundary-string) in order to indicate to the receiving system that the body of the request includes data comprising multiple parts separated by a unique boundary string. Finally, the completed request for advice, including a first section of data containing hierarchical portfolio 300 and a second section of data referencing hierarchical portfolio 300, may be submitted to intelligent investment system 102.

It is to be understood, from the three cases discussed above, that a request for advice from a client device, such as client device 106, may include data that contains (e.g., first case above), references (e.g., second case above), or both contains and references (e.g., third case above) a hierarchical portfolio, such as hierarchical portfolio 300.

Upon receiving the request for financial advice submitted on behalf of the user (e.g., a financial client or a financial advisor of the financial client) by the AI assistant working in conjunction with the client application (e.g., web client application 112) running on a client device (e.g., client device 106), where the request includes data comprising an encoded and formatted data payload containing or referencing hierarchical portfolio 300, example method 500 within intelligent investment system 102 may decode and deserialize the data included with the request in order to extract or retrieve hierarchical portfolio 300. Specifically, in the case where the data included in the body of the request contains hierarchical portfolio 300 in an encoded and serialized form (e.g., a UTF-8 encoded JSON document), method 500 may employ a server-side programming language (e.g., Java, C #, etc.) to extract an object (e.g., Java object, C #object) representation of the hierarchical portfolio by decoding and deserializing the encoded and serialized representation of the hierarchical portfolio contained within the data included in the body of the request. Similarly, in the case where the data included in the body of the request references hierarchical portfolio 300, method 500 may extract a reference to the hierarchical portfolio by decoding and deserializing the encoded and serialized reference to the hierarchical portfolio contained within the data included in the body of the request. The method may then utilize the extracted reference to retrieve from an investment system (e.g., investment system 102 itself or other investment system) or secure storage system (e.g., file system, database, data lake, blockchain, etc.) an object representation (e.g., Java object, C #object, etc.) or a serialized representation (e.g., JSON, XML, etc.) of hierarchical portfolio 300.

Having obtained hierarchical portfolio 300, intelligent investment system 102 may subsequently communicate with multiple data sources (e.g., databases 134, machine learning algorithms 136, or distributed ledgers 138), generate one or more AI suggestions, determine one or more corresponding AI suggestion locations, and assemble context-specific financial advice in the form of an AI view of hierarchical portfolio 300. Once the AI view is assembled, method 500 of intelligent investment system 102 may prepare a response (e.g., HTTP or HTTPS response), construct and format a data payload containing the AI view, encode the formatted data payload, add the encoded and formatted data payload to the body of the response, and transmit the completed response to the client device (e.g., client device 106, client device 108, or third-party system 110). The data payload containing the AI view may be constructed and formatted by serializing an object representation of the AI view into a character stream in a standard data-interchange format (e.g., JSON, XML, etc.). In addition, the data payload containing the AI view may identified using a standard internet media type and subtype (e.g., application/json, application/xml, etc.). The formatted data payload containing the AI view may be encoded using a standard encoding method (e.g., UTF-8, UTF-16, etc.). For example, in the case of an HTTP response that includes a response body in the form of a UTF-16 encoded and XML formatted data payload that contains an AI view of a hierarchical portfolio (e.g., AI view 400 of hierarchical portfolio 300), the content-type attribute in the header of the HTTP response may be utilized to indicate to the client application (e.g., web client application 112, API client application 114, or third-party application 116) receiving the response that the data payload is formatted in XML and encoded in UTF-16 by setting the value of the content-type attribute accordingly (i.e., Content-type: application/xml; charset=utf-16).

In the case where the user of intelligent investment system 102 is a financial client (e.g., individual or institutional investor) rather than a financial professional (e.g., financial advisor), the financial advice generated and assembled by example method 500 in the form of an AI view may be required by global, national, or regional financial industry rules and regulations to be reviewed by a financial professional or by one or more members of a financial review board (FRB) prior to the release and transmission of an approved AI view (i.e., an AI view approved by a financial advisor or an FRB team) to the financial client.

Upon receiving the response from investment system 102 containing a) the AI view of the hierarchical portfolio, such as AI view 400 of hierarchical portfolio 300, in the case where the user is a financial advisor or b) the approved AI view of the hierarchical portfolio, such as approved AI view 400 of hierarchical portfolio 300, in the case where the user is a financial client, the client application, such as API client application 114, running on the client device, such as client device 108, may utilize the content-type attribute in the response header to properly decode and deserialize the encoded and serialized data payload included in the response body. More specifically, API client application 114 running on client device 108 may first decode the encoded and formatted data payload included in the response by converting it from an encoded (e.g., UTF-8, UTF-16, etc.) byte stream to a formatted (e.g., JSON, XML, etc.) character stream based on the content-type attribute (e.g., Content-type: application/j son; charset=utf-8, Content-type: application/xml; charset=utf-16, etc.) in the response header. It may then parse the formatted character stream into a language-neutral document object model (DOM), such as an XML DOM, that may be accessed and manipulated by the programming language of the client application (e.g., C #, Objective-C, Swift, etc.). With the document object model accessible, API client application 114 may efficiently overlay a) AI view 400, or portions thereof in the case where the user is a financial advisor, or b) approved AI view 400, or portions thereof, in the case where the user is a financial client upon hierarchical portfolio 300 and present the combined result to the user, as described in more detail below.

Figure 8C:
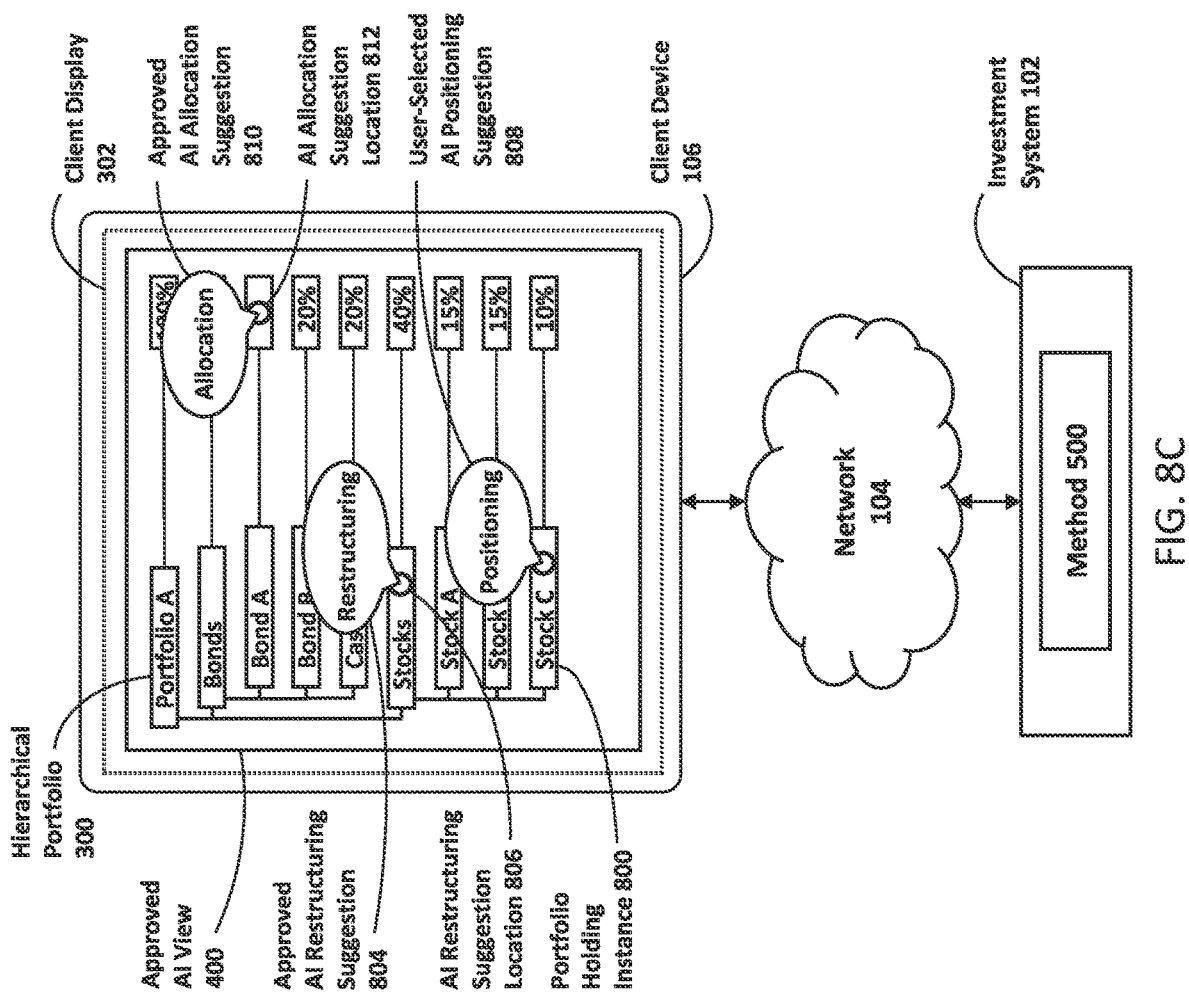
FIG. 8C is an illustration of a client device displaying context-specific financial advice to a user in the form of an approved AI view according to an exemplary embodiment.

FIG. 8C is an illustration of a client device displaying context-specific financial advice to a user in the form of an approved AI view and communicating with an intelligent investment system over a network according to an exemplary embodiment. The client device 106 visually displays context-specific financial advice in the form of an approved AI view 400 of a hierarchical portfolio 300 via a client display 302 and communicates with example method 500 and optionally example method 600 within intelligent investment system 102 via network 104. The approved AI view may contain one or more approved AI suggestions, including approved AI restructuring, allocation, positioning, or consolidation suggestions, with each approved AI suggestion having a corresponding AI suggestion location. For example, approved AI view 400 may contain several approved AI suggestions with corresponding AI suggestion locations, one of which may be approved AI restructuring suggestion 804 with corresponding AI restructuring suggestion location 806. In addition, an AI suggestion location may be mapped to a precise structural position within the hierarchical portfolio by augmenting a hierarchical path to a portfolio item or portfolio item attribute with optional relative offsets (e.g., a 2D or 3D display offset or a left, right, top, bottom justification offset). For example, AI restructuring suggestion 804 may be mapped to a precise structural position within the hierarchical portfolio by augmenting the hierarchical path to the portfolio item (i.e., stocks) representing the stock asset class: portfolio a\stocks\item with the justification offset: \right, resulting in the following AI restructuring suggestion location 806: portfolio a\stocks\item\right. Similarly, AI allocation suggestion 810 may be mapped to a precise structural position within the hierarchical portfolio by augmenting the hierarchical path to the first attribute (i.e., attribute 1) of the portfolio item (i.e., bond A) representing a portfolio holding instance of bond A: portfolio a\bonds\bond a\attribute 1 with the justification offset: \center, resulting in the following AI allocation suggestion location 812: portfolio a\bonds\bond a\attribute 1\center.

An approved AI view displayed on a client device may also contain approved AI suggestions that have been selected by the user as candidates for inclusion in portfolio change operations (e.g., portfolio item additions, deletions, or updates). Such suggestions may be formatted with specific background and text colors to enable the user to visually distinguish between selected (e.g., black background with white text) and non-selected (e.g., gray background with black text) approved AI suggestions. For example, approved AI view 400 displayed on client device 106 may contain user-selected approved AI positioning suggestion 808 which may have been specifically chosen by the user as a candidate for one or more portfolio change operations (e.g., the removal of a first portfolio item, such a portfolio holding instance of stock C, and the addition of a second portfolio item, such as a portfolio holding instance of stock D).

In various embodiments, elemental portfolio change operations may be combined into composite portfolio change operations, enabling several simple (i.e., elemental) related AI suggestions or more complex (i.e., composite) related AI suggestions to be assembled and presented to the user. For example, for a user who has a large balance of accumulated dividends stored in a cash account, intelligent investment system 102 may provide multiple AI suggestions comprising portfolio change operations for reinvesting those dividends. A simple AI suggestion for dividend reinvestment may comprise portfolio change operations that include augmenting the allocation to the portfolio holding instance or instances which generated the dividends. Alternatively, a more complex AI suggestion for dividend reinvestment may comprise portfolio change operations that include creating a new portfolio holding, adding a new portfolio position, creating a new portfolio holding instance of the new portfolio holding, adding the new portfolio holding instance to the new portfolio position, and initializing the allocation to the new portfolio holding instance utilizing the cash, or portion thereof, available from the accumulated dividends in the cash account.

In various embodiments, AI suggestions may be overlaid upon corresponding AI suggestion locations using horizontal (e.g., left, center, or right) or vertical (e.g., top, middle, or bottom) justification. In the case where an AI suggestion location is positioned toward the left side of a hierarchical portfolio, left horizontal justification may be used. For example, as shown in FIG. 8C, an AI suggestion location 806 may be positioned on the left side of a hierarchical portfolio 300 and accordingly the corresponding AI suggestion 804 may be overlaid upon AI suggestion location 806 using left horizontal justification. More specifically, the point of the tail of the message bubble of AI suggestion 804 may be placed directly at the center of AI suggestion location 806 and the tail of the message bubble may be directed to point toward the left side of hierarchical portfolio 300. Similarly, in cases where an AI suggestion location is positioned toward the center or right side of a hierarchical portfolio, center or right horizontal justification may be used, respectively. Furthermore, in cases where an AI suggestion location is positioned toward the top of a hierarchical portfolio, top vertical justification may be employed, wherein the point of the tail of the message bubble of an AI suggestion may be placed directly at the center of its corresponding AI suggestion location and the tail of the message bubble may be directed to point toward the top of the hierarchical portfolio. Similarly, in cases where an AI suggestion location is not positioned toward the top of a hierarchical portfolio, middle or bottom vertical justification may be employed. Utilizing this approach, AI suggestions may be precisely located within the proper context of hierarchical portfolio 300, thereby providing context-specific financial advice that is both easy for the financial client to understand and efficient for the financial advisor to explain.

In a general embodiment, a client application, such as web application 112, API application 114, or third-party application 116, implemented in a client programming language (e.g., JavaScript, Python, C #, Java, Swift, etc.) and running within a browser (e.g., Chrome, Safari, Firefox, etc.) or running natively on an operating system platform (e.g., Android, iOS, Windows, Linux, etc.) of a client device (e.g., smartphone, tablet, laptop, desktop, workstation, wall computer, smart glasses, etc.), such as client device 106, client device 108, or third-party system 110, may utilize an application programing interface (API), such as a representational state transfer API (i.e., REST API), of intelligent investment system 102 to form a request via a standard request-response protocol (e.g., HTTP, HTTPS, etc.). The request may include a request header and a request body. The request header may include a request line containing a protocol method (e.g., GET, POST, etc.) and a universal resource identifier (URI) that specifies a REST API endpoint, such as a particular API method, to be invoked by investment system 102 upon receiving the request. The request header may further include individual headers, such as a content-type header. The content-type header may specify the format (e.g., JSON, XML, etc.) and encoding (e.g., UTF-8, UTF-16, etc.) of the request body. The request body may include a data payload that contains input parameters and input parameter values to be passed to the API method specified in the request line of the header. Upon receiving the request, investment system 102 may process the request by decoding and deserializing the data payload, calling the requested REST API method (e.g., methods 500, 600, 900, 1300, etc.) with required input parameters and parameter values, waiting asynchronously for the method and any related methods called by the method to be executed, and then forming and transmitting a response to the client device. The response may include a response header and a response body. The response header may include individual headers, such as the content-type header, which may specify the format and encoding of the response body. The response body may include a data payload that contains output parameters and output parameter values to be used by the client application running on the client device to, for example, overlay an AI view (e.g., AI view 400), or portions thereof, upon a hierarchical portfolio (e.g., hierarchical portfolio 300).

In an exemplary embodiment involving a request for context-specific financial advice related to a hierarchical portfolio 300 owned by a financial client, an HTTP request may be constructed by web client application 112 running on client device 106. The web client application 112 may be implemented in JavaScript and it may run within a browser supported by an operating system (e.g., iOS, Android, Windows, Chrome OS, tvOS, Android TV, Wear OS, etc.) of client device 106. The client device 106 may be a tablet (iPad Pro, Surface Pro, etc.), PC (e.g., laptop, desktop, workstation), smart screen (e.g., smart HD TV, wall computer, etc.), or other smart device, such as augmented reality or mixed reality smart glasses, particularly next-generation AR/MR smart glasses with a large and wide field of view (e.g., substantially larger than that of a smart watch, smart speaker, or smartphone). Client device 106 may also be a smart watch (e.g., Apple Watch, Galaxy Watch, Honor Watch, etc.), a smart speaker or hub (e.g., Amazon Echo or Echo Show, Google Home or Nest Hub, Apple HomePod, etc.), or a smartphone (e.g., Apple iPhone or iPhone Pro, Samsung Galaxy or Galaxy Note, Huawei Mate or P30, etc.) connected to a screen with a large and wide field of view (e.g., computer monitor, projector, HD TV, AR/MR smart glasses, etc.). The HTTP request may include an encoded and formatted data payload that contains hierarchical portfolio 300. The data payload of the HTTP request may be formatted as a JSON document and encoded in UTF-8. Web client application 112 may submit the HTTP request to intelligent investment system 102 over a secure connection via the HTTPS protocol. After receiving and processing the HTTP request, as previously described, intelligent investment system 102 may generate a corresponding HTTP response that includes an encoded and formatted data payload that contains an AI view, such as AI view 400, of hierarchical portfolio 300, and transmit the response to client device 106 over a secure connection via the HTTPS protocol. The data payload, containing AI view 400, of the HTTP response may be formatted as a JSON document and encoded in UTF-8.

Upon receiving the HTTP response from intelligent investment system 102 which comprises a response body that includes a data payload that contains a UTF-8-encoded JSON-formatted document representing AI view 400 of hierarchical portfolio 300, client application 112 may a) decode and deserialize the encoded JSON document into a JavaScript object or b) decode and transform, via a standard transformation language (e.g., extensible stylesheet language transformations, or XSLT), the JSON document into an equivalent XML document and subsequently parse the XML document into an XML DOM object. With the encoded JSON document representing AI view 400 decoded and deserialized into a JavaScript object or decoded, transformed, and parsed into and XML DOM object, client-side JavaScript code running within the browser may be utilized to iterate through the nodes and attributes of the JavaScript object or XML DOM object in order to extract the AI suggestions, AI suggestion locations, and associated transactions contained within AI view 400. Once the AI suggestions, locations, and transactions have been extracted, client application 112 may load or access (e.g., from a file, system, service, or site) hierarchical portfolio 300 in JSON format and deserialize it to a JavaScript object or transform and parse it into an XML DOM object. With both hierarchical portfolio 300 and AI view 400 represented as internal data objects (e.g., JavaScript objects or XML DOM objects) within the memory of the browser, client application 112 may employ JavaScript code to access and manipulate these data objects in order to construct a new data object in the form of an HTML DOM object that combines the object representations of hierarchical portfolio 300 and AI view 400.

In other embodiments, in addition to including an AI view of a hierarchical portfolio, such as AI view 400 of hierarchical portfolio 300, the response transmitted by intelligent investment system 102 to a client device, such as client device 108, may further include the hierarchical portfolio, such as hierarchical portfolio 300, itself. For example, a particular response may include both hierarchical portfolio 300 and AI view 400 of hierarchical portfolio 300. This response may be utilized by a client application, such as client application 114, to construct internal data object representations of hierarchical portfolio 300 and AI view 400 without requiring client application 114 to first load or access hierarchical portfolio 300 from a local or remote data source, such as a data file, enterprise or investment system, cloud or web service, or web or internet site.

In other embodiments, an object representation of a hierarchical portfolio, such as hierarchical portfolio 300, and an object representation of an AI view of the hierarchical portfolio, such as AI view 400 of hierarchical portfolio 300, may be serialized by intelligent investment system 102 into individual XML documents via sever-side code written in one or more of the programming languages employed to implement the investment application services 124 of intelligent investment system 102. The resulting XML documents may be encoded and transmitted by investment system 102 to a client system, such as third-party system 110. For example, intelligent investment system 102 may employ the C #programming language to serialize C #object representations of AI view 400 and hierarchical portfolio 300 into equivalent XML documents, encode each XML document in UTF-16, form an HTTP response with the encoded documents contained in the response body, and securely transmit the response to third-party system 110 via the HTTPS protocol. This response may be utilized by a client application, such as third-party application 116, running on third-party system 110 to construct an HTML DOM object that combines XML DOM object representations of hierarchical portfolio 300 and AI view 400 without requiring the third-party application 116 to first transform hierarchical portfolio 300 and AI view 400 into XML.

In other embodiments, an HTML DOM object that combines an object representation of a hierarchical portfolio, such as hierarchical portfolio 300, and an object representation of an AI view of the hierarchical portfolio, such as AI view 400 of hierarchical portfolio 300, may be constructed by intelligent investment system 102. For example, intelligent investment system 102 may employ server-side code (e.g., Java, C #, etc.) to iterate through the nodes of object representations of AI view 400 and hierarchical portfolio 300 in order to combine them and construct an HTML DOM object that enables AI view 400, or portions thereof, to be overlaid upon hierarchical portfolio 300 and presented to the user within a browser of a client device, such as client device 106. Investment system 102 may subsequently utilize the HTML DOM object to generate an HTML (e.g., HTML 4, HTML 5, etc.) document, which may then be encoded, added to the body of an HTTP response, and securely transmitted over the HTTPS protocol to client device 106. This response may be utilized by the client application, such as client application 112, running within the browser of client device 106 to present AI view 400, or portions thereof, as an overlay on hierarchical portfolio 300 to the user, such as a financial client or the financial advisor of the financial client, without requiring client application 112 to construct the HTML DOM object that combines the object representations of AI view 400 and hierarchical portfolio 300.

In various embodiments, the HTML DOM object that combines AI view 400 and hierarchical portfolio 300 may be constructed, by client applications 112, 114, or 116 or by investment application services 124 of intelligent investment system 102, in such a way as to enable the AI suggestions of AI view 400 to be precisely positioned, based on AI suggestion locations, and overlaid upon hierarchical portfolio 300 and presented to the user, such as a financial client or a financial advisor, as described and illustrated in FIG. 8C above.

In various embodiments, the HTML DOM object may also be constructed by client applications and application services of investment system 102 in such a way as to enable AI suggestion indicators to be precisely positioned, based on AI suggestion locations, within hierarchical portfolio 300 and presented to a financial client or the financial advisor of the financial client. For example, the HTML DOM object may include inner HTML text that contains table row and table data markup as well as inline, internal, or external styles defined in a standard stylesheet language (e.g., cascading style sheet, or CSS) that enables hierarchical portfolio 300 to be displayed to the user in a tree structure containing cells which represent portfolio elements, attributes, and values (e.g., portfolio items, portfolio item attributes, and portfolio item attribute values). In addition, each cell of the tree may contain an AI suggestion indicator that signals, to the user, the presence of an underlying AI suggestion from AI view 400, where the appearance of an AI suggestion indicator within a cell of the tree is determined by the existence of an AI suggestion location of an AI suggestion within AI view 400 that corresponds to the hierarchical position of the cell within the tree. The AI suggestion indicator may be in the form of a small marker (e.g., small square, circle, rectangle, etc.) with a background color (e.g., standard CSS color: Moccasin, a light orange) that is notably different than the background color (e.g., standard CSS color: AliceBlue, a light blue) of the marked cell, as described and illustrated in FIG. 8D below.

Figure 8D:
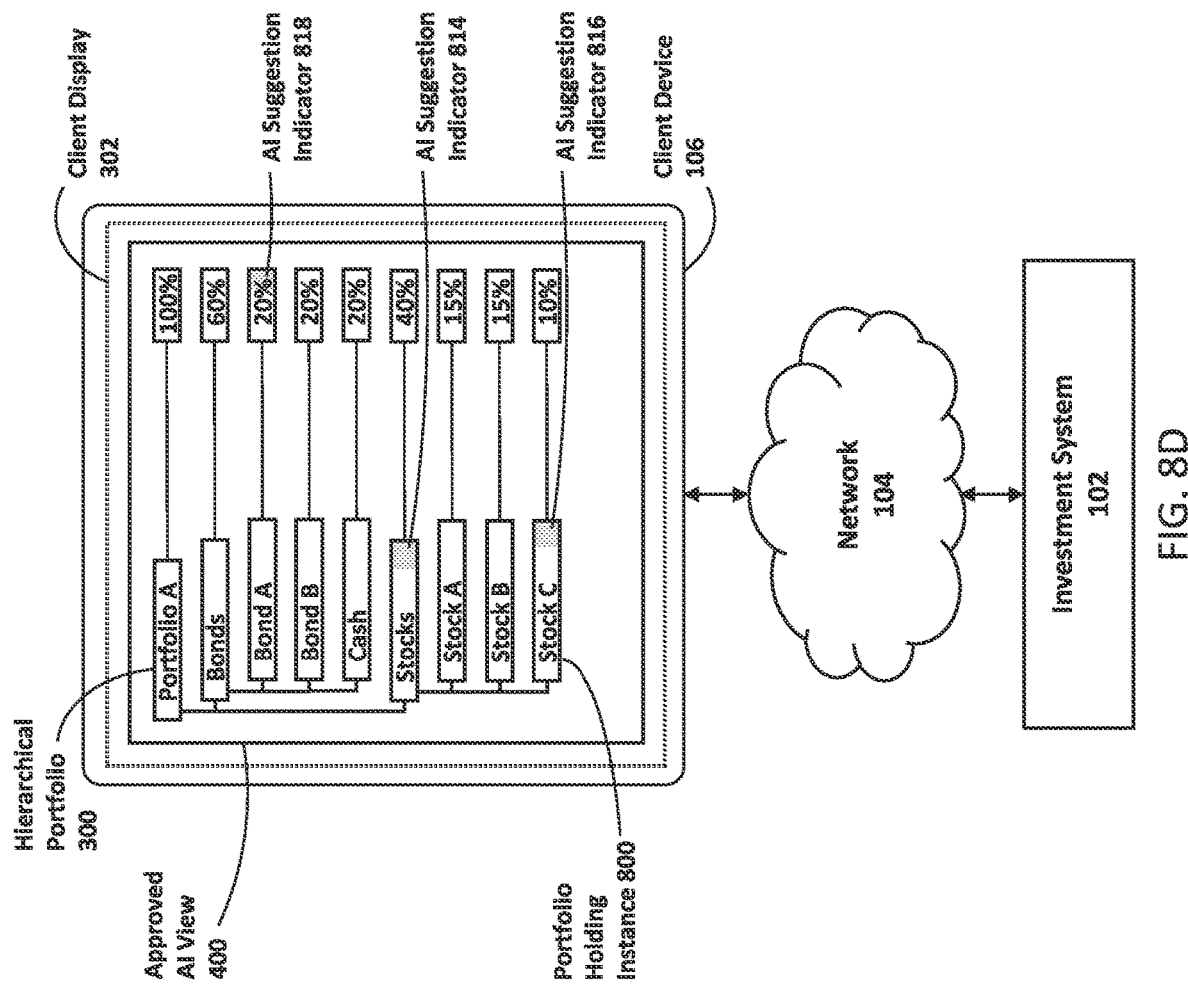
FIG. 8D is an illustration of a client device displaying AI suggestion indicators of AI suggestions from an approved AI view of a hierarchical portfolio according to an exemplary embodiment.

FIG. 8D is an illustration of a client device 106 displaying AI suggestion indicators 814, 816, 818 of AI suggestions from an approved AI view 400 of a hierarchical portfolio 300 according to an exemplary embodiment. The AI suggestion indicators 814, 816, and 818 of FIG. 8D correspond to approved AI suggestions 804, 808, and 810 of FIG. 8C. By employing these AI suggestion indicators, a client application (e.g., client application 112) of investment system 102 running on client device 106 may help a user to readily and easily locate marked cells (i.e., cells within the HTML DOM that contain an AI suggestion indicator) and view underlying AI suggestions from AI view 400 that provide advice for changing the structure or content of hierarchical portfolio 300. For example, a small rectangular indicator, such as AI suggestion indicator 818, may be employed to indicate to the user the presence of a corresponding AI suggestion, such as AI suggestion 810, associated with the allocation value of a particular bond, such as Bond A. The indicator may be of a particular background color (e.g., light orange, light yellow, light grey, etc.) and it may be positioned to cover all or only a portion (e.g., left, right, top, or bottom portion) of the marked cell. The marked cell may be of a different background color (e.g., light blue, light green, white, etc.) enabling the user to easily differentiate between the indicator and the cell containing the indicator. As shown in FIG. 8D, the background colors of the AI suggestion indicator 818 and marked cell are light grey and white, respectively, and AI suggestion indicator 818 is positioned to cover only the right portion of the marked cell.

In various embodiments, intelligent investment system 102 may be configured to display AI suggestions (e.g., AI suggestions 804, 808, and 810) directly without first displaying AI suggestion indicators, as described and illustrated previously in FIG. 8C. In addition, investment system 102 may be alternatively configured to display AI suggestion indicators (e.g., AI suggestion indicators 814, 816, and 818) prior to interactively displaying underlying AI suggestions, as described and illustrated in FIG. 8E below.

Figure 8E:
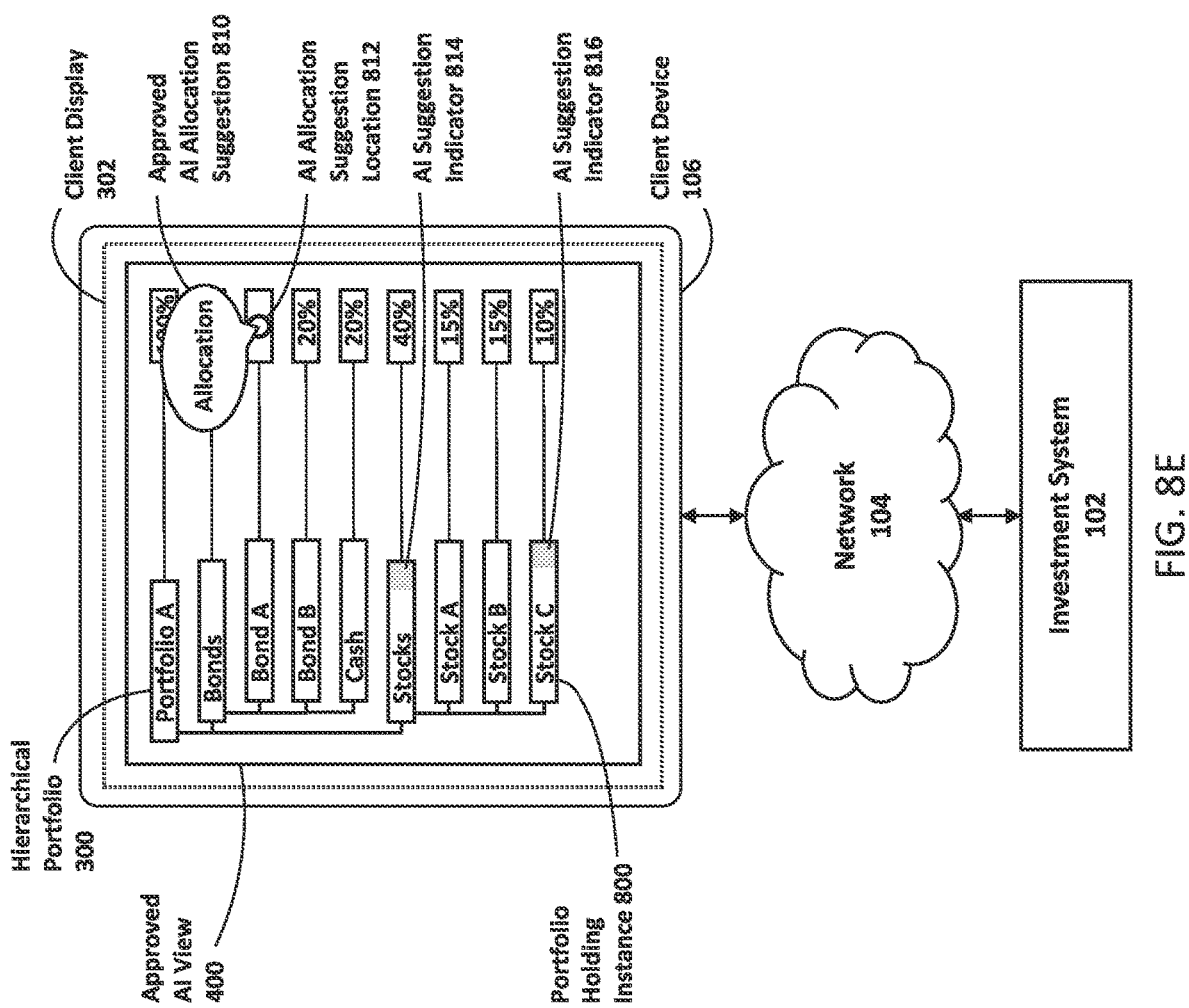
FIG. 8E is an illustration of a client device displaying an AI suggestion revealed by an AI suggestion indicator according to an exemplary embodiment.

FIG. 8E is an illustration of a client device 106 displaying an AI suggestion 810 revealed by an AI suggestion indicator 818 according to an exemplary embodiment. As illustrated, approved AI suggestion 810 represents context-specific advice associated with the allocation value of Bond A. In addition, the approved AI suggestion 810 shown in FIG. 8E corresponds to the AI suggestion indicator 818 shown in FIG. 8D. As illustrated across FIGS. 8D and 8E, to interactively view AI suggestion 810, the user may draw focus to AI suggestion indicator 818 via a simple user gesture (e.g., mouse hover, finger tap, eye gaze, etc.), whereupon a client application, such as client application 112, may overlay the corresponding AI suggestion 810, contained within AI view 400, on top of the cell marked by AI suggestion indicator 818, thereby presenting the advice associated with the allocation value of Bond A to the user in its proper context within hierarchical portfolio 300.

In various embodiments, AI suggestions, such as 804, 808, and 810, may be overlaid upon AI suggestion locations corresponding to AI suggestion indicators, such as 814, 816, and 818, using left, center, or right justification. In the case where the AI suggestion location is located toward the right side of the tree structure representing hierarchical portfolio 300, right justification may be used. For example, as shown in FIGS. 8D and 8E, an AI suggestion location 812, corresponding to an AI suggestion indicator 818, may be positioned on the right side of a tree structure representing hierarchical portfolio 300 and accordingly the corresponding AI suggestion 810 may be overlaid upon AI suggestion location 812 using right justification. More specifically, the point of the tail of the message bubble of AI suggestion 810 may be placed directly at the center of AI suggestion location 812 and the tail of the message bubble may be directed to point toward the right side of hierarchical portfolio 300. Similarly, in cases where the AI suggestion location is located toward the left side or center of the tree structure representing hierarchical portfolio 300, left or center justification may be used, respectively.

Figure 9:
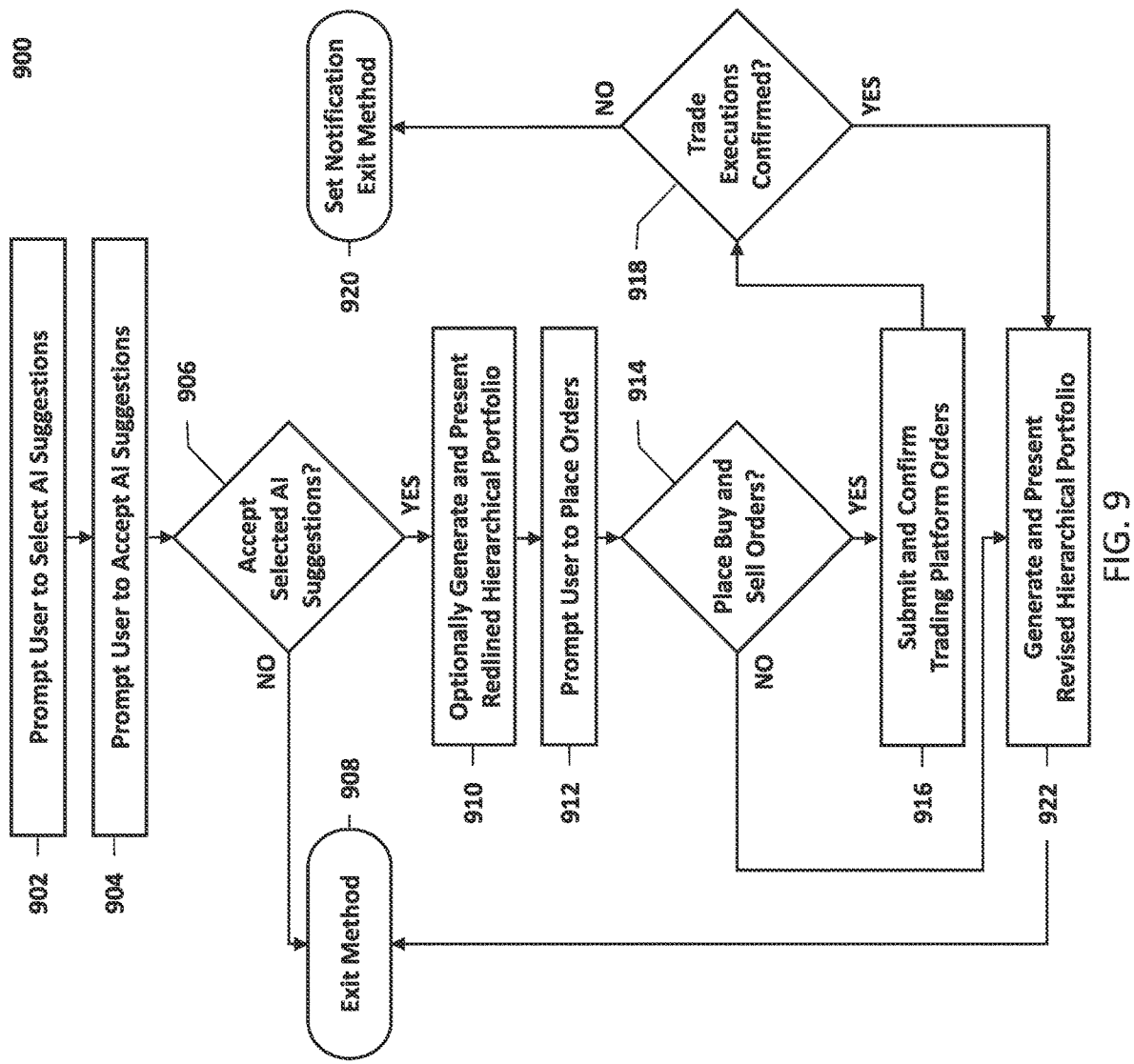
FIG. 9 is a flowchart of an example method for processing conversational inputs received from a client device on an application server according to an exemplary embodiment.

FIG. 9 is a flowchart of an example method 900 for processing inputs received from a client device on an application server according to an exemplary embodiment. The inputs may be received from a client device displaying an approved AI view overlaid upon a hierarchical portfolio or an approved AI restructuring, allocation, positioning, or consolidation view overlaid upon a hierarchical portfolio. The method 900 may be invoked after transmitting an approved AI view from an application server to a client device per example method 500 or transmitting an approved AI restructuring, allocation, positioning, or consolidation view from an application server to a client device per example method 600. In the discussion to follow, the term approved AI view shall denote an approved AI view containing all types of approved AI suggestions or an approved AI restructuring, allocation, positioning, or consolidation view containing only approved AI restructuring, allocation, positioning, or consolidation suggestions, respectively.

At block 902, an AI assistant or other conversational application running on the client device may interact with and prompt the user to select approved AI suggestions contained within the context of an approved AI view overlaid upon a hierarchical portfolio displayed on the client device. For example, an AI assistant may prompt the user via voice or text message to select a number of approved AI suggestions. The user may respond to the AI assistant's prompts by navigating the portfolio hierarchy (by scrolling up/down/left/right, expanding/collapsing nodes, or zooming in/out), reading individual approved AI suggestions attached to various portfolio items or portfolio item attributes, and selecting (via a mouse, finger gesture, keyboard, voice command, etc.) all or some of the approved AI suggestions while rejecting or not selecting other approved AI suggestions.

At block 904, the AI assistant or other conversational application may further prompt the user to accept approved AI suggestions previously selected by the user. The user may respond to the AI assistant's prompts by first reviewing previously selected AI suggestion summary information (e.g., suggestion type, suggestion description, and reason for suggestion), then examining individual AI suggestion recommended transactions (e.g., orders to buy, sell, or transfer specific stocks, bonds, ETFs, or other portfolio holding instances), and finally deciding to accept all or some of the previously selected approved AI suggestions.

An AI view of a hierarchical portfolio of assets is said to be an actionable AI view when it contains AI suggestions that can be acted upon (i.e., selected and accepted) by a user (e.g., financial client, financial advisor, etc.) via a user interface (e.g., web app, mobile app, etc.) or by a system (e.g., first-party system, third-party system, etc.) via a programmatic interface (i.e., API). Such actions may effect a change in the underlying hierarchical portfolio upon the implementation of the AI suggestions. Changes to the hierarchical portfolio resulting from the implementation of AI suggestions selected and accepted by the user within an actionable AI view may be structural changes or content changes. For example, within an actionable approved AI view (e.g., approved AI view 400) displayed within a web application running on a mobile device, a user may select and accept (i.e., act upon) an approved AI suggestion (e.g., a restructuring suggestion, such as AI restructuring suggestion 804, to add a geographic dimension beneath the portfolio item representing the stock asset class) that results in a change to the structure (e.g., new geographic dimension) of the underlying hierarchical portfolio upon the implementation of the AI suggestion. In addition, the implementation of an AI suggestion may include the execution of recommended transactions associated with the AI suggestion. For example, within an actionable approved AI view, the user may select and accept an approved AI suggestion (e.g., an allocation suggestion, such as AI allocation suggestion 810, to increase the amount of funds allocated to bond A) with an associated transaction (e.g., a recommended buy order to purchase additional quantities of bond A) that results in a change to the content (e.g., allocation level of bond A) of the underlying hierarchical portfolio upon the implementation of the AI suggestion and execution of its associated transaction.

Moreover, in various embodiments, an actionable AI view (e.g., AI view 400) may further contain context-specific promotional advertisements or product recommendations in addition to precisely located AI suggestions with recommended asset transactions. This key capability of the present technology offers an important advantage from the perspective of a financial firm: the ability to capture additional streams of revenue for the firm. More specifically, the financial firm may capture lead generation, customer conversion, or asset transaction revenue streams by directing online advertising traffic (e.g., traffic from banner ads, pay-per-click ads, cost-per-action ads, etc.), financial product recommendations (e.g., recommendations for mutual fund products, ETF products, ESG products, smart-beta/factor products, etc.), or asset transaction orders (e.g., orders to buy, sell, or transfer assets) to various third parties, including brand or performance advertisers targeting investors (e.g., individual or institutional investors), asset management companies offering mutual funds or ETFs to investors, and electronic trading platforms or other financial service companies providing asset transaction services for investors.

For example, in the context of making a financial decision regarding an AI restructuring suggestion (e.g., AI restructuring suggestion 804) to add a geographic dimension with various geographic dimension members (e.g., U.S. Stocks, European Stocks, Asia Pacific Stocks, etc.) to the stock asset class and, as a result, reposition an automotive stock, such as the stock of Tesla with ticker symbol TSLA, within the hierarchical portfolio of assets (e.g., hierarchical portfolio 300), an individual financial client may be presented, via intelligent investment system 102, with a context-specific advertisement associated with or directly attached to the AI suggestion regarding the stock of Tesla, wherein the ad may present the financial client with promotional content about a Tesla vehicle or a vehicle from a Tesla competitor. In the same context, the individual financial client may also be presented with a context-specific financial product recommendation associated with or directly attached to the AI suggestion regarding the stock of Tesla, wherein the recommendation may present the financial client with promotional content regarding a financial product, such as a technology-focused ETF product (e.g., PowerShares QQQ Trust with ticker symbol QQQ) or a U.S.-focused ESG product (e.g., iShares ESG MSCI USA Leaders ETF with ticker symbol SUSL), that may be of interest to the financial client given his or her interest in the stock of Tesla. In addition, should the financial client decide to place a transaction, such as to buy or sell shares of Tesla, associated with the AI suggestion or place a customized transaction, such as to buy or sell shares of an ETF (e.g., QQQ, or SUSL), related to the financial product recommendation associated with the AI suggestion, intelligent investment system 102 may route the resulting order flow to an electronic trading platform for execution.

At decision block 906, it may be determined, based on an interactive conversation between the user and the AI assistant in block 904, that the user has decided to accept one or more previously selected approved AI suggestions within the actionable approved AI view (e.g., approved AI view 400). In this case (i.e., YES branch), the AI assistant, or other conversational application, may construct and submit, to example method 900 of intelligent investment system 102, an input message comprising a set of accepted suggestions, whereupon example method 900 then proceeds to block 910, the next step in the process. Conversely, at decision block 906, it may be determined that the user would not like to accept any of the previously selected approved AI suggestions. In this case, (i.e., NO branch), the interactive AI suggestion selection, acceptance, and execution process with the AI assistant is cancelled and example method 900 is terminated at the exit method node 908. In the discussion to follow, the term approved AI view shall further denote an approved AI view which is actionable (i.e., contains one or more AI suggestions, with or without transactions, that can be acted upon by a user or system and effect portfolio changes upon implementation) or an approved AI view which is not actionable (e.g., contains only AI suggestions that do not effect portfolio changes, such as AI suggestions containing educational or informational messages).

At block 910, example method 900 may optionally generate a redlined hierarchical portfolio that visually depicts the proposed effect of the user accepting one or more approved AI suggestions in the form of incremental changes (i.e., redlines) to the structure or content of the original hierarchical portfolio (e.g., hierarchical portfolio 300). For example, upon the acceptance of one or more selected AI suggestions by the user and the subsequent submission, by the AI assistant or other conversational application, of an input message comprising the set of suggestions accepted by the user, example method 900 may generate a redlined hierarchical portfolio containing numerous redline change elements, with each element discretely proposing the removal, addition, or modification of an individual portfolio item or portfolio holding instance.

The primary purpose of the redlined hierarchical portfolio is to enable the user to visually review each proposed redline change to the original hierarchical portfolio before committing to the implementation and execution of the accepted AI suggestions and associated transactions. To enable a user to quickly distinguish between different types of redline changes (e.g., remove, add, or modify), the textual portion of an individual redline change element may be displayed to the user via different font colors (e.g., red, blue, black, etc.) and font styles (e.g., regular, bold, or italic), font effects (e.g., strikethrough, single underline, or all caps), or highlighting options (e.g., black highlight, black highlight with white text, grey highlight, grey highlight with white text, etc.) depending on the type of the redline change element. For example, if the redline change element type is remove (e.g., remove a portfolio item or portfolio holding instance from the original hierarchical portfolio), then the textual portion of the individual redline change element may be displayed to the user in a red font color with a strikethrough font effect on a white background or alternatively in a white font highlighted with a black background. If the redline change element type is add (e.g., add a portfolio item or portfolio holding instance to the original hierarchical portfolio), then the textual portion of the individual redline change element may be displayed to the user in a blue font color without a strikethrough font effect on a white background or alternatively in a black font highlighted with a grey background. If the redline change element type is modify (e.g., modify an existing portfolio item or portfolio holding instance within the original hierarchical portfolio), then the textual portion of the individual redline change element that has been modified (e.g., specific attribute values of a portfolio item or portfolio holding instance, such as name, allocation amount, or parent name) may have its prior attribute values displayed to the user in a red font color with a strikethrough font effect on a white background and its new attribute values displayed to the user in a blue font color without a strikethrough effect on a white background. Alternatively, the textual portion of the individual redline change element that has been modified may have its prior attribute values displayed to the user in a white font highlighted with a black background and its new attribute values displayed to the user in a black font highlighted with a grey background.

Furthermore, during the redline generation process, example method 900 may position each redline change element (i.e., redline remove, add, or modify element) within the redlined hierarchical portfolio near or at the same location as the AI suggestion from which it derived. For example, the user may select an approved AI positioning suggestion that proposes the removal of a first portfolio holding instance (e.g., stock C) from the original hierarchical portfolio (e.g., hierarchical portfolio 300) and the replacement with a second portfolio holding instance (e.g., stock D). The selected AI positioning suggestion (e.g., selected AI positioning suggestion 808) may be located at a precise structural position within the original hierarchical portfolio, namely: portfolio a\stocks\stock C\item\right (e.g., the structural position of the portfolio item representing stock C with right justification). Upon acceptance of the selected AI suggestion by the user, example method 900 may generate a redlined hierarchical portfolio containing a redline remove element proposing the removal of the first portfolio holding instance (e.g., remove stock C) and a redline add element proposing the addition of the second portfolio holding instance (e.g., add stock D) to replace the first portfolio holding instance. During the redline generation process, example method 900 may position the redline remove and add elements within the redlined hierarchical portfolio at the following location: portfolio a\stocks\stock C\item\left (i.e., the structural position of the portfolio item representing stock C with left, rather than right, justification), which is near the location of the selected AI positioning suggestion from which the redline remove and add elements derived.

A secondary purpose of the redline hierarchical portfolio is to enable a user to propose customized changes to any portion of the hierarchical portfolio, save these customized changes to a portfolio advice service (e.g., portfolio advice service 216) of an investment system (e.g., investment system 102), and automatically cause the investment system to generate, classify, and locate one or more new suggestions comprising one or more of the customized changes saved and implicitly accepted by the user, as described as part of the previous discussion regarding portfolio advice service 216.

At block 912, an AI assistant or other conversational application running on the client device may interact with and prompt the user to place transactions, such as buy or sell orders, associated with approved AI suggestions previously selected and accepted by the user. The user may respond to the AI assistant's prompts by reviewing previously accepted AI suggestions, examining associated recommended buy or sell orders for various portfolio holding instances, rejecting or customizing some of the orders, and finally deciding to place all or some of the recommended or customized transactions. In cases where the user rejects one or more recommended buy or sell orders associated with an accepted AI suggestion, the state of the suggestion may revert to its original state (i.e., unselected approved AI suggestion). In cases where the user customizes one or more recommended buy or sell orders associated with an accepted AI suggestion, the state of the suggestion may change to a customized state (e.g., customized accepted AI suggestion). Other types of orders (e.g., transfer orders) may also be employed without departing from the scope of this disclosure.

At decision block 914, it may be determined, based on an interactive conversation with the AI assistant in block 912, that the user has decided to place one or more recommended or customized buy or sell orders associated with one or more previously accepted AI suggestions. In this case (i.e., YES branch), the AI assistant, or other conversational application, may construct and submit, to example method 900 of intelligent investment system 102, an input message comprising a set of placed transactions, whereupon example method 900 then proceeds to block 916 to submit and confirm trade execution orders. Conversely, at decision block 914, it may be determined that the user would not like to place any of the recommended or customized buy or sell orders associated with one or more previously accepted AI suggestions. In this case, (i.e., NO branch), example method 900 proceeds to block 922 to generate and present a revised hierarchical portfolio if applicable (i.e., in the case where the implementation of any remaining accepted AI suggestions without associated buy or sell orders results in changes to the structure or content of the original hierarchical portfolio).

At block 916, based on an affirmative confirmation command from decision block 914 and the subsequent submission, by the AI assistant or other conversational application, of an input message comprising the set of transactions placed by the user, example method 900 within intelligent investment system 102 may assemble, sequence, and submit the placed transactions, such as recommended or customized buy and sell orders, to one or more first-party or third-party electronic trading platforms and then wait to receive trade confirmations. Example method 900 may further control the flow of trade execution requests to the electronic trading platforms to ensure proper order sequencing.

At decision block 918, it may be determined, based on system-level responses (e.g., synchronous or asynchronous messages) from one or more $1^{st}$-party or $3^{rd}$-party electronic trading platforms, that all recommended and customized buy and sell orders associated with accepted AI suggestions have been successfully submitted, executed, and confirmed. In this case (i.e., YES branch), example method 900 proceeds to block 922 the next step in the process. Conversely, at decision block 918, it may be determined, based on received or yet to be received system-level responses from one or more electronic trading platforms, that one or more buy or sell orders have not been or have yet to be successfully submitted, executed, and confirmed. In this case, (i.e., NO branch), the interactive AI suggestion selection, acceptance, and execution process with the AI assistant is concluded, the user is issued an in-process notification accordingly, and example method 900 is terminated at the set notification (e.g., auto-notify the user upon process completion) and exit method node 920.

At block 922, based on a positive confirmation (i.e., YES branch) from decision block 918 or a negative confirmation (i.e., NO branch) from decision block 914, example method 900 of intelligent investment system 102 may generate a revised hierarchical portfolio and subsequently transmit the revised hierarchical portfolio to the (e.g., client device 106) to be displayed to the user via the client display (e.g., client display 302). In cases where trade confirmation errors are found, example method 900 may invoke an AI assistant or other conversational application to help interactively diagnose error conditions.

In more complex embodiments, a user (e.g., financial advisor, financial client, etc.) may choose to operate intelligent investment system 102 in collaborative mode or scenario mode prior to invoking method 900. In collaborative mode, the values of various user data parameters stored within application management service 220 of investment system 102 may be dynamically adjusted by the user while collaboratively sending and receiving a series of requests and responses regarding financial advice related to a hierarchical portfolio. In this mode, each request in the series is based on a set of user data parameter values established by the user prior to submitting the request for financial advice, and each response in the series contains context-specific advice in the form of an AI view containing AI suggestions for optimizing the hierarchical portfolio subject to the set of user data parameter values. User data parameters may include, but are not limited to, user profile, financial goals, investment objectives, time horizon, risk tolerance, income estimates, financial accounts, cost of living, discretionary items, healthcare estimates, insurance costs, leases and loans, legal costs, life events, maintenance costs, professional services, and taxes.

In scenario mode, one or more scenarios comprising preconfigured sets of user data parameter values may be defined by the user and saved within application management service 220 of investment system 102. From the set of defined scenarios, the user may select a scenario of interest, designate it as the active scenario, and subsequently send a request and receive a response regarding financial advice related to a hierarchical portfolio. In this mode, the request is based on the set of user data parameter values of the active scenario and the response contains context-specific advice in the form of an AI view containing AI suggestions for optimizing the hierarchical portfolio subject to the set of user data parameter values of the active scenario. Also, in scenario mode, the user may run multiple individual scenarios (e.g., scenario 1, scenario 2, etc.) in succession and compare the responses from investment system 102. Once the user is satisfied with the responses provided while operating investment system 102 in collaborative mode or scenario mode, the user may, via method 900, engage an intelligent assistant through a conversational application 802 to accept the resulting AI suggestions and place the associated transactions via an electronic trading platform.

In other more complex embodiments, while operating intelligent investment system 102 in collaborative mode or scenario mode, a user may further choose to operate investment system 102 in focused mode prior to invoking method 900. In focused mode, values of certain focus parameters stored within application management service 220 of investment system 102 may be set by the user in order to limit the scope, or narrow the focus, of the request for advice. In this mode, the focused request for advice is based on the active set of user data parameter values and the focus parameters values, and the focused response contains context-specific advice in the form of an AI view containing focused AI suggestions for optimizing the hierarchical portfolio subject to the active set of user data parameter values and the focus parameters values. For example, while operating investment system 102 in collaborative focused mode (i.e., collaborative mode plus focused mode), a user may submit a focused request for financial advice regarding a specific asset (e.g., a particular stock, bond, commodity, currency, real estate property, work of art, personal property, intellectual property, or cryptocurrency) or a specific subset of assets included or under consideration to be included in his or her hierarchical portfolio of assets. Because the user is operating in collaborative mode, the request is based on the set of user data parameter values established by the user prior to submitting the request. In addition, because the user is also operating in focused mode, the request is further based on the focus parameters values that narrow the scope of the request to the specific asset (or subset of assets) of interest to the user. The focused response, in this example, contains context-specific advice regarding the specific asset or subset of assets of interest to the user in the form of an AI view containing focused AI suggestions for optimizing the hierarchical portfolio subject to the set of user data parameter values established by the user prior to submitting the request and the focus parameters values specifying the asset or subset of assets of interest to the user.

While operating intelligent investment system 102 in collaborative mode, scenario mode, collaborative focused mode, or scenario focused mode, AI suggestions generated by the system for optimizing a hierarchical portfolio are not only subject to user data constraints but also to global financial data conditions, such as economic and market conditions. Although, as described above, these modes permit user data constraints for a given time period to vary, they presume the current prevailing set of global financial data conditions for a given time period to be held constant. In various embodiments, for a given time period, in addition to permitting user data constraints to vary, global financial data conditions may also be permitted to vary while operating investment system 102 in collaborative, scenario, collaborative focused, or scenario focused mode without departing from the scope of this disclosure.

Figure 10:
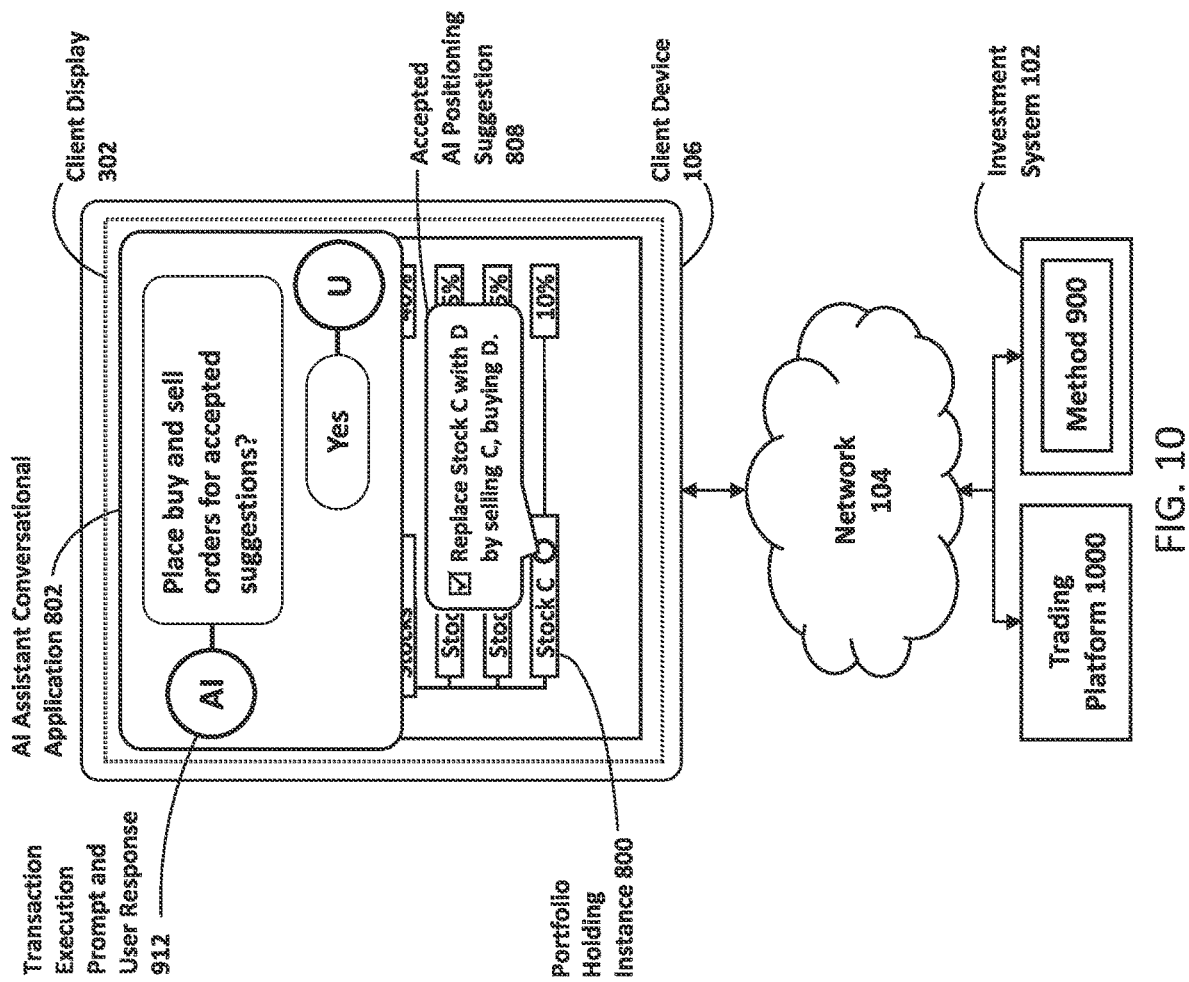
FIG. 10 is an illustration of a client device displaying an example transaction execution prompt to a user according to an exemplary embodiment.

FIG. 10 is an illustration of a client device displaying an example transaction execution prompt to a user while communicating with an intelligent investment system over a network according to an exemplary embodiment. The client device 106 displays the transaction execution prompt 912 from an AI assistant within conversational application 802 via a client display 302 and communicates with example method 900 within intelligent investment system 102 via network 104. Example method 900 also communicates with asset trading platform 1000 via network 104. The transaction execution prompt 912 may enable the AI assistant to confirm a decision by the user to place buy and sell orders associated with previously accepted AI suggestions, which may be formatted to enable the user to visually distinguish between accepted (e.g., checkmark adjacent to suggestion text) and non-accepted (e.g., no checkmark next to suggestion text) suggestions. For example, after a user selects and accepts one or more approved AI suggestions (e.g., accepted AI positioning suggestion 808), the AI assistant may ask the user via transaction execution prompt 912, "Would you like to place buy and sell orders for accepted suggestions?" In turn, the user may respond, "Yes" to the AI assistant's question posed in transaction prompt 912.

In the case of an affirmative response (e.g., yes, ok, etc.) from the user, example method 900 may assemble and submit the required transaction requests to asset trading platform 1000 on behalf of the user, with each individual transaction request containing specific instructions for buying or selling a particular asset. For example, accepted AI positioning suggestion 808 (e.g., replace stock C with stock D) may recommend two distinct transactions (e.g., sell stock C and buy stock D). The first transaction may be defined by specific sell order instructions (e.g., sell 50 shares of stock C for no less than $200 per share). The second transaction may be defined by specific buy order instructions (e.g., buy 50 shares of stock D for no more than $1,100 per share). Furthermore, individual transactions may be ordered in a definitive sequence, such as a first transaction (e.g., sell stock C) followed by a second transaction (e.g., buy stock D), where the former must be executed and confirmed prior to execution of the latter.

Upon the receipt of each transaction request, asset trading platform 1000 may execute the specific trading instructions (e.g., buy, sell, or transfer a particular asset) contained within the request and then issue a trade confirmation upon execution success or an error upon execution failure to intelligent investment system 102. When required, the sequencing of individual transactions may be controlled by intelligent investment system 102 (i.e., the request source), rather than by asset trading platform 1000 (i.e., the request destination) to ensure that asset trading instructions are executed and confirmed in the proper order.

In other embodiments, rather than employing and AI assistant or other conversational application, a more direct approach may be employed. More specifically, a web client application, such as web client application 112, running on a client device, such as client device 106, may enable a user to directly place one or more transactions, such as buy, sell, or transfer orders, from any individual AI suggestion that has one or more associated recommended or customized transactions. For example, a particular AI suggestion may recommend two distinct transactions: a first transactions to sell stock C at the current market price and a second transaction to buy stock D at the current market price. A user may decide that he or she desires to immediately place the recommended sell order and buy order. In order to enable the user to immediately place these recommended sell and buy orders, the AI suggestion may provide a direct means to place the first transaction (e.g., sell stock C at the current market price) in the form of a sell button attached to the AI suggestion, and it may further provide a direct means to place the second transaction (e.g., buy stock D at the current market price) in the form of a buy button also attached to the AI suggestion.

In addition, web client application 112 may further enable a user to directly place a number of transactions across a number of individual AI suggestions that have associated recommended or customized transactions. For example, a first AI suggestion may recommend a first transaction to buy bond A at the current market price and a second AI suggestion may recommend a second transaction to buy stock A at the current market price. A user may decide that he or she desires to immediately place both of the recommended buy orders. In order to enable the user to immediately place these recommended buy orders, the first AI suggestion may provide a direct means to place the first transaction (e.g., buy bond A at the current market price) in the form of a buy button attached to the first AI suggestion, and the second AI suggestion may provide a direct means to place the second transaction (e.g., buy stock A at the current market price) in the form of a buy button attached to the second AI suggestion. Once the user has directly placed one or more transactions, web client application 112 may submit an input message comprising the set of placed transactions to example method 900 of intelligent investment system 102, which may then control the submission of the placed transactions to asset trading platform 1000. This direct approach obviates the need for the user to accept AI suggestions before placing transactions because, in this case, the set of accepted AI suggestions is implicitly determined by the set of placed AI transactions.

Figure 11:
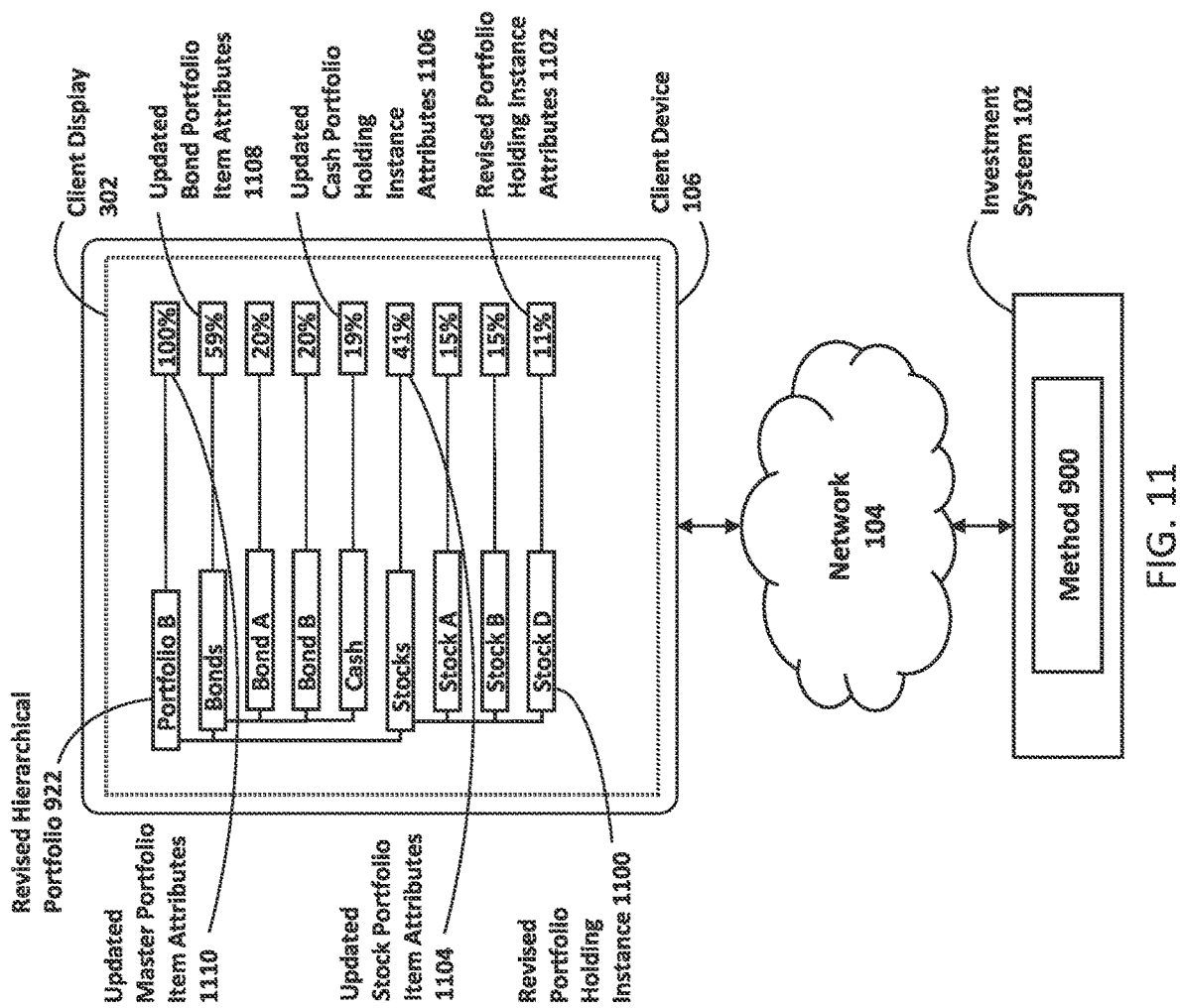
FIG. 11 is an illustration of a client device displaying a revised hierarchical portfolio incorporating accepted AI suggestions and confirmed transactions according to an exemplary embodiment.

FIG. 11 is an illustration of a client device displaying a revised hierarchical portfolio incorporating accepted AI suggestions and confirmed transactions while communicating with an intelligent investment system over a network according to an exemplary embodiment. The client device 106 displays the revised hierarchical portfolio 922 via a client display 302 and communicates with example method 900 within intelligent investment system 102 via network 104. The revised hierarchical portfolio, like the prior hierarchical portfolio, may be organized by asset class and then by individual assets, in which case each individual asset is located under the asset class to which it belongs. For example, the revised portfolio holding instance 1100 (e.g., stock D), which replaced the prior portfolio holding instance 800 (e.g., stock C), is located under the asset class to which it belongs (e.g., stocks) within the revised hierarchical portfolio 922 (e.g., portfolio B), which replaced prior hierarchical portfolio 300 (e.g., portfolio A).

Revised and prior hierarchical portfolios may have not only different corresponding revised and prior portfolio holding instances, but also different corresponding revised and prior portfolio holding instance attributes and attribute values and revised and prior portfolio item attributes and attribute values. For example, relative to prior hierarchical portfolio 300 (e.g., portfolio A), revised hierarchical portfolio 922 (e.g., portfolio B) may contain revised portfolio holding instance attributes and values 1102 (e.g., cost basis of stock D as a percentage of the total cost basis of portfolio B, or 11% in this example), updated stock portfolio item attributes and values 1104 (e.g., cost basis of stock holdings as a percentage of the total cost basis of portfolio B, or 41% in this example), updated cash portfolio holding instance attributes and values 1106 (e.g., cost basis of cash holdings as a percentage of the total cost basis of portfolio B, or 19% in this example), updated bond portfolio item attributes and values 1108 (e.g., cost basis of bond and cash holdings as a percentage of the total cost basis of portfolio B, or 59% in this example), and updated master portfolio item attributes and values 1110 (e.g., cost basis of portfolio B as a percentage of the total cost basis of portfolio B, or 100% by definition).

Attributes for revised and prior portfolio holding instances may include, but are not limited to, the following leaf-level attributes: Account Custodian, Account Name, Account Purpose, Account Type, Active Status, Active Manager, Allocation Level, Annual Fees Charged, Annual Income, Asset Class, Capital Gain/Loss, Category, Classification, Competency, Cost Basis, Count, Current Price, Deviation from Plan, Downside Value, Fund, Holding, Inflation Protection, Market Price, Market Value Date, Market Value Date, Maturity Date, Opportunity, Parent Level, Parent Portfolio, Planning Amount, Planning Date, Portfolio Name, Portfolio Owner, Primary Cycle, Quantity, Quarter, Rank, Risk, Sector, Year, and Yield.

In addition to the leaf-level attributes for revised and prior holding instances, attributes for revised and prior portfolio items may further include, but are not limited to, the following hierarchical role-up attributes: Capital Gain/Loss in Hierarchy, Cost Basis in Hierarchy, Count in Hierarchy, Downside Value in Hierarchy, Market Value in Hierarchy, Realized Gain/Loss in Hierarchy, Tax-Exempt Income in Hierarchy, Taxable Income in Hierarchy, Total Cash Balance in Hierarchy, Total Income in Hierarchy, Total Tax Payments in Hierarchy, Total Withdrawals & Fees & Taxes in Hierarchy, and Unrealized Gain/Loss in Hierarchy.

In other exemplary embodiments, revised and prior hierarchical portfolios may have not only different portfolio items and portfolio item attributes, but also a different number of child portfolio items nodes beneath a parent portfolio item node. For example, a prior portfolio hierarchy may contain two first-level portfolio item nodes, a first first-level node representing and aggregating bond and cash holdings (e.g. bonds and cash) and a second first-level node representing and aggregating stock holdings (e.g., stocks). In contrast, a revised portfolio hierarchy may contain three first-level portfolio item nodes, a first first-level node for bonds and cash, a second first-level node for stocks, and a third first-level node representing and aggregating real estate holdings (e.g., properties). In this example, the bonds and cash node and the stocks node are present in both the prior and the revised portfolio hierarchies, but the properties node is present only in the revised portfolio hierarchy.

In various other exemplary embodiments, a more diverse set of asset classes and pooled investment vehicles may be employed. Asset classes may include, but are not limited to, equities (e.g., domestic stocks, foreign stocks, large-cap stocks, value stocks, stock options, etc.), bonds (e.g., high-yield bonds, corporate bonds, municipal bonds, savings bonds, government bonds, inflation protected securities, etc.), commodities (e.g., wheat, oil, copper, silver, gold, rare-earth metals, etc.), currencies (e.g., U.S. Dollar, European Euro, Japanese Yen, Chinese Yuan, Indian Rupee, etc.), cash (e.g., savings accounts, checking accounts, certificates of deposit, money market funds, etc.), real estate (e.g., homes, vacation properties, rental properties, land, commercial property, etc.), works of art (e.g., sculptures, pottery, woodworking, literature, poetry, music, designs, drawings, paintings, prints, photographs, films, etc.), personal property (e.g., jewelry, boats, cars, collectibles, horses, livestock, antiques, etc.), insurance policies (e.g., life, annuity, etc.), intellectual property (e.g., copyrights, trademarks, domain names, patents, etc.), derivatives (e.g., futures, options, etc.), and cryptocurrencies (e.g., Bitcoin, Ether, Libra, etc.). Public and private pooled investment vehicles may include, but are not limited to, real estate investment trusts (REITs), master limited partnerships (MLPs), mutual funds, exchange traded funds (ETFs), pension funds, venture capital (VC) funds, private equity (PE) funds, and hedge funds.

The diverse set of asset classes and pooled investment vehicles described above may be reorganized into a classification structure partitioned into two primary investment groups: a traditional investment group comprising traditional asset classes and pooled investment vehicles, and an alternative investment group comprising alternative asset classes and pooled investment vehicles. Under this classification structure, the traditional investment group includes stocks, bonds, and cash plus any pooled investment vehicles that may be classified as stocks, bonds, or cash. The alternative investment group includes all asset classes that are not stocks, bonds, or cash plus any pooled investment vehicles that may not be classified as stocks, bonds, or cash.

Since a pooled investment vehicle may be viewed as an asset container, it is an asset itself and may be classified accordingly based on its contents. In particular, a pooled investment vehicle that primarily contains stocks is itself a stock asset and may be classified as such. For example, a stock ETF, such as the SPDR S&P 500 ETF Trust with ticker symbol SPY, that primarily contains a number of individual stocks may be classified as a stock asset. Similarly, a pooled investment vehicle that primarily contains a) bonds is itself a bond asset may be classified as such; b) cash is itself a cash asset may be classified as such; or c) alternative investments is itself an alternative asset may be classified as such. For example, a bond mutual fund, such as the Vanguard Total International Bond Index Fund Admiral Shares mutual fund with ticker symbol VTABX, that primarily contains a number of individual bonds may be classified as a bond asset; a cash mutual fund, such as the Fidelity Government Cash Reserves money market mutual fund with ticker symbol FDRXX, that primarily contains a number of individual cash, or cash equivalent, investments may be classified as a cash asset; a real estate ETF, such as the Vanguard Real Estate ETF with ticker symbol VNQ, that primarily contains a number of individual real estate investments may be classified as a real estate asset or, under the classification structure described above, an alternative asset (i.e., not a stock, bond, or cash asset); a commodity ETF, such as the SPDR Gold Shares ETF with ticker symbol GLD, that primarily contains holdings in one or more physical commodities or commodities futures contracts may be classified as a commodity asset or an alternative asset; and a currency ETF, such as the Invesco CurrencyShares Japanese Yen Trust ETF with ticker symbol FXY, that primarily contains holdings in one or more physical currencies may be classified as a currency asset or an alternative asset.

Accordingly, under this classification structure and view of pooled investments vehicles, a hierarchical portfolio of assets may comprise any number of stock assets, bond assets, cash assets, or alternative assets, wherein it is to be understood, from the examples discussed above, that the stock assets may include individual stocks or pooled investment vehicles containing primarily stocks, the bond assets may include individual bonds or pooled investment vehicles containing primarily bonds, the cash assets may include individual cash accounts or pooled investment vehicles containing primarily cash, or cash equivalent, investments, and the alternative assets may include individual alternative investments or pooled investment vehicles containing primarily alternative investments.

In more complex embodiments, a hierarchical portfolio structured along multiple dimensions and containing several levels of depth may be utilized. For example, a user may request advice regarding a complex multidimensional multilevel hierarchical portfolio (e.g., hierarchical portfolio 300 of FIG. 3) containing a specific portfolio holding instance of interest (e.g., an instance of the stock of Google, such as portfolio holding instance 304 of FIG. 3) positioned deeply within the portfolio hierarchy. The portfolio holding instance of interest (e.g., the instance of Google stock) may be located within a particular branch of the portfolio hierarchy. The branch itself may be organized along multiple dimensions (e.g., asset class, sector, geography, capitalization, investment style, and custodian). For example, the branch may start with a first-level node referring to an asset class (e.g., Stock), continuing to a second-level node referring to a sector (e.g., Technology), continuing to a third-level node referring to a geography (e.g., United States), continuing to a fourth-level node referring to a market capitalization level (e.g., Mega-Cap), continuing to a fifth-level node referring to an investment style (e.g., Growth), continuing to a sixth-level node referring to a brokerage firm (e.g., Fidelity), and finally reaching the leaf-level portfolio holding instance of interest (e.g., the instance of Google stock). In response to the user's request for advice, intelligent investment system 102 may offer one or more AI suggestions (e.g., an AI suggestion for the instance of Google stock, such as AI suggestion 402 of FIG. 4) related to the portfolio holding instance of interest (e.g., the Google stock instance). The one or more AI suggestions may include a restructuring suggestion (e.g., add a new sector, such as communication services, to contain the instance of Google stock), an allocation suggestion (e.g., increase the allocation level to the instance of Google stock by a defined relative or absolute amount), a positioning suggestion (e.g., move the instance of Google stock from the technology sector subbranch to the communication services subbranch), or a consolidation suggestion (e.g., consolidate the instance of Google stock held at Fidelity with a second instance of Google stock held at JPMorgan). The AI suggestions may further contain recommended stock transaction orders (e.g., buy, sell, or transfer shares of Google stock) to be executed and confirmed by a stock trading platform (e.g., electronic asset trading platform 1000).

For each AI suggestion regarding the portfolio holding instance of interest (e.g., the Google stock instance) within the complex hierarchical portfolio, intelligent investment system 102 may provide location data for the AI suggestion that maps the AI suggestion to a precise structural position within the hierarchical portfolio. The location data may comprise an identifier for the AI suggestion and a corresponding AI suggestion location. The AI suggestion location, which represents a precise structural position within the portfolio hierarchy, may be specified by the investment system as a hierarchical path to a portfolio item within the hierarchical portfolio. For example, for an AI restructuring suggestion related to the portfolio holding instance of interest, an AI restructuring suggestion location (e.g., Portfolio A\Stock\Technology) may be specified by the investment system as a hierarchical path representing a precise structural position within the hierarchical portfolio (e.g., the Technology sector portfolio item to which the Google stock instance belongs) upon which to place the AI restructuring suggestion.

The AI suggestion location may also be specified by intelligent investment system 102 as a hierarchical path to a portfolio holding instance (i.e., a leaf-level portfolio item) within the hierarchical portfolio. For example, for an AI positioning suggestion related to the portfolio holding instance of interest, an AI positioning suggestion location (e.g., Portfolio A\Stock\Technology\United States\Mega-Cap\Growth\Fidelity\Google) may be specified by the investment system as a hierarchical path representing a precise structural position within the hierarchical portfolio (e.g., the portfolio holding instance of Google stock beneath its custodian, Fidelity in this example) upon which to place the AI positioning suggestion. Similarly, for an AI consolidation suggestion related to two unique portfolio holding instances (e.g., a first portfolio holding instance of Google stock and a second portfolio holding instance Google stock) of a portfolio holding (e.g., the stock of Google), an AI consolidation suggestion location (e.g., Portfolio A\Stock\Technology\United States\Mega-Cap\Growth\JPMorgan\Google) may be specified by the investment system as a hierarchical path representing a precise structural position within the hierarchical portfolio (e.g., the second portfolio holding instance of Google stock beneath its respective custodian, JPMorgan in this example) upon which to place the AI consolidation suggestion.

An AI suggestion location may also be specified by intelligent investment system 102 as a hierarchical path that extends down to an attribute of a portfolio item or an attribute of a portfolio holding instance within the hierarchical portfolio. For example, for an AI allocation suggestion related to the portfolio holding instance of interest (e.g., the first Google stock instance), an AI allocation suggestion location (e.g., Portfolio A\Stock\Technology\United States\Mega-Cap\Growth\Fidelity\Google\Allocation Level) may be specified by the investment system as a hierarchical path representing a precise structural position within the hierarchical portfolio down to the attribute level (e.g., the Allocation Level attribute of the first portfolio holding instance of Google stock) upon which to place the AI allocation suggestion. Furthermore, an AI suggestion location may be augmented by the investment system using a relative offset, such as a justification offset (e.g., left, center, right, etc.). For example, an AI allocation suggestion location (e.g., Portfolio A\Stock\Technology\United States\Mega-Cap\Growth\Fidelity\Google\Allocation Level\Center) may be specified by the investment system as a hierarchical path representing a precise structural position within the hierarchical portfolio down to the attribute level with a justification offset (e.g., the center of the Allocation Level attribute of the first portfolio holding instance of Google stock) upon which to place the AI allocation suggestion.

When requesting advice related to the complex multidimensional multilevel hierarchical portfolio, the user may receive additional advice regarding other portfolio holding instances of interest. For example, the user may receive advice for a second portfolio holding instance of interest (e.g., an instance of a 30-year Treasury Inflation Protected Security, or TIPS) positioned deeply within the portfolio hierarchy. The second portfolio holding instance of interest (e.g., the instance of the 30-year TIPS) may be located within a second branch of the portfolio hierarchy. The second branch may be organized along multiple dimensions (e.g., asset class, trust, bond issuer, bond type, maturity, and custodian). The second branch of the portfolio hierarchy may start with a first-level node referring to a second asset class (e.g., Bond), continuing to a second-level node referring to a trust (e.g., Trust A), continuing to a third-level node referring to a sovereign bond issuer (e.g., United States Treasury), continuing to a fourth-level node referring to a bond type (e.g., 30-year Inflation Protected), continuing to a fifth-level node referring to a maturity (e.g., 2045), continuing to a sixth-level node referring to a custodian auction platform (e.g., Treasury Direct), and finally reaching the leaf-level portfolio holding instance of interest (e.g., the instance of the 30-year TIPS). In response to the user's request for advice, intelligent investment system 102 may offer one or more AI suggestions related to the second portfolio holding instance of interest (e.g., the 30-year TIPS instance), including a restructuring suggestion (e.g., add a new trust, such as Trust B, to contain the instance of the 30-year TIPS), an allocation suggestion (e.g., decrease the allocation level to the instance of the 30-year TIPS by a defined relative or absolute amount), a positioning suggestion (e.g., move the instance of the 30-year TIPS from the US Treasury subbranch of Trust A to the corresponding US Treasury subbranch of Trust B), or a consolidation suggestion (e.g., consolidate the instance of the 30-year TIPS held at Treasury Direct with a second instance of the 30-year TIPS held at Fidelity). The AI suggestions may further contain recommended bond transaction orders (e.g., buy, sell, or transfer 30-year TIPS bonds) to be executed and confirmed by a bond trading platform (e.g., electronic asset trading platform 1000).

For each AI suggestion regarding the second portfolio holding instance of interest (e.g., the 30-year TIPS instance), intelligent investment system 102 may provide location data (e.g., AI suggestion identifier and corresponding AI suggestion location) for the AI suggestion that maps the AI suggestion to an AI suggestion location. The AI suggestion location represents a precise structural position within the hierarchical portfolio, and it may be specified by the investment system as a hierarchical path, with or without a relative offset, to a portfolio item, portfolio holding instance, portfolio item attribute, or portfolio holding instance attribute with within the hierarchical portfolio. For example, for an AI restructuring suggestion related to the second portfolio holding instance of interest, an AI restructuring suggestion location (e.g., Portfolio A\Bond) may be specified by the investment system as a hierarchical path representing a precise structural position within the hierarchical portfolio (e.g., the Bond asset class portfolio item to which the 30-year TIPS portfolio holding instance belongs) upon which to place the AI restructuring suggestion. Similarly, for an AI positioning suggestion related to the second portfolio holding instance of interest, an AI positioning suggestion location (e.g., Portfolio A\Bond\Trust A\United States Treasury\30-Year Inflation Protected\2045\Treasury Direct\30-year TIPS) may be specified by the investment system as a hierarchical path representing a precise structural position within the hierarchical portfolio (e.g., the 30-year TIPS portfolio holding instance beneath its custodian, Treasury Direct in this example) upon which to place the AI positioning suggestion. Furthermore, for an AI allocation suggestion related to the second portfolio holding instance of interest, an AI allocation suggestion location (e.g., Portfolio A\Bond\Trust A\United States Treasury\30-Year Inflation Protected\2045\Treasury Direct\30-year TIPS\Allocation Level\Right) may be specified by the investment system as a hierarchical path representing a precise structural position within the hierarchical portfolio down to the attribute level with a justification offset (e.g., the right-hand side of the Allocation Level attribute of the 30-year TIPS portfolio holding instance) upon which to place the AI allocation suggestion.

Furthermore, when requesting advice related to the complex multidimensional multilevel hierarchical portfolio, the user may receive additional advice regarding a third portfolio holding instance (e.g., an instance of the SPDR Gold Shares Exchange Traded Fund, or GLD ETF) positioned deeply within the hierarchical portfolio. The third portfolio holding instance of interest (e.g., the instance of the GLD ETF) may be located within a third branch of the portfolio hierarchy. The third branch may be organized along multiple dimensions (e.g., asset class, trust, commodity type, and custodian). The third branch of the portfolio hierarchy may start with a first-level node referring to a third asset class (e.g., Commodity), continuing to a second-level node referring to a trust (e.g., Trust A), continuing to a third-level node referring to a commodity type (e.g., Gold), continuing to a fourth-level node referring to a custodian (e.g., Morgan Stanley), and finally reaching the leaf-level portfolio holding instance of interest (e.g., the instance of the GLD ETF). In response to the user's request for advice, intelligent investment system 102 may offer one or more AI suggestions related to the third portfolio holding instance of interest (e.g., the GLD ETF instance), including a restructuring suggestion (e.g., add a new trust, such as Trust C, to contain the instance of the GLD ETF), an allocation suggestion (e.g., zero the allocation level to the instance of the GLD ETF), a positioning suggestion (e.g., move the instance of the GLD ETF from the Gold subbranch of Trust A to the corresponding Gold subbranch of Trust C), or a consolidation suggestion (e.g., consolidate the instance of the GLD ETF held at a first account at Morgan Stanley with a second instance of the GLD ETF held at a second account at Morgan Stanley). The AI suggestions may further contain recommended ETF transaction orders (e.g., buy, sell, or transfer GLD ETF shares) to be executed and confirmed by a commodity ETF trading platform (e.g., electronic asset trading platform 1000).

For each AI suggestion regarding the third portfolio holding instance of interest (e.g., the GLD ETF instance), intelligent investment system 102 may provide location data for the AI suggestion that maps the AI suggestion to an AI suggestion location representing a precise structural position within the hierarchical portfolio as specified as a hierarchical path to a portfolio item or portfolio item attribute with or without a relative offset. For example, for an AI restructuring suggestion related to the third portfolio holding instance of interest, an AI restructuring suggestion location (e.g., Portfolio A\Commodity) may be specified by the investment system as a hierarchical path representing a precise structural position within the hierarchical portfolio (e.g., the Commodity asset class portfolio item to which the GLD ETF instance belongs) upon which to place the AI restructuring suggestion. Similarly, for an AI consolidation suggestion related to the third portfolio holding instance of interest, an AI consolidation suggestion location (e.g., Portfolio A\Commodity\Trust A\Gold\Morgan Stanley\GLD) may be specified by the investment system as a hierarchical path representing a precise structural position within the hierarchical portfolio (e.g., the portfolio holding instance of the GLD ETF beneath its custodian, Morgan Stanley in this example) upon which to place the AI consolidation suggestion. Furthermore, for an AI allocation suggestion related to the third portfolio holding instance of interest, an AI allocation suggestion location (e.g., Portfolio A\Commodity\Trust A\Gold\Morgan Stanley\GLD\Allocation Level\Left) may be specified by the investment system as a hierarchical path representing a precise structural position within the hierarchical portfolio down to the attribute level with a justification offset (e.g., the left-hand side of the Allocation Level attribute of the GLD ETF portfolio holding instance) upon which to place the AI allocation suggestion.

In various embodiments, an AI suggestion (e.g., restructuring, allocation, etc.) related to a portfolio holding instance of interest (e.g., an instance of the GLD ETF) may be positioned within the hierarchical portfolio at one of several possible AI suggestion locations, with investment system 102 selecting the most relevant AI suggestion location that provides the proper context for the user to quickly understand and confidently act upon the AI suggestion. For example, an AI restructuring suggestion (e.g., add a new trust, such as Trust C, to contain the instance of the GLD ETF) related to a portfolio holding instance of interest may be positioned within the hierarchical portfolio at one of several possible AI restructuring suggestion locations from a first-level location (e.g., Portfolio A\Commodity) to a second-level location (e.g., Portfolio A\Commodity\Trust A) down to a leaf-level location (e.g., Portfolio A\Commodity\Trust A\Gold\Morgan Stanley\GLD), with the investment system selecting the most relevant AI suggestion location (e.g., Portfolio A\Commodity) that provides the best context for the user to understand and act on the AI restructuring suggestion related to the portfolio holding instance of interest.

Figure 12A:
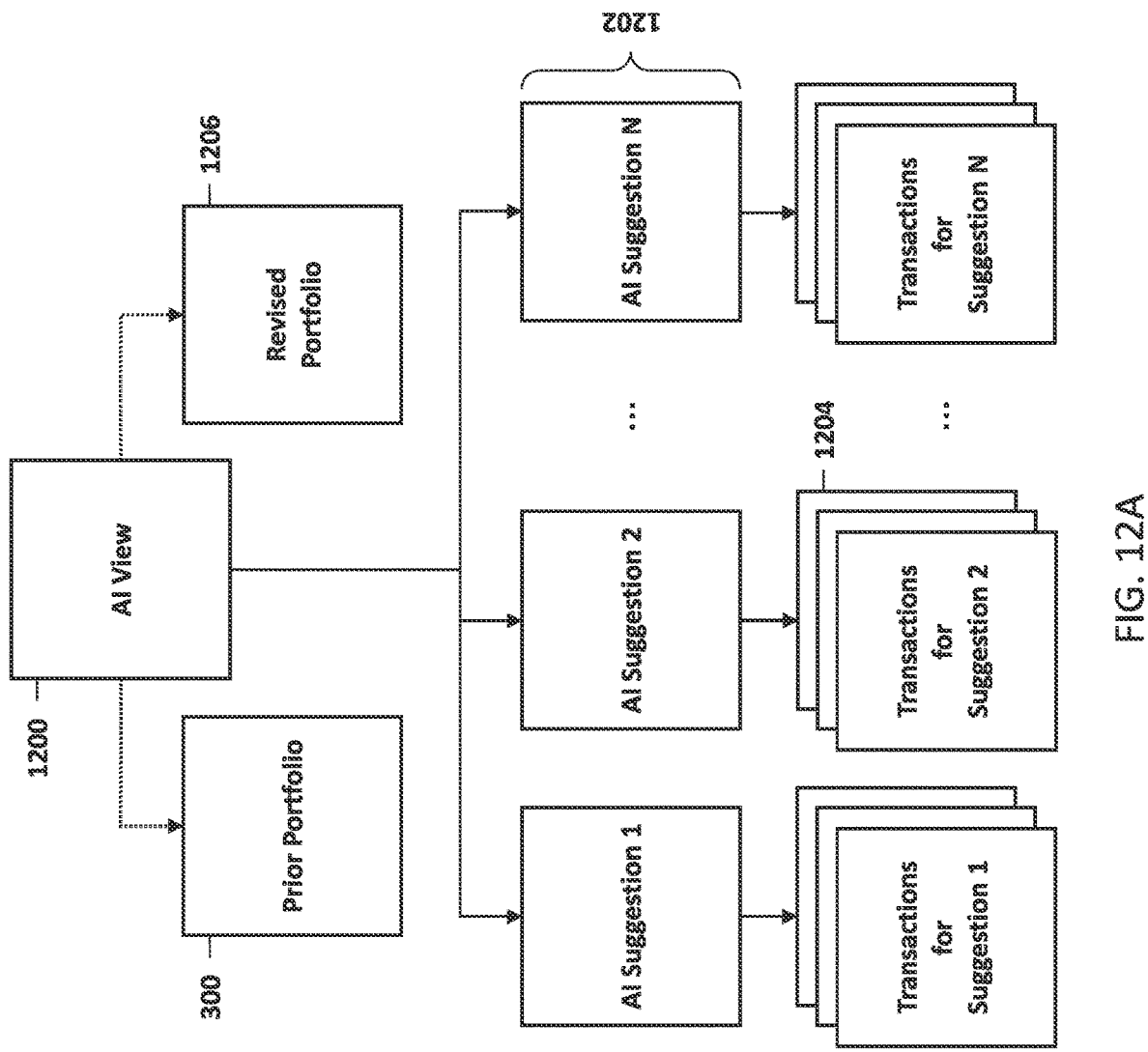
FIG. 12A is a data model diagram of an AI view for capturing, recording, and exchanging context-specific financial advice related to a hierarchical portfolio of assets according to various embodiments.

FIG. 12A is a data model diagram of an AI view 1200 for capturing, recording, and exchanging context-specific financial advice in the form of offered suggestions, accepted suggestions, recommended transactions, and executed transactions related to a hierarchical portfolio of assets according to various embodiments. The AI view 1200 is organized hierarchically via a structured set of nodes, attributes, and attribute values. The top-level node, representing AI view 1200, contains an AI suggestions node 1202. The AI suggestions node 1202 may contain individual AI suggestion nodes, including AI Suggestion 1, AI Suggestion 2, . . . , AI Suggestion N. AI suggestion nodes 1, 2, . . . , N represent individual AI suggestions, generated based on machine learning models, for optimizing the state of the hierarchical portfolio of assets. Each individual AI suggestion node, such as AI Suggestion 2, may contain a transactions node, such as transactions node 1204. For example, the transactions node 1204 within AI Suggestion 2 may contain individual transaction nodes, including Transaction 1, Transaction 2, . . . , Transaction M (as shown in more detail in FIG. 12B). Transaction nodes 1, 2, . . . , M within transactions node 1204 associated with AI Suggestion 2 represent individual transactions required to realize the individual AI suggestion represented by AI Suggestion 2. An individual transaction may be a recommended transaction (i.e., a transaction recommended by the investment system) or a customized transaction (i.e., a recommended transaction that has been altered or customized by the user). Each individual AI suggestion node may further contain a review node and an acceptance node (not shown for brevity in FIG. 12A but shown in FIG. 12B). AI view 1200 may further contain a specific reference to a prior portfolio 300, representing the state of the hierarchical portfolio just before the implementation of accepted AI suggestions and execution of associated transactions (i.e., recommended or customized transactions associated with individual AI suggestions). It may further contain a specific reference to a revised portfolio

1206, representing the state of the hierarchical portfolio just after the implementation of accepted AI suggestions and execution of associated transactions. All nodes may contain associated attributes and attribute values, as described in more detail below.

Figure 12B:
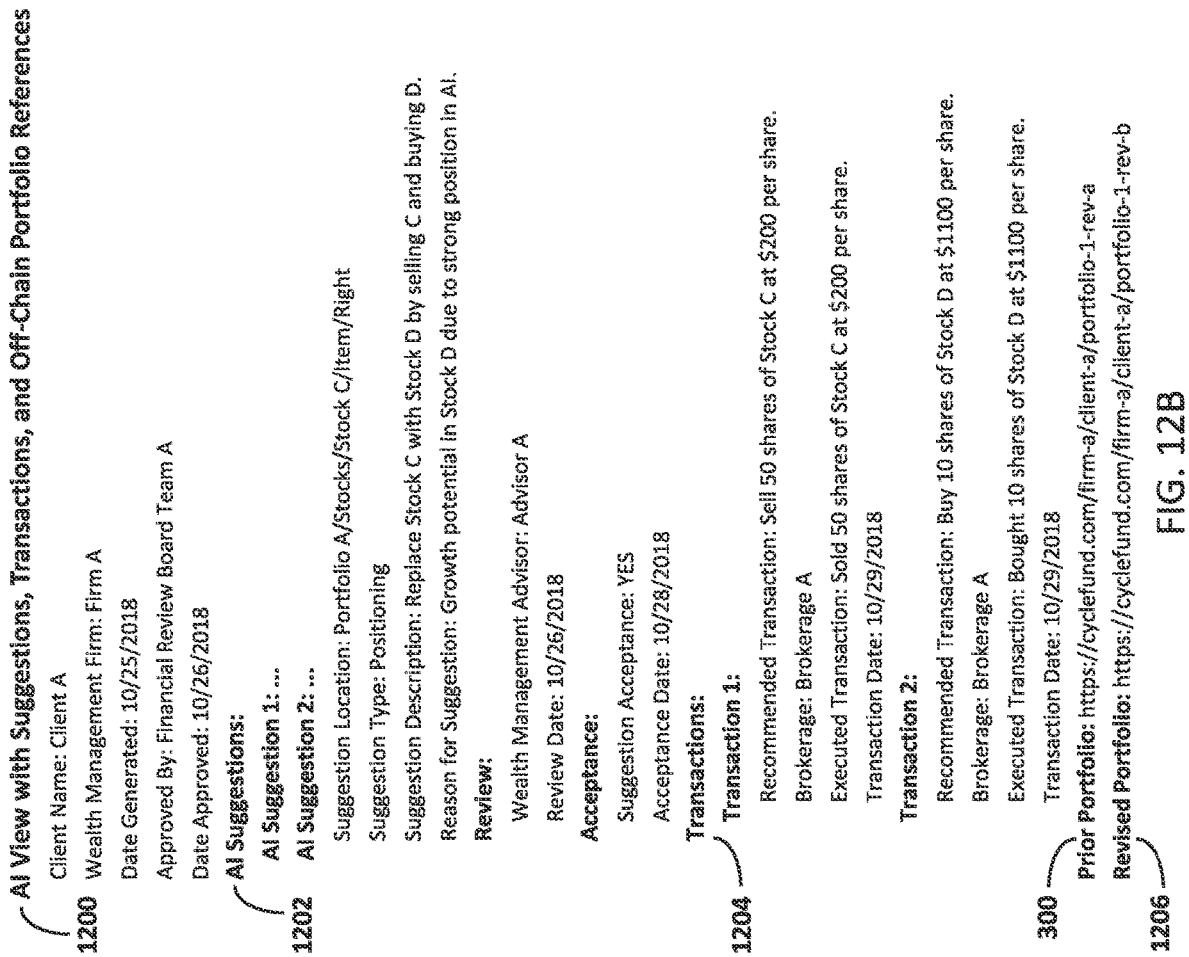
FIG. 12B is an example document illustrating an AI view populated with representative attributes and attribute values according to an exemplary embodiment.

FIG. 12B is an example document illustrating an AI view 1200 populated with representative attributes and attribute values according to an exemplary embodiment. More specifically, the example document shows representative AI view attributes and attribute values, AI suggestion attributes and attribute values, and recommended or customized transaction attributes and attribute values. The example document, which consists of Unicode characters, may be transformed into a human-readable data-exchange format (e.g., JSON, XML, etc.) and encoded into a byte stream using one of the Universal Transformation Format (UTF) variable-width character encoding methods (e.g., UTF-8, UTF-16, etc.). The AI view 1200, as noted previously, is organized hierarchically via a structured set of nodes. Each node of AI view 1200 may contain attributes and attribute values, as well as other lower-level nodes. For example, AI view 1200 may contain the following attributes and attribute values: Client Name: Client A, Wealth Management Firm: Firm A, Date Generated: Oct. 25, 2018, Approved By: Financial Review Board Team A, and Date Approved: Oct. 26, 2018, as well as an AI suggestions node 1202.

The AI suggestions node 1202 may contain a number of individual AI suggestion nodes, such as individual AI Suggestion 2 for example. AI Suggestion 2 may contain the following attributes and attribute values: Suggestion Location: Portfolio A/Stocks/Stock C/Item/Right, Suggestion Type: Positioning, Suggestion Description: Replace Stock C with Stock D by selling Stock C and buying Stock D, and Reason for Suggestion: Growth potential in Stock D due to strong competitive position in AI. The text value of the Reason for Suggestion attribute of a particular AI suggestion (e.g., AI Suggestion 2 within AI suggestions node 1202 of AI view 1200) may provide users (e.g., financial clients, financial advisors, multigenerational families, etc.) with important insights into the nature of the associated AI suggestion. More specifically, insights into an AI suggestion, including its intent (e.g., aim or purpose), may be captured by the attribute value of the Reason for Suggestion attribute of the AI suggestion, and this attribute value may comprise text related to, but not limited to, global events (e.g., Global Liquidation, Global Surge, Macro Growth, Macro Shock, etc.), opportunities and risks (e.g., Improved Opportunity, Diminished Opportunity, Decreased Risk, Increased Risk, etc.), competitive positioning (etc., Strong Competitive Position, Weak Competitive Position, etc.), catalysts (e.g., Strengthened Catalyst, Weakened Catalyst, etc.), valuation (e.g., Under Priced Asset, Over Priced Asset, etc.), investment lifecycle phase (e.g., Initialization, Accumulation, Holding, Harvesting, Reduction, Closure, Archive), and investment attractiveness (e.g., Attractive Investment, Unattractive Investment, etc.). For example, as illustrated in FIG. 12B, the intent of an AI suggestion, such as the AI suggestion represented by AI Suggestion 2, may be to offer advice for capturing the growth potential of a company stock, such as Stock D, that has a strong competitive position in an emerging technology, such as AI, and this intent may be summarized by the text value, "Growth potential in Stock D due to strong competitive position in AI" of the Reason for Suggestion attribute of the AI suggestion. In various embodiments, the text value of the Reason for Suggestion attribute of an AI suggestion may be authored and populated by a financial professional, who may serve as a member of a financial review board responsible for reviewing, annotating (e.g., interpreting, explaining, or detailing), and approving AI suggestions and AI views.

AI Suggestion 2 may also contain a review node and an acceptance node. The review node within AI Suggestion 2 may contain the following attributes and attribute values: Wealth Management Advisor: Advisor A and Review Date: Oct. 26, 2018. The acceptance node within AI Suggestion 2 may contain the following attributes and attribute values: Suggestion Acceptance: YES and Acceptance Date: Oct. 28, 2018. AI Suggestion 2 may further contain a transactions node 1204. The transactions node 1204 within AI Suggestion 2 may contain individual transaction nodes associated with AI Suggestion 2, such as Transaction 1 and Transaction 2 for example. Transaction 1 within transactions node 1204 of AI Suggestion 2 may contain the following attributes and attribute values: Recommended Transaction: Sell 50 shares of Stock C at no less than $200 per share. Brokerage: Brokerage A, Executed Transaction: Sold 50 shares of Stock C at $200 per share, and Transaction Date: Oct. 29, 2018. Similarly, Transaction 2 within transactions node 1204 of AI Suggestion 2 may contain the following attributes and attribute values: Recommended Transaction: Buy 10 shares of Stock D at no more than $1100 per share, Brokerage: Brokerage A, Executed Transaction: Bought 10 shares of Stock D at $1100 per share, and Transaction Date: Oct. 29, 2018.

The recommended transaction of Transaction 1 and the recommended transaction of Transaction 2 may be sequentially ordered (e.g., the sell order recommended in Transaction 1 may be placed, executed, and confirmed prior to the placement and execution of the buy order recommended in Transaction 2) and the sequential flow of these transactions may be controlled by intelligent investment system 102, rather than electronic trading platform 1000. Furthermore, the cash balance of the hierarchical portfolio may be increased due to sales proceeds exceeding purchasing costs (i.e., cash balance increase) or reduced due to purchasing costs exceeding sales proceeds (i.e., cash balance reduction). For example, the sales proceeds from the execution of the recommended transaction of Transaction 1 may be less than the purchasing costs associated with the execution of the recommended transaction of Transaction 2, resulting in a cash balance reduction. Transaction costs and fees may also be incurred, further reducing the cash balance.

The AI view 1200 may further contain off-chain references to the state of the hierarchical portfolio. An off-chain reference represents a link to a resource not stored on a blockchain. For example, AI view 1200 may contain the following attribute and attribute value: Prior Portfolio: https://cyclefund.com/firm-a/client-a/portfolio-1-rev-a, where the attribute value represents a secure off-chain reference to the prior state of the hierarchical portfolio identified, within a private wealth management system, by the portfolio name: portfolio-1 at revision level: rev-a (i.e., prior portfolio 300). Similarly, AI view 1200 may further contain the following attribute and attribute value: Revised Portfolio: https://cyclefund.com/firm-a/client-a/portfolio-1-rev-b, where the attribute value represents a secure off-chain reference to the revised state of the hierarchical portfolio identified by the portfolio name: portfolio-1 at revision level: rev-b (i.e., revised portfolio 1206). AI view 1200 itself may be recorded on a blockchain, as described in the next subsection of the detailed description.

As described in this subsection of the detailed description, a key capability of the present technology is to provide actionable context-specific advice in the form of an actionable view of a hierarchical portfolio, wherein the advice may be financial advice, the actionable view may be an actionable AI view, the hierarchical portfolio may be a hierarchical portfolio of assets, and the hierarchical portfolio may be owned, legally or beneficially, by an individual financial client, institutional financial client, or a multigenerational family represented by individual or institutional financial clients. An important advantage of the present technology associated with this key capability is the ability for a financial client or a financial advisor acting on behalf of the financial client to immediately accept, reject, or place AI suggestions and associated asset transactions contained and precisely located within the actionable AI view overlaid upon the hierarchical portfolio. More specifically, from the perspective of the financial client or financial advisors to the financial client utilizing the actionable AI view, this important advantage provides a seamless user experience between making and acting upon a financial decision and increases the speed, efficiency, and accuracy of placing asset transactions associated with the financial decision from within a single view, namely the actionable AI view. In addition, from the perspective of the financial firm providing the actionable AI view to financial clients of the firm, including designated members or agents of multigenerational families, this important advantage may a) promote and drive higher transaction volumes by reducing friction in the order placement and execution process and b) further reduce the total cost to serve financial clients of the firm by encouraging financial clients to employ self-service methods to place asset transaction orders directly from suggestions within the actionable AI view without the assistance of an employee (e.g., investment broker, trader, etc.) of the financial firm.

Recording an AI View on a Blockchain

Figure 12C:
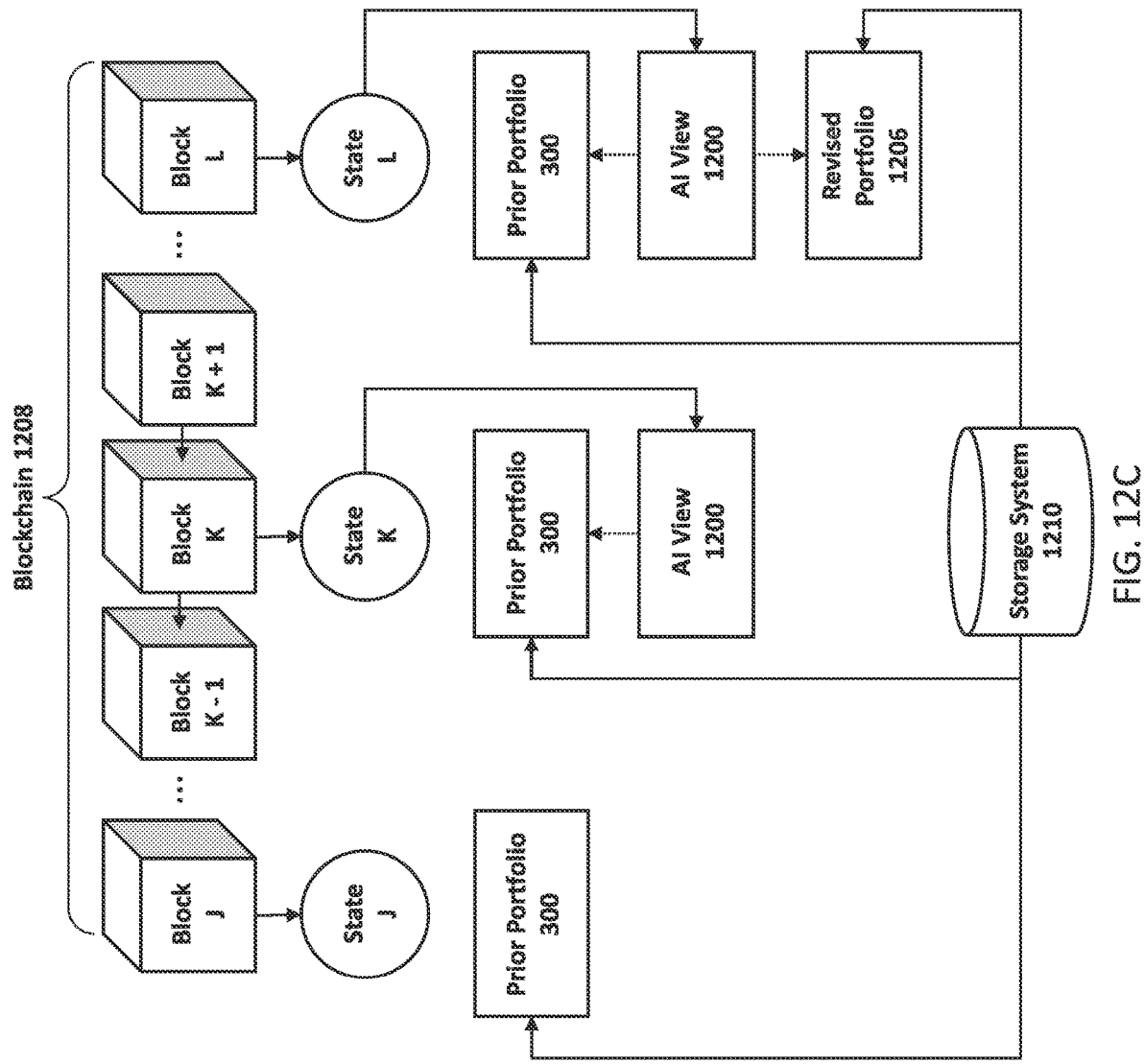
FIG. 12C is a block diagram of an AI view stored on a blockchain with off-chain references to a prior state and a revised state of a hierarchical portfolio of assets according to various embodiments.

FIG. 12C is a block diagram of an AI view 1200 stored within the state trie (e.g., a modified Merkle Patricia Trie or tree) of a blockchain 1208 (e.g., public Ethereum blockchain or private permissioned Enterprise Ethereum blockchain) with off-chain references to a prior state and a revised state of a hierarchical portfolio of assets according to various embodiments. As illustrated, a portion of the blockchain 1208 comprises a number of blocks, denoted by blocks J, K−1, K, K+1, and L, arranged in a time sequence, starting with block J and progressing forward in time to block L. The portion of blockchain 1208 further comprises a number of states, denoted by states J, K−1, K, K+1, and L, arranged in a time sequence, starting with state J and progressing forward in time to state L. (States K−1 and K+1 are not shown in FIG. 12C for clarity.) Each block in blockchain 1208 (e.g., block K) contains a block header attribute which stores a value in the form of a root hash (e.g., stateRoot attribute in Ethereum or Enterprise Ethereum) that references the corresponding state (e.g., state K) stored within the state trie. The state of the state trie is updated at periodic intervals corresponding to the creation of new blocks within the blockchain. For example, at time period K, state K of the state trie is updated contemporaneously with the creation of new block K within blockchain 1208. AI view 1200 is stored in encrypted, partially encrypted, or unencrypted form within states K, K+1, . . . , L corresponding to blocks K, K+1, . . . , L of blockchain 1208. AI view 1200 references prior portfolio 300. The reference to prior portfolio 300 is an off-chain reference to the prior state of the hierarchical portfolio stored in a secure off-chain storage system 1210 (e.g., file system, database, data lake, wealth management system, etc.). AI view 1200 also references revised portfolio 1206. The reference to revised portfolio 1206 is an off-chain reference to the revised state of the hierarchical portfolio stored in secure off-chain storage system 1210.

In some embodiments, blockchain 1208 may be a public (e.g., permissionless or open) blockchain (e.g., Bitcoin blockchain, Ethereum blockchain, future generation of Libra blockchain, etc.) containing fully encrypted or partially encrypted AI views but not, in most cases, unencrypted AI views. In these public blockchains, participation is not limited. Anyone (e.g., users, validators, miners) may join, transactions are visible to all participants, and participant identity is typically masked. In other embodiments, blockchain 1208 may be a private (e.g., permissioned or consortium) blockchain (e.g., Hyperledger Fabric blockchain, Corda and Corda Enterprise blockchains, Enterprise Ethereum blockchain, Libra blockchain, etc.) containing fully encrypted or partially encrypted AI views and, in some use cases, unencrypted AI views. In these private blockchains, participation is limited. Only participants (e.g., trusted firms within an industry or supply chain) pre-selected via consensus may join, transactions are only visible to participants, and participant identity is typically required.

In various embodiments, for a given time period (e.g., time period t), block (e.g., block K(t)), and corresponding state (e.g., state K(t)), the state trie may store a snapshot of the full state (e.g., token balances, transaction count, executable code, data storage, etc.) of all accounts (e.g., user accounts, smart contract accounts, oracle accounts, etc.) owned by blockchain 1208 participants. In such an embodiment, the given block may contain a number of transactions, validated and executed by miners (e.g., specialized nodes on the blockchain rewarded for adding valid blocks to the blockchain), that transition the state from one state to the next, such as from an arbitrary state K to the next state K+1 or from the prior latest state L−1 to the latest state L. For example, a miner, who has solved a cryptographic hashing puzzle for a block before other competing miners by finding a particular value, called a nonce, that when included in the block header produces a block-header hash with the required number of leading zeros to satisfy the prevailing difficultly threshold, may broadcast a proposed new block (e.g., block L) to the blockchain network. The new block may contain a number of valid transactions that, upon execution, transition the prior state (e.g., state L−1) of the state trie to arrive at the new state (e.g., state L) of the state trie.

Before trying to solve the cryptographic puzzle by iterating through nonces, a miner first prepares a new block candidate by finalizing its contents. To do so, the miner computes a number of root hashes (e.g., transactions, receipts, and state root hashes) and sets values for various block header attributes, such as parent hash (i.e., hash of the header of the previous block in the blockchain), transactions root, receipts root, state root, block number, timestamp, nonce, difficulty, logs bloom (i.e., filter for searching logs within transaction receipts), gas limit (i.e., maximum fuel available to execute block transactions), gas used (i.e., actual fuel used to execute block transactions), and beneficiary (i.e., winning miner account to deposit cryptocurrency rewards and transaction fees). For example, after executing the valid transactions included within a new block candidate (e.g., block L) and transitioning the state from the prior state (e.g., state L−1) to the proposed new state (e.g., state L) and before embarking on solving the cryptographic puzzle, a miner may set the values of the transactions root, receipts root, and state root attributes of the new block candidate by computing the hashes of the root nodes of the transactions, transaction receipts, and states tries, respectively. To do so in an efficient manner, data mutability and relative data volume should be considered, as described below.

Since the data contained within the transactions trie and transaction receipts trie do not change once a block is finalized, computing the hashes of the root nodes of these tries follow a similar bottoms-up approach. For example, depending on the blockchain network (e.g., Bitcoin, Ethereum, etc.), computing the hash of the root node of the transaction trie may involve a) encoding, via an encoding algorithm (e.g., RLP or Recursive Length Prefix), the attributes and attribute values of each individual transaction; b) hashing, via a hashing algorithm (e.g., SHA2 SHA-256, SHA3 Keccak-256, etc.), each individually encoded transaction; d) duplicating the last hash in the case of an odd number of transactions; c) proceeding pairwise, hashing together pairs of previously hashed individually encoded transactions to generate hashed nodes within the next higher level of the hash tree; e) moving to the next level of the hash tree and proceeding pairwise again to hash together pairs of previously hashed nodes to generate hashed nodes within the next higher level of the tree; and finally f) proceeding in the same manner until only two previously hashed nodes are available to hash together into the single final hashed node, which is referred to as the root node of the hash tree.

Unlike the transactions and transaction receipts tries which are immutable (i.e., static) once written to the blockchain, the state trie is mutable (i.e., not static) and data contained within the state trie changes dynamically over time as new accounts are created and existing accounts are updated. In addition, the volume of data that is changed within the state trie as it transitions from one state to the next, due to the execution of a set of transactions within a block of the blockchain, is relatively small compared to the total volume of data stored in the state trie. Given these two key differences (i.e., data mutability and relative data volume) between the transaction tries and the state trie, a bottoms-up approach where all the individual account states are encoded, hashed, and rolled up in pair-wise hashes to a root hash is not practicable. Moreover, each account within the state trie has its own dedicated storage trie. An individual account storage trie is referenced from its corresponding account in the state trie via a hash of the account storage root (e.g., storageRoot in Ethereum or Enterprise Ethereum). Given these differences, an approach employing a modified Merkle Patricia Trie (MPT) is typically pursued to manage state and storage tries, where (key, value) bindings are encoded, hashed, and stored in a hierarchical data structure with several important characteristics: a) an encoded data value (i.e., account attribute value within the state trie or storage attribute value within the storage trie) stored within the current state of a modified MPT may be efficiently retrieved (i.e., read) by following the path (i.e., encoded account key or encoded storage key) within the current state of the trie (i.e., state trie or storage trie) under which the encoded data value is stored; b) an encoded data value stored within a past state of a trie may be retrieved by starting at the root of the past state of the trie and following the path within the past state of the trie under which the encoded data value is stored; c) newly encoded keys and data values may be inserted into the next state of the trie; d) existing encoded keys and data values may be deleted from the next state of the trie, while preserving them in the current and past states of the trie; e) existing encoded data values may be updated in the current state of the trie, while preserving them in the current and past states of the trie; and f) the cryptographic fingerprint (e.g., hash of the root node) of the trie may be quickly recomputed after the completion of any of the aforementioned insert, update, or delete operations.

The hybrid storage approach depicted in FIG. 12C, where the AI view is stored on-chain while its references to the prior state and revised state of the hierarchical portfolio are stored off-chain, may represent an economically feasible tradeoff between decentralized and centralized storage models under conditions where blockchain storage costs increase exponentially with storage size, such as for various current public blockchain networks. However, in other embodiments, where blockchain storage costs may be more economical (e.g., vary linearly, rather than exponentially, with storage size), such for various current private blockchain networks or some future public blockchain networks, a pure on-chain storage approach may be adopted, where the data representing the AI view (e.g., AI view 1200), the data representing the prior state of the hierarchical portfolio (e.g., prior portfolio 300), and the data representing the revised state of hierarchical portfolio (e.g., revised portfolio 1206), are all stored on-chain via a decentralized blockchain (e.g., blockchain 1208), rather than a traditional centralized storage mechanism (e.g., storage system 1210). This pure on-chain approach is described below.

Figure 12D:
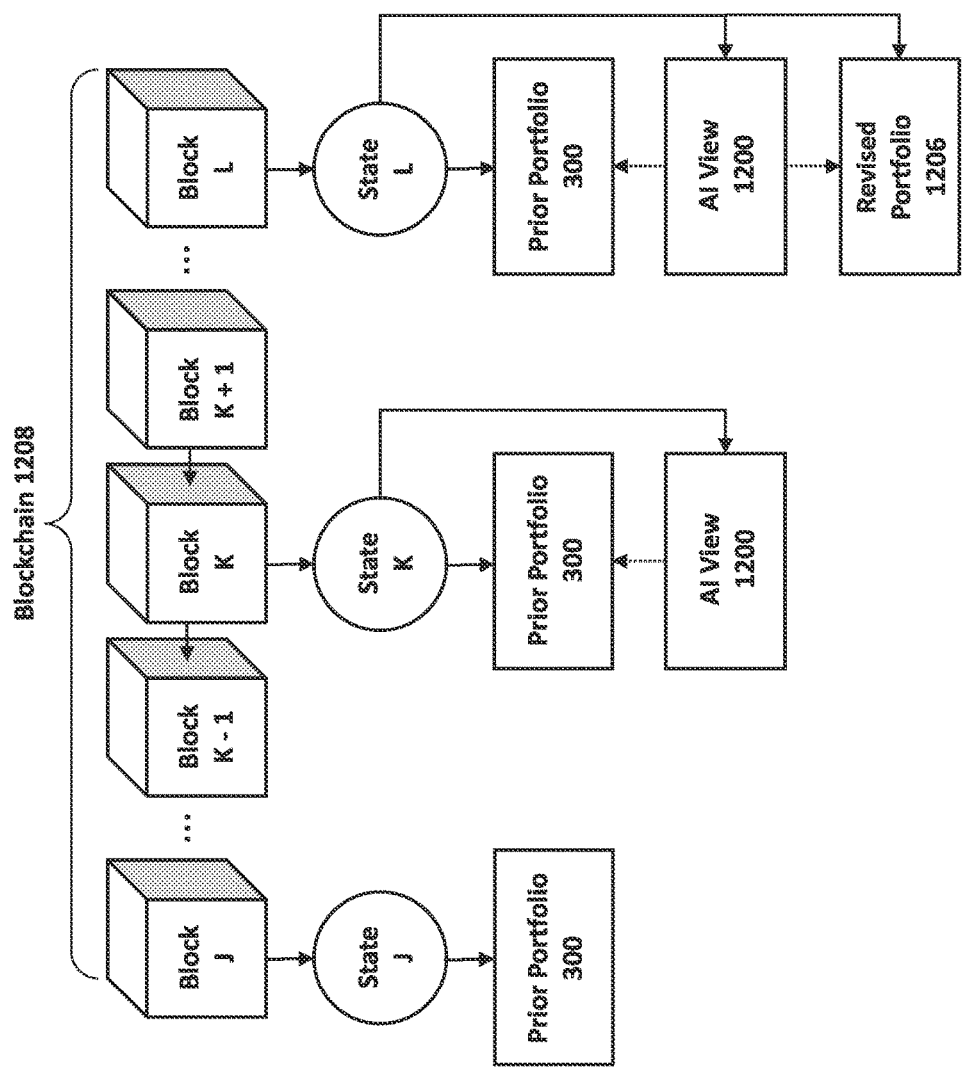
FIG. 12D is a block diagram of an AI view stored on a blockchain with on-chain references to a prior state and a revised state of a hierarchical portfolio of assets according to some embodiments.

FIG. 12D is a block diagram of an AI view 1200 stored within a state trie of a blockchain 1208 with on-chain references to a prior state and a revised state of a hierarchical portfolio of assets according to some embodiments. As illustrated, prior portfolio 300 is stored in encrypted, partially encrypted, or unencrypted form within states J, . . . , K−1, K, K+1, . . . , L corresponding to blocks J, . . . , K−1, K, K+1, . . . , L of blockchain 1208. AI view 1200 is stored in encrypted, partially encrypted, or unencrypted form within states K, K+1, . . . , L corresponding to blocks K, K+1, . . . , L of blockchain 1208. Revised portfolio 1206 is stored in encrypted, partially encrypted, or unencrypted form within state L corresponding to block L of blockchain 1208. AI view 1200 references prior portfolio 300. The reference to prior portfolio 300 is an on-chain reference (i.e., a reference to the prior state of the hierarchical portfolio stored on blockchain 1208). AI view 1200 also references revised portfolio 1206. The reference to revised portfolio 1206 is an on-chain reference (i.e., a reference to the revised state of the hierarchical portfolio stored on blockchain 1208). Since the timeframe between block creation is typically considerably less than the timeframe required to suggest, review, and approve changes to the state of a hierarchical portfolio of assets, blocks J, K, and L within blockchain 1208 may be distinct blocks separated by time, with a number of blocks between blocks J and K and a number of blocks between blocks K and L.

Figure 12E:
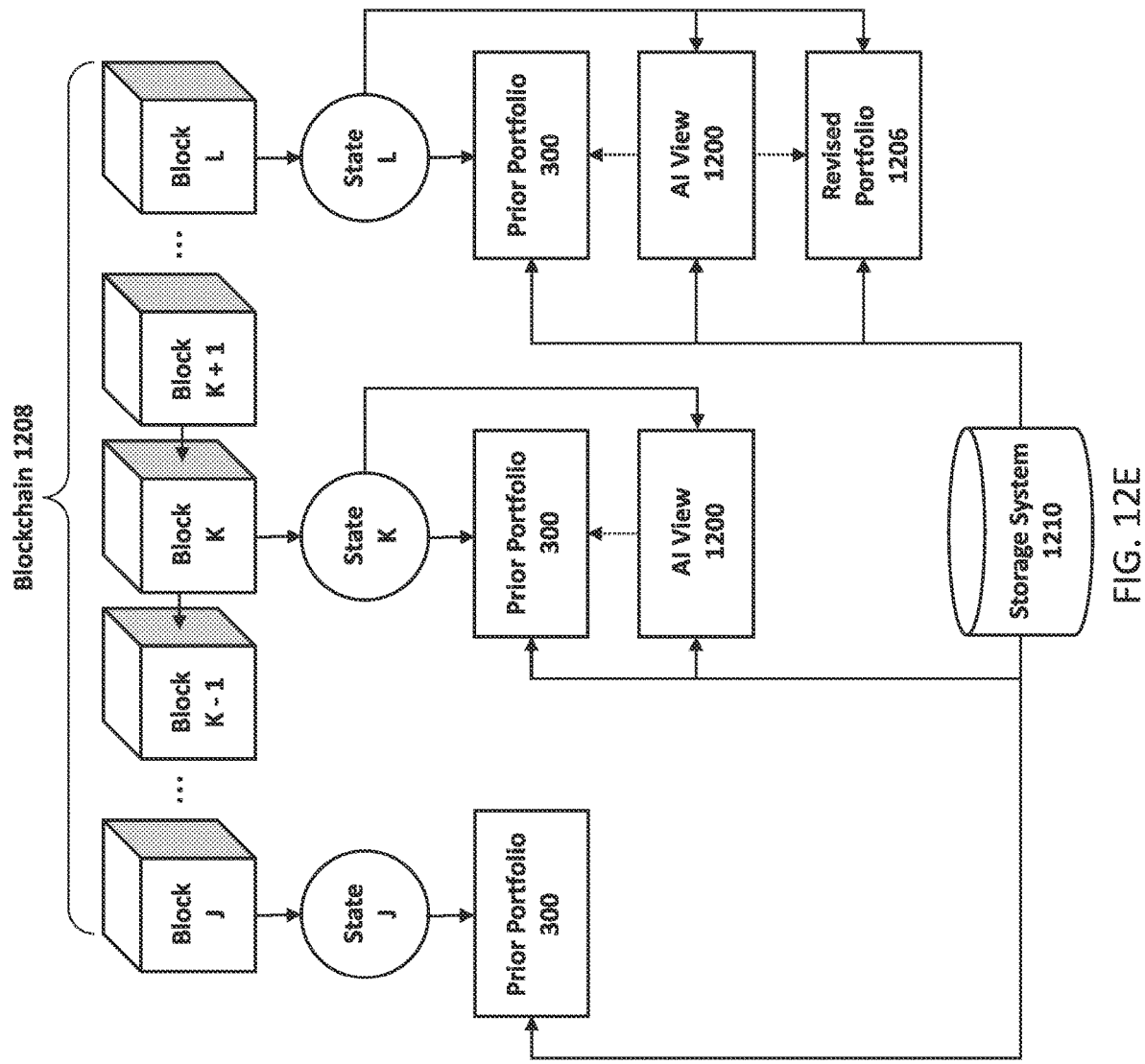
FIG. 12E is a block diagram of an AI view stored on a blockchain and a storage system with both off-chain and on-chain references to a prior state and a revised state of a hierarchical portfolio of assets according to some embodiments.

FIG. 12E is a block diagram of an AI view 1200 stored within a state trie of a blockchain 1208 and a storage system 1210 with both on-chain and off-chain references to a prior state and a revised state of a hierarchical portfolio of assets according to some embodiments. As illustrated, prior portfolio 300 is stored in encrypted, partially encrypted, or unencrypted form within the state trie of blockchain 1208, and it is also securely stored in storage system 1210. AI view 1200 is stored in encrypted, partially encrypted, or unencrypted form within the state trie of blockchain 1208, and it is also securely stored in storage system 1210. Revised portfolio 1206 is stored in encrypted, partially encrypted, or unencrypted form within the state trie of blockchain 1208, and it is also securely stored in storage system 1210. AI view 1200 contains both a first reference and a second reference to prior portfolio 300, where the first reference to prior portfolio 300 is an on-chain reference and the second reference is an off-chain reference. AI view 1200 also contains first and second references to revised portfolio 1206, where the first and second references are on-chain and off-chain references, respectively.

In various embodiments, how an AI view of a hierarchical portfolio (e.g., AI view 1200) is stored by an investment system (e.g., investment system 102) on a blockchain (e.g., blockchain 1208) may depend on the type (e.g., public, private, hybrid, etc.) and unique features (e.g., EOAs, smart contracts, UTXOs, scripts, etc.) of the blockchain itself. In addition, the encryption state (e.g., encrypted, partially encrypted, or unencrypted) of the AI view, the metadata associated with the AI view, and the set of events related to the AI view may also depend on the type and features of the blockchain, as described in detail below.

In an exemplary embodiment, investment system 102 may communicate with one or more full nodes of a blockchain network, via blockchain servers, such as distributed ledger servers 130, that host a complete copy of a blockchain, such as distributed ledger 138 or, more specifically, blockchain 1208. The blockchain 1208 may be a private or public blockchain that supports managing blockchain accounts via a state trie. The accounts may be externally owned accounts (e.g., accounts owned by financial clients, financial advisors, investment systems, miners, validators, oracles, etc.) or smart contract accounts (i.e., accounts containing executable code). The state of each account is stored within the state trie. Blockchain transactions are initiated by externally owned accounts (EOAs), executed and validated by blockchain miners and validators, and ultimately grouped together within a new block that is recorded on the blockchain by the miner who solves a cryptographic puzzle (i.e., winning miner) and, as a result, collects the mining rewards and transaction fees associated with the block.

A transaction comprising a message containing data (e.g. key-value pairs) and value (i.e., cryptocurrency) may be formed (i.e., constructed), signed (by the private key of the sender), serialized (i.e., converted to a byte stream), and sent (i.e. issued) from an EOA account to one or more EOA accounts (e.g., to transfer cryptocurrency, such as Ether or Libra, from a user to another user) or issued from an EOA account to a smart contract (e.g., to execute a stored program). Unlike the address of a contract account (created by hashing the address used to create the contract account with the number of transactions issued by that account) which is not associated with a private key, the address of an EOA account (created by hashing the public key of a public/private key pair generated on behalf of the owner of the EOA account) is associated with a private key. Since transactions represent cryptographically signed messages and only EOA accounts have private keys to sign such messages, it follows that only EOA accounts may initiate transactions, not contract accounts. However, a smart contract activated by an EOA-initiated transaction may call, via internal messages (i.e., unsigned messages between contracts), other smart contracts which may in turn call other smart contracts. Upon the execution of the transactions within the new block of the blockchain, blockchain accounts (i.e., EOA accounts or contract accounts) participating in the transactions may change state, and these state changes are captured and stored, via state variables, within the state trie of the blockchain, as described in more detail below.

To record an AI view, such as AI view 1200, on a private or public blockchain, investment system 102 may deploy (via a contract creation transaction) a smart contract (in the form of bytecode that is executable by the Ethereum virtual machine, or EVM) to a smart contract account stored within the state trie of blockchain 1208. The smart contract may be named RecordViews, and it may contain a number of state variables, one or more functions, and one or more events. The state variables of the RecordViews contract may include, but are not limited to, portfolioID, viewHash, hashingAlgorithm, viewCount, viewContent, viewFormat, viewStatus, dateApproved, dateReleased, dateUpdated, dateFinalized, viewEncrypted, encryptionAlgorithm, encryptedKey, viewSignature, signatureAlgorithm, viewSignator, and transactionSignator. The list of state variables may further include a variable for storing the hash of the immediately preceding AI view, namely priorViewHash. Since, in the this exemplary embodiment, blockchain 1208 may represent a public blockchain network (e.g., Ethereum, Libra, etc.), the aforementioned state variables, independent of how they are declared (e.g., public, internal, private, etc.) within the code of the RecordViews contract, are accessible (via the state trie) to any and all parties participating in the network, which by the definition of a public blockchain may be anyone in the world with a computer and an internet connection, subject to local, state, and national telecommunications laws.

A function within the smart contract may be named addView, and it may contain a number of input arguments, including_portfolioID, _viewHash, _hashingAlgorithm, _viewContent, _viewFormat, _viewStatus, _dateApproved, _dateReleased, _dateUpdated, _dateFinalized, _viewEncrypted, _encryptionAlgorithm, _encryptedKey, _viewSignature, _signatureAlgorithm, _viewSignator, and _priorViewHash. The addView function may perform a number of operations, the most important of which is to store the AI view (e.g., AI view 1200) on blockchain 1208. Upon the declaration of a function, in addition to setting visibility (e.g., public, external, internal, private) and access (e.g., view, pure) attributes, a function modifier may be applied to conditionally alter the execution flow of the function itself. For example, a function modifier may be constructed named onlyOwner that specifies particular condition under which a function is permitted to execute, such as when the sender of the calling message is equal to the owner of the contract. The onlyOwner modifier may then be applied to the addView function of the RecordViews contract, thereby restricting the activation of the addView function to the owner of the RecordViews contract. Such a modifier may be important, especially in the case of a public blockchain, in order to prevent unidentified parties from inadvertently, or purposefully, adding new views to the RecordViews contract.

An event defined within the smart contract may be named ViewAdded, and it may contain a number of input arguments, including portfolioID, viewHash, viewCount, viewFormat, viewStatus, dateFinalized, viewEncrypted, viewSignator, transactionSignator, and priorViewHash. Some of these arguments may be indexed, such as viewHash, viewSignator, and transactionSignator in order to enable efficient search and retrieval of AI views by investment system 102 or other investment systems utilized by financial clients or financial advisors.

Once the smart contract is deployed on blockchain 1208, one or more of its functions may be called, via a transaction, by investment system 102, or any other investment system supporting AI views, on behalf of a user having one or more externally owned accounts on blockchain 1208. For example, to record an AI view, such as AI view 1200, on blockchain 1208 while acting on behalf of a financial client or financial advisor with an account on blockchain 1208, investment system 102 may form a transaction containing transaction parameters and a transaction signature. The transaction parameters may comprise a number of attributes and attribute values, including one or more to addresses, one or more payment amounts, current number of transactions sent by the from account, gas amount, maximum gas price, and data payload. More specifically, investment system 102 may assign one of the one or more to address attributes to the address value of the RecordViews contract. It may further construct a data payload value by a) encoding assigned values for the arguments of the addView function, b) generating an addView function selector by hashing a portion (e.g., method name and argument types) of the application binary interface (ABI) definition of the addView method, and c) concatenating the addView function selector with the encoded argument values of the addView function. In this example where the objective is to store AI view 1200 and its associated metadata together within the state trie of blockchain 1208, the data payload may comprise an encoded attribute value for AI view 1200 (i.e., _viewContent) and encoded attributes for key metadata attributes of AI view 1200, such as the unique identifier of the view (i.e., _viewHash) and its signator (i.e., _viewSignator).

In addition, the data payload may further comprise encoded attribute values for other metadata attributes of AI view 1200, including the unique identifier (i.e., _portfolioID) of the hierarchical portfolio to which AI view 1200 refers, the hashing algorithm (i.e., _hashingAlgorithm) used to hash AI view 1200, the format (i.e., _viewFormat) used to represent AI view 1200, the status (i.e., _viewStatus) of AI view 1200, the key dates (i.e., _dateApproved, _dateReleased, _dateUpdated, _dateFinalized) on which AI view 1200 was approved, released, updated, and finalized, a flag (i.e., _viewEncrypted) indicating whether or not AI view 1200 is encrypted, the encryption algorithm (i.e., _encryptionAlgorithm) and secret symmetric encryption key (i.e., _encryptedKey) used by investment system 102 to encrypt AI view 1200, the digital signature algorithm (i.e., _signatureAlgorithm) used by investment system 102 to generate the digital signature (i.e., _viewSignature) of the hash of AI view 1200 utilizing the private key of the owner of the hierarchical portfolio, and the hash (i.e., _priorViewHash) of the immediately preceding AI view.

Once the data payload has been created and assigned to the data payload attribute of the transaction and the other transaction parameters have been specified, investment system 102 may then encode the transaction parameters via an encoding algorithm (e.g., RLP), hash the encoded transaction parameters via a hashing algorithm (e.g., SHA3 Keccak-256), sign the resulting hash value with the private key (of the public/private key pair) of the financial client or the private key of the financial advisor via a digital signature algorithm (e.g., ECDSA secp256k1), and serialize the resulting digital signature components (e.g., v, r, and s) with the encoded transaction parameters. With the transaction formed, encoded, signed, and serialized, investment system 102 may utilize the blockchain account address of the financial client or financial advisor to submit the transaction, including its data payload (i.e., encoded AI view 1200 and encoded metadata associated with the AI view 1200), to a node hosting blockchain 1208 for processing (i.e., mining and validation) by the blockchain network. To be considered a valid transaction, the private key used to sign the transaction must pair with the public key that generated (via a series of hashing steps) the account address used to submit the transaction. For example, if investment system 102 submits a transaction to the blockchain network from a blockchain address of the financial advisor, then the transaction must be signed using the private key of the financial advisor that pairs with public key that generated the blockchain address used to send the transaction. Similarly, if the system submits a transaction from an address of the financial client, then the transaction must be signed with the private key of the financial client that pairs with public key that generated the address used to send the transaction.

Over time, as a number of AI views of a particular hierarchical portfolio are recorded on the blockchain, a financial client or advisor may utilize investment system 102, or other investment system, to query blockchain 1208 in order to retrieve one or more AI views of the hierarchical portfolio of interest. In the case where blockchain 1208 supports a state trie, investment system 102, operating on behalf of a financial client or a financial advisor authorized by the financial client, may query a full node hosting blockchain 1208 using the account address of the smart contract storing the AI views of the hierarchical portfolio of interest. Moreover, when the lineage of AI views associated with the hierarchical portfolio of interest spans many years, decades, or even centuries in cases involving multigenerational families, investment system 102 may be required to query a full archive node (i.e., a node within the blockchain network that stores all blocks, transactions, transaction receipts, events, and state trie history from the genesis block onward) hosting blockchain 1208, rather full node, in order to retrieve the complete set of historical AI views associated with longstanding hierarchical portfolios. In such long duration cases, investment system 102 may be further required to query a number of different blockchain contracts (e.g., a plurality of contracts within the same blockchain managing the state of a particular hierarchical portfolio at different non-overlapping time periods), a number of different blockchains (e.g., a plurality of blockchains managing the state of a particular hierarchical portfolio at different non-overlapping time periods), or a number of different blockchains and a number of different blockchain contracts.

For example, in the case where an AI view of a hierarchical portfolio, such as AI view 1200, references a prior version of the hierarchical portfolio, such as prior portfolio 300, and a revised version of the hierarchical portfolio, such as revised portfolio 1206, investment system 102 may retrieve AI view 1200 from blockchain 1208 by first looking up within a securely stored key rack (e.g., a private matrix that organizes the hierarchical portfolios owned by a financial client over time, and includes hierarchical portfolio names, identifiers, private keys, blockchain names, and contract addresses) of the financial client the unique hierarchical portfolio identifier shared by prior portfolio 300 and revised portfolio 1206, namely portfolioID. It is to be noted that because portfolios 300 and 1206 originated from the same genesis portfolio, they represent different revisions of the same hierarchical portfolio within a lineage of descendent revised portfolios; therefore, they share the same portfolio identifier (e.g., the hash of the genesis portfolio). Next, with the unique portfolioID of the hierarchical portfolio of interest determined, investment system 102 may utilize the portfolioID to lookup, via the key rack, the contract address that stores the RecordViews smart contract responsible for autonomously managing the storage and retrieval of AI views associated with the hierarchical portfolio identified by portfolioID. Once the RecordViews contract address has been obtained from the key rack, investment system 102 may query a full node, or if necessary a full archive node, of blockchain 1208 and retrieve AI view 1200 with references to prior portfolio 300 and revised portfolio 1206, as described in more detail below.

In order to access an AI view, such as AI view 1200, stored at some point in the past on a public or private blockchain, such as blockchain 1208, supporting a state trie, an investment system, such as investment system 102, may examine the event history of all AI views associated with a particular hierarchical portfolio of interest and then utilize a portion of the event history to identify the block, such as block K, within the blockchain containing a specific attribute value (i.e., the state root attribute value) required to extract the AI view stored at some point in the past on the blockchain. For example, a smart contract, such as the RecordViews contract, may be deployed at a specific address on blockchain 1208. The RecordViews contract may be responsible for storing all of the AI views associated with the hierarchical portfolio of interest. The key rack of the financial client who owns the hierarchical portfolio of interest may be utilized, by investment system 102, to lookup the address of the RecordViews contract given the name or unique identifier (e.g., portfolioID) of the hierarchical portfolio of interest. Next, with the address of the RecordViews contract and its associated application binary interface (ABI), investment system 102 may communicate with a full node or, if necessary, a full archive node hosting blockchain 1208 to create an instance of the RecordViews contract stored at the RecordViews address.

Once the RecordViews instance is obtained, investment system 102 may access its addView event and form a query containing a number of arguments related to retrieving a set of specific events emitted by the RecordViews contract over a period of time. The query arguments related to the addViews event may include viewHash, viewSignator, transactionSignator, transactionHash, blockHash, blockNumber, fromBlock, and toBlock. The first three of these arguments represent indexed addViews event arguments, while the latter five arguments represent indexed transaction and block attributes. For example, in order to retrieve the ViewAdded event emitted in the past by the addView function of the RecordViews contract upon the recording of AI view 1200 to blockchain 1208, investment system 102 may form a query that sets the value of the viewHash argument to the hash of AI view 1200 and further sets the value of the fromBlock argument to 0 (i.e. the genesis block of blockchain 1208) and the toBlock argument to the current block, where the hash of AI view 1200 (i.e., the value of the viewHash argument) may be obtained by investment system 102 from a more recent AI view (i.e., immediate descendant of AI view 1200) containing a reference to the immediately preceding AI view (i.e., AI view 1200), the reference comprising the hash of the immediately preceding AI view (i.e., the hash of AI view 1200).

With the argument values set, investment system 102 may then issue a watch command to the full node of blockchain 1208 and wait for the full node to scan the event logs stored within the transaction receipts trie of blockchain 1208 from the genesis block to the current block in order to identify and return the specific event logs that a) are associated with the addView event of the RecordViews contract and b) match the value (i.e., hash of AI view 1200) of the viewHash argument specified in query. In this case, since the hash of AI view 1200 is unique and because in the course of normal operations each AI view and its associated hash are stored only once in the RecordViews account within the state trie of blockchain 1208, investment system 102 should receive only a single response from the full node, namely the single event log generated by the ViewAdded event when emitted by the addView function of the RecordViews contract upon successful execution of the transaction containing the data payload comprising the encoded information (i.e., addView function selector and encoded argument values of the addView function) required to add AI view 1200 to the storage trie (i.e., dedicated storage trie for an account within the state trie) associated with RecordViews account stored within the state trie of blockchain 1208.

From this event log, investment system 102 may extract the BlockNumber associated with the ViewAdded event for AI view 1200. Then from the blockNumber, investment system 102 may query the full node for the associated block header. With the block header, investment system 102 may extract the stateRoot. With the stateRoot, investment system 102 may instruct the full node to query the state trie starting from the stateRoot to determine the storage state of the RecordViews account. From the storage state, investment system 102 may extract, decode (i.e., transform from a byte stream to a character stream), deserialize (i.e., transform from a character stream to an internal object representation), and return the state variable, viewContent, containing AI view 1200.

It is to be understood, in this example, that the state variable viewContent retrieved from the RecordViews smart contract account represents a particular AI view, namely AI view 1200, of a hierarchical portfolio of interest, namely the hierarchical portfolio identified by portfolioID, stored at some point in the past on a public or private blockchain supporting a state trie, namely blockchain 1208, by an investment system, namely investment system 102. Moreover, it is to be further understood that this process, which may be invoked at any point in time, enables an investment system (e.g., investment system 102 or another investment system supporting AI views and storage via blockchain state tries) working in conjunction with a full node or full archive node hosting a public or private blockchain supporting a state trie (e.g., blockchain 1208 or another blockchain supporting a state trie) to a) efficiently scan the full length (i.e., complete history) of the blockchain by forming and executing queries based on indexed event attributes (e.g., viewHash, viewSignator, transactionSignator) and indexed transaction and block attributes (e.g., transactionHash, blockHash, blockNumber, fromBlock, and toBlock), b) retrieve specific logs of events (e.g., ViewAdded event) emitted by functions (e.g., addView function) of a smart contract (e.g., RecordViews contract), c) identify block header information (e.g., stateRoot) associated with a past state of a contract account (e.g., RecordViews account), and d) extract and decode state variables (e.g., viewContent, viewHash, viewSignator, transactionSignator, portfolioID, priorViewHash, etc.) stored within the storage trie associated with the past state of the contract account, where the state variables represent an AI view (e.g., AI view 1200) in encrypted, partially encrypted, or unencrypted form and its associated metadata recorded on the blockchain by a contract function (e.g., addView function) at some point in the past.

While the process to retrieve an AI view of a hierarchical portfolio recorded in encrypted, partially encrypted, or unencrypted form sometime in the past within the state trie of a blockchain requires several steps as stated above, the process to retrieve the current (i.e., most recent) encrypted, partially encrypted, or unencrypted AI view of a hierarchical portfolio is more straightforward. For example, to retrieve the current (encrypted, partially encrypted, or unencrypted) AI view of a particular hierarchical portfolio identified by a unique portfolio identifier (e.g., portfolioID) with its AI views recorded by a contract (e.g., RecordViews contract) deployed at a known contract address (e.g., RecordViews address) of a public or private blockchain supporting a state trie, such as blockchain 1208, an investment system, such as investment system 102, may communicate with a full node of the blockchain network hosting blockchain 1208 to create an instance (e.g., RecordViews instance) of the contract stored at the contract account address. Once the instance of the contract is obtained, investment system 102 may simply access its state variables directly, including the specific state variable (e.g., viewContent) that represents (an encoded version of) the current (encrypted, partially encrypted, or unencrypted) AI view of the hierarchical portfolio.

In other embodiments, an AI view may be recorded on a public or private blockchain that does not support a state trie to manage accounts (e.g., user accounts, smart contract accounts, etc.). In such cases, since a state trie is not available to store the AI view, investment system 102 may instead store the AI view within a transaction of a block of the blockchain. For example, to record an AI view, such as AI view 1200, on a public blockchain not supporting a state trie, such as a Bitcoin blockchain, investment system 102 may first serialize the AI view (i.e., convert from a text format into a byte stream), then segment AI view into a number of small data blocks (e.g., 520 bytes or less), and finally insert the data blocks into one or more transaction input scripts corresponding to one or more pay-to-script-hash (P2SH) output scripts of one or more prior transactions, as described in more detail below.

To employ this method of storing an AI view (e.g., AI view 1200) on a Bitcoin blockchain, investment system 102 may create a first transaction, called Transaction 1, associated with a particular redeem script (i.e., a Bitcoin script that redeems Bitcoin cryptocurrency, or BTC, based on one or more valid signatures) and generated from an encoded hash (i.e., Base58-encoded RIPEMD hash of a SHA-256 hash) of the redeem script itself. The source of funds (i.e., BTC) for Transaction 1 may originate from unspent transaction outputs (UTXOs) belonging to a standard Bitcoin address. The standard address, called Address 0, may be generated from an encoded hash (i.e., Base58-encoded RIPEMD hash of a SHA-256 hash) of a public key of an ECDSA-generated public/private key pair owned by the financial client. Address 0 may be further associated with a particular hierarchical portfolio owned by the financial client, called Portfolio 1.

In the simplest case, where the serialized AI view itself is small (e.g., less than 1,500 bytes), investment system 102 may partition the serialized AI view into three distinct data blocks, Data Block 1, Data Block 2, and Data Block 3, represented by Bitcoin script variables DataBlock1, DataBlock2, and DataBlock3, respectively. Next, investment system 102 may create a redeem script, called Redeem Script 1, with the following form:

OP_HASH160<HashDataBlock3> OP_EQUALVERIFY OP_HASH160<HashDataBlock2> OP_EQUALVERIFY OP_HASH160<HashDataBlock1> OP_EQUALVERIFY<PublicKey> OP_CHECKSIG Redeem Script 1 includes Bitcoin operation codes that perform specific stack operations (e.g., hashing, verifying, signature checking, etc.). For example, OP_HASH160 is an operation code that pulls (i.e., pops) a value from the stack, hashes the value, and then places (i.e. pushes) the hashed value back on the stack.<HashDataBlock3> is an operation that places the Hash of Data Block 3 onto the top of the stack. OP_EQUALVERIFY is an operation code that pulls the top two values from the stack, checks for equality, permits the execution of the script to proceed if the values are the same, and terminates the script execution otherwise.

Redeem Script 1 also includes Bitcoin script variables that contain various data elements. For example, HashDataBlock1 is a script variable that contains the hash of the first distinct data block (i.e., DataBlock1) associated with the AI view, and PublicKey is a script variable that contains the public key owned by the financial client and associated with Portfolio 1.

After creating Redeem Script 1, investment system 102 may hash Redeem Script 1 (i.e., RIPEMD hash of a SHA-256 hash of Redeem Script 1 in serialized form) and include the hash value within a locking or output script (i.e., scriptPubKey) of Transaction 1, called Output Script 1. Output Script 1 of Transaction 1 may have the following form:

OP_HASH160<HashRedeemScript> OP_EQUAL

Like Redeem Script 1, Output Script 1 includes Bitcoin operation codes and script variables. For example, HashRedeemScript is a script variable that contains the hash of Redeem Script 1. After creating Output Script 1 for Transaction 1, investment system 102 may further assign a small amount of BTC denominated in satoshis ($1/100,000,000^{th}$ of a BTC) to the amount parameter (i.e., Value: number of satoshis) associated with the first output, identified by an output index parameter of zero (i.e., Index: 0), of Transaction 1. With Transaction 1 fully specified, investment system 102 may digitally sign the transaction using the private key of the public/private key pair owned by the financial client and associated with Portfolio 1, whereupon it may then serialize and submit the transaction to the Bitcoin network for validation and processing.

Upon successful validation and execution of Transaction 1 and inclusion in the latest block of the public Bitcoin blockchain network, investment system 102 may create a second transaction, called Transaction 2, that stores the AI view within an input script of Transaction 2 and further claims and spends the small amount of BTC specified by Output Script 1 of Transaction 1. In order to claim the BTC and store the AI view, the unlocking or input script of Transaction 2 must cryptographically solve Output Script 1 of Transaction 1. Given this, investment system 102 may create an input script (i.e., scriptSig) for Transaction 2, called Input Script 1. Input Script 1 of Transaction 2 may have the following form:

<DataPayload> <RedeemScript>

Input Script 1 comprises Bitcoin script variables, including a RedeemScript variable representing Redeem Script 1 in serialized form and a DataPayload variable containing individual data blocks (i.e., DataBlock1, DataBlock2, and DataBlock3) interspersed with operation codes (e.g., OP_PUSHDATA) necessary to add the data blocks to the stack, where the data blocks collectively represent the AI view in serialized form.

The sequence of the data blocks in the DataPayload must directly correspond to their hashed values (i.e., HashDataBlock1, HashDataBlock2, and HashDataBlock3) contained in Redeem Script 1 accounting for various first-in, last-out (FILO) stack operations utilized within the scripts (e.g., redeem, output, and input scripts). For example, in the case where Redeem Script 1 orders the hash values of the data blocks in descending order (i.e., HashDataBlock3, HashDataBlock2, and HashDataBlock1), the DataPayload must order the data blocks in ascending order (i.e., DataBlock1, DataBlock2, and DataBlock3). Given this, investment system 102 may create a DataPayload with the following form:

<Sig> <DataBlock1> <DataBlock2> <DataBlock3>

The DataPayload contains Bitcoin script variables, including three data block variables (e.g., DataBlock1, Data- Block1, DataBlock3) and a signature variable. The data block variables represent portions of the AI view in serialized form and the signature variable represents the digital signature of a hash of Transaction 1 signed by the private key, owned by the financial client, associated with Portfolio 1. In order to satisfy the unlocking conditions specified by Output Script 1 of Transaction 1, the value of the signature variable must correspond to the value of the PublicKey variable specified in Redeem Script 1.

With the DataPayload formed, investment system 102 may then finalize Input Script 1 for Transaction 2 by combining the DataPayload for Transaction 2 with Redeem Script 1 for Transaction 1. Next, investment system 102 may create a first output (i.e., Output Index: 0), for Transaction 2, where the first output may contain a standard P2PKH (pay-to-public-key-hash) locking script with the following form:

OP_DUP                      OP_HASH160<PublicKeyHash> OP_EQUALVERIFY OP_CHECKSIG The P2PKH script contains Bitcoin operation codes and script variables, including a PublicKeyHash variable. In order to ensure that only the private key associated with the Bitcoin address owned by the financial client and associated with Portfolio 1, namely Address 0, may be utilized to generate a signature that satisfies the unlocking conditions specified by the P2PKH of the first output of Transaction 2, investment system 102 may assign the value of the PublicKeyHash variable to the to the hash (i.e., Hash160) of the public key used to generate Address 0. Investment system 102 may further assign the amount parameter of the first output of Transaction 2 to a sufficient amount of BTC required to cover the transaction fees and storage costs associated with recording the AI view (e.g., AI view 1200) within Input Script 1 of Transaction 2. With Transaction 2 fully specified, investment system 102 may then digitally sign (using the private key of the public/private key pair of the financial client associated Portfolio 1) and submit the transaction to the Bitcoin network for processing, validation, and mining (i.e., adding new transactions and blocks to the blockchain).

During the execution of Transaction 2 by nodes of the Bitcoin blockchain network, the value of the RedeemScript variable (i.e., the serialized value of Redeem Script 1) provided as part of Input Script 1 of Transaction 2 is joined with Output Script 1 of Transaction 1 and processed as follows:

<RedeemScript>    OP_HASH160<HashRedeemScript> OP_EQUAL

First, the value of the RedeemScript variable is placed on the stack. Second, the RedeemScript value is removed from stack, hashed, and placed back on the stack. Third, the value of the HashRedeemScript variable provided as part of Output Script 1 of Transaction 1 is placed on the stack. Fourth, the top two values are removed from the stack and compared.

If the two values are equal, then Input Script 1 of Transaction 2 (i.e., the combination of the DataPayload and Redeem Script 1) is processed as follows:

<Sig> <DataBlock1> <DataBlock2> <DataBlock3> OP_HASH160<HashDataBlock3> OP_EQUALVERIFY OP_HASH160<HashDataBlock2> OP_EQUALVERIFY
    OP_HASH160<HashDataBlock1> OP_EQUALVERIFY<PublicKey> OP_CHECKSIG First, the values of the DataPayload variables Sig, DataBlock1, DataBlock2, DataBlock3 are placed on the stack one at a time. Second, the topmost value (i.e., DataBlock3) is removed from the stack and hashed and placed back on the stack. Third, the value of the HashDataBlock3 variable provided in Redeem Script 1 is placed on the stack. Fourth, the top two values are removed from the stack and compared. If the two values are equal, then execution continues and the value of each remaining data block variable (i.e., DataBlock2 and DataBlock1) provided in the DataPayload is hashed and checked against its corresponding value (i.e., HashDataBlock2 and HashDataBlock1) provided in Redeem Script 1.

When all three data blocks have been successfully verified, execution proceeds to the final steps where the value of the PublicKey variable provided in Redeem Script 1 is placed on the stack, and then the top two values are removed from the stack (i.e., Sig and PublicKey) and a final operation (i.e., OP_CHECKSIG) is performed to check that the digital signature of the hash of Transaction 1 (i.e., the value of the Sig variable provided by Input Script 1) corresponds to the public key of the public/private key pair of the financial client associated with Portfolio 1 (i.e., the PublicKey variable provided by Redeem Script 1). If this last step is successful (i.e., returns true), then Transaction 2 is valid and may be subsequently added to the list of tractions to be included in a new block within the public Bitcoin blockchain. Upon the successful addition of a new block containing Transaction 2 to the Bitcoin blockchain, the AI view is permanently and immutably recorded thereon. It is to be understood, in this example, that the AI view may be recorded on the Bitcoin blockchain in encrypted, partially encrypted, or unencrypted form.

In addition to storing an AI view (e.g., AI view 1200) in encrypted, partially encrypted, or unencrypted form within an output script (e.g., Output Script 1) of a transaction (e.g., Transaction 2) contained in a block of the public Bitcoin blockchain, investment system 102 may further include a small amount of metadata about the encrypted, partially encrypted, or unencrypted AI view within the transaction using an operation code (e.g., OP_RETURN, OP_CHECKSIG, OP_CHECKMULTISIG). For example, investment system 102 may further include a standard Bitcoin OP_RETURN script as a second output script, called Output Script 2, within Transaction 2 with the following form:

OP_RETURN<MetaData>

Output Script 2 contains a single script variable, MetaData, which enables a small amount of metadata to be stored within Transaction 2 without burning (i.e., destroying) trace amounts of BTC, called dust values. Since Output Script 2 is a standard OP_RETURN script, it creates an output that can never be spent (i.e., an output that does not generate a UTXO), thus relieving miners of the burden of keeping track of such outputs. However, because each transaction may only contain a single OP_RETURN script and due to byte-length constraints (e.g., 80 bytes) on the data payload variable (i.e., MetaData) of the script, the metadata about the AI view may be limited to only one or two important attributes (e.g., primary key attributes) associated with the AI view. For example, the MetaData variable included within Output Script 2 of Transaction 2 may represent the value of the hash of the AI view, an important primary-key metadata attribute of the AI view which may be useful to an investment system (e.g., investment system 102) for identifying and extracting the AI view from the blockchain.

It is to be understood that as a result of this process, an AI view (e.g., AI view 1200) of a hierarchical portfolio (e.g., Portfolio 1) is recorded as a set of individual data blocks (e.g., DataBlock1, DataBlock2, DataBlock3) within the data parameter (e.g., DataPayload) of a first input script (e.g., Input Script 1) and a hash of the AI view of the hierarchical portfolio is recorded as metadata value within the data parameter (e.g., MetaData) of a second input script (e.g., Input Script 2), where both the first and second input scripts are included within a transaction (e.g., Transaction 2) contained within a set of transactions immutably stored in a block of a public blockchain (e.g., Bitcoin blockchain). In more complex cases, where the serialized AI view is not small (e.g., greater than 1,500 bytes), several outputs scripts (e.g., Output Script 1, 2, 3, etc.) may be included within a first transaction (e.g., Transaction 1) and several corresponding input scripts (e.g., Input Script 1, 2, 3, etc.) may be included within a single second transaction (e.g., Transaction 2) or spread across multiple transactions (e.g., Transaction 2, Transaction 3, Transaction 4, etc.), where each input script corresponds to a distinct redeem script (e.g., Redeem Script 1, 2, 3, etc.). While the example above describes the process of recording an AI view within a transaction of a public blockchain (e.g., Bitcoin blockchain) that does not support a state trie for managing accounts, the approach may be similarly applied to private blockchain not supporting a state trie, assuming the private blockchain supports storing data payloads within transactions.

As described in this subsection of the detailed description, a key capability of the present technology is to enable a view of a hierarchical portfolio to be recorded on a blockchain, wherein the view may be an AI view, the hierarchical portfolio may be a hierarchical portfolio of assets, the hierarchical portfolio may be owned by a financial client or a multigenerational family, and the blockchain may be a public, private, or hybrid blockchain. A fundamental advantage of the present technology associated with this key capability is the ability for one or more financial firms to establish and maintain over time, via an intelligent investment system such as intelligent investment system 102, a personal financial record for a financial client who owns one or more hierarchical portfolios or a multigenerational financial record for a multigenerational family that owns one or more hierarchical portfolios, as described in more detail below.

Portable Personal and Multigenerational Financial Records

Figure 13:
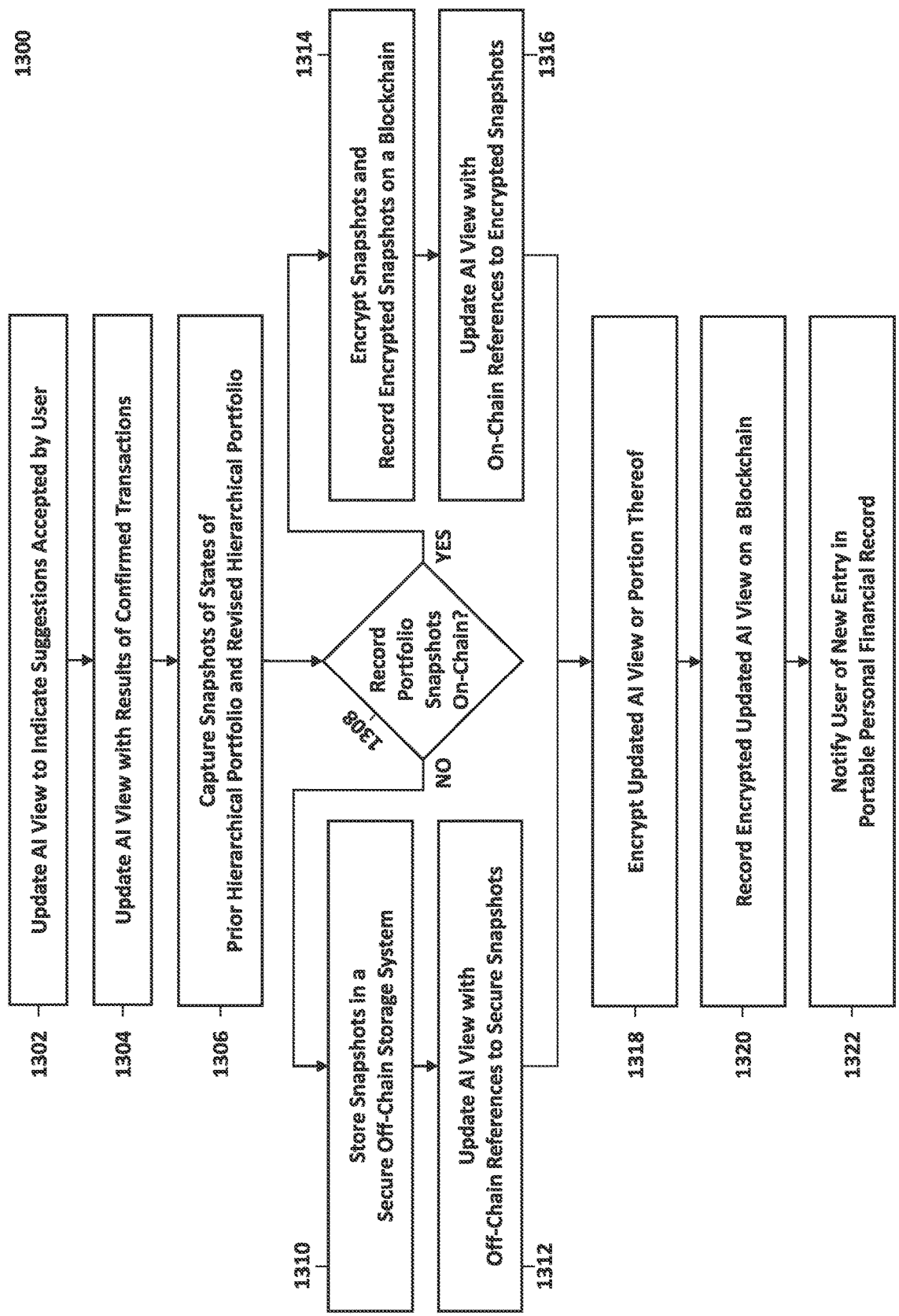
FIG. 13 is a flowchart of an example method for updating an AI view with off-chain or on-chain references to states of a hierarchical portfolio, encrypting the updated AI view, and recording the encrypted updated AI view on a blockchain according to an exemplary embodiment.

FIG. 13 is a flowchart of an example method 1300 for updating an AI view with off-chain or on-chain references to states of a hierarchical portfolio owned by a user (e.g., financial client or multigenerational family), encrypting the updated AI view, and recording the encrypted updated AI view on a distributed ledger (e.g., distributed ledger 138) in the form of a blockchain (e.g., blockchain 1208) according to an exemplary embodiment. The user may be an individual financial client (e.g., individual investor or institutional investor) or a multigenerational family (e.g., a family comprising living or deceased family members related to one another through bloodline or by law spanning multiple generations over time), wherein the multigenerational family is represented at any moment in time by one or more family members or one or more agents designated or appointed to act on behalf of the multigenerational family in the capacity of a financial client. The method 1300 may be invoked, by intelligent investment system 102, after receiving a set of accepted suggestions from a client device or a set of confirmed transactions from an electronic trading platform per example method 900. As shown in this example, method 1300 may include operations comprising: updating an AI view to indicate which suggestions contained within the AI view have been accepted by the user 1302, updating an AI view with the results of confirmed transactions 1304, capturing portfolio snapshots of the states of the prior revision of the hierarchical portfolio and the revised revision of the hierarchical portfolio 1306, determining whether to store the portfolio snapshots off-chain or record the portfolio snapshots on-chain 1308, storing the portfolio snapshots in a secure off-chain storage system 1310, updating the AI view with off-chain references to the portfolio snapshots 1312, encrypting and recording the portfolio snapshots on a blockchain 1314, updating the AI view with on-chain references to the encrypted portfolio snapshots 1316, encrypting the updated AI view or portions thereof 1318, recording the encrypted updated AI view on a blockchain 1320, and notifying the user of a new entry in their portable personal financial record 1322.

In an embodiment, at block 1302, intelligent investment system 102 may update an AI view previously assembled via exemplary methods 500 or 600 to indicate which suggestions contained within the AI view have been accepted by the user. For example, after reviewing one or more suggestions included in an AI view (e.g., AI view 1200), the user may accept a suggestion (e.g., AI Suggestion 2) contained within the AI view, and investment system 102 may subsequently update the acceptance attribute (e.g., Suggestion Acceptance) of the AI suggestion within the AI view with the corresponding acceptance value (e.g., YES) accordingly.

At block 1304, in an embodiment, intelligent investment system 102 may further update the AI view with the results of confirmed transactions. For example, after the execution and confirmation, by an electronic trading platform, of a recommended transaction (e.g., the recommended transaction of Transaction 1) associated with a suggestion (e.g., AI Suggestion 2) contained within the AI view, investment system 102 may update the executed transaction attribute (e.g., Executed Transaction) and transaction date attribute (e.g., Transaction Date) of the recommended transaction associated with the AI suggestion within the AI view with the corresponding executed transaction value (e.g., Sold 50 Shares of Stock C and $200 per share) and transaction date value (e.g., Oct. 29, 2018) accordingly.

At block 1306, in an embodiment, intelligent investment system 102 may capture a snapshot of the state of the prior hierarchical portfolio (i.e., the prior revision of the hierarchical portfolio, such as prior portfolio 300) and a snapshot of the state of the revised hierarchical portfolio (i.e., the revised revision of the hierarchical portfolio, such as revised portfolio 1206). For example, when the user submits a request for advice, investment system 102 may capture a snapshot of the state of the prior hierarchical portfolio (e.g., hierarchical portfolio 300) contained or referenced within the data (i.e. request content) accompanying the request. In addition, when investment system 102 generates a revised hierarchical portfolio (e.g., revised hierarchical portfolio 1206), it may capture a snapshot of the state of the revised hierarchical portfolio. Furthermore, prior to capturing the snapshots of the hierarchical portfolio and the revised hierarchical portfolio, investment system 102 may further enrich the portfolios with the latest market data.

In an embodiment, at decision block 1308, it may be determined, based on configuration settings within the application management service 220, that intelligent investment system 102 is configured to store the snapshots of the states of the prior hierarchical portfolio and the revised hierarchical portfolio in a secure off-chain storage system. In this case (i.e., NO branch), example method 1300 proceeds to block 1310. Conversely, at decision block 1308, it may be determined that investment system 102 is configured to record the portfolio snapshots on a distributed ledger in the form of a blockchain, such as blockchain 1208. In this case (i.e., YES branch), example method 1300 proceeds to block 1314.

At block 1310, in an embodiment, intelligent investment system 102 may store the portfolio snapshots captured in block 1306 in a secure off-chain storage system. For example, after capturing snapshots of the states of the prior hierarchical portfolio and the revised hierarchical portfolio, investment system 102 may store each portfolio snapshot in a secure off-chain storage system (e.g., storage system 1210).

At block 1312, in an embodiment, intelligent investment system 102 may further update the AI view with off-chain references to the portfolio snapshots stored in the secure storage system in block 1310. For example, after storing snapshots of the states of the prior hierarchical portfolio and the revised hierarchical portfolio in a secure off-chain storage system, investment system 102 may update the prior hierarchical portfolio reference attribute (e.g., Prior Portfolio) of the AI view with the corresponding off-chain reference value (e.g., https://cyclefund.com/firm-a/client-a/portfolio-1-rev-a) accordingly, and it may update the revised hierarchical portfolio reference attribute (e.g., Revised Portfolio) of the AI view with the corresponding off-chain reference value (e.g., https://cyclefund.com/firm-a/client-a/portfolio-1-rev-b) accordingly.

At block 1314, in an embodiment, intelligent investment system 102 may encrypt and record the portfolio snapshots captured in block 1306 on a blockchain. For example, after capturing snapshots of the states of the prior hierarchical portfolio and the revised hierarchical portfolio, investment system 102 may fully or partially encrypt the snapshot of the state of the prior hierarchical portfolio, fully or partially encrypt the snapshot of the state of the revised hierarchical portfolio, and subsequently record each fully or partially encrypted portfolio snapshot on a blockchain, by utilizing the techniques, previously described, to record an AI view on a blockchain.

At block 1316, in an embodiment, intelligent investment system 102 may further update the AI view with an on-chain references to the encrypted portfolio snapshots recorded on the blockchain in block 1314. For example, after recording fully or partially encrypted snapshots of the states of the prior hierarchical portfolio and the revised hierarchical portfolio on a blockchain, investment system 102 may update the prior hierarchical portfolio reference attribute and the revised hierarchical portfolio reference attribute of the AI view with the corresponding on-chain reference values accordingly.

At block 1318, in an embodiment, intelligent investment system 102 may encrypt the updated AI view, or portions thereof, using a hybrid encryption approach employing an asymmetric encryption algorithm (e.g., ECC (Elliptic Curve Cryptography), RSA (Rivest, Shamir, and Adleman), or Diffie-Hellman), a symmetric encryption algorithm (e.g., AES (Advanced Encryption Standard), which replaced DES), and a cryptographically secure pseudo-random number generator (CSPRNG). For example, after updating the AI view to include a) indications of accepted suggestions, b) results from confirmed transactions, and c) off-chain or on-chain references to snapshots of the states of the prior hierarchical portfolio and the revised hierarchical portfolio, investment system 102 may perform operations to encrypt the updated AI view using the following hybrid encryption approach: 1) generate a secret key of sufficiently secure length (e.g., 256-bit) via the CSPRNG and a non-deterministic seed value; 2) fully or partially encrypt the updated AI view via a symmetric encryption algorithm (e.g., AES-256) based on the secret key from the CSPRNG; 3) encrypt the secret key itself using the public key of the user previously generated with sufficiently secure length (e.g., 3072-bit, 4096-bit, etc. for RSA) via an asymmetric encryption algorithm known for its ability encrypt a small-block message (e.g., a secret key) with a public key (or private key) and decrypt the message with the corresponding private key (or public key), such as RSA rather than ECC.

At block 1320, in an embodiment, intelligent investment system 102 may record the (symmetrically) encrypted updated AI view on a blockchain, including the corresponding (asymmetrically) encrypted secret key used to encrypt the updated AI view. For example, after encrypting the updated AI view, or portions thereof, via AES and encrypting the secret key via RSA, investment system 102 may record the encrypted updated AI view, including its encrypted secret key, on a blockchain. Recording the encrypted updated AI view together with its encrypted secret key on the blockchain enables the user to access the updated AI view from the blockchain at a later time. For example, by using investment system 102, the user may extract the encrypted updated AI view and its encrypted secret key from the blockchain, decrypt the encrypted secret key with the user's private key, and then decrypt the encrypted updated AI view using the secret key in order to access the updated AI view.

At block 1322, in an embodiment, intelligent investment system 102 may notify the user that a new entry has been made in their portable personal financial record (PFR). For example, after recording a fully or partially encrypted updated AI view on a blockchain, investment system 102 may notify the user or the trusted advisor of the user that a new entry has been made in (i.e., appended to) the user's blockchain-based PFR. In this example, the new entry (i.e., data record) in the user's PFR comprises 1) the updated AI view and 2) snapshots of the prior hierarchical portfolio and the revised hierarchical portfolio, wherein the updated AI view is recorded on the blockchain in fully or partially encrypted form and contains: a) off-chain references to snapshots of the state of the prior hierarchical portfolio and the state the revised hierarchical portfolio that are stored in a secure storage system or b) on-chain references to snapshots of the state of the prior hierarchical portfolio and the state the revised hierarchical portfolio that are recorded in fully or partially encrypted form on the blockchain.

In various embodiments, blockchain 1208 may store the complete financial history of context-specific financial advice provided to a financial client by a number of financial advisors or financial firms over time. For example, when an individual financial client receives and acts upon a first AI view containing context-specific financial advice approved by a financial advisor working at a particular financial firm, the first AI view is updated accordingly, fully or partially encrypted, and appended to the blockchain via method 1300. At a later time, when the same financial client receives and acts upon a second AI view containing context-specific financial advice approved by the same financial advisor working for the same financial firm or a different financial advisor working at the same or different financial firm, the second AI view is updated, encrypted, and appended to the blockchain. This process of receiving and acting upon AI views and subsequently updating, encrypting, and appending them to the blockchain may continue over the lifetime of the financial client or longer (e.g., the lifetime of future generations of the financial client's family), thereby establishing a complete history of context-specific financial advice (i.e., a sequence of AI views) provided to the financial client or the multigenerational family of the financial client over time by numerous financial advisors and financial firms participating in the blockchain, as described in more detail below.

Figure 14A:
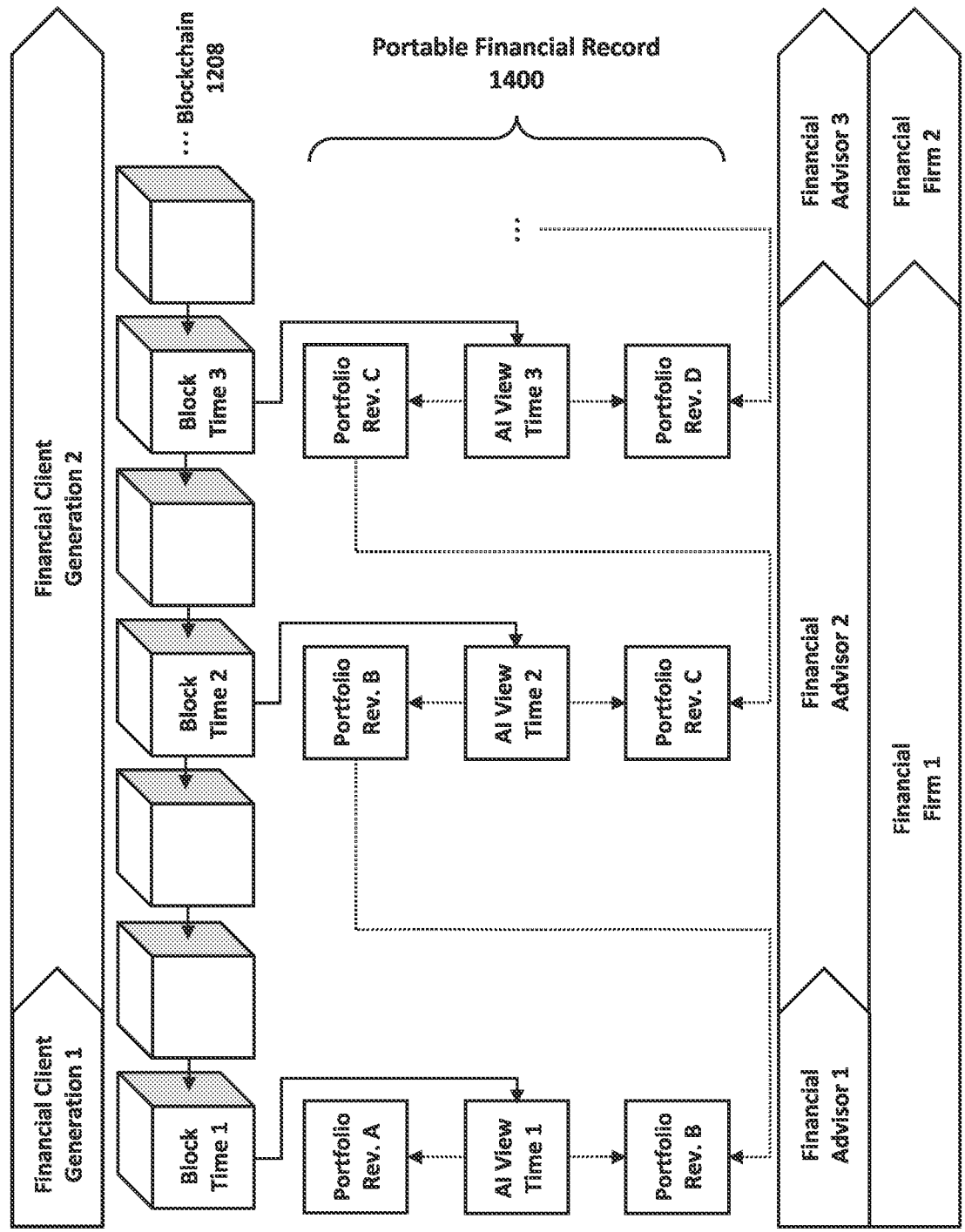
FIG. 14A is a block diagram of a portable financial record stored on a blockchain in the form of a series of AI views with off-chain references to states of a hierarchical portfolio of assets according to an exemplary embodiment.

FIG. 14A is a block diagram of a portable financial record 1400 stored on a blockchain 1208 in the form of a series of AI views with off-chain references to snapshots of the states of a hierarchical portfolio of assets according to an exemplary embodiment. As illustrated, a first prior AI view, AI view ($t_1$), is stored in encrypted, partially encrypted, or unencrypted form within block N($t_1$n) of blockchain 1208 at time $t_1$. Similarly, a second prior AI view, AI view ($t_2$), is stored in encrypted, partially encrypted, or unencrypted form within block N($t_2$) of blockchain 1208 at time $t_2$. Likewise, the latest (i.e., most recent or current) AI view, AI view ($t_3$), is stored in encrypted, partially encrypted, or unencrypted form within block N($t_3$) of blockchain 1208 at time $t_3$. As further illustrated, AI view ($t_1$) references a snapshot of the state of the hierarchical portfolio at revision A at time $t_1^-$ (i.e., Portfolio$^A$ ($t_1^-$)) and a snapshot of the state of the revised version of the hierarchical portfolio at revision B at time $t_1^+$ (i.e., Portfolio$^B$ ($t_1^+$)), where the former represents a snapshot of the state of the hierarchical portfolio just before (i.e., time $t_1^-$) the implementation of the AI view at time $t_1$ and the latter represents a snapshot of the state of the hierarchical portfolio just after (i.e., time $t_1^+$) the implementation of the AI view at time $t_1$. Similarly, AI view ($t_2$) references a snapshot of the state of the hierarchical portfolio at revision B at time $t_2^-$ (i.e., Portfolio$^B$ ($t_2^-$)) and a snapshot of the state of the revised version of the hierarchical portfolio at revision C at time $t_2^+$ (i.e., Portfolio$^C$ ($t_2^+$)), where the former and latter represent snapshots of the state of the hierarchical portfolio just before (i.e., time $t_2^-$) and just after (i.e., time $t_2^+$) the implementation of the AI view at time $t_2$, respectively. Likewise, AI view ($t_3$) references a snapshot of the state of the hierarchical portfolio at revision C at time $t_3^-$ (i.e., Portfolio$^C$ ($t_3^-$)) and a snapshot of the state of the revised version of the hierarchical portfolio at revision D at time $t_3^+$ (i.e., Portfolio$^D$ ($t_3^+$)), where the former and latter represent snapshots of the state of the hierarchical portfolio just before (i.e., time $t_3^-$) and just after (i.e., time $t_3^+$) the implementation of the AI view at time $t_3$, respectively. In this example, the references to the snapshots of the states of the prior revisions of the hierarchical portfolio (i.e., Portfolio$^A$ ($t_1^-$), Portfolio$^B$ ($t_1^+$), Portfolio$^B$ ($t_2^-$), Portfolio$^C$ ($t_2^+$), Portfolio$^C$ ($t_3^-$) at time periods $t_1^-$, $t_1^+$, $t_2^-$, $t_2^+$, and $t_3^-$, respectively) and the reference to the snapshot of the state of the latest revision of the hierarchical portfolio (i.e., Portfolio$^D$ ($t_3^+$) at time $t_3^+$) are off-chain references.

The letter designations A, B, C, and D associated with Portfolio$^A$, Portfolio$^B$, Portfolio$^C$, and Portfolio$^D$ represent the revision levels A, B, C, and D of the structure of the hierarchical portfolio of assets, respectively. For example, the hierarchical portfolio of assets at revision level A at time t is denoted by Portfolio$^A$ (t). While the structure of a hierarchical portfolio of assets at a fixed revision level is identical from one time period to the next, its attribute values may change significantly. For example, while the structure of Portfolio$^B$ (i.e., the hierarchical portfolio of assets at revision level B) is identical from time $t_1^+$ to time $t_2^-$, its attribute values (e.g., market data, microeconomic data, macroeconomic data, etc.) at time $t_1^+$ and $t_2^-$ may be markedly different. In contrast, while the attribute values of a hierarchical portfolio of assets just before and just after a fixed time period may be the same or similar, its structure may change significantly from one revision level to the next. For example, while the attribute values of Portfolio$^B$ and Portfolio$^C$ (i.e., the hierarchical portfolio of assets at revision levels B and C, respectively) may be the same or similar between time periods $t_2^-$ (i.e., just before $t_2$) and $t_2^+$ (i.e., just after $t_2$) surrounding time $t_2$, the structure (e.g., nodes, positions, holdings, etc.) of the hierarchical portfolio of assets at revision level B at time $t_2^-$ (i.e., Portfolio$^B$ ($t_2^-$)) may be markedly different than the structure of the hierarchical portfolio of assets at revision level C at time $t_2^+$ (i.e., Portfolio$^C$ ($t_2^+$)).

In addition to illustrating the elements (e.g., AI views of a hierarchical portfolio and snapshots of the states of the hierarchical portfolio referenced by the AI views) of a portable financial record 1400 recoded on a blockchain 1208, FIG. 14A further depicts three distinct entity lifecycles, each of which include a plurality of lifecycle phases according to an exemplary embodiment. As depicted, the first entity lifecycle is the financial client lifecycle, the second is the financial advisor lifecycle, and the third is the financial firm lifecycle. The financial client lifecycle, in this example, is shown to contain two lifecycle phases: the first phase representing a $1^{st}$-generation financial client (e.g., financial client generation 1) and the second phase representing a $2^{nd}$-generation financial client (e.g., financial client generation 2). The financial advisor lifecycle, in this example, is shown to contain three lifecycle phases: the first phase representing a $1^{st}$ financial advisor (e.g., financial advisor 1), the second phase representing a $2^{nd}$ financial advisor (e.g., financial advisor 2), and the third phase representing a $3^{rd}$ financial advisor (e.g., financial advisor 3). The financial firm lifecycle, in this example, is shown to contain two lifecycle phases: the first phase representing a $1^{st}$ financial firm (e.g., financial firm 1) and the second phase representing a $2^{nd}$ financial firm (e.g., financial firm 2).

At any moment in time, for example at time $t_2$, a vertical line may be traced within FIG. 14A from the financial client lifecycle, through the portable financial record 1400, continuing through the financial advisor lifecycle, and finally through the financial firm lifecycle to arrive at the set of entities with access to the portable financial record at time $t_2$, namely the $2^{nd}$-generation financial client, the $2^{nd}$ financial advisor, and the $1^{st}$ financial firm, as well as the set of elements of the portable financial record, namely Portfolio$^B$ ($t_2^-$), AI view ($t_2$), and Portfolio$^C$ ($t_2^+$), acted upon by those entities. More specifically, during time periods surrounding time $t_2$ (i.e., $t_2^- t_2$, $t_2^+$), the illustration shows the following sequence of events involving the aforementioned entities and elements: just before $t_2$ (i.e., at time $t_2^-$), the $2^{nd}$-generation financial client submits the hierarchical portfolio of assets at revision level B (i.e., Portfolio$^B$ ($t_2^-$)); then at time $t_2$, the $2^{nd}$ financial advisor, while working for the $1^{st}$ financial firm, provides context-specific financial advice via an intelligent investment system (e.g., intelligent investment system 102) to the $2^{nd}$-generation financial client in the form of AI view ($t_2$) containing approved AI suggestions for optimizing the structure or content of the hierarchical portfolio; and finally just after $t_2$ (i.e., at time $t_2^+$), the $2^{nd}$-generation financial client accepts the approved AI suggestions contained within AI view ($t_2$), the intelligent investment system implements the accepted AI suggestions and executes the associated transactions via an electronic trading platform (e.g., electronic trading platform 1000), and the $2^{nd}$-generation financial client receives a revised hierarchical portfolio of assets at revision level C (i.e., Portfolio$^C$ ($t_2^+$).

In various embodiments, an investment system, such as intelligent investment system 102, may employ the embedded payment capabilities of a blockchain network hosting blockchain 1208 in order to enable payments to be made from a first user, such as a financial client or multigenerational family represented by a financial client, to a second user, such as a financial advisor or financial firm, for financial services performed by the second user for the first user. The payments made from the first user to the second user may be in the form of the native cryptocurrency, such as Ether (ETH) or Bitcoin (BTC), of the blockchain network (e.g., Ethereum network, Bitcoin network, etc.) hosting blockchain 1208 (Ethereum blockchain, Bitcoin blockchain, etc.). The financial services performed by the second user for the first user may include services related to providing and recording personalized context-specific financial advice in the form of an AI view of a hierarchical portfolio owned by the first user or a multigenerational family represented by the first user. Each of these services may have one or more associated service fees. Such service fees may include, but are not limited to, AI suggestion generation fees, AI suggestion approval fees, AI view assembly fees, AI view approval fees, AI view linking fees, AI view transmission fees, AI suggestion associated transaction execution fees, AI view secure storage fees, AI view encryption fees, AI view blockchain recording fees, and AI view blockchain retrieval fees, portfolio snapshot generation fees, portfolio snapshot referencing fees, portfolio snapshot secure storage fees, portfolio snapshot blockchain recording fees, and portfolio snapshot blockchain retrieval fees. Moreover, each of these service fees may be priced in ETH, BTC, or another native cryptocurrency of the blockchain network.

For example, referring to FIG. 14A, at a certain moment in time (e.g., time $t_3$) when a financial advisor (e.g., financial advisor 2) provides personalized context-specific financial advice in the form of an AI view (e.g., AI view ($t_3$)) to a financial client (e.g., financial client generation 2), the financial firm (e.g., financial firm 1) employing the financial advisor at that time may charge the financial client a number of service fees (e.g., AI suggestion generation fee, AI view approval fee, AI view blockchain recording fee, portfolio snapshot secure storage fee, etc.) associated with the AI view, including the portfolio snapshots (e.g., Portfolio$^C$ ($t_3^-$), and Portfolio$^D$ ($t_3^+$) referenced by the AI view. The financial client (i.e., the recipient of the financial advice) may pay these service fees by making a cryptocurrency payment, via intelligent investment system 102, that specifies an amount of cryptocurrency to be sent to the financial firm (i.e., the provider of the financial advice) employing the financial advisor via a blockchain network hosting blockchain 1208. In the case where the blockchain network hosting blockchain 1208 is an Ethereum network (e.g., the public Ethereum mainnet) and blockchain 1208 is an Ethereum blockchain (e.g., the public Ethereum mainnet blockchain), the amount of cryptocurrency may be specified in ETH (i.e., Ether) and upon the execution, by the Ethereum network, and settlement, on the Ethereum blockchain, of the blockchain transaction containing the cryptocurrency payment, the financial firm may receive the amount paid, less transaction fees, for the service fees associated with the AI view in Ether via the Ethereum network. Furthermore, the financial advisor employed by the financial firm may subsequently or concomitantly receive, subject to the automated or manual approval by the financial firm, his or her commission, if any, in Ether via the Ethereum network. This key capability of the present technology to enable a cryptocurrency payment to be made from a financial client to a financial firm or a financial advisor employed by the financial firm offers the financial firm two important advantages: a) prompt payment (e.g., within the settlement time of the blockchain network) and b) efficient payment (e.g., no centralized third-party payment service required) for services related to providing and recording personalized context-specific financial advice.

It is to be understood, from the discussion above, that a recipient of an AI view may make, by intelligent investment system 102, a cryptocurrency payment for financial advice in the form of the AI view via a blockchain network, such as the blockchain network hosting blockchain 1208. Furthermore, the cryptocurrency payment related to the AI view may specify an amount of cryptocurrency to be sent to the provider of the AI view from the recipient of the AI view, wherein the amount of cryptocurrency may be related to one or more service fees associated with the AI view.

Although FIG. 14A illustrates a portable financial record 1400 as a series of AI views (i.e., AI view ($t_1$), AI view ($t_2$), and AI view ($t_3$)) across time with off-chain references to snapshots of the state of a hierarchical portfolio of assets (i.e., Portfolio$^A$ ($t_1^-$), Portfolio$^B$ ($t_1^+$) Portfolio$^B$ ($t_2^-$), Portfolio$^C$ ($t_2^+$), Portfolio$^C$ ($t_3^-$), and Portfolio$^D$ ($t_3^+$)), the series of AI views may, in other embodiments, contain on-chain references to snapshots of the state of the hierarchical portfolio as previously described in FIG. 12D or both on-chain and off-chain references to snapshots of the state of the hierarchical portfolio as previously described in FIG. 12E.

Figure 14B:
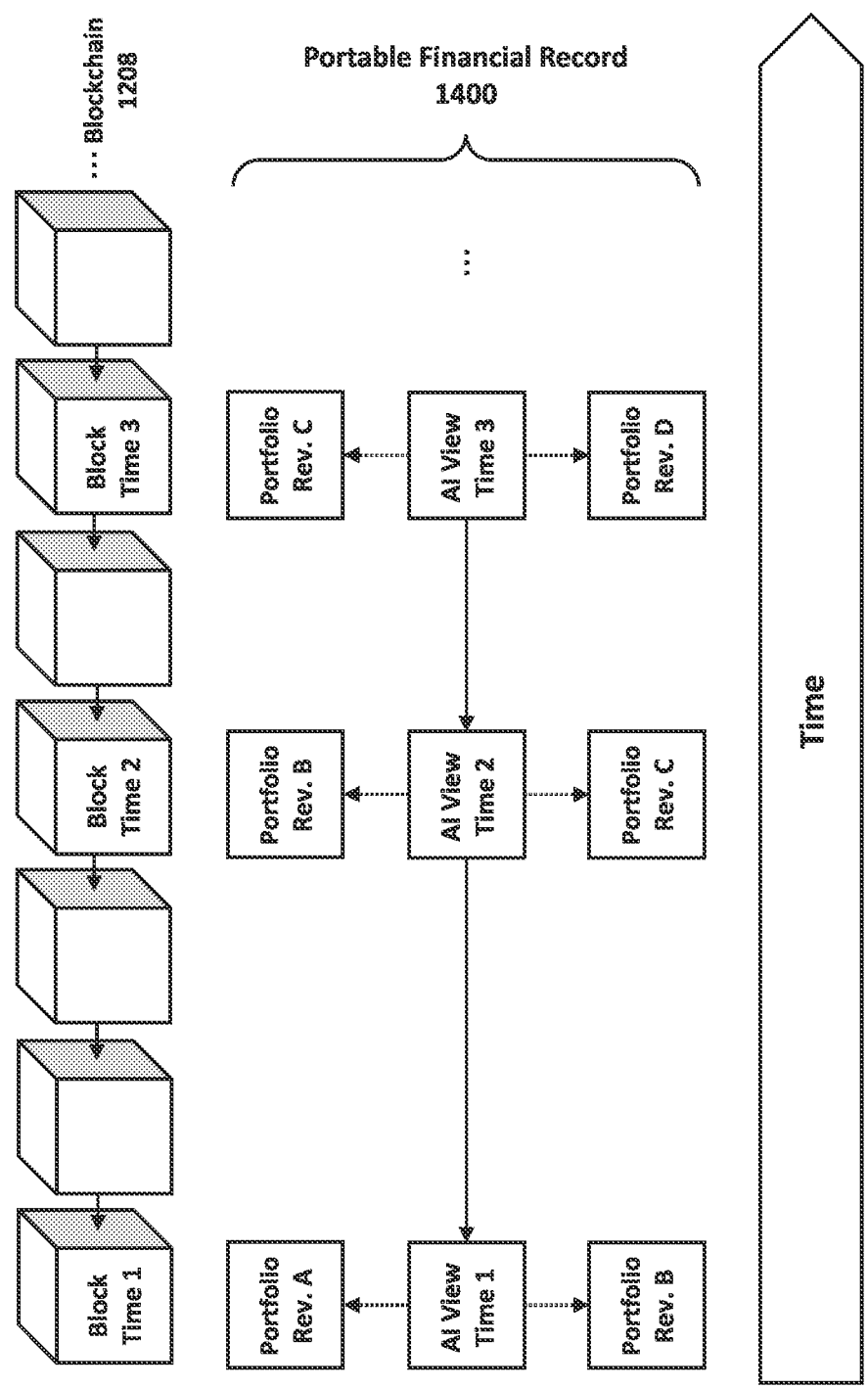
FIG. 14B is a block diagram of a portable financial record stored on a blockchain in the form of a series of AI views linked to one another according to an exemplary embodiment.

FIG. 14B is a block diagram of a portable financial record 1400 stored on a blockchain 1208 in the form of a series of AI views of a hierarchical portfolio linked to one another via hash values according to an exemplary embodiment. As illustrated, three AI views of the hierarchical portfolio, AI view ($t_1$), AI view ($t_2$), and AI view ($t_3$), are stored within their respective blocks, N($t_1$), N($t_2$), and N($t_3$), of blockchain 1208 by an investment system (e.g., investment system 102) at time $t_1$, time $t_2$, and time $t_3$, respectively, where $t_1$ is before $t_2$, and $t_2$ is before $t_3$. As further illustrated, the third AI view ($t_3$) is linked to the second AI view ($t_2$), which in turn is linked to the first AI view ($t_1$). In this example, the AI views, AI view ($t_1$), AI view ($t_2$), and AI view ($t_3$), are assumed to have been approved via a financial advisor or financial review board, updated and released for distribution to a financial client, and encrypted and recorded on blockchain 1208 via a trusted investment system, such as investment system 102, operated by a financial firm of high integrity participating in blockchain 1208. Hence, in the context of the following discussion, the term AI view shall denote a recorded, encrypted, released, updated, and approved AI view. For example, rather than referring to an AI view using its fully specified state (e.g., recorded, encrypted, released, updated, and approved AI view ($t_1$)), it shall simply be referred to using its abbreviated form (e.g., AI view ($t_1$)), with the status (e.g., recorded, encrypted, released, updated, and approved) of its state implied.

The link between any two AI views of the hierarchical portfolio that are temporally adjacent (i.e., immediately proximal to one another in time) may be established by adding to the more recent AI view of the hierarchical portfolio a reference to its immediately preceding AI view of the hierarchical portfolio before the more recent AI view is recorded on the blockchain. For example, a link between AI view ($t_3$) of the hierarchical portfolio and AI view ($t_2$) of the hierarchical portfolio may be established before AI view ($t_3$) is recorded on blockchain 1208 by adding to AI view ($t_3$) (i.e., the more recent AI view) a reference to AI view ($t_2$)

(i.e., the immediately preceding AI view). The reference linking an AI view of the hierarchical portfolio to its immediately preceding AI view of the hierarchical portfolio may comprise a hash of the immediately preceding AI view. For example, AI view ($t_3$) of the hierarchical portfolio may include a reference to AI view ($t_2$) of the hierarchical portfolio where the reference linking AI view ($t_3$) to AI view ($t_2$) comprises a hash of AI view ($t_2$).

Linking an AI view of a hierarchical portfolio to its immediately preceding AI view of the hierarchical portfolio via a reference comprising a hash of the immediately preceding AI view is feasible in practice when the two AI views are stored on the same blockchain. However, in the case where an investment system (e.g., investment system 102) operates over a hybrid blockchain or an internetwork of blockchains, the linked AI views may be stored on different blockchains. Accordingly, the reference linking the two AI views and contained within the latter AI view may be augmented to include not only the hash of the immediately preceding AI view but also the global identifier of the blockchain upon which it is stored. For example, a first blockchain, such as a private mainnet of the Enterprise Ethereum blockchain, may store AI view ($t_2$) of a hierarchical portfolio and a second blockchain, such as the public mainnet of the Libra blockchain, may store AI view ($t_3$) of the hierarchical portfolio. The reference linking the two AI views, and contained within AI view ($t_3$) stored on the public Libra blockchain, may include both the hash of AI view ($t_2$) and the global identifier of the private Enterprise Ethereum blockchain upon which AI view ($t_2$) is stored.

Before recording an AI view of a hierarchical portfolio on a blockchain, in order to establish a reference link between the AI view of the hierarchical portfolio and its immediately preceding AI view of the hierarchical portfolio in the form of a hash of the immediately preceding AI view, an investment system may query a full node of a blockchain network hosting the blockchain storing thereon many AI views of the hierarchical portfolio in order to identify the latest prior AI view of the hierarchical portfolio from a portion of the blockchain. The query parameters may include but are not limited to a unique smart contract account associated with the hierarchical portfolio and a range of blocks within the blockchain. For example, an investment system (e.g., investment system 102) at time $t_3$ may form a query, as described previously, utilizing the unique smart contract account (e.g., RecordViews contract account) associated with the hierarchical portfolio identified by a unique portfolio identifier (e.g., portfolioID) and a range of block numbers as query parameters and issue the query to a full node or full archive node of the blockchain network. The blockchain node (e.g., distributed ledger server 130) may return several events (e.g., ViewAdded events) related to prior AI views of the hierarchical portfolio (e.g., AI view ($t_2$) and AI view ($t_1$)) to the investment system, whereupon the investment system may sort the returned events by associated block height in order to determine the most recent event related to the latest prior AI view of the hierarchical portfolio (e.g., AI view ($t_2$)). Next, the investment system may extract the hash value (e.g., value of the viewHash event attribute) of the latest prior AI view from the event and then add the hash of the latest prior AI view (e.g., hash of AI view ($t_2$)) to the current AI view (e.g., AI view ($t_3$)). Finally, the investment system may record the current AI view, including the hash of the latest prior AI view, on the blockchain (e.g., blockchain 1208). It is to be understood that this process results in the investment system recording the current AI view of the hierarchical portfolio on the blockchain, where the current AI view of the hierarchical portfolio contains an embedded reference to the latest prior AI view of the hierarchical portfolio in the form of a hash of the latest prior AI view.

The ability to query a blockchain to identify and extract a specific AI view of a hierarchical portfolio using the hash value of the AI view as a unique identifier becomes particularly useful when an investment system, such as investment system 102, traverses a number of related AI views linked, via hash values, to one another in a sequence. For example, in the case where a number of AI views of a hierarchical portfolio, such as AI view ($t_1$), AI view ($t_2$), and AI view ($t_3$), are linked to one another in a sequence, investment system 102 may traverse the sequence of AI views of the hierarchical portfolio by using the hash value references to latest prior AI views embedded within the AI views. Specifically, starting from AI view ($t_3$), which contains an embedded reference to the immediately preceding AI view ($t_2$) in the form of a hash of the immediately preceding AI view ($t_2$), investment system 102 may utilize the hash value of AI view ($t_2$) to query, as previously described, a full node (e.g., full node distributed ledger server 130) or, if necessary, a full archive node (e.g., full archive node distributed ledger server 130) of the blockchain network hosting blockchain 1208 in order to extract AI view ($t_2$) and the hash of AI view ($t_2$) from the state trie corresponding to a specific block (e.g., N($t_2$)) within blockchain 1208. Continuing the traversal process from AI view ($t_2$), which contains an embedded reference to the immediately preceding AI view ($t_1$) in the form of a hash of the immediately preceding AI view ($t_1$), investment system 102 may utilize the hash value of AI view ($t_1$) to query the blockchain node in order to extract both AI view ($t_1$) and the hash of AI view ($t_1$) from the state trie corresponding to a specific block (e.g., N($t_1$)) within blockchain 1208. As the number of AI views related to a particular financial client or multigenerational family grows over time, the ability of an investment system to quickly and efficiently traverse the complete history of context-specific financial advice in the form of a sequence of AI views becomes increasingly important.

In order to verify the integrity and authenticity of AI views, an investment system may store each AI view and its corresponding signed hash value together within the same transaction of a block of a blockchain by utilizing the techniques, previously described, to record an AI view and a hash of an AI view on a Bitcoin blockchain. For example, in addition to storing AI view ($t_1$) within a transaction of block N($t_1$) of blockchain 1208 at time ti, the investment system may further store a signed hash of AI view ($t_1$) within the same transaction of block N($t_1$) at time $t_1$. Similarly, the investment system may further store AI view ($t_2$) and a signed hash of AI view ($t_2$) together within a single transaction of block N($t_2$) at time $t_2$, and the system may further store AI view ($t_3$) and a signed hash of AI view ($t_3$) together within a single transaction of block N($t_3$) at time $t_3$. A signed hash of an AI view may be generated by digitally signing the corresponding hash of the AI view using the private key of a user (e.g., financial client, multigenerational family, etc.) of the investment system via a number of standard digital signature algorithms (e.g., ECDSA (Elliptic Curve Digital Signature Algorithm), DSA (Digital Signature Algorithm), RSA, etc.).

By storing an AI view and the signed hash value of the AI view together within the same transaction of a block of a blockchain and employing a digital signature algorithm (e.g., ECDSA) based on asymmetric cryptography (i.e., public-key cryptography), an investment system may utilize the signed hash of the AI view generated by the digital signature algorithm to verify the integrity and authenticate the signatory (i.e., signing party) of the AI view. For example, in order to verify the integrity and authenticate the signatory of an AI view, such as AI view ($t_2$), investment system 102 may utilize the public key of the signatory (e.g., a financial client, designated member of a multigenerational family, etc.), the signed hash of AI view ($t_2$), and the hashing algorithm (e.g., SHA-256) used to hash AI view ($t_2$) as inputs to the digital signature algorithm. The public key of the signatory may be stored on a local or remote database, such as database 134, and accessed via a local or remote database server, such as database server 126, or it may be stored by some other means, such as secure offline keystore located within a dedicated hardware wallet or secure enclave of a mobile device. The public key may also be included as part of a digital certificate issued and signed by an organization (e.g., financial firm) serving as its own certificate authority (CA) or by a globally trusted CA (e.g., IdenTrust, Comodo, DigiCert, etc.). Based on the three aforementioned inputs (public key, signed hash, and hashing algorithm), the digital signature algorithm may generate an output, the output being the expected hash value of AI view ($t_2$).

With the expected hash value of AI view ($t_2$) determined, investment system 102 may then hash the AI view ($t_2$) extracted from block N($t_2$) of blockchain 1208 using the same hashing algorithm provided as input to the digital signature algorithm and compare the resulting hash value with its expected value generated by the digital signature algorithm. If the compared values match, then the integrity of AI view ($t_2$) stored within block N($t_2$) of blockchain 1208 has been verified and the signatory has been authenticated. In contrast, if the compared values do not match, then either the integrity of the AI view ($t_2$) stored within block N($t_2$) of blockchain 1208 has been compromised (e.g., AI view ($t_2$) has been tampered with or corrupted) or the signatory is not authentic (e.g., AI view ($t_2$) has been signed by a unrecognized or unauthorized party). This validation process enables investment system 102 to detect non-genuine AI views (e.g., counterfeit, forged, or fraudulent AI views) placed on the blockchain by unauthorized parties. It may also enable investment system 102 to detect when the wrong public key has been submitted as an input to the digital signature algorithm, a situation that may arise when a portable financial record contains AI views of a long-duration hierarchical portfolio that have been digitally signed by a number of different private keys over a period of time, as described below for a multigenerational family.

In other embodiments, the validation process described above may also be utilized in cases where individual AI views are encrypted, as previously described in block 1318 of example method 1300. In such cases, storing an encrypted AI view (e.g., encrypted AI view ($t_1$)) and the signed hash of the encrypted AI view (e.g., signed hash of encrypted AI view ($t_1$)) together within the same transaction of a block (e.g., N($t_1$)) of a blockchain (e.g., blockchain 1208) and employing a digital signature algorithm based on asymmetric cryptography, an investment system may utilize the signed hash of the encrypted AI view generated by the digital signature algorithm to verify the integrity and authenticate the signatory of the encrypted AI view.

Moreover, a link between two temporally adjacent encrypted AI views (e.g., encrypted AI view ($t_1$) and encrypted AI view ($t_2$)) may established by adding to the more recent encrypted AI view (e.g., encrypted AI view ($t_2$)) a reference to its immediately preceding encrypted AI view (e.g., encrypted AI view ($t_1$)) before the more recent encrypted AI view is recorded on the blockchain, where the reference linking the more recent encrypted AI view to its immediately preceding encrypted AI view may comprise a hash of the immediately preceding encrypted AI view (e.g., hash of encrypted AI view ($t_1$)). In brief, the process described above for validating the integrity and authenticity of AI views or encrypted AI views, stored on a private or public blockchain, containing references to immediately preceding AI views or encrypted AI views is central to the establishment and maintenance of a portable financial record on behalf of individual users and multigenerational users, as described in more detail below.

In various embodiments, a portable financial record (e.g., portable financial record 1400) recoded on a blockchain (e.g., blockchain 1208) may comprise 1) a single series (i.e., single linked sequence) of encrypted AI views of a particular hierarchical portfolio with associated encrypted snapshots of the states of the hierarchical portfolio referenced by the encrypted AI views within the single series of encrypted AI views (as illustrated in FIG. 14A) or 2) multiple series (i.e., multiple linked sequences) of encrypted AI views of multiple corresponding hierarchical portfolios with associated encrypted snapshots of the states of the hierarchical portfolios referenced by the encrypted AI views within the multiple series of encrypted AI views. More specifically, when the complete history of context-specific financial advice provided by one or more financial advisors and one or more financial firms to a financial client or multigenerational family in the form of one or more linked sequences of encrypted AI views of one or more corresponding hierarchical portfolios with associated encrypted snapshots of the states of the hierarchical portfolios is recorded over time on a blockchain, such as blockchain 1208, the result is a financial record that provides both security and portability— two important advantages of the present technology. The financial record may be a personal financial record (e.g., personal form of financial record 1400) in the case of the financial client or a multigenerational financial record (e.g., multigenerational form of financial record 1400) in the case of the multigenerational family.

The personal financial record (PFR) and multigenerational financial record (MFR) provide the advantage of security because each individual element of the financial record (e.g., an AI view, such as AI view ($t_1$), or a portfolio snapshot, such as Portfolio$^4$ ($t_1^-$)) may be fully or partially encrypted, thereby securing potentially sensitive element attributes and attribute values (e.g., sensitive AI view attributes and values or sensitive portfolio snapshot attributes and values) of the elements (e.g., AI views or portfolio snapshots) of the financial record. The PFR and MFR also provide the advantage of portability because the financial client or multigenerational family, who/that may engage the services of multiple financial advisors or firms at one time or many different financial advisors or firms over the lifetime of the financial client or many lifetimes of members of the multigenerational family, may authorize a) a newly retained financial advisor employed by a previously retained financial firm participating in the blockchain, b) a previously retained financial advisor employed by a newly retained financial firm participating in the blockchain, or c) a newly retained financial advisor employed by a newly retained financial firm participating in the blockchain to access and view some or all of the encrypted elements of the financial record stored on the blockchain. The process of authorizing access to encrypted elements of a secure and portable financial record (e.g., PFR or MFR) is described in detail below.

In an exemplary embodiment, elements of a personal financial record, or PFR, stored on a blockchain (e.g., blockchain 1208) for an individual financial client may be encrypted and decrypted using a hybrid encryption/decryption approach based on both symmetric-key cryptography (i.e., shared key or secret key) and asymmetric-key cryptography (i.e., public/private key), as previously described in blocks 1318 and 1320 of example method 1300. Under this hybrid approach, an element of the personal financial record (e.g., an AI view of a hierarchical portfolio owned by a financial client or a snapshot of the state of the hierarchical portfolio) previously encrypted by an investment system using a secret key uniquely generated for that element and stored on the blockchain may, at a later time, be extracted from the blockchain and decrypted by the same investment system or a different investment system on behalf of the financial client by first extracting from the blockchain the encrypted secret key uniquely associated with the encrypted element, then using the private key of the financial client to decrypt the encrypted secret key, and finally utilizing the secret key to decrypt the encrypted element of the PFR. Since the private key is owned by the financial client and securely stored and safeguarded by the investment system or other means (e.g., secure offline hardware wallet, secure enclave/secure element of a mobile device, etc.) over the lifetime of the financial client, the financial client may a) direct the investment system to decrypt specific, or selected, encrypted elements of his or her personal financial record or b) direct the investment system to provide an access token (e.g., one-time token, temporary token, limited-use token, etc.) to a trusted financial advisor representing the financial client and working for a financial firm participating in the blockchain, where the access token enables the trusted financial advisor to instruct the investment system to decrypt specific encrypted elements of the personal financial record on behalf of the financial client who authorized the issuance of the access token to the trusted advisor.

Similarly, elements of a multigenerational financial record, or MFR, stored on a blockchain for a multigenerational family may be encrypted and decrypted based on the aforementioned hybrid encryption/decryption approach. Under this hybrid approach, an element of the MFR (e.g., an AI view of a hierarchical portfolio owned by a multigenerational family or a snapshot of the state of the hierarchical portfolio) previously encrypted using a secret key and stored on the blockchain by an investment system and may, at a later time, be extracted from the blockchain and decrypted by the same investment system or a different investment system on behalf of the multigenerational family utilizing the private key of the multigenerational family and the secret key used to encrypt the element of the MFR, as previously described for the PFR. Since the private key is owned by the multigenerational family and securely stored and safeguarded by the investment system or other means over the lifetimes of the members of the multigenerational family, a designated member or designated members of the multigenerational family may a) direct the investment system to decrypt specific encrypted elements of their family's personal financial record or b) direct the investment system to provide an access token to a trusted financial advisor representing the multigenerational family and working for a financial firm participating in the blockchain, where the access token enables the trusted financial advisor to instruct the investment system to decrypt specific encrypted elements of the multigenerational financial record on behalf of the designated member the multigenerational family who authorized the issuance of the access token to the trusted advisor.

In more general embodiments, given the inherent portability, immutability, and durability characteristics of blockchain-based personal and multigenerational financial records, access methods that persist through time must be agreed upon and standardized across numerous versions of investment systems (e.g., different versions of intelligent investment system 102 or other competing investment systems) developed, owned, hosted, or provided by various non-financial or financial firms. Such firms may include, but are not limited to, enterprise software vendors, integrated hardware manufacturers, systems integrators, social media platforms, cloud platform providers, payment service networks, commercial banks, brokerage firms, asset managers, private banks, and investment banks. For example, a standard method to enable a user (e.g., financial client, designated member of a multigenerational family, trusted advisor to the financial client, or trusted advisor to the multigenerational family) to access a portable financial record (e.g., a PFR of a financial client or an MFR of a multigenerational family) stored on a blockchain via an investment system hosted by a non-financial firm (e.g., a cloud service provider) and provided by a financial firm (e.g., a private bank) participating in the blockchain may comprise the following seven user authentication, authorization, and access steps: 1) Authenticate the login credentials (e.g., username and password, biometric scans, two-factor authentication, etc.) of the user of the investment system. 2) Authorize direct access to the PFR if the user is the financial client who owns the records stored in the PFR. 3) Authorize direct access to the MFR if the user is one of the designated members of the multigenerational family that owns the records stored in the MFR. 4) Authorize limited access to the PFR if the user is the trusted advisor to the financial client. 5) Authorize limited access to the MFR if the user is the trusted advisor to the multigenerational family. 6) Determine the access rights to the PFR for the trusted advisor to the financial client. 7) Determine the access rights to the MFR for the trusted advisor to the multigenerational family.

Moreover, the standard method may comprise the following additional four data query and decryption steps: 1) If the user is the financial client, enable the financial client to query the PFR stored on the blockchain and direct the investment system to decrypt the encrypted elements of the PFR utilizing the private key to the PFR owned by the financial client. 2) If the user is one of the designated members of the multigenerational family, enable the designated member to query the MFR stored on the blockchain and direct the investment system to decrypt the encrypted elements of the MFR utilizing the private key to the MFR owned by the multigenerational family. 3) If the user is a trusted advisor to the financial client, enable this trusted advisor to query the PFR stored on the blockchain and direct the investment system to apply the trusted advisor's access rights in order to decrypt only the accessible subset of encrypted elements of the PFR utilizing the private key to the PFR owned by the financial client. 4) If the user is a trusted advisor to the multigenerational family, enable this trusted advisor to query the MFR stored on the blockchain and direct the investment system to apply the trusted advisor's access rights in order to decrypt only the accessible subset of encrypted elements of the MFR utilizing the private key to the MFR owned by multigenerational family. Access rights, such as those granted to a trusted advisor by a financial client or by a designated member of a multigenerational family, are described in more detail below.

In complex embodiments, more restrictive and fine-grained (e.g., element attribute and attribute value level, in addition to element level) access rights and control policies may be required for users (e.g., financial clients, multigenerational family members, or trusted advisors working for financial firms participating in the blockchain network) accessing elements (e.g., AI views of hierarchical portfolios or hierarchical portfolio snapshots) and element attributes and attribute values (e.g., attributes and attribute values of AI views or attributes and attribute values of hierarchical portfolio snapshots) of personal or multigenerational financial records (e.g., one or more PFRs or MFRs) stored on a blockchain. More specifically, the access rights to elements and element attributes and attribute values of a PFR or MFR granted to a trusted advisor by a financial client or by a multigenerational family, respectively, may comprise a number of element-level restrictions and element-attribute-level restrictions. The element-level restrictions may include, but are not limited to, Active AI Views, Inactive AI Views, Current AI Views, Historical AI Views, and List of AI Views; and Active Portfolio Snapshots, Inactive Portfolio Snapshots, Current Portfolio Snapshots, Historical Portfolio Snapshots, and List of Portfolio Snapshots. The element-attribute-level restrictions may include, but are not limited to, Timeframe Attributes, Insensitive Data Attributes, Sensitive Data Attributes, Non-Rollup Data Attributes, and Rollup Data Attributes; and Timeframe Attributes Values, Insensitive Data Attribute Values, Sensitive Data Attribute Values, Non-Rollup Data Attribute Values, and Rollup Data Attribute Values. These individual element-level and element-attribute-level restrictions may be combined to create more complex access restriction rules, such as the following access restriction rule: "Limit access to Active Al Views and Active Portfolio Snapshots with Timeframe between now and two years ago and show only Insensitive Data Attributes and Insensitive Data Attribute Values including Rollup Data Attributes and Data Attribute Values." Access rights may also restrict the set of permissible actions that may be taken by a financial client, trusted advisor, or designated member of a multigenerational family, such as the ability to Read, Copy, or Extract accessible portfolio snapshots or accessible portfolio snapshot data. These individual action restrictions may be combined to create more complex action restriction rules, such as the following action restriction rule: "For any accessible AI view or portfolio snapshot, enable the Read action but disable the Copy action and the Extract action." Element-level restrictions may be extended to include any set of AI views or hierarchical portfolio snapshots contained within a PFR or MFR without departing from the scope of this disclosure. Similarly, element-attribute-level restrictions may be extended to include any set of attributes or attribute values of any AI view or set of AI views or of any hierarchical portfolio snapshot or set of hierarchical portfolio snapshots contained within a PFR or MFR without departing from the scope of this disclosure.

These more restrictive rules and policies described above may be required by state, national, or supranational regulators responsible for monitoring and enforcing compliance with various comprehensive data protection, privacy, and portability laws and regulations, such the California Consumer Privacy Act (CCPA) or the General Data Protection Regulation (GDPR), on a local, national, or global level. At a high level, the CCPA or GDPR require companies conducting business in, but not necessarily based in, California or the European Union that collect and store personal data about individuals (e.g., consumers, customers, employees, vendors, etc.) who are located for tax purposes or physically, even if only temporarily, within a certain geography (e.g., California or European Union) to employ reliable means (e.g., systems, policies, procedures, processes, etc.) to secure and protect personal data (e.g., any information related to an identified or identifiable household or person) and to honor and comply with the individual data rights provided by these laws. CCPA applies to businesses of a certain type (e.g., for-profit) and gross revenue (e.g., greater than $25 million in annual revenue) or installed base (e.g., 50 thousand or more customers, households, or devices), whereas GDPR applies to both for-profit and non-profit organizations collecting personal data regardless of size.

From the perspective of a financial client, multigenerational family, trusted advisor, or financial firm, the most important individual data rights mandated by CCPA or GDPR include the right for a customer (e.g., financial client, multigenerational family, etc.) to a) access data about them that is stored by the financial firm or has been collected by the financial firm over a period of time (e.g., 12 months, 24 months, all time), b) rectify (i.e., correct) erroneous data about them that is stored by the financial firm, c) delete data or completely erase data about them that is stored by the financial firm, d) port (i.e., transfer) data about them from the financial firm to another firm, financial or otherwise, or receive a portable of copy of the data about them that is stored by the financial firm, e) understand for what purpose or why the data about them is being processed by the financial firm, f) object to (i.e., seek to prevent) the processing of data about them that is stored by the financial firm, g) know (i.e., be aware of through a process of disclosure by the financial firm) the sources of origin of the data about them that is stored by the financial firm, h) know the categories (i.e., types) of data about them that is stored by the financial firm, i) know the categories of third parties or the individual third parties with which data about them has been or is being sold (e.g., exchanged for money or other valuable consideration) or shared by the financial firm, j) opt-out of or opt-in to sharing or selling data stored by the financial firm with or to third parties, and k) track and limit access to who (e.g., advisors, administrators, other employees, or partners of the financial firm) can view, create, edit, or delete data about them that is stored by the financial firm.

It is important to note that the right of a customer to make a request to a financial firm to delete or erase data about them that is stored by the financial firm (i.e., right c above) may appear to conflict with the ability of an intelligent investment system (e.g., intelligent investment system 102) to record financial advice, in the form of an AI view of a hierarchical portfolio, on a blockchain. This apparent conflict arises because a blockchain, by construction, stores data thereon in a manner which makes, through the integrity of the blockchain itself, the data immutable and, in the case where the blockchain network hosting the blockchain employs numerous decentralized fault-tolerant full archive nodes, permanent. Accordingly, to satisfy the customer's data deletion or erasure request, an approach involving the removal or deletion of cryptographic keys may be considered, as described in the example below.

For example, in the case where a financial client makes a request to a financial firm to completely erase all data about them stored by the financial firm, the financial firm, in order to comply with GDPR or CCPA, may employ an investment system, such as intelligent investment system 102, to locate all data records associated with the financial client, including 1) user data (e.g., user name, primary address, email addresses, phone numbers, date of birth, social security number, credit scores, income estimates, account numbers, etc.), 2) portfolio data (e.g., hierarchical portfolios, portfolio holdings, portfolio holding instances, etc.), and 3) personal financial record (PFR) data (e.g., AI views and hierarchical portfolio snapshots). The user data, portfolio data, and PFR data may be located within database 134 of intelligent investment system 102 and thus may be efficiently and permanently deleted from database 134 by intelligent investment system 102 utilizing standard database operations. However, the PFR data may also be located within the blockchain of distributed ledger 138 of intelligent investment system 102. In this case, an approach for complying with the financial client's data erasure request is to ensure that all PFR records stored on the blockchain of distributed ledger 138 are encrypted, prior to storage, using a cryptographic encryption key owned by and known only to the financial client. Under this approach, in order to comply with the erasure request from the financial client, the financial firm may permanently remove all access to the encryption key owned by the financial client, for example, by deleting the encryption key from the secure keystore of intelligent investment system 102. As a result, the PFR of the financial client is still completely intact on the blockchain and therefore fully accessible to the financial client; however, it is no longer accessible to the financial firm or any of its advisors, employees, or partners. This same approach involving the removal or deletion of cryptographic encryption keys may apply equally to multigenerational financial records (MFRS) owned by multigenerational families.

Clearly, the data security policies and practices of financial firms must also consider, incorporate, and comply with other applicable data protection and privacy laws and regulations predating CCPA (January of 2020) and GDPR (May of 2018), such as the Gramm-Leach-Bliley Act, or GLBA (November of 1999) which applies specifically to financial firms licensed to operate in the United States.

In other complex embodiments, in addition to storing personal and multigenerational financial records on a single public or private blockchain network, PFRs and MFRS may also be stored, with suitable cryptographic encryption techniques, on a hybrid blockchain network (i.e., a blockchain network maintaining both a private state and a public state), an internetwork of private blockchain networks (i.e., a plurality of private blockchain networks connected to one another), an internetwork of public blockchain networks (i.e., a plurality of public blockchain networks connected to one another), an internetwork of hybrid blockchain networks (i.e., a plurality of hybrid blockchain networks connected to one another), or any combination of public, private, hybrid networks or internetworks. More specifically, in cases where a PFR or MFR is distributed across several blockchains or internetworks of blockchains or in cases where a PFR or MFR spans long periods of time (e.g., the lifetime of a financial client or many lifetimes of members of a multigenerational family), a single private key to access the encrypted elements of a PFR or MFR may not be practical. In such cases, a set of private keys may have been generated over time by various investment systems on behalf of a financial client owning a long-duration PFR or on behalf of a lineage of members of a multigenerational family owning an MFR spanning generations, and an investment system may need to iterate through the set of private keys to determine the proper private key to utilize at the right time in order to a) verify the integrity of an encrypted AI view, b) authenticate the signatory of the hash of the encrypted AI view, and c) decrypt the encrypted AI view. For example, to validate (i.e., verify and authenticate) and decrypt a particular encrypted AI view of a long-duration PFR stored on one or more blockchains or internetworks of blockchains, an investment system, such as intelligent investment system 102, may securely store and safeguard a set of private keys owned by a financial client and utilize the proper private key within the set at the right time within the historical context of the PFR in order to validate the signed hash of the encrypted AI view and once successfully validated to decrypt the encrypted AI view.

The aforementioned set of private keys may be owned by a financial client in the case of a PFR or by a multigenerational family in the case of an MFR, with the former set of private keys being referred to as a financial client keychain and the latter as a multigenerational family keychain. For example, a financial client keychain may comprise a number of private keys, generated via asymmetric cryptography (i.e., public key cryptography) algorithms (e.g., RSA, ECC, etc.) on behalf of the financial client. In addition, the financial client keychain may comprise a set of private keys dedicated to encryption and decryption operations generated by an asymmetric encryption algorithm (e.g., RSA) most optimal for such operations in the context of a PFR, and it may further comprise a set of private keys dedicated to digital signature generation and validation operations generated by an asymmetric encryption algorithm (e.g., ECC) most optimal for such operations in the context of a PFR. The private keys of the financial client may be stored securely within an investment system (e.g., investment system 102), a secure enclave or secure element of a mobile device (e.g., iOS or Android smart device, such as a smartwatch, smart glasses, smartphone, tablet, etc.), or a software wallet application running on a personal computing device (e.g., tablet, laptop, desktop, workstation, etc.). For additional security, the financial client's private keys may also be stored securely in a hardware wallet embedded in a dedicated computing device. In this context, the hardware wallet may serve as secure offline keystore that contains the private keys of the financial client as well as associated trusted digital certificates signed by a certificate authority (e.g., a firm acting as its own CA or a globally trusted CA). Similarly, a multigenerational family keychain may comprise a number of private keys generated on behalf of the multigenerational family, including a first set of asymmetric private keys optimized for encryption/decryption operations and a second set optimized for digital signature generation/validation operations in the context of an MFR. The private keys of the multigenerational family may be stored securely within an investment system, a secure enclave or secure element, or a software or hardware wallet.

As the number of hierarchical portfolios in a PFR of a financial client or MFR of a multigenerational family becomes large, the number of private keys required to decrypt these portfolios may also become correspondingly large. As a result, a key rack represented by a matrix that maps each hierarchical portfolio in a PFR or MFR to one or more private keys may be required to help financial clients or multigenerational families organize their private keys and manage keychain complexity over time. For example, a financial client may own several hierarchical portfolios (e.g., $P_1$, $P_2$, ..., $P_N$) and several private keys (e.g., $K_1$, $K_2$, ..., $K_M$) to decrypt these portfolios. The financial client may utilize a key rack to organize and store a mapping that maps each hierarchical portfolio to a particular private key and time period for which the private key unlocks (i.e., decrypts) the hierarchical portfolio. For example, AI views and snapshots related to hierarchical portfolios $P_1$ and $P_2$ may be unlocked by $K_1$ from $t_1$ to present day. Similarly, a multigenerational family may own numerous hierarchical portfolios (e.g., $MP_1, MP_2, \ldots, MP_N$) and multiple private keys (e.g., $MK_1, MK_2, \ldots, MK_M$) to decrypt their portfolios. The multigenerational family may utilize a key rack to map each hierarchical portfolio to a particular private key and time period. For example, AI views and snapshots related to hierarchical portfolio $MP_1$ may be unlocked by $MK_1$ from $t_1$ to $t_2$ and unlocked by $MK_4$ from $t_2$ to present day. The first example above illustrates that a single private key may unlock AI views and snapshots related to multiple hierarchical portfolios over a specific period of time, whereas the second example above shows that multiple private keys may be required to unlock the AI views and snapshots related to a single hierarchical portfolio over different periods of time. While the former example is illustrated with a PFR of a financial client and the latter with an MFR of a multigenerational family, the former example is also applicable to an MFR and the latter is also applicable to a PFR.

In summary, utilizing a blockchain (e.g., public blockchain, private blockchain, hybrid blockchain, internetwork of private blockchains, etc.) to store, over time, a single series of AI views (e.g., unencrypted, partially encrypted, or fully encrypted AI views) containing context-specific advice related to a single hierarchical portfolio or multiple series of AI views containing context-specific advice related to multiple corresponding hierarchical portfolios enables an intelligent investment system, such as intelligent investment system 102, to establish and maintain a personal financial record (PFR) owned by a financial client or a multigenerational financial record (MFR) owned by a multigenerational family. The PFR and MFR are secure (i.e., restricted, via access rights, at an element, element attribute, or element attribute value level and optionally encrypted at an AI view or portfolio level), portable (i.e., transportable across financial advisors, firms, and multigenerational families), permanent (i.e., append-only records that cannot be changed or deleted), and durable (i.e., span the lifetimes of financial clients or multigenerational families). Each entry, or data record, within the personal or multigenerational financial record, such as financial record 1400, comprises 1) an AI view of a hierarchical portfolio, such as AI view ($t_2$), and 2) snapshots of the states of the hierarchical portfolio referenced by the AI view, such as Portfolio$^B$ ($t_2^-$) and Portfolio$^C$ ($t_2^+$). The AI view of the hierarchical portfolio is recorded on a blockchain, such as blockchain 1208, and contains context-specific financial advice (restructuring advice, allocation advice, positioning advice, consolidation advice, etc.) for changing, or optimizing, the hierarchical portfolio. The AI view further contains a) off-chain references to snapshots of the prior and revised states of the hierarchical portfolio that are stored in a secure storage system or b) on-chain references to snapshots of the prior and revised states of the hierarchical portfolio that are recorded in unencrypted, partially encrypted, or fully encrypted form on the blockchain.

At any moment in time, the PFR or MFR may be securely accessed by the financial client or a designated member of the multigenerational family, respectively, via their preferred investment system. In addition, the PFR, or portions thereof, may be securely accessed, via the financial client's preferred investment system, by a trusted advisor granted access rights, by the financial client, to decrypt and access some or all of the elements (e.g., active AI views and portfolio snapshots, inactive AI views and portfolio snapshots, current AI views and portfolio snapshots, historical AI views and portfolio snapshots, etc.) and element attributes and attribute values (e.g., insensitive data attributes and attribute values, sensitive data attributes and attribute values, insensitive rollup data attributes and attribute values, etc.) within the PFR. Similarly, the MFR, or portions thereof, may be securely accessed, via the multigenerational family's preferred investment system, by a trusted advisor granted access rights, by a designated member of the multigenerational family, to decrypt and access some or all of the elements and element attributes and attribute values within the MFR.

By serving as an analytical foundation to trace, track, and analyze the complete history of financial advice and performance over time and along multiple dimensions, the portable personal financial record PFR or the portable multigenerational financial record MFR, including their methods of construction described in detail herein, provide an important advantage to the financial client and trusted advisors to the financial client or members of the multigenerational family and trusted advisors to the multigenerational family, respectively, by helping them make better financial decisions based on the knowledge of and insights into the outcomes of and intent behind past financial decisions accumulated over time in the blockchain-based PFR or MFR. For example, a financial client may analyze his or her PFR to identify all of the financial decisions made over time with poor outcomes, wherein the outcome classification (e.g., poor, good, etc.) of the financial decision is determined based on a financial performance metric (e.g., after-tax dividend payments for a stock asset, after-tax coupon payments for a bond asset, after-tax interest payments for a cash asset, after-tax capital gains for a commodity asset, or after-commission capital gains for a real estate asset, etc.) selected by the financial client or trusted advisor to the financial client. Next, for each poor financial decision (i.e., financial decision with an outcome classified as poor), the financial client may start from the point in time when the poor financial decision was made and trace back in time through the entries (i.e., individual records) in the PFR to identify related ancestor financial decisions and also track forward in time through the PFR entries to identify related descendant financial decisions in order to construct related backward and forward decision chains that provide the full context of the poor financial decision.

Once all of the poor financial decisions and their related decisions chains have been identified and constructed, the financial client may further analyze the PFR to understand the intent behind, conditions surrounding, and insights related to each poor financial decision, including related decision chains. This analysis may be dimensionalized along a number of key dimensions (e.g., portfolio, trust, asset class, geography, style, theme, factor, sector, custodian, account, holding, asset manager, financial advisor, financial firm, etc.) of interest to the financial client, wherein the financial client may be able to select and view a specific dimensional slice of the set of poor financial decisions (e.g., poor decisions related to stocks, poor decisions made while working with a particular financial advisor, etc.). Upon completing the analysis, the financial client may codify the results by establishing a list of common financial mistakes. Finally, the financial client may improve his or her ability to make current financial decisions by taking active measures to avoid repeating the past mistakes codified in the list of common financial mistakes. The financial client may employ a similar process to identify and analyze all of the good financial decisions (i.e., financial decisions with outcomes classified as good), including the backward and forward decision chains related to each good financial decision, within the PFR and then codify the results in a list of best practices, thereby securing the means to further improve his or her ability to make current financial decisions by taking active measures to adhere to the best-practice learnings codified in the list of best practices.

It is to be noted that a financial decision with a poor outcome when measured at a particular point in time does not necessarily mean that the financial decision was of poor quality at the time it was made by the decision maker, such as a financial client or trusted advisor. For example, a financial decision (e.g., allocate funds to Apple in 2008) may be a decision of good quality based on all of the information available to a financial client or trusted advisor at the moment in time when the decision was made. However, the decision may have led to, by circumstance or chance (e.g., The Great Recession of 2007-2009), a poor outcome (e.g., unrealized capital losses in Apple in 2009) when measured at a later moment in time. Similarly, a financial decision with a good outcome does not necessarily mean that the financial decision was of good quality at the time is was made. Given this, the decision and decision chain analysis process described above may seek to identify and exclude financial decisions with poor outcomes but of good quality as well as financial decisions with good outcomes but of poor quality.

A multigenerational family may also apply the process described above to identify and analyze all of the poor and good financial decisions, including related decision chains, within their portable multigenerational financial record MFR in order to codify lists of common financial mistakes and best practices, thereby securing the means for the multigenerational family to improve the ability of its family members or its trusted advisors to make current financial decisions by taking active measures to avoid repeating the past mistakes codified in the list of common financial mistakes while at the same time adhering to the best-practice learnings codified in the list of best practices. The MFR, in addition to helping members of the multigenerational family and their trusted advisors make better financial decisions, may provide an additional advantage, because of its greater longitudinal timeframe, by instilling in various family members, especially those with limited or narrow experience regarding financial matters, a more tangible and personal appreciation of the cyclical nature of assets and markets based on significant fluctuations in the family's net worth over long periods of time, which may, in due course, encourage current and future generations to avoid undue financial risks during periods of financial excess historically coincident with cyclical peaks.

Neural Network Models for Generating Recommended Portfolios

In various embodiments, in order to achieve scale in providing a potentially large number of users with personalized context-specific financial advice in the form of AI views of their hierarchical portfolios, intelligent investment system 102 may employ an artificial intelligence powered suggestion service, such as portfolio suggestion service 208 of investment application services 124, designed to generate artificial intelligence suggestions for changing, or optimizing, user portfolios based on user data (e.g., age, risk tolerance, investment preferences, etc.) and global financial data (e.g., economic data, market data, etc.). Portfolio suggestion service 208 may comprise a suite of machine learning models, one or more preprocessing modules, and one or more postprocessing modules. Each machine learning model within the suite may be constructed by selecting and assembling a set of machine learning algorithms 136 from open-source or proprietary libraries, training the selected algorithms with training data collected over time by investment system 102 or other investment systems, and then deploying the trained machine learning models on machine learning servers 128. The one or more preprocessing and postprocessing modules of portfolio suggestion service 208 may comprise routines for transforming and processing input and output data respectively. As new training data becomes available, the suite of machine learning models within portfolio suggestion service 208 may be periodically or continuously retrained, updated, or redeployed on machine learning servers 128.

In a general embodiment, a financial firm may employ intelligent investment system 102 to provide a financial client with personalized context-specific financial advice in the form of an AI view of a hierarchical portfolio owned by the financial client. The AI view may contain one or more AI suggestions for changing the structure, the content, or both the structure and content of the financial client's hierarchical portfolio. For example, in the case of a structural change, an AI view may contain an AI suggestion to add a new node in the hierarchy (e.g., add a new bond within the Bonds section of the hierarchy). In the case of a content change, an AI view may contain an AI suggestion to update an attribute of an existing node in the hierarchy (e.g., update the value of the Allocation Level attribute of a particular stock within the Stocks section of the hierarchy). In the case of a structural and content change, an AI view may contain a first AI suggestion to delete a first existing node in the hierarchy (e.g., delete an existing stock from within the Stocks section of the hierarchy) and a second AI suggestion to update an attribute of a second existing node in the hierarchy (e.g., update the value of the Yield attribute of a particular bond within the Bonds section of the hierarchy).

The AI suggestions may be generated by portfolio suggestion service 208 based on user data related to the financial client or global financial data related to economic and market conditions. The user data of the financial client may be stored and managed by application management service 220 of investment application services 124. Portfolio suggestion service 208 may extract a portion of the user data from application management service 220 during the process of compiling a data input package to be utilized to construct machine learning model inputs. The data input package may further include certain global financial data, including data related to current and expected states of the global economy and global markets, extracted from database 134 by portfolio suggestion service 208. After assembling the data input package, portfolio suggestion service 208 may invoke a set of preprocessing routines to select certain data elements from the data input package and transform these data elements into various inputs with the proper input formats required by one or more of the machine learning models. Next, portfolio suggestion service 208 may employ one or more trained machine learning models to recommend a suitable hierarchical portfolio for the financial client based on a number of model inputs, where the model inputs may comprise transformations of one or more elements of the user data or global financial data contained within the data input package, as described in more detail below.

In a simple univariate embodiment, the user data related to the financial client may contain a first data attribute and data attribute value specifying the age of the financial client and portfolio suggestion service 208 may employ a first machine learning model, such as a univariate linear regression model, to recommend a suitable hierarchical portfolio that balances the allocation between stocks and bonds as a function of the age of the financial client. In this case, the model may take the form of a linear equation that maps points in the space of real numbers representing various ages (e.g., 30.0 years old, 40.0 years old, 50.0 years old, etc.) of financial clients to points in the space of real numbers representing suitable stock allocations (e.g., 70.0 percent, 60.0 percent, 50.0 percent, etc.) for financial clients based on their age. The parameters to be learned by this model include the intercept (i.e., percentage of the portfolio allocated to stocks at a zero value of age) and slope (i.e., the percentage change in stock allocation per unit change in age) of the following linear equation:

$$\hat{y} = wx + b$$

where the model input variable x represents the age of a financial client; the model output variable $\hat{y}$ represents an estimate for a suitable stock allocation for the financial client based on his or her age; and w and b represent, respectively, the slope and intercept of the linear equation to be learned by the model based on training data. The optimal value of w, referred to as w*, and the optimal value of b, referred to as b*, are computed by minimizing the value of a scalar loss function L over a number of training samples within a set of training data. For a univariate linear regression model, the loss function may be given by the sum of squares of error estimates:

$$L = \sum_{i=1}^{D} \hat{\varepsilon}_i^2$$

$$\hat{\varepsilon}_i = y_i - \hat{y}_i$$

where D is the number of training samples in the training data set, $y_i$ and $\hat{y}_i$ respectively denote the actual stock allocation and the estimated stock allocation for a financial client represented by the $i^{th}$ training sample, and the error estimate term $\hat{\varepsilon}_i$ represents the difference between the actual and estimated stock allocation values for a financial client represented by the $i^{th}$ training sample. By substituting the linear expression for the estimator $\hat{y}_i$, the loss function takes on the following form:

$$L = \sum_{i=1}^{D} (y_i - wx_i - b)^2$$

Since this loss function is a differentiable function of the parameters w and b, its gradient with respect these parameters may be analytically determined and expressed as $$\frac{\partial L}{\partial w} = 2 \sum_{i=1}^{D} (y_i - wx_i - b)(-x_i)$$

$$\frac{\partial L}{\partial b} = 2 \sum_{i=1}^{D} (y_i - wx_i - b)(-1)$$

Setting each component of the gradient to zero, rearranging terms, and solving the system of two linear equations for parameters w and b results in the following expressions for w* and b*:

$$w^* = \frac{\text{cov}(x, y)}{\text{var}(x)}$$

$$\text{cov}(x, y) = \sum_{i=1}^{D} (y_i - \bar{y})(x_i - \bar{x})$$

$$\text{var}(x) = \sum_{i=1}^{D} (x_i - \bar{x})^2$$

$$b^* = \bar{y} - w^* \bar{x}$$

where coy (x, y) is the covariance of random variables x (e.g., financial client age) and y (e.g., suitable stock allocation), var (x) is the variance of the random variable x, and $\bar{x}$ and $\bar{y}$ are the respective mean values of x and y over the training samples (e.g., $x_i$ and $y_i$ i=1, . . . , D) in the training data set.

The training data for this embodiment may include numerous training samples organized into rows of a training table, where the $i^{th}$ row of the training table contains the $i^{th}$ training sample in a training set containing a total of D training samples. Since the percentage allocation to stocks uniquely determines the percentage allocation to bonds (i.e., 100 percent minus the percentage allocation to stocks) in this example, each row (i.e., training sample) of the training table need only contain a single training input value $x_i$ representing an actual age of a financial client and a single training output value $y_i$ representing the actual percentage of the portfolio allocated to stocks. More specifically, the column structure of the training table may be represented by the following field labels: financial_client_age and stock_allocation_level, where valid values for the financial_client_age field may include real values ranging from 20.0 to 100.0 and valid values for the stock_allocation_level field may include real values ranging from 0.0 to 100.0 percent. For example, a particular training sample residing in a row within the training table may be populated with the following field values: financial_client_age=30.0 and stock_allocation_level=80.0, which represents a financial client who is thirty years of age with an eighty percent allocation to stocks and a twenty percent allocation to bonds (e.g., 100.0-80.0=20.0).

The training samples, as well as test and validation samples, for this embodiment may be generated based on user data for a number of financial clients collected over time by intelligent investment system 102 or other investment systems and stored within or accessed via application management service 220. More specifically, the user data for each financial client may contain a first user-specific attribute and attribute value representing the age of the financial client, a first array of user-specific attributes and attribute values representing the allocation to stocks for each portfolio owned by the financial client, and a second array of user-specific attributes and attribute values representing the allocation to bonds for each portfolio owned by the financial client. For a particular financial client, one or more trusted advisors working collaboratively with the financial client may establish and approve stock and bond allocations for each portfolio owned by the financial client in isolation, across a portion of portfolios owned by the financial client, or across all portfolios owned by the financial client. For example, a trusted advisor of a financial client who owns multiple hierarchical portfolios may establish and approve an aggregate 40/60 stock/bond allocation (i.e., 40% stock and 60% bond allocation) across all portfolios owned by the financial client, where any particular portfolio owned by the financial client may deviate from the approved allocation but all portfolios when aggregated together adhere to the approved allocation. Given the age and approved allocation data stored within or accessible to application management service 220 across a large pool of financial clients, intelligent investment system 102 may serve as a valuable source of user data for creating training samples, test samples, and validation samples. As such, this user data may be periodically extracted, aggregated, transformed, and utilized to populate the rows of a training table, test table, or validation table with respective training, test, or validation samples, where each sample contains one or more model input or output values formatted in accordance with the requirements of the model.

Once the model has been trained, tested, and validated, it may be utilized in practice to make predictions or recommendations. For example, if the age of a particular financial client is 65, the input to the trained univariate linear regression model would be the numerical value 65.0. Based on this input value (e.g., x=65.0), the trained model, utilizing the optimal intercept parameter (e.g., b*) and slope parameter (e.g., w*) it learned through prior training sessions, may calculate a numerical output value, representing the recommended percentage of the financial client's portfolio that should be allocated to stocks, via the following linear equation:

$$\hat{y}=w^*x+b^*$$

More specifically, if the model learns, based on training data collected over time by intelligent investment system 102, that the optimal parameters values for w and b are w*=−1.0 and b*=105.0, respectively, then recommended allocation to stocks for the 65-year-old financial client calculated by the trained linear model using these optimal parameter values is equal to 40.0 percent (e.g., $\hat{y}$=−1.0× 65.0+105.0). Furthermore, the implied recommended allocation to bonds for the financial client is equal to 60.0 percent (e.g., 100.0−40.0=60.0) in this example.

In this simple embodiment, given an allocation to stocks (e.g., 40.0 percent) and bonds (e.g., 60.0 percent) recommended by the machine learning model (e.g., univariate linear regression model) for a financial client of a particular age (e.g., 65 years of age), the specific composition (e.g., individual stocks, bonds, stock ETFs, or bond ETFs) of a hierarchical portfolio with the recommended stock/bond (e.g., 40/60) allocation may be constructed and reviewed by one or more financial professionals (e.g., investment advisor, portfolio manager, investment strategist, risk manager, etc.). Then based on this hierarchical portfolio of known composition, portfolio suggestion service 208 may invoke a number of post-processing routines to calculate the set of changes required to transform the current revision of the hierarchical portfolio (e.g., prior portfolio 300) of the financial client into a new revision of the hierarchical portfolio that precisely matches the hierarchical portfolio constructed and reviewed by the one or more financial professionals with the proper allocation balance between stocks and bonds recommended by the machine learning model based on the age of the financial client. Once the required changes have been determined, portfolio suggestion service 208 may then generate and suitably format the corresponding set of AI suggestions to be utilized by downstream services, such as portfolio mapping service 210 and portfolio view service 212, to assemble an AI view of the current revision of the hierarchical portfolio (e.g., an AI view of the prior portfolio 300) of the financial client.

In a more complex multivariate embodiment, in addition to containing a first data attribute and data attribute value specifying the age the financial client, intelligent investment system 102 may have access to a database, such as database 134, containing a wide variety of user data, such as a second data attribute and data attribute value specifying the risk tolerance of the financial client, and a wide variety of global financial data, such as a third data attribute and data attribute value specifying the projected annual gross domestic product (GDP) growth rate of the global economy over the next year, and portfolio suggestion service 208 may employ a second machine learning model, such as a multilayer neural network model, to recommend a suitable hierarchical portfolio that balances the allocation between stocks, bonds, cash, real estate, and other asset classes as a function of the user data related to the financial client as well as the global financial data related to the state of the global economy and global markets. In this more complex embodiment, the model may take the form of a multilayer neural network that partitions the multidimensional space (e.g., N-dimensional space, where N is the number of model inputs) of attribute values representing user data related to a potentially very large number of financial clients and attribute values representing global financial data related to the state of the global economy and global markets into regions with linear or nonlinear boundaries and then maps the points within each region to points in the multidimensional space (e.g., M-dimensional space, where M is the number of model outputs) of probability values associated with suitable hierarchical portfolios for financial clients based on their user data and the current and projected states of the global economy and global markets.

More specifically, the functional mapping may take the form of fully connected two-layer neural network model where the first layer of the network may be modeled via a set of parameterized multivariate linear equations given by $$f_{1,1}(x) = ReLU(w_{1,1,1}x_1 + w_{1,1,2}x_2 + \ldots + w_{1,1,N}x_N + b_{1,1})$$
$$f_{1,2}(x) = ReLU(w_{1,2,1}x_1 + w_{1,2,2}x_2 + \ldots + w_{1,2,N}x_N + b_{1,2})$$
$$\vdots$$
$$f_{1,N}(x) = ReLU(w_{1,N,1}x_1 + w_{1,N,2}x_2 + \ldots + w_{1,N,N}x_N + b_{1,N})$$

where $w_{1,i,j}$ for i=1, 2, . . . , N and j=1, 2, . . . , N and $b_{1,i}$ for i=1, 2, . . . , N represent the individual weight and bias parameters, respectively, of the first layer of the neural network. In addition, the activation function (i.e., thresholding function) for the first layer of the neural network is a rectifying linear unit (ReLU) which may be expressed as $$ReLU(x) = \begin{cases} x \text{ for } x \geq 0 \\ 0 \text{ for } x < 0 \end{cases}$$

The second layer of the network may also be modeled via a set of parameterized multivariate linear equations given by $$f_{2,1}(x) = w_{2,1,1}f_{1,1}(x) + w_{2,1,2}f_{1,2}(x) + \ldots + w_{2,1,N}f_{1,N}(x) + b_{2,1}$$
$$f_{2,2}(x) = w_{2,2,1}f_{1,1}(x) + w_{2,2,2}f_{1,2}(x) + \ldots + w_{2,2,N}f_{1,N}(x) + b_{2,2}$$
$$\vdots$$
$$f_{2,M}(x) = w_{2,M,1}f_{1,1}(x) + w_{2,M,2}f_{1,2}(x) + \ldots + w_{2,M,N}f_{1,N}(x) + b_{2,M}$$

where the input values to the second layer of the network are the output values from the first layer of the network and $w_{2,i,j}$ for $i=1, 2, \ldots, M$ and $j=1, 2, \ldots, N$ and $b_{2,i}$ for $i=1, 2, \ldots, M$ represent the individual weight and bias parameters, respectively, of the second layer of the neural network.

In vector form, the output from the first layer of the network $f_1(x)$ may be expressed as a vector-valued function of the input vector x, a first weight matrix $W_1$, and a first bias vector $b_1$ as follows:

$$f_1(x) = \begin{bmatrix} f_{1,1}(x) \\ f_{1,2}(x) \\ \vdots \\ f_{1,N}(x) \end{bmatrix} = ReLU(W_1 x + b_1)$$

where the input vector x, the first bias vector $b_1$, and the first output vector $f_1(x)$ are of dimension N×1 and the first weight matrix $W_1$ is of dimension N×N, wherein N is the total number of independent categories that may be utilized as inputs to the model. Similarly, the output from the second layer of the network $f_2(x)$ may be expressed as a vector-valued function of the output from the first layer of the network $f_1(x)$, a second weight matrix $W_2$, and a second bias vector $b_2$ as follows:

$$f_2(x) = \begin{bmatrix} f_{2,1}(x) \\ f_{2,2}(x) \\ \vdots \\ f_{2,M}(x) \end{bmatrix} = W_2 f_1(x) + b_2$$

where the second bias vector $b_2$ and the second output vector $f_2(x)$ are of dimension M×1 and the second weight matrix $W_2$ is of dimension M×N, wherein M is the number of different unique hierarchical portfolios that may be selected by the model.

If the output of the second layer of the neural network model is interpreted to be a set of non-normalized log probabilities, then these values may be exponentiated and normalized to produce an output vector from the neural network that represents a normalized probability distribution over the set of model classes (e.g., unique hierarchical portfolios). In this case, the model output vector may be expressed as $$\hat{y} = \text{softmax}[f_2(f_2(x))]$$

where the estimated classification vector $\hat{y}$ is of dimension M×1 and the activation function for the second layer of the neural network is the softmax function for a vector-valued argument with M components given by $$\text{softmax}(g(x)) = \begin{bmatrix} \frac{e^{g_1(x)}}{\sum_{i=1}^{M} e^{g_i(x)}} \\ \frac{e^{g_2(x)}}{\sum_{i=1}^{M} e^{g_i(x)}} \\ \vdots \\ \frac{e^{g_k(x)}}{\sum_{i=1}^{M} e^{g_i(x)}} \\ \vdots \\ \frac{e^{g_M(x)}}{\sum_{i=1}^{M} e^{g_i(x)}} \end{bmatrix}$$

where $g_k(x)$ in the numerator of the $k^{th}$ element of the softmax function represents the $k^{th}$ element of the second output vector $f_2(f_1(x))$ or, expressed mathematically, $g_k(x) = f_{2,k}(f_1(x))$ and $g_i(x)$ in the denominator of each of the elements of the softmax function represents the $i^{th}$ element of the second output vector $f_2(f_1(x))$ or $g_i(x) = f_{2,i}(f_1(x))$.

Through the training process, the neural network model seeks to learn a set weight parameters $W_1$ and $W_2$ and bias parameters $b_1$ and $b_2$ that enable it to optimally predict the classification of each training sample within the training data set via the multivariate vector-valued nonlinear equation:

$$\hat{y} = \begin{bmatrix} \pi_1 \\ \pi_1 \\ \vdots \\ \pi_M \end{bmatrix} = \pi$$

$$\pi = \text{softmax}[f_2(f_1(x))]$$
$$f_1(x) = ReLU(W_1 x + b_1)$$
$$f_2(x) = W_2 f_1(x) + b_2$$

where x and $\hat{y}$ are the input and output vectors of the two-layer neural network, respectively, and the probability vector $\pi$ represents the estimated probability distribution over the set of M possible classification values that may be predicted by the model. The $k^{th}$ element of $\pi$, represented by $\pi_k$, is given by $$\pi_k = \frac{e^{f_{2,k}(f_1(x))}}{\sum_{i=1}^{M} e^{f_{2,i}(f_1(x))}}$$

where $f_{2,k}(f_1(x))$ in the numerator and $f_{2,i}(f_1(x))$ in the denominator represent the $k^{th}$ and $i^{th}$ element of the second output vector $f_2(f_1(x))$, respectively.

Optimal, or near-optimal, values of weight parameters $W_1$ and $W_2$ and bias parameters $b_1$ and $b_2$ may be computed by minimizing the value of a scaler-valued total loss function L given by $$L = \sum_{k=1}^{D} L_k$$

where D is the number of training samples in the training data set and $L_k$ is the loss of the $k^{th}$ training sample, which may be expressed as $$L_k = -\log \pi_j = -\log \frac{e^{f_{2,j}(f_1(x))}}{\sum_{i=1}^{M} e^{f_{2,i}(f_1(x))}}$$

where M is the number model classes, $\pi_j$ is the computed probability estimate of the correct classification value of the $k^{th}$ training sample. In other words, the value of the loss of the $k^{th}$ training sample is given by minus one times the log of the probability of the correct class for that training sample. For a given training sample (e.g., the $k^{th}$ training sample), as the probability of the correct output class (e.g., the $j^{th}$ output class) approaches unity, the loss function (e.g., minus one times the log of $\pi_j$) approaches zero. Conversely, as the probability of the correct output class approaches zero, the loss function approaches positive infinity.

When this individual training sample loss function $L_k$ is incorporated into the total loss function L and iteratively minimized via suitable optimization methods (e.g., stochastic, mini-batch, or full-batch gradient decent) across the training samples within the training data, it tends to drive weights and biases toward values that result in a diminution of incorrect probabilities relative to correct probabilities. More specifically, as the total loss function L is minimized via the optimization process, the weight and bias parameters are iteratively adjusted in order to drive correct classification probabilities toward a value of one. Moreover, since the set of classification probabilities across all output classes of a given output vector sum to unity for a neural network applying a softmax activation function to the output of the final layer, the optimization process tends to drive incorrect classification probabilities toward zero.

In order to ensure that weight parameters are well behaved (e.g., not too large in magnitude), a penalty term may be applied to the total loss function and the total loss function may be rewritten as $$L = \sum_{k=1}^{D} L_k + \lambda R$$

where is a hyperparameter (i.e., a parameter established via heuristics or random search rather than via training) that represents the regularization strength and R is a regularization function which may be expressed in L2 form (i.e., sum of squares) as follows:

$$R = \sum_{i=1}^{N} \sum_{j=1}^{N} w_{1,i,j}^2 + \sum_{i=1}^{M} \sum_{j=1}^{N} w_{2,i,j}^2$$

where the first term in the regularization function represents the sum of squares of all elements of the N×N dimensional weight parameter matrix $W_1$ of the first layer of the neural network and the second term represents the sum of squares of all elements of the M×N dimensional weight parameter matrix $W_2$ of the second layer of the neural network.

The two-layer neural network model presented above may be extended in a straightforward manner to include addition network layers (e.g., 3, 4, 5, etc.) in order to create deep neural networks (DNNs). For example, the two-layer model may be readily extended to a three-layer model utilizing the following multivariate vector-valued nonlinear equation:

$$\hat{y} = \text{softmax}[f_3(f_2(f_1(x)))]$$

where $$f_1(x) = ReLU(W_1 x + b_1)$$

$$f_2(x) = ReLU(W_2 f_1(x) + b_2)$$

$$f_3(x) = W_3 f_2(x) b_3$$

wherein x is the input and $\hat{y}$ is the output of the model; $f_1(x)$, $f_2(x)$, and $f_3(x)$ are the outputs from the first, second, and third layers of the model; $W_1(x)$, $W_2(x)$, and $W_3(x)$ and $b_1(x)$, $b_2(x)$, and $b_3(x)$ are the respective weight matrices and bias vectors of the first, second, and third layers of the model; x, $f_1(x)$, $f_2(x)$, $b_1$, and $b_2$ are dimension N×1; $\hat{y}$, $f_3(x)$ and $b_3$ are dimension M×1; $W_1$ and $W_2$ are of dimension N×N; and $W_3$ is of dimension M×N.

The optimization process to minimize the total loss function over a set of training data with known inputs and known outputs (i.e., supervised learning) involves the following steps: a) encoding, b) transformation, c) segmentation, d) initialization, e) forward pass, f) backward pass, and g) parameter update. In brief, the encoding step involves encoding (e.g., one-hot encoding, ordinal encoding, binary encoding, hashing encoding, etc.) model input categories and model output classifications. The transformation step involves transforming each sample within the set of available data into its encoded representation. The segmentation step involves partitioning the available data into training data, test data, and validation data. The initialization step involves setting values for hyperparameters (e.g., number of network layers, nodes per layer, learning rate, regularization parameters, batch size, training epochs, etc.) and establishing initial values for weight and bias parameters. The forward pass step involves running the set of training samples contained within the training data through the network layers and activation functions of the neural network model and computing the total loss function over the training samples given the current set of weight and bias parameters and hyperparameters. The forward pass step may further include batch-normalization operations between hidden layers of the network, where the outputs from a previous layer are normalized (e.g., adjusted by the mean and standard deviation of the batch sample), scaled (e.g., by a first trainable parameter γ), and shifted (e.g., by a second trainable parameter β) prior to being utilized as inputs to a subsequent layer. The backward pass step involves computing the numerical gradient (i.e., numerically estimated partial derivatives) of the total loss function with respect to the weight and bias parameters given the current set of training data by starting with a unity gradient value at the output of a computational graph (i.e., directed acyclic graph, or DAG) representing the neural network and backpropagating gradient values through each node of the computational graph via recursive applications of the chain rule. The parameter update step involves utilizing an estimate of the numerical gradient to calculate updated values for each of the weight and bias parameters in order to reduce the total loss function.

Based on the numerical optimization method employed to search for the optimal set of weight and bias parameters, the parameter update step may be performed across a different number of training samples. For example, the parameter update step may be performed for each training sample, a mini batch (e.g., 16, 32, 64, 128, etc. samples drawn from the training data set) of training samples, or a full batch (e.g., all samples within the training data set) of training samples by employing stochastic, mini-batch, and (full) batch gradient descent methods, respectively. Each pass through the complete set of training samples within the training data is referred to as a training epoch. The number of parameter updates steps per training epoch depends on the batch size (i.e., number of training samples per batch) of the gradient descent method employed and the training data set size (i.e., number of training samples contained in the training data set). For example, the number of parameter update steps per training epoch is equal to the number of samples in the training data set, the number batches required to span the training data set (i.e., training data set size divided by batch size), and unity for stochastic, mini-batch, and (full) batch gradient descent methods, respectively.

The training process proceeds for a number of training epochs until the computed value of the total loss function reaches an acceptable level or a threshold number of training epochs has been attained. To monitor the training process, the total loss function is computed over the training samples within the training data set at each epoch utilizing the current set of weight and bias parameters. It is also computed over the test samples within the test data at each epoch utilizing the current set of weight and bias parameters. The total loss function over the training data (i.e., training loss) and the total loss function over the test data (i.e., test loss) may then be plotted for each training epoch and analyzed during the progression of the training process.

Upon completion of the training process for a given set of hyperparameters, a specific subset of hyperparameters (e.g., learning rate, regularization parameters, batch size, etc.) may be changed and the training process may be reconducted based on the altered subset of hyperparameters. After conducting a number of retraining sessions, a near-optimal subset of hyperparameters may be discovered based on the training data set. The near-optimal subset of hyperparameters is then validated against other previously considered subsets of hyperparameters utilizing the validation samples within the validation data set. Once the validation process is complete, the trained, tested, and validated neural network model may then be deployed in a production environment hosted within a private cloud (e.g., on-premise, virtual, hosted, or managed private cloud), hybrid cloud (i.e., combination of private and public clouds), or public cloud (e.g., Amazon Web Services, Microsoft Azure, or Google Cloud Platform) as part of an AI-powered suggestion service, such as portfolio suggestion service 208.

Once the model has been trained, tested, validated, and deployed it may be utilized in practice to recommend a suitable portfolio for a financial client based on user data related to the financial client and global financial data related to the state of the global economy and global markets. For example, based on training data collected by or accessible to intelligent investment system 102 or a group of federated investment systems (i.e., linked systems that share data assets, such as user data or global financial data), a multi-layer neural network model may learn a set of near-optimal parameters values for a collection of weight matrices W and a collection of bias vectors b represented by $$W^* = \{W_1^*, W_2^*, \ldots, W_{N_L}^*\}$$

$$b^* = \{b_1^*, b_2^*, \ldots, b_{N_L}^*\}$$

where $N_L$ represents the number of layers of the neural network.

Using these optimal parameter matrices and vectors for the case of a three-layer neural network model (e.g., $N_L=3$), the trained model may calculate an output vector $\hat{y}$ for a given model input vector x that may be expressed by the following multivariate vector-valued nonlinear equation:

$$\hat{y} = \text{softmax}[f_3(f_2(f_1(x)))]$$

where $$f_1(x) = ReLU(W_1^* x + b_1^*))$$

$$f_2(x) = ReLU(W_2^* f_1(x) + b_2^*)$$

$$f_3(x) = W_3^* f_2(x) + b_3^*$$

wherein the model input vector x represents the transformed and encoded state of a) selected elements of the user data related to the current and expected states of a particular financial client and b) selected elements of the global financial data related to the current and expected states of the global economy and global markets, and the model output vector $\hat{y}$ represents, in the form of a probability distribution $\hat{y} = \pi$, the hierarchical portfolio recommended by the model for the financial client given the current and expected states of the financial client, global economy, and global markets.

In an embodiment, the user data related to the current and expected states of the $k^{th}$ user (e.g., financial client) may be represented by a user data vector given by $$u_k = \begin{bmatrix} u_{k,1} \\ u_{k,2} \\ \vdots \\ u_{k,N_{A_k}} \end{bmatrix}$$

where $u_{k,i}$ represents the $i^{th}$ data attribute describing the $k^{th}$ user and $N_{A_k}$ is the total number of data attributes within $u_k$. For example, given two users comprising a first financial client and a second financial client, the first data attribute $u_{1,1}$ of the first financial client and the first data attribute $u_{2,1}$ of the second financial client may represent the age in years of the first and second financial clients, respectively. If the ages of the first and second financial clients are equal to forty and fifty-five years of age, respectively, then the data attribute $u_{1,1}$ would be assigned to the data attribute value of 40 (i.e., $u_{1,1}=40$) and the data attribute $u_{2,1}$ would be assigned to the data attribute value of 55 (i.e., $u_{2,1}=55$). In the case where the set of users share a common user data vector structure, then $N_{A_k}=N_A$ for all k and the user data of a set of users, such as set of financial clients, may be represented by a user data matrix given by $$U = \begin{bmatrix} u_1^T \\ u_2^T \\ \vdots \\ u_k^T \\ \vdots \\ u_{M_U}^T \end{bmatrix}$$

where $M_U$ is the total number of users within the set of users, which may comprise any number (e.g., thousands, millions, tens of millions, hundreds of millions, etc.) of users managed within intelligent investment system 102 or across a group of federated investment systems.

In various embodiments, the user data vectors contained within the user data matrix may be functions of time and expressed as follows:

$$U(t) = \begin{bmatrix} u_1^T(t) \\ u_2^T(t) \\ \vdots \\ u_k^T(t) \\ \vdots \\ u_{M_U}^T(t) \end{bmatrix}$$

where the temporal variable t represents discrete periods of time $t_1, t_2, \ldots, t_P, \ldots, t_{N_P}$, wherein P represents an arbitrary point in time and $N_P$ represents the total number of time periods under consideration. Moreover, since the number of user data vectors contained within the user data matrix and the number of attributes contained within in each user data vector may change over time, the shape of the user data matrix may change accordingly with time and be expressed at time period $t_P$ as $$U(t_P) = \begin{bmatrix} u(t_P)_{1,1} & u(t_P)_{1,2} & \cdots & u(t)_{1,N(t_P)_A} \\ u(t_P)_{2,1} & u(t_P)_{2,2} & \cdots & u(t)_{2,N(t_P)_A} \\ \vdots & \vdots & \vdots & \vdots \\ u(t_P)_{M(t_P)_U,1} & u(t_P)_{M(t_P)_U,2} & \cdots & u(t_P)_{M(t_P)_U,N(t_P)_A} \end{bmatrix}$$

where $M(t_P)_U$ is the number of user data vectors contained within the user data matrix at time period $t_P$ and $N(t_P)_A$ is the number of data attributes contained within each user data vector at time period $t_P$.

In an embodiment, the economic data for the $k^{th}$ economic entity (e.g., country, region, etc.) may be represented by an economic data vector given by $$e_k = \begin{bmatrix} e_{k,1} \\ e_{k,2} \\ \vdots \\ e_{k,N_{A_{e,k}}} \end{bmatrix}$$

where $e_{k,i}$ represents the $i^{th}$ data attribute describing the $k^{th}$ economic entity and $N_{A_{e,k}}$ is the total number of data attributes within $e_k$. For example, given two economic entities comprising a first country and a second country, the first data attribute $e_{1,1}$ of the first country and the first data attribute $e_{2,1}$ of the second country may represent the annual GDP growth rate in percent of the first and second country, respectively. If the GDP growth rates of the first and second countries are equal to three percent and six percent, respectively, then the data attribute $e_{1,1}$ would be assigned to the data attribute value of 3.0 (i.e., $e_{1,1}=3.0$) and the data attribute $e_{2,1}$ would be assigned to the data attribute value of 6.0 (i.e., $e_{2,1}=6.0$). In the case where the set of economic entities share a common economic data vector structure, then $N_{A_{e,k}} = N_{A_e}$ for all k and the economic data of a set of economic entities, such as a set of countries, regions, states, businesses, or households, may be represented by an economic data matrix given by $$E = \begin{bmatrix} e_1^T \\ e_2^T \\ \vdots \\ e_k^T \\ \vdots \\ e_{M_C}^T \end{bmatrix}$$

where $M_C$ is the total number of economic entities within the set of economic entities, which may comprise any number (e.g., tens, hundreds, thousands, millions, etc.) of economic entities managed within intelligent investment system 102 or across a group of federated investment systems.

In various embodiments, the economic data vectors contained within the economic data matrix may be functions of time and expressed as follows:

$$E(t) = \begin{bmatrix} e_1^T(t) \\ e_2^T(t) \\ \vdots \\ e_k^T(t) \\ \vdots \\ e_{M_C}^T(t) \end{bmatrix}$$

where t represents discrete periods of time $t_1, t_2, \ldots, t_P, \ldots, t_{N_P}$. Moreover, since the number of economic data vectors contained within the economic data matrix and the number of attributes contained within in each economic data vector may change over time, the shape of the economic data matrix may change accordingly with time and be expressed at time period $t_P$ as $$E(t_P) = \begin{bmatrix} e(t_P)_{1,1} & e(t_P)_{1,2} & \cdots & e(t)_{1,N(t_P)_{A_e}} \\ e(t_P)_{2,1} & e(t_P)_{2,2} & \cdots & e(t)_{2,N(t_P)_{A_e}} \\ \vdots & \vdots & \vdots & \vdots \\ e(t_P)_{M(t_P)_C,1} & e(t_P)_{M(t_P)_C,2} & \cdots & e(t_P)_{M(t_P)_C,N(t_P)_{A_e}} \end{bmatrix}$$

where $M(t_P)_C$ is the number of economic data vectors contained within the economic data matrix at time period $t_P$ and $N(t_P)_{A_e}$ is the number of data attributes contained within each economic data vector at time period $t_P$.

In an embodiment, the market data for the $k^{th}$ market asset (e.g., stock, bond, cash, commodity, currency, real estate, etc.) may be represented by a market data vector given by $$m_k = \begin{bmatrix} m_{k,1} \\ m_{k,2} \\ \vdots \\ m_{k,N_{A_{m,k}}} \end{bmatrix}$$

where $m_{k,i}$ represents the $i^{th}$ data attribute describing the $k^{th}$ market asset and $N_{A_{m,k}}$ is the total number of data attributes within $m_k$. For example, given two market assets comprising a first stock and a second stock, the first data attribute $m_{1,1}$ of the first stock and the first data attribute $m_{2,1}$ of the second stock may represent the market capitalization in billions of dollars of the first and second stock, respectively. If the market capitalization of the first and second stocks are equal to $200 billion and $800 billion, respectively, then the data attribute $m_{1,1}$ would be assigned to the data attribute value of 200 (i.e., $m_{1,1}=200$) and the data attribute $m_{2,1}$ would be assigned to the data attribute value of 800 (i.e., $m_{2,1}=800$). In the case where the set of market assets share a common market data vector structure, then $N_{A_{m,k}}=N_{A_m}$ for all k and the market data of a set of market assets, such as a set of stocks, bonds, cash, commodities, currencies, or real estate properties, may be represented by a market data matrix given by $$M = \begin{bmatrix} m_1^T \\ m_2^T \\ \vdots \\ m_k^T \\ \vdots \\ m_{M_A}^T \end{bmatrix}$$

where $M_A$ is the total number of market assets within the set of market assets, which may comprise any number (e.g., hundreds, thousands, tens of thousands, hundreds of thousands, etc.) of market assets managed within intelligent investment system 102 or across a group of federated investment systems.

In various embodiments, the market data vectors contained within the market data matrix may be functions of time and expressed as follows:

$$M(t) = \begin{bmatrix} m_1^T(t) \\ m_2^T(t) \\ \vdots \\ m_k^T(t) \\ \vdots \\ m_{M_A}^T(t) \end{bmatrix}$$

where t represents discrete periods of time $t_1, t_2, \ldots, t_P, \ldots, t_{N_P}$. Moreover, since the number of market data vectors contained within the market data matrix and the number of attributes contained within in each market data vector may change over time, the shape of the market data matrix may change accordingly with time and be expressed at time period $t_P$ as $$M(t_P) = \begin{bmatrix} m(t_P)_{1,1} & m(t_P)_{1,2} & \cdots & m(t)_{1,N(t_P)_{A_m}} \\ m(t_P)_{2,1} & m(t_P)_{2,2} & \cdots & m(t)_{2,N(t_P)_{A_m}} \\ \vdots & \vdots & \vdots & \vdots \\ m(t_P)_{M(t_P)_A,1} & m(t_P)_{M(t_P)_A,2} & \cdots & m(t_P)_{M(t_P)_A,N(t_P)_{A_m}} \end{bmatrix}$$

where $M(t_P)_A$ is the number of market data vectors contained within the market data matrix at time period $t_P$ and $N(t_P)_{A_m}$ is the number of data attributes contained within each market data vector at time period $t_P$.

In the case where the set of countries share a common economic data vector structure and the set of market assets share a common market data vector structure, the economic data of a set of economic entities, such as a set of countries, and the market data of a set of market assets may be represented by a global financial data matrix given by $$G = \begin{bmatrix} e_1^T \\ e_2^T \\ \vdots \\ e_k^T & 0 \\ \vdots \\ e_{M_C}^T \\ & m_1^T \\ & m_2^T \\ & \vdots \\ 0 & m_k^T \\ & \vdots \\ & m_{M_A}^T \end{bmatrix}$$

In various embodiments, the global financial data vectors contained within the global financial data matrix may be functions of time and expressed as follows:

$$G(t) = \begin{bmatrix} e_1^T(t) \\ e_2^T(t) \\ \vdots \\ e_k^T(t) & 0 \\ \vdots \\ e_{M_C}^T(t) \\ & m_1^T(t) \\ & m_2^T(t) \\ & \vdots \\ 0 & m_k^T(t) \\ & \vdots \\ & m_{M_A}^T(t) \end{bmatrix}$$

where t represents discrete periods of time $t_1, t_2, \ldots, t_P, \ldots, t_{N_P}$.

In an embodiment, given a user data vector $u(t_P)_k$ for the $k^{th}$ financial client and a global financial data matrix $G(t_P)$ at time $t_P$, a vector-valued transformation function $\Phi(u(t_P)_k, G(t_P))$ may be defined that selects, extracts, parses, converts, maps, and encodes elements of the user data vector and the global financial data matrix into an encoded (e.g., one-hot, binary, hash, etc.) representation of the input vector for the multilayer neural network model at time period $t_P$ as follows:

$$x(t_P) = \Phi(u(t_P)_k, G(t_P))$$

where $\Phi$ is a vector-valued transformation function that transforms, where necessary, each selected element of the user data vector of the $k^{th}$ financial client and each selected element of the global financial data matrix into an encoded representation of the input vector $x_k(t_P)$ for financial client k at time period $t_P$ in order to comply with input requirements of the neural network. The arguments for the transformation function $\Phi$ are a) the user data vector of the $k^{th}$ financial client at time period $t_P$ given by $$u_k(t_P) = \begin{bmatrix} u(t_P)_{k,1} \\ u(t_P)_{k,2} \\ \vdots \\ u(t_P)_{k,N(t_P)_A} \end{bmatrix}$$

where $N(t_P)_A$ is the total number of data attributes describing and characterizing the current state and expected future state of financial client k at time period $t_P$ and b) the global financial data matrix at time period $t_P$ given by $$G(t_P) = \begin{bmatrix} e(t_P)_{1,1} & \cdots & e(t)_{1,N(t_P)_{A_e}} & & & & \\ e(t_P)_{2,1} & \cdots & e(t)_{2,N(t_P)_{A_e}} & & & & \\ \vdots & \vdots & \vdots & & & 0 & \\ e(t_P)_{M(t_P)_C,1} & \cdots & e(t_P)_{M(t_P)_C,N(t_P)_{A_e}} & & & & \\ & & & m(t_P)_{1,1} & \cdots & m(t)_{1,N(t_P)_{A_m}} \\ & & & m(t_P)_{2,1} & \cdots & m(t)_{2,N(t_P)_{A_m}} \\ & 0 & & \vdots & \vdots & \vdots \\ & & & m(t_P)_{M(t_P)_A,1} & \cdots & m(t_P)_{M(t_P)_A,N(t_P)_{A_m}} \end{bmatrix}$$

where $M(t_P)_C$ and $M(t_P)_A$ are the total number of countries and total number of assets contained within the economic data sub-matrix (i.e., $E(t_P)$) and the market data sub-matrix (i.e., $M(t_P)$) of the global financial data matrix $G(t_P)$, respectively, and $N(t_P)_{A_e}$ and $N(t_P)_{A_m}$ are the total number of data attributes describing and characterizing the current state and expected future state of the countries and assets contained within the economic data vectors and market data vectors of the economic and market data sub-matrices, respectively.

Employing this formulation for the model input vector $x(t_P)$ at time period $t_P$, the corresponding output vector from the trained three-layer neural network model at time period $t_P$ may be rewritten as $$\hat{y}_k(t_P) = \text{softmax}[f_3(f_2(f_1(\Phi(u_k(t_P),G(t_P)))))]$$

where $$f_1(\Phi(u_k(t_P),G(t_P))) = ReLU[W_1 * \Phi(u_k(t_P),G(t_P)) = b_1^*]$$

$$f_2(\Phi(u_k(t_P),G(t_P))) = ReLU[W_2 * f_1(\Phi(u_k(t_P),G(t_P))) + b_2^*]$$

$$f_3(\Phi(u_k(t_P),G(t_P))) = W_3 * f_2(\Phi(u_k(t_P),G(t_P))) + b_3^*$$

In this formation, the input to the neural network is given by $\Phi(u_k(t_P), G(t_P))$, which represents the vector-valued transformation function for a) selected data attributes and data attribute values from the user data vector of the $k^{th}$ financial client at time period $t_P$, b) selected data attributes and data attribute values from the economic data sub-matrix of the global financial data matrix at time period $t_P$, and c) selected data attributes and data attribute values from the market data sub-matrix of the global financial data matrix at time period $t_P$. In addition, the output of the neural network is given by $\hat{y}_k(t_P)$, which represents, in the form of a probability distribution $\hat{y}_k(t_P) = \pi(t_P)_k$, the hierarchical portfolio recommended by the multilayer neural network for the $k^{th}$ financial client at time period $t_P$ given 1) the current state and expected future state of financial client k at time period $t_P$, as represented by the user data vector $u_k(t_P)$ of the user data matrix $U(t_P)$, 2) the current and expected future economic states of key countries around the world at time period $t_P$, as represented by the economic data sub-matrix $E(t_P)$ of the global financial data matrix $G(t_P)$, and 3) the current and expected future market states of key assets traded on global markets, as represented by the market data sub-matrix $M(t_P)$ of matrix $G(t_P)$.

The multilayer neural network formulation presented above may be incorporated within an intelligent investment system, such as intelligent investment system 102, and applied therein to provide a financial client with personalized context-specific financial advice—an important advantage of the present technology. Since the degree of financial advice personalization (i.e., personalization advantage) provided by intelligent investment system 102 may be directly related to the breadth, depth, and quality of the user data about the financial client, a trusted financial advisor of the financial client may host a series of data gathering interviews with the financial client or members of the financial client's immediate or multigenerational family in order elicit, capture, and accurately record such user data within application management service 220 of intelligent investment system 102. Such interviews may also be conducted by a trusted AI assistant. In order to improve accuracy, speed, and efficiency, the interview process may employ a variety conversional technologies within the domain of artificial intelligence, including but not limited to, automated speech recognition (ASR), speech translation, natural language processing/understanding (NLP/NLU), and text to speech (TTS), as well as conversational or AI assistants. The financial client may also input such user data directly within application management service 220 without the assistance of a trusted advisor or a trusted AI assistant. For example, through a series of interviews with a trusted advisor/AI assistant or direct input by the financial client, various types of user data about a particular financial client may be captured and recorded as described in more detail below.

User data about a particular financial client, referred to as financial client k, may be given by 1) 45 years of age, 2) Conservative risk tolerance, 3) Growth and value-oriented investment objectives, 4) Long-term time horizon for investments, 5) Steady job with mean income level for area of residence, 6) Significant job promotion expected at or around age 50, 7) Partially vested stock options representing two years of annual salary, 8) Emergency savings representing twelve months of non-discretionary expenses, 9) Family healthcare plan, including vision and dental care, provided by employer, 10) Short commute time to and from place of employment, 11) Married to a spouse whose primary long-term occupation is homemaker, 12) Two young children cared for at home without nanny support, 13) Conservatively mortgaged modest home with no plans to upgrade in the near term, 14) Home located in a quiet low-density suburb with median national cost of living expenses, 15) Two relatively new mid-priced cars owned via low-interest loans, 16) One new larger replacement car expected within five years, 17) Modest non-discretionary and discretionary expenses, 18) Wife, husband, and both children are in good health, 19) Low out-of-pocket healthcare costs and modest deductible expected over time, 20) One local family vacation per year expected over time, 21) One non-local family vacation expected every five to ten years, 22) Modest home, auto, life, and personal property insurance costs expected over time, 23) Modest property taxes expected over time, 24) K-12 education for children via public school system, 25) 529 accounts established primarily for kids' college education, 26) 401(k) and IRA accounts established for retirement at or near 67 years of age, 27) No credit card debt, no outstanding student loans, no tax liens, 28) No HELOC debt, no PMI debt, no personal lines of credit, 29) Limited inheritance income from prior generations expected, 30) Limited support expenses for prior generations expected, and 31) No legal matters expected. In this case, the user data vector for financial client k may be expressed as follows:

$$u_k(t_P) = \begin{bmatrix} u(t_P)_{k,1} \\ u(t_P)_{k,2} \\ \vdots \\ u(t_P)_{k,N(t_P)_A} \end{bmatrix} = \begin{bmatrix} 45 \text{ years of age} \\ \text{Conservative risk tolerance} \\ \vdots \\ \text{No legal matters expected} \end{bmatrix}$$

where $u_k(t_P)$ represents the current state and expected future state of financial client k at time period $t_P$ and $N(t_P)_A$ is the total number of data attributes within user data vector $u_k(t_P)$ at time period $t_P$. In this example, data attributes $N(t_P)_A=31$. The user data about a particular financial client may be captured and recorded via application management service 220 and stored within databases 134 and accessible via database servers 126 of intelligent investment system 102.

In addition, at time period $t_P$, financial client k may seek personalized context-specific financial advice under conditions where the state of the global economy may be characterized by 1) Modest and steady global GDP growth rates expected over time, 2) Low interest rates with upward inflection expected over time, 3) Low inflation rates with upward inflection expected over time, 4) Historically high and rising deficit and debt levels for developed and developing nations, 5) Elevated and rising geopolitical uncertainty, 6) Rising demand for services expected over time, 7) Steady manufacturing activity expected over time, 8) Low yet rising unemployment rates expected over time, 9) Widening skills gap expected over time, 10) Historically low business investment expected over time, and 11) Accommodative global central banks ready to act at first signs of recession. In this case, the economic data vector may be expressed as follows:

$$e_G(t_P) = \begin{bmatrix} e(t_P)_{G,1} \\ e(t_P)_{G,2} \\ \vdots \\ e(t_P)_{G,N(t_P)_{A_e}} \end{bmatrix} = \begin{bmatrix} \text{Modest and steady global GDP growth rates} \\ \text{Low interest rates with upward inflection} \\ \vdots \\ \text{Accommodative global central banks} \end{bmatrix}$$

where $e_G(t_P)$ represents the current state and expected future state of the global economy at time period $t_P$ and $N(t_P)_{A_e}$ is the total number of data attributes within economic data vector $e_G(t_P)$ at time period $t_P$. In this simplified example of the global economy, $N(t_P)_{A_e}=11$. The state of the global economy may be stored as global financial data contained within databases 134 and accessible via database servers 126 of intelligent investment system 102.

Furthermore, the state of global markets at time period $t_P$ may be characterized by 1) Moderately inflated U.S. stock values with moderation expected over time, 2) Subdued commodity prices with upward bias expected over time, 3) Rising and potentially inflated bond values with moderation expected over time, 4) Modest and rising real estate values expected over time, 5) Balanced inventory levels expected over time, 6) Historically high stock buyback rates, 7) Constrained capital costs expected over time, 8) Moderately increasing research and development (R&D) costs, manufacturing costs, and selling, general and administrative (SG&A) costs expected over time, 9) Low and steady corporate tax rates expected over time, and 10) Historically high and rising corporate debt levels. In this case, the market data vector may be expressed as follows:

$$m_G(t_P) =$$

$$\begin{bmatrix} m(t_P)_{G,1} \\ m(t_P)_{G,2} \\ \vdots \\ m(t_P)_{G,N(t_P)A_m} \end{bmatrix} = \begin{bmatrix} \text{Moderately inflated U.S. stock values} \\ \text{Subdued commodity prices with upward bias} \\ \vdots \\ \text{Historically high and} \\ \text{rising corporate debt levels} \end{bmatrix}$$

where $m_G(t_P)$ represents the current state and expected future state of global markets at time period $t_P$ and $N(t_P)_{A_m}$ is the total number of data attributes within market data vector $m_G(t_P)$ at time period $t_P$. In this simplified example of global markets, $N(t_P)_{A_m}=10$. The state of global markets may be stored as global financial data contained within databases 134 and accessible via database servers 126 of intelligent investment system 102.

Utilizing the illustrative values described in the example above to populate the economic data vector $e_G(t_P)$ and market data vector $m_G(t_P)$, a simplified version (e.g., two rows and twenty-one columns, rather than a large number of rows and columns) of the global financial data matrix at time period $t_P$ may be expressed as follows:

$$G(t_P) = \begin{bmatrix} e_G^T(t_P) & 0^T \\ 0^T & m_G^T(t_P) \end{bmatrix}$$

and the input vector to the multilayer neural network model at time period $t_P$ for financial client k may be expressed as $$x_k(t_P) = \Phi(u_k(t_P), G(t_P)) \text{ where}$$

$$\Phi(u_k(t_P), G(t_P)) = \begin{bmatrix} \Phi_u(u_k(t_P), G(t_P)) \\ \Phi_e(u_k(t_P), G(t_P)) \\ \Phi_m(u_k(t_P), G(t_P)) \end{bmatrix} = \begin{bmatrix} \Phi(u_k(t_P), G(t_P))_{u,1} \\ \vdots \\ \Phi(u_k(t_P), G(t_P))_{u,N(t_P)_{\Phi_u}} \\ \Phi(u_k(t_P), G(t_P))_{e,1} \\ \vdots \\ \Phi(u_k(t_P), G(t_P))_{e,N(t_P)_{\Phi_e}} \\ \Phi(u_k(t_P), G(t_P))_{m,1} \\ \vdots \\ \Phi(u_k(t_P), G(t_P))_{m,N(t_P)_{\Phi_m}} \end{bmatrix}$$

wherein the economic $E(t_P)$ and market $M(t_P)$ data matrices of the global financial data matrix $G(t_P)$ are represented, respectively, by economic $e_G(t_P)$ and market $m_G(t_P)$ data vectors at time period $t_P$; $\Phi_u$, $\Phi_e$, $\Phi_m$ are vector-valued transformation functions for the user, economic, and market data vectors $u_k(t_P)$, $e_G(t_P)$, and $m_G(t_P)$, respectively; and $N(t_P)_{\Phi_u}$, $N(t_P)_{\Phi_e}$, and $N(t_P)_{\Phi_m}$ are the total number of individual transformation functions within $\Phi_u$, $\Phi_e$, $\Phi_m$, respectively, at time period $t_P$.

In various embodiments, elements of the user data vector $u_k(t_P)$ for financial client k at time period $t_P$ may be selected to be extracted, parsed, mapped, converted, and encoded into respective vector components of model input vector $x(t_P)$ at time period $t_P$ via a suitable transformation function $\Phi(u_k(t_P), G(t_P))$. For example, the first user data element $u(t_P)_{k,1}$ of the user data vector $u_k(t_P)$ of financial client k at time period $t_P$ may have an integer value equal to 45 with corresponding unit of measure of years and the transformation function $\Phi(u_k(t_P), G(t_P))$ may convert this integer value into a one-hot encoding in the format required by the model input vector $x(t_P)$ at time period $t_P$. More specifically, rather than having a single element of an input vector represent the age of the financial client where the single element may take on various values of age, multiple input vector elements related to age may be utilized where each element related to age represents only one particular range of age values and may itself take on only one of two values: a value of one or a value of zero, where one indicates that the value of age represented by the element is true and zero indicates that it is false.

In particular, if the value of the first user data element $u(t_P)_{k,1}$ of financial client k at time period $t_P$ represents the age of the financial client and contains an integer value that may fall within any of the following seventeen ranges of integer values: 20 to 24, 25 to 29, 30 to 34, . . . , 95 to 99, and 100 to 104, then the transformation function $\Phi(u_k(t_P), G(t_P))$ may encode the age of the financial client into the following vector component of input vector $x(t_P)$ related to age:

$$x_1(t_P) = \begin{bmatrix} x(t_P)_{1,1} \\ x(t_P)_{1,2} \\ \vdots \\ x(t_P)_{1,N_A} \end{bmatrix}$$

where the number of age categories $N_A$ equals seventeen in this example and the elements $x(t_P)_{1,k}$ of age vector $x_1(t_P)$ for k=1, 2, . . . , $N_A$ of input vector $x(t_P)$ represent various age ranges and are defined as follows:

$$x_1(t_P) = \begin{bmatrix} x(t_P)_{1,1} \\ x(t_P)_{1,2} \\ \vdots \\ x(t_P)_{1,17} \end{bmatrix} \equiv \begin{bmatrix} 20 \text{ to } 24 \\ 25 \text{ to } 29 \\ \vdots \\ 100 \text{ to } 104 \end{bmatrix}$$

Given the structural definition of the age vector $x_1(t_P)$, a first transformation function $\Phi_{u,1}$ and a second transformation function $\Phi_{u,2}$ may parse, map, and encode an integer value of the first user data element $u(t_P)_{k,1}$ that is in the range of 20 to 24 into the following one-hot representation:

$$x_1(t_P) = \begin{bmatrix} x(t_P)_{1,1} \\ x(t_P)_{1,2} \\ \vdots \\ x(t_P)_{1,17} \end{bmatrix} = \begin{bmatrix} 1 \\ 0 \\ \vdots \\ 0 \end{bmatrix}$$

More specifically, the first transformation function $\Phi_{u,1}$ may parse and map the following integer values of $u(t_P)_{k,1}$ to a standardized canonical range as follows:

$$u(t_P)_{k,1} = 20, 21, 22, 23, \text{ or } 24 \underset{\Phi_{u,1}}{\Longrightarrow} \text{``20 to 24''}$$

Then, the second transformation function $\Phi_{u,2}$ may encode the resulting canonical range of $u(t_P)_{k,1}$ to its corresponding one-hot representation:

$$u(t_P)_{k,1} \underset{\Phi_{u,1}}{\Longrightarrow} \text{``20 to 24''} \underset{\Phi_{u,2}}{\Longrightarrow} x_1(t_P) = \begin{bmatrix} 1 \\ 0 \\ \vdots \\ 0 \end{bmatrix}$$

wherein, for financial client k, only one of the elements of the age vector $x_1(t_P)$ is considered to be equal to 1 (i.e., hot) for a given time period $t_P$, while all others are considered to be equal to 0 (i.e., cold).

Similarly, $\Phi_{u,1}$ and $\Phi_{u,2}$ may transform integer values of the first user data element $u(t_P)_{k,1}$ that fall within the ranges of 25 to 29, . . . , 95 to 99, or 100 to 104 into the following one-hot representations, respectively:

$$x_1(t_P) = \begin{bmatrix} x(t_P)_{1,1} \\ x(t_P)_{1,2} \\ \vdots \\ x(t_P)_{1,17} \end{bmatrix} = \begin{bmatrix} 0 \\ 1 \\ \vdots \\ 0 \end{bmatrix} \text{ or } u(t_P)_{k,1} \underset{\Phi_{u,1}}{\Longrightarrow} \text{``25 to 29''} \underset{\Phi_{u,2}}{\Longrightarrow} x_1(t_P) = \begin{bmatrix} 0 \\ 1 \\ \vdots \\ 0 \end{bmatrix}$$

and so forth for age ranges 30 to 34, . . . , 95 to 99 and concluding with the following one-hot representation for the age range of 100 to 104:

$$x_1(t_P) = \begin{bmatrix} x(t_P)_{1,1} \\ x(t_P)_{1,2} \\ \vdots \\ x(t_P)_{1,17} \end{bmatrix} = \begin{bmatrix} 0 \\ 0 \\ \vdots \\ 1 \end{bmatrix} \text{ or } u(t_P)_{k,1} \underset{\Phi_{u,1}}{\Longrightarrow} \text{``100 to 104''} \underset{\Phi_{u,2}}{\Longrightarrow} x_1(t_P) = \begin{bmatrix} 0 \\ 0 \\ \vdots \\ 1 \end{bmatrix}$$

Furthermore, the second user data element $u(t_P)_{k,2}$ of the user data vector $u_k(t_P)$ of financial client k at time period $t_P$ may have a text value equal to "conservative risk tolerance" and the transformation function $\Phi(u_k(t_P), G(t_P))$ may convert this text value into a one-hot encoding in the format required by the model input vector $x(t_P)$ at time period $t_P$. More specifically, rather than having a single element of an input vector represent the assessed risk tolerance of the financial client where the single element may take on various values of risk tolerance, multiple input vector elements related to risk tolerance may be utilized where each element related to risk tolerance represents only one particular value of risk tolerance and may itself take on only one of two values: a value of one or a value of zero, where one indicates that the value of risk tolerance represented by the element is true and zero indicates that it is false.

In particular, if the value of the second user data element $u(t_P)_{k,2}$ of financial client k at time period tp represents the risk tolerance of the financial client and contains a text value that may be parsed and mapped to any of the following three text values: "conservative," "moderate," or "aggressive", then the transformation function $\Phi(u_k(t_P), G(t_P))$ may encode the risk tolerance of the financial client into the following vector component of input vector $x(t_P)$ related to risk tolerance:

$$x_2(t_P) = \begin{bmatrix} x(t_P)_{2,1} \\ x(t_P)_{2,2} \\ \vdots \\ x(t_P)_{2,N_R} \end{bmatrix}$$

where the number of risk tolerance categories $N_R$ equals three in this example and the elements $x(t_P)_{2,k}$ of risk tolerance vector $x_2(t_P)$ for $k=1, 2, \ldots, N_R$ of input vector $x(t_P)$ represent various risk tolerance categories and are defined as follows:

$$x_2(t_P) = \begin{bmatrix} x(t_P)_{2,1} \\ x(t_P)_{2,2} \\ \vdots \\ x(t_P)_{2,3} \end{bmatrix} \equiv \begin{bmatrix} \text{conservative} \\ \text{moderate} \\ \text{aggressive} \end{bmatrix}$$

Given the structural definition of the risk tolerance vector $x_2(t_P)$, a third transformation function $\Phi_{u,3}$ and a fourth transformation function $\Phi'_{u,4}$ may parse, map, and encode a text value of the second user data element $u(t_P)_{k,2}$ that is equal to "Conservative risk tolerance" into the following one-hot representation:

$$x_2(t_P) = \begin{bmatrix} x(t_P)_{2,1} \\ x(t_P)_{2,2} \\ x(t_P)_{2,3} \end{bmatrix} = \begin{bmatrix} 1 \\ 0 \\ 0 \end{bmatrix}$$

More specifically, the third transformation function $\Phi_{u,3}$ may parse and map the text value of $u(t_P)_{k,2}$ to a standardized canonical value as follows:

$$u(t_P)_{k,2} = \text{``Conservative risk tolerance''} \underset{\Phi_{u,3}}{\Longrightarrow} \text{``conservative''}$$

Then, the fourth transformation function $\Phi_{u,4}$ may encode the canonical value of $u(t_P)_{k,2}$ into its corresponding one-hot representation:

$$u(t_P)_{k,2} \underset{\Phi_{u,3}}{\Longrightarrow} \text{``conservative''} \underset{\Phi_{u,4}}{\Longrightarrow} x_2(t_P) = \begin{bmatrix} 1 \\ 0 \\ 0 \end{bmatrix}$$

wherein, for financial client k, only one of the elements of the risk tolerance vector $x_2(t_P)$ is considered to be equal to 1 for a given time period $t_P$, while all others are considered to be equal to 0.

Similarly, $\Phi_{u,3}$ and $\Phi_{u,4}$ may transform text values of the second user data element $u(t_P)_{k,2}$ that are equal to "Moderate risk tolerance" or "Aggressive risk tolerance" into the following one-hot representations, respectively:

$$x_2(t_P) = \begin{bmatrix} x(t_P)_{2,1} \\ x(t_P)_{2,2} \\ x(t_P)_{2,3} \end{bmatrix} = \begin{bmatrix} 0 \\ 1 \\ 0 \end{bmatrix}$$

or $$u(t_P)_{k,2} \underset{\Phi_{u,3}}{\Longrightarrow} \text{``moderate''} \underset{\Phi_{u,4}}{\Longrightarrow} x_2(t_P) = \begin{bmatrix} 0 \\ 1 \\ 0 \end{bmatrix}$$

and $$x_2(t_P) = \begin{bmatrix} x(t_P)_{2,1} \\ x(t_P)_{2,2} \\ x(t_P)_{2,3} \end{bmatrix} = \begin{bmatrix} 0 \\ 0 \\ 1 \end{bmatrix}$$

or $$u(t_P)_{k,2} \underset{\Phi_{u,3}}{\Longrightarrow} \text{``aggressive''} \underset{\Phi_{u,4}}{\Longrightarrow} x_2(t_P) = \begin{bmatrix} 0 \\ 0 \\ 1 \end{bmatrix}$$

In various embodiments, elements of the global financial data matrix $G(t_P)$ at time period $t_P$ may be selected to be extracted, parsed, mapped, converted, and encoded into respective vector components of model input vector $x(t_P)$ at time period $t_P$ via a suitable transformation function $\Phi(u_k(t_P), G(t_P))$. For example, the first economic data element $e(t_P)_{G,1}$ of the economic data vector $e_G(t_P)$ of the global financial matrix $G(t_P)$ at time period $t_P$ may have a text value equal to "modest and steady global GDP growth rates" and the transformation function $\Phi(u_k(t_P), G(t_P))$ may convert this text value into a one-hot encoding in the format required by the model input vector $x(t_P)$ at time period $t_P$. More specifically, rather than having a single element of an input vector represent the GDP growth rate of the global economy where the single element may take on various values of global GDP growth, multiple input vector elements related to global GDP growth may be utilized where each element related to global GDP growth represents only one particular range of values of global GDP growth and may itself take on only one of two values: a value of one or a value of zero, where one indicates that the value of global GDP growth represented by the element is true and zero indicates that it is false.

In particular, if the value of the first economic data element $e(t_P)_{G,1}$ of the economic data vector $e_G(t_P)$ of the global financial matrix $G(t_P)$ at time period $t_P$ represents the GDP growth of the global economy and contains a text value that may be converted to a corresponding lookup value that may fall within any of the following eight ranges of floating point values: −2.0 and below, −1.9 to −1.0, −0.9 to 0.0, 0.0 to 0.9, 1.0 to 1.9, 2.0 to 2.9, 3.0 to 3.9, and 4.0 and above, then the transformation function $\Phi(u_k(t_P), G(t_P))$ may encode the GDP growth of the global economy into the following vector component of input vector $x(t_P)$ related to global GDP growth:

$$x_3(t_P) = \begin{bmatrix} x(t_P)_{3,1} \\ x(t_P)_{3,2} \\ \vdots \\ x(t_P)_{3,N_G} \end{bmatrix}$$

where the number of global GDP growth categories NG equals eight in this example and the elements $x(t_P)_{3,k}$ of global GDP growth vector $x_3(t_P)$ for k=1, 2, . . . , NG of input vector $x(t_P)$ represent various global GDP growth ranges and are defined as follows:

$$x_3(t_P) = \begin{bmatrix} x(t_P)_{3,1} \\ x(t_P)_{3,2} \\ \vdots \\ x(t_P)_{3,8} \end{bmatrix} \equiv \begin{bmatrix} -2.0 \text{ and below} \\ -1.9 \text{ to } -1.0 \\ \vdots \\ 4.0 \text{ and above} \end{bmatrix}$$

Given the structural definition of the global GDP growth vector $x_3(t_P)$, a first transformation function $\Phi_{e,1}$, a second transformation function $\Phi_{e,2}$, and a third transformation function $\Phi_{e,3}$ may parse, map, convert, and encode a text value of the first economic data element $e(t_P)_{G,1}$ that is equal to "Modest and steady global GDP growth rates" into the following one-hot representation:

$$x_3(t_P) = \begin{bmatrix} x(t_P)_{3,1} \\ \vdots \\ x(t_P)_{3,5} \\ x(t_P)_{3,6} \\ x(t_P)_{3,7} \\ x(t_P)_{3,8} \end{bmatrix} = \begin{bmatrix} 0 \\ \vdots \\ 0 \\ 1 \\ 0 \\ 0 \end{bmatrix}$$

More specifically, first transformation function $\Phi_{e,1}$ may parse and map the text value of $e(t_P)_{G,1}$ to a standardized canonical text value as follows:

$$e(t_P)_{G,1} = \text{"Modest and steady global } GDP \text{ growth rates"} \underset{\Phi_{e,1}}{\Longrightarrow} \text{"modest"}$$

Next, the second transformation function $\Phi_{e,2}$ may convert the canonical text value of $e(t_P)_{G,1}$ to a standardized canonical range via a lookup table as follows:

$$e(t_P)_{G,1} \underset{\Phi_{e,1}}{\Longrightarrow} \text{"modest"} \underset{\Phi_{e,2}}{\Longrightarrow} \text{"2.0 to 2.9"}$$

Then, the third transformation function $\Phi_{e,3}$ may encode the canonical range of $e(t_P)_{G,1}$ into its corresponding one-hot representation:

$$e(t_P)_{G,1} \underset{\Phi_{e,1}}{\Longrightarrow} \text{"modest"} \underset{\Phi_{e,2}}{\Longrightarrow} \text{"2.0 to 2.9"} \underset{\Phi_{e,3}}{\Longrightarrow} x_3(t_P) = \begin{bmatrix} 0 \\ \vdots \\ 0 \\ 1 \\ 0 \\ 0 \end{bmatrix}$$

wherein, for the global economy, only one of the elements of the global GDP growth vector $x_3(t_P)$ is considered to be equal to 1 for a given time period $t_P$, while all others are considered to be equal to 0.

Similarly, $\Phi_{e,1}$, $\Phi_{e,2}$, and $\Phi_{e,3}$ may transform text values of the first economic data element $e(t_P)_{G,1}$ that may be converted to a corresponding lookup value that may fall within the ranges of −2.0 and below, . . . , 1.0 to 1.9, 3.0 to 3.9, or 4.0 and above into the following one-hot representations, respectively:

$$x_3(t_P) = \begin{bmatrix} x(t_P)_{3,1} \\ x(t_P)_{3,2} \\ \vdots \\ x(t_P)_{3,8} \end{bmatrix} = \begin{bmatrix} 1 \\ 0 \\ \vdots \\ 0 \end{bmatrix}$$

or $$e(t_P)_{G,1} \underset{\Phi_{e,1}}{\Longrightarrow} \text{"very strongly negative"} \underset{\Phi_{e,2}}{\Longrightarrow} \text{"−2.0 and below"} \underset{\Phi_{e,3}}{\Longrightarrow} x_3(t_P) = \begin{bmatrix} 1 \\ 0 \\ \vdots \\ 0 \end{bmatrix}$$

and so forth for global GDP growth ranges −1.9 to −1.0, . . . , 2.0 to 2.9, 3.0 to 3.9 and concluding with the following one-hot representation for the global GDP growth range of 4.0 and above:

$$x_3(t_P) = \begin{bmatrix} x(t_P)_{3,1} \\ x(t_P)_{3,2} \\ \vdots \\ x(t_P)_{3,8} \end{bmatrix} = \begin{bmatrix} 0 \\ 0 \\ \vdots \\ 0 \\ 1 \end{bmatrix}$$

or $$e(t_P)_{G,1} \underset{\Phi_{e,1}}{\Longrightarrow} \text{"very strongly positive"} \underset{\Phi_{e,2}}{\Longrightarrow} \text{"4.0 and above"} \underset{\Phi_{e,3}}{\Longrightarrow} x_3(t_P) = \begin{bmatrix} 0 \\ 0 \\ \vdots \\ 0 \\ 1 \end{bmatrix}$$

Using the illustrative transformation techniques discussed above, other elements of the user data vector $u_k(t_P)$ for financial client k or the global financial data matrix $G(t_P)$ at time period $t_P$ may be selected to be extracted, parsed, mapped, converted, and encoded into respective vector components of model input vector $x(t_P)$ at time period $t_P$ via a suitable transformation function $\Phi(u_k(t_P), G(t_P))$. For example, one skilled in the art may employ these transformation techniques to define a first transformation function $\Phi_{m,1}$ that may parse and map the text value of the first element $m(t_P)_{G,1}$ of the market data vector $m_G(t_P)$ of the global financial matrix $G(t_P)$ at time period $t_P$ to a standardized canonical text value as follows:

$$m(t_P)_{G,1} = \text{"Moderately inflated U.S. stock values"} \underset{\Phi_{m,1}}{\Longrightarrow}$$
$$\text{"moderately inflated S \& P500"}$$

and then define a second transformation function $\Phi_{m,2}$ that may convert the canonical text value of $m(t_P)_{G,1}$ to a standardized canonical range of twelve-month trailing price to earnings (i.e., trailing P/E) ratios for the Standard and Poor's 500 (S&P 500) index via a lookup table as follows:

$$m(t_P)_{G,1} \underset{\Phi_{m,1}}{\Longrightarrow} \text{"moderately inflated S \& P 500"} \underset{\Phi_{m,2}}{\Longrightarrow} \text{"18.0 to 19.0"}$$

and then define a third transformation function $\Phi_{m,3}$ that may encode the canonical range of $m(t_P)_{G,1}$ into a corresponding one-hot representation as follows:

$$m(t_P)_{G,1} \underset{\Phi_{m,1}}{\Longrightarrow} \text{"moderately inflated S \& P 500"} \underset{\Phi_{m,2}}{\Longrightarrow}$$

$$\text{"18.0 to 19.0"} \underset{\Phi_{m,3}}{\Longrightarrow} x_4(t_P) = \begin{bmatrix} 0 \\ \vdots \\ 0 \\ 1 \\ 0 \\ \vdots \\ 0 \end{bmatrix}$$

wherein, for the global market, only one of the elements of the S&P 500 trailing P/E vector $x_4(t_P)$ is considered to be equal to 1 for a given time period $t_P$, while all others are considered to be equal to 0.

Figure 15:
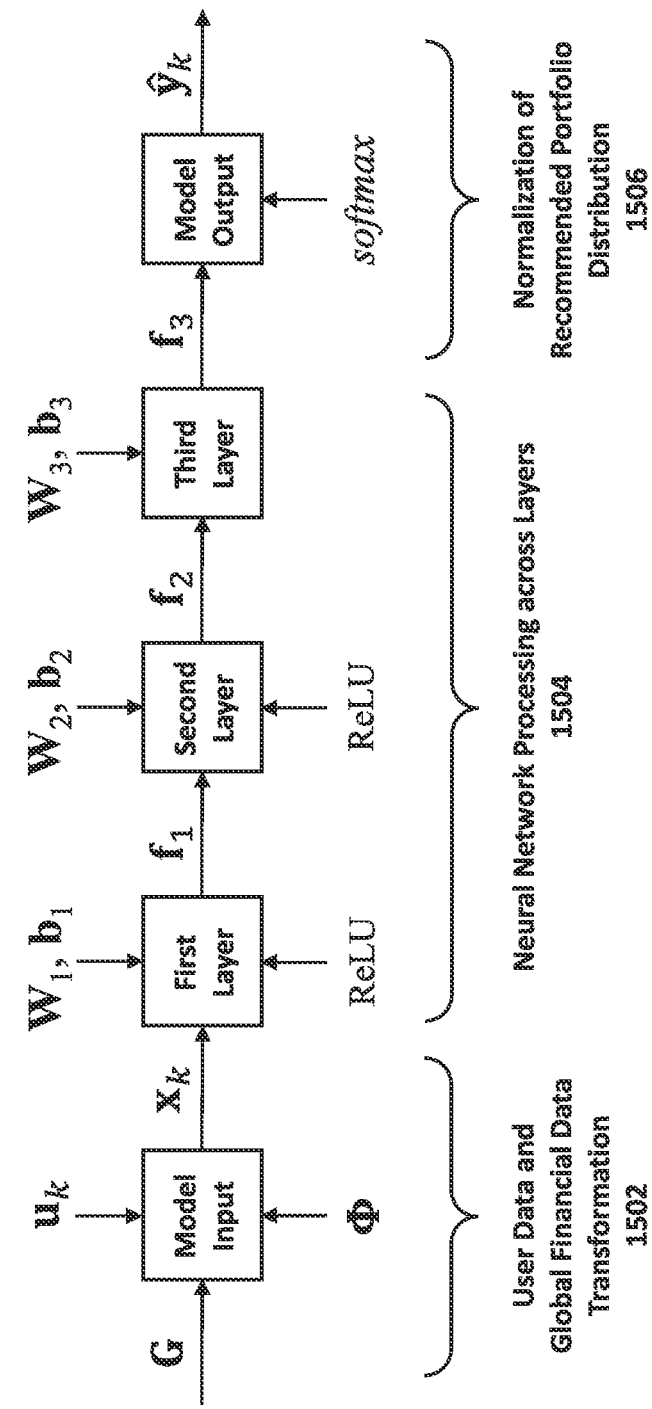
FIG. 15 is a block diagram of multilayer neural network for recommending hierarchical portfolios for a financial client based on the current and expected states of the financial client, global economy, and global markets.

FIG. 15 is a block diagram of a three-layer neural network model 1500 for recommending a hierarchical portfolio for financial client k at time period $t_P$ in the form of a probability distribution $\hat{y}_k(t_P)$ based on the current and expected states of the user data about financial client k as represented by user data vector $u_k(t_P)$ at time period $t_P$ and the current and expected states of the global economy and global markets as represented by global financial data matrix $G(t_P)$ at time period $t_P$. In order to recommend a hierarchical portfolio to financial client k at time period $t_P$, the three-layer neural network model 1500 may employ a transformation step 1502, a series of sequential processing steps 1504, and a distribution normalization step 1506. As illustrated in step 1502, the input to the first layer of the neural network model $x_k(t_P)$ at time period $t_P$ is determined by applying a transformation function $\Phi(u_k(t_P), G(t_P))$ to user data vector $u_k(t_P)$ and global data matrix $G(t_P)$. In step 1504, the vector-valued outputs $f_1$ and $f_2$ of the first two layers of the neural network model are computed in sequence by applying an activation function (e.g., ReLU) to linear combinations (e.g., $W_1 x_k + b_1$ and $W_2 f_1 + b_2$) of the respective vector-valued inputs $x_k$ and $f_1$ to the first and second layers, and the vector-valued output $f_3$ of the third layer is computed as a linear combination (e.g., $W_3 f_2 + b_3$) of the vector-valued input $f_2$ to the third layer. In step 1506, the vector-valued output of the neural network model $\hat{y}_k(t_P)$, representing the probability distribution $\pi(t_P)_k$ over the set of unique portfolios that may be selected by the model at time period $t_P$, is computed by applying a log probability distribution normalization function (e.g., softmax) to the vector-valued output $f_3$ of the third layer of the model.

More specifically, given a user data vector $u_k(t_P)$ for financial client k, a global financial data matrix $G(t_P)$, and a transformation function $\Phi(u_k(t_P), G(t_P))$, the encoded representation of the input vector $x(t_P)_k$ at time period $t_P$ may be determined by $$x_k(t_P) = \Phi(u_k(t_P), G(t_P))$$

and the corresponding output vector $\hat{y}_k(t_P)$ at time period $t_P$ from a fully trained version of the three-layer neural network model 1500 may be computed by $$\hat{y}_k(t_P) = \text{softmax}[f_3(f_2(f_1(\Phi(u_k(t_P), G(t_P)))))]$$

given near-optimal values for weight and bias parameters for each of the three layers $$W^* = \{W_1^* \; W_2^* \; W_3^*\}$$

$$b^* = \{b_1^* \; b_2^* \; b_3^*\}$$

learned by the model through a training, testing, and validation process, as described previously.

The elements of output vector $\hat{y}_k(t_P p)$ represent various unique portfolios that may be recommended by the trained neural network model 1500 and are defined as follows:

$$\hat{y}_k(t_P) = \begin{bmatrix} \hat{y}(t_P)_{k,1} \\ \hat{y}(t_P)_{k,2} \\ \vdots \\ \hat{y}(t_P)_{k,N_P} \end{bmatrix} \equiv \begin{bmatrix} \text{unique portfolio 1} \\ \text{unique portfolio 2} \\ \vdots \\ \text{unique portfolio } N_P \end{bmatrix}$$

where $N_P$ represents the total number of unique portfolios. Furthermore, each element of $\hat{y}_k(t_P)$ may take on the following probability values $$\hat{y}_k(t_P) = \begin{bmatrix} \hat{y}(t_P)_{k,1} \\ \hat{y}(t_P)_{k,2} \\ \vdots \\ \hat{y}(t_P)_{k,N_P} \end{bmatrix} = \begin{bmatrix} \pi(t_P)_{k,1} \\ \pi(t_P)_{k,2} \\ \vdots \\ \pi(t_P)_{k,N_P} \end{bmatrix} = \pi(t_P)_k$$

where each probability $\pi(t_P)_{k,i}$ value is between zero and one for $i = 1, 2, \ldots, N_P$. For financial client k, ideally only a single element of the recommended portfolio vector $\hat{y}_k(t_P)$ takes on a probability value of one or near one, while all others take on a probability values of zero or near zero. For example, in the case where the number of unique portfolios $N_P = 300$ and the $107^{th}$ element $\hat{y}(t_P)_{k,107}$ of $\hat{y}_k(t_P)$ assumes a probability value of $\pi(t_P)_{k,107}$ that is very close to unity (e.g., 0.9500), while all other elements of $\pi(t_P)_k$ for $k \neq 107$ assume values very close to zero (e.g., 0.0001, . . . , 0.0002), then the elements of the model output vector for financial client k at time period $t_P$ may assume the following illustrative probability values:

$$\hat{y}_k(t_P) = \begin{bmatrix} \hat{y}(t_P)_{k,1} \\ \vdots \\ \hat{y}(t_P)_{k,107} \\ \vdots \\ \hat{y}(t_P)_{k,300} \end{bmatrix} = \begin{bmatrix} 0.0001 \\ \vdots \\ 0.9500 \\ \vdots \\ 0.0002 \end{bmatrix} \equiv \begin{bmatrix} \text{unique portfolio 1} \\ \vdots \\ \text{unique portfolio 107} \\ \vdots \\ \text{unique portfolio 300} \end{bmatrix}$$

In this case, unique portfolio 107 is the hierarchical portfolio recommended by trained neural network model 1500 for financial client k at time period $t_P$ since the $107^{th}$ element of $\hat{y}_k(t_P)$ is close to one (e.g., $\hat{y}(t_P)_{k,107}=0.9500$) while all others are close to zero. Moreover, the recommendation from the trained model is based on a) the characteristics of the financial client (e.g., age 45, conservative risk tolerance, married, modest home, good health, etc.) at time period $t_P$ captured within the user data vector $u_k(t_P)$ and b) the state of the global economy (e.g., modest global GDP growth, low interest rates, accommodative central banks, etc.) and global markets (e.g., moderately inflated stock values, subdued commodity prices, historically high corporate debt levels, etc.) captured via global financial data matrix $G(t_P)$ at time period $t_P$.

In other cases, two or more elements of the recommended portfolio vector $\hat{y}_k(t_P)$ may assume similar probability values that together sum to a value of one or near one, while all others assume a probability values of zero or near zero. In such cases, portfolio suggestion service 208 of intelligent investment system 102 may further examine the user data vector $u_k(t_P)$ of financial client k at time period $t_P$ and apply additional AI methods, such as production rules, decision trees, or heuristics, in order to select the most suitable portfolio from the plurality of portfolios recommended by trained neural network model 1500.

Given one or more hierarchical portfolios recommended by trained neural network model 1500 for financial client k in the form of a probability distribution $\hat{y}_k(t_P)=\pi(t_P)_k$ at time period $t_P$ over the set of unique portfolios (e.g., unique portfolio 1, unique portfolio 2, . . . , unique portfolio 107, . . . etc.), portfolio suggestion service 208 may invoke one or more post-processing routines to calculate the set of portfolio change operations required to transform the current revision of the hierarchical portfolio, such as prior portfolio 300, of financial client k at time period $t_P$ into a new revision of the hierarchical portfolio that precisely matches a target portfolio that is equal to one of the unique hierarchical portfolios recommended by trained neural network model 1500. In the case where one element of the recommended portfolio vector $\hat{y}_k(t_P)$ takes on a dominant value or a value near one, such as $\hat{y}(t_P)_{k,107}=0.9500$, the target portfolio is equal to the unique portfolio that is most highly recommended (i.e., highest probability value) by trained neural network model 1500, such as unique portfolio 107. In the case where two or more elements of the recommended portfolio vector $\hat{y}_k(t_P)$ take on similar probability values that together sum to a dominant value or a value near one, the target portfolio is selected, from the plurality of portfolios recommended by trained neural network model 1500, by portfolio suggestion service 208 of intelligent investment system 102, as previously described. Once the required portfolio change operations have been determined, portfolio suggestion service 208 may further generate and suitably format the corresponding set of AI suggestions to be utilized by portfolio mapping service 210 and portfolio view service 212 to assemble an AI view of the current revision of the hierarchical portfolio of financial client k at time period $t_P$, such as an AI view 1200 of prior portfolio 300.

In various embodiments, during the process of generating AI suggestions for changing a hierarchical portfolio of interest owned by a user, such as a financial client, portfolio suggestion service 208 of intelligent investment system 102 may further employ tax-efficient investing strategies. These strategies may be personalized based on user data (e.g., tax filing status, income level(s), tax bracket(s), short/long-term capital loss carryover, etc.) about the financial client as well as transaction data (e.g., account number, purchase price and date, sales price and date, holding period, realized gains and losses, etc.) and state data (e.g., asset classification, cost basis, market price, yield, maturity, account type, unrealized gains and losses, etc.) about past or current portfolio holdings associated with one or more hierarchical portfolios (e.g., the hierarchical portfolio of interest as well as other hierarchical portfolios with realized gains/losses for the tax year) owned by the financial client. Such strategies may include, but are not limited to, tax-loss harvesting (e.g., offsetting capital gains with capital losses for a given tax year); selection of tax-exempt or tax-efficient securities (e.g., municipal bonds without federal taxes, treasury securities without state taxes, long-term growth stocks, tax-efficient mutual funds, etc.); placement of such tax-exempt or tax-efficient securities within taxable accounts; placement of tax-inefficient securities (e.g., high-yield and investment-grade bonds; dividend and preferred stocks; alternative investments in commodities, currency, or real estate; short-term stock investments, etc.) within tax-deferred accounts (e.g., IRAs, 401(k)s, etc.); and various other tax-minimization or tax-avoidance strategies, such as seeking long-term, rather than short-term capital gains; maximizing contributions to retirement accounts within annual limits; minimizing or avoiding alternative minimum taxes (AMT); maximizing the capital gain exclusion on the sale of a primary residence; and giving gifts within annual limits or making charitable contributions.

In various embodiments, portfolio change operations offered by portfolio suggestion service 208 of intelligent investment system 102 may relate to AI restructuring suggestions, AI allocation suggestions, AI positioning suggestions, or AI consolidation suggestions. More specifically, the types of portfolio change operations related to AI restructuring suggestions may include, but are not limited to, Create Portfolio Item, Delete Portfolio Item, and Update Portfolio Item; Add Portfolio Relationship, Change Portfolio Relationship, and Remove Portfolio Relationship. Similarly, the types of portfolio change operations related to AI allocation suggestions may include, but are not limited to, Augment Allocation, Initialize Allocation, Reduce Allocation, and Zero Allocation. The types of portfolio change operations related to AI positioning suggestions may include, but are not limited to, Create Holding, Delete Holding, Rename Holding, and Update Holding; Add Portfolio Position, Change Portfolio Position, and Remove Portfolio Position; Add Holding Instance, Create Holding Instance, Delete Holding Instance, Move Holding Instance, Remove Holding Instance, and Update Holding Instance. The types of portfolio change operations related to AI consolidation suggestions may include, but are not limited to, Deactivate Holding, Deactivate Holding Instance, Deactivate Portfolio Item, Deactivate Portfolio Position, and Deactivate Portfolio Relationship.

For example, transforming the current revision of the hierarchical portfolio of financial client k at time period $t_P$ into the unique hierarchical portfolio 107 recommended by trained neural network model 1500 may entail establishing a new position in an asset (e.g., stock, bond, commodity, etc.) within an existing asset class within the current revision of the hierarchical portfolio. Accordingly, portfolio suggestion service 208 of intelligent investment system 102 may generate an AI positioning suggestion, a first AI allocation suggestion, and a second AI allocation suggestion. The AI positioning suggestion may comprise the following set of portfolio change operations: a) create a new portfolio holding (e.g., Create Holding) representing the asset, b) add a new portfolio position (e.g., Add Portfolio Position) under the existing asset class within the current revision of the hierarchical portfolio, c) create a new portfolio holding instance (e.g., Create Holding Instance) of the new portfolio holding, and d) add the new portfolio holding instance (e.g., Add Holding Instance) to the new portfolio position. The first AI allocation suggestion may comprise the following portfolio change operation: initialize the allocation (e.g., Initialize Allocation) to the new portfolio holding instance. The second AI allocation suggestion may comprise the following portfolio change operation: reduce the allocation (e.g., Reduce Allocation) to the cash node of the current revision of the hierarchical portfolio. Portfolio change operations may relate to other types of AI suggestions, such as AI structuring, tuning, partitioning, harvesting, or distribution suggestions, without departing from the scope of this disclosure.

As described in this subsection of the detailed description, a key capability of the present technology is to generate suggestions for changing a hierarchical portfolio, wherein the hierarchical portfolio may be a hierarchical portfolio of assets, the hierarchical portfolio may be owned by a financial client or a multigenerational family, and the suggestions for changing the hierarchical portfolio may be AI suggestions generated based on the outputs of a machine learning model. Furthermore, the machine learning model may be a deep neural network model, wherein the inputs to the model are related to user data, market data, or economic data. From the perspective of a financial firm providing, via an intelligent investment system (e.g., intelligent investment system 102), an AI view containing AI suggestions generated based on the outputs of one or more machine learning models, an important advantage of the present technology associated with this key capability is the ability for the financial firm to significantly reduce the time or cost associated with providing advice to their financial clients by offloading work from the firm's financial advisors to machine learning models owned by the firm, including deep neural network models.

Given these savings in time (e.g., same number of financial advisors with more time available for other tasks) or cost (e.g., fewer number of financial advisors required to serve the same number of financial clients), this advantage enables the financial firm to redirect the available time or unlocked capital toward strategic initiatives designed to improve its competencies in a) trusted and committed relationships with financial clients, b) data gathering and management, c) machine learning development and operations, and d) interactive financial client experiences powered by AI. Accordingly, the nature of work for financial advisors may be purposefully shifted toward these strategic initiatives, whereby financial advisors may increasingly focus their available time on activities related to a) engaging deeply with financial clients on matters of import to build trust and to secure long-term commitments, b) working closely with financial clients to gather important user data to be used by and to improve the performance of the firm's machine learning models, c) monitoring, evaluating, and assessing the predictive capabilities of the machine learning models owned by the firm, and d) working collaboratively with AI assistants to improve the overall user experience for financial clients.

An additional advantage associated with the key capability of the present technology to generate suggestions for changing a hierarchical portfolio is the ability for the financial firm to improve the quality and reduce the variability of the financial advice provided to their financial clients (e.g., individual or institutional financial clients or multigenerational families represented by one or more financial clients) by ensuring that the machine learning models owned by the firm are periodically or continuously retrained and improved through an ongoing supervised machine learning process to perform at or above the levels of the firm's most senior and highest performing financial advisors. This continuous learning process may enable the financial firm to markedly raise the performance of its junior and mid-level financial advisors while at the same time accelerating the performance of its senior financial advisors.

Alibaba and Alibaba Cloud are registered trademarks of Alibaba Group Holding Limited.

Amazon, Amazon.com, Amazon Echo, Amazon Echo Show, Amazon Fire, and Amazon Web Services are trademarks or registered trademarks of Amazon Technologies, Inc.

Apple, Apple Watch, CarPlay, iPad, iPad Pro, iPhone, macOS, Safari, and watchOS are registered trademarks of Apple Inc. HomePod, iPadOS, Swift, and tvOS are trademarks of Apple Inc.

iShares is a registered trademark of BlackRock Fund Advisors.

iOS is a registered trademark of Cisco Technology, Inc.

Docker is a registered trademark of Docker, Inc.

Fidelity is a registered trademark of FMR LLC.

Android, Android Auto, Android TV, Chrome, Chrome OS, Google, Google Cloud Platform, Google Home, Google Kubernetes Engine (GKE), and Wear OS by Google are trademarks or registered trademarks of Google Inc.

Huawei is a registered trademark of Huawei Technologies Co., Ltd.

IBM and IBM Cloud are registered trademarks of International Business Machines Corporation.

CurrencyShares and PowerShares are registered trademarks of Invesco Holding Company (US), Inc.

Azure, Hyper-V, Microsoft, Windows, and Windows Server are registered trademarks of Microsoft Corporation.

Firefox is a registered trademark of Mozilla Foundation.

Java and Oracle Cloud are registered trademarks of Oracle America, Inc.

Red Hat is a registered trademark of Red Hat, Inc.

Salesforce and Salesforce.com are registered trademarks of salesforce.com, inc.

Samsung is a registered trademark of Samsung Electronics America, Inc.

SPDR is a registered trademark of Standard & Poor's Financial Services LLC.

Tesla is a registered trademark of Tesla, Inc.

Linux is a registered trademark of Torvalds, Linus.

Vanguard is a registered trademark of The Vanguard Group, Inc.

VMware is a registered trademark of VMWare, Inc.

The term "machine learning model" has been used herein to refer to one or more machine learning algorithms associated with a particular data set. The term machine learning model may refer to a machine learning model in an untrained or trained state, wherein the context in which the term is utilized will clarify its intended meaning when interpreted by one skilled in the art.

The term "or" is used in its inclusive form herein. For example, the phrase "item A or item B" is intended to mean "item A, item B, or item A and item B."

The terms "a," "an," and "the" are used herein to indicate one or more, unless the context within which the terms are used clearly implies otherwise.

The terms "comprise," "include," and "contain" are used interchangeably herein and mean that at least one item or step is present in an entity or process but does not exclude other items or steps from being present. For example, the phrases "entity 1 comprises item A and item B," "entity 1 includes item A and item B," and "entity 1 contains item A and item B" are intended to convey the same meaning, namely, that entity 1 is made up of a plurality of items, the least of which being item A and item B. That is, items other than items A and B, such as item C and item D, are not excluded from the composition of entity 1.

The terms "an embodiment," "an exemplary embodiment," "some embodiments," "other embodiments," "more complex embodiments," and "various embodiments" are used herein to indicate that the implementation of the present technology described as such may include particular elements that are not necessarily found in other implementations.

The term "an embodiment" is used herein to refer to one implementation of the present technology; however, the repeated use the term "an embodiment" may refer to different implementation or the same implementation, as determined by the context of the description.

The terms "store," "record," and "persist" are used interchangeably herein when describing a medium for preserving data. For example, the phrases "data item A is stored in a medium," "data item A is persisted to a medium," and "data item A is recorded on a medium" are intended to convey the same meaning, namely, to preserve data item A on a medium for future use or reference.

The term "set" is used herein to refer to collection of similar items, wherein the number of items within the collection may be zero or more. For example, the phrase "a set of decisions" is intended to mean "a collection of decisions, wherein the collection contains zero, one, two, or more individual decisions."

The term "signal" is used herein to refer to a transitory propagating electromagnetic wave. For example, various local or remote components of a computer system may communicate with one another internally or over a network, such as a LAN or WAN, using a signal to send and receive data in accordance with standard communication protocols, such internal bus protocols, inter-process communication (IPC) protocols, or Ethernet, TCP/IP, or HTTP/HTTPS networking protocols.

When used herein to describe a medium, the term "non-transitory" is meant to limit the medium itself to a tangible form, rather than a signal. For example, when the term "non-transitory" is used to describe a storage medium, it is intended to mean a storage medium that is limited to a tangible form (i.e., not a signal), such as a physical storage device. Furthermore, the term "non-transitory" is not meant to limit persistency of the medium. For example, when the term "non-transitory" is used to describe a storage medium with data stored thereon, it is intended to include storage media that do not necessarily store the data permanently, such as random-access memory (RAM) devices or cache memory devices.

Various embodiments of the methods disclosed are described via flowcharts comprising individual process steps represented as blocks. It is understood by one skilled in the art that any one block within a flowchart, any combination of one or more blocks within a flowchart, or any combination of one or more blocks across multiple flowcharts may be implemented by computer-executable instructions. It is further understood that blocks within and across flowcharts may be reordered, removed, or repeated in other embodiments and implemented accordingly by computer-executable instructions. The computer-executable instructions may be stored on a non-transitory computer-readable medium in the form of a physical storage device, thereby producing an article of manufacture in the form of a tangible computer program product. The computer program product may be physically transferred in a repeatable manner to any number of computer systems comprising a main memory device and one or more processors. The computer-executable instructions stored within the non-transitory computer-readable medium of the computer program product may be loaded into a main memory device of a computer system, whereupon the instructions may be executed by one or more processors of the computer system to perform the methods described herein.

A number of examples with specific details have been used throughout this disclosure to provide a better understanding of the features, capabilities, and advantages of the present technology; describe the preferred and alternative embodiments at the present time; and enable persons skilled in the art to practice certain embodiments, including making and using the systems and implementing and performing the methods specified herein.

The Abstract section of this disclosure is provided to enable the reader to quickly comprehend the general nature of the present technology and is not to be interpreted or used to limit the meaning or scope of the appended claims.

The Summary section of this disclosure is provided to introduce concepts related to the present technology in a simplified form and is not to be interpreted or used to limit the meaning or scope of the appended claims.

The Detailed Description section of this disclosure presents various embodiments of the present technology as sets of features in order to facilitate exposition and not as an indication that the embodiments require additional features beyond those definitively stated within the appended claims.

The Claims section of this disclosure expressly states the novel features of the present technology, where each claim represents a distinct embodiment.

While the present technology has been described herein using specific example embodiments, it is to be understood that the present technology is not limited to these embodiments; rather, its scope is defined solely by the appended claims including all equivalents and modifications thereto.

The invention claimed is:

1. A computer-implemented method of providing personalized, context-specific financial advice based on stored information for a hierarchical portfolio of assets owned by a user, the assets being organized based on a set of one or more hierarchical dimensions, the method comprising:

receiving, at a computer system, a first type of request, from a client device, regarding the hierarchical portfolio owned by the user;

processing, by the computer system, the first type of request, including accessing the hierarchical portfolio information and compiling a data input package comprising user data associated with the user and financial data;

processing the data input package by machine learning algorithms running as trained machine learning models on one or more machine learning servers;

generating, as an output of the machine learning models, individual suggestions for changing the structure or content of the hierarchical portfolio subject to constraints or conditions related to the user data;

determining, by the computer system, location data for the individual suggestions, the location data including structural positions of portfolio items within the hierarchical portfolio;

assembling, by the computer system, a first type of view of the hierarchical portfolio based on the first type of request, the first type of view including the individual suggestions and the location data for the individual suggestions;

transmitting, from the computer system, the first type of view to the client device for overlay of the first type of view upon a depiction of the hierarchical portfolio wherein the individual suggestions are displayed at locations corresponding to the portfolio items to which they refer; and transforming, by the computer system, the hierarchical portfolio to a revised hierarchical portfolio, creating a snapshot of the hierarchical portfolio and a snapshot of the revised hierarchical portfolio, updating the first type of view to include references to the snapshots, and recording the updated first type of view on a private or public blockchain.

2. The method of claim 1, wherein: the machine learning model is a neural network model; and the inputs to the neural network model are related to at least one of user data or global financial data.

3. The method of claim 1, wherein the method further comprises recording, by the computer system, the view on a blockchain.

4. The method of claim 3, wherein the recording the view on a blockchain comprises storing the view within a transaction of a blockchain, the state trie of a blockchain, or a transaction and the state trie of a blockchain.

5. The method of claim 1, wherein the method further comprises making, by the computer system, a cryptocurrency payment related to the view via a blockchain network.

6. The method of claim 5, wherein the making a cryptocurrency payment related to the view via a blockchain network comprises sending, via the blockchain network, an amount of cryptocurrency from the recipient of the view to the provider of the view.

7. The method of claim 6, wherein the amount of cryptocurrency is related to one or more service fees associated with the view.

8. The method of claim 1, wherein the request for advice regarding the hierarchical portfolio includes data containing, referencing, or containing and referencing the hierarchical portfolio.

9. The method of claim 1, wherein the request for advice regarding the hierarchical portfolio is a request for financial advice regarding the hierarchical portfolio, the financial advice including restructuring advice, allocation advice, positioning advice, or consolidation advice, or any combination thereof.

10. The method of claim 1, wherein the hierarchical portfolio is a hierarchical portfolio of assets, the assets including stock assets, bond assets, cash assets, or alternative assets, or any combination thereof.

11. The method of claim 1, wherein the method further comprises approving, by the computer system, the view.

12. The method of claim 1, wherein the suggestions for changing the hierarchical portfolio include recommended transactions to buy assets, sell assets, or transfer assets, or any combination thereof.

13. The method of claim 1, wherein the method further comprises: receiving, at the computer system, an input message from the client device, the input message including a set of accepted suggestions; generating, by the computer system, a redlined hierarchical portfolio, the redlined hierarchical portfolio including proposed changes to the hierarchical portfolio effected by the accepted suggestions; and transmitting, from the computer system, the redlined hierarchical portfolio to the client device.

14. The method of claim 1, wherein the method further comprises: receiving, at the computer system, an input message from the client device, the input message including a set of placed transactions; and submitting, by the computer system, the placed transactions to an electronic trading platform.

15. The method of claim 14, wherein the method further comprises: generating, by the computer system, a revised hierarchical portfolio; and recording, by the computer system, the view on a blockchain, the view including references to a snapshot of the state of the hierarchical portfolio and a snapshot of the state of the revised hierarchical portfolio; thereby either establishing or maintaining a portable financial record.

16. The method of claim 1, wherein the method further comprises: calculating, by the computer system, a hash of the view; and recording, by the computer system, the hash of the view on a blockchain.

17. The method of claim 16, wherein the method further comprises: identifying and extracting, by the computer system, a hash of the latest prior view of the hierarchical portfolio from a portion of the blockchain; and adding, by the computer system, to the view a reference to the latest prior view, the reference including the hash of the latest prior view; thereby linking the view to the latest prior view.

18. The method of claim 1, further comprising generating a revised hierarchical portfolio and recording the view on a blockchain for establishing or maintaining a portable financial record for the user.

19. The method of claim 18, wherein the method further comprises analyzing the portable financial record along one or more analytical dimensions based on a performance metric.

20. The method of claim 19, wherein the one or more analytical dimensions include account, asset class, category, custodian, fund, geography, organization, rank, risk classification, sector, smart factor, style, theme, time, or user dimensions.

21. The method of claim 1, further comprising providing recurring context-specific financial advice in the form of a series of artificial intelligence (AI) views of a hierarchical portfolio and recording, in partially or fully encrypted form, the series of AI views of the hierarchical portfolio, including references to snapshots of specific states of the hierarchical portfolio, on a blockchain, thereby establishing and maintaining a portable financial record for the user.

22. The method of claim 1, further comprising positioning, using the location data, an individual suggestion near a first portfolio item, or attribute thereof, to which it refers and in the same view, positioning a second individual suggestion near a second portfolio item, or attribute thereof, to which it refers.

23. The method of claim 1, further comprising presenting a computer-generated user interface element by which the user or financial advisor of the user may select and act upon individual suggestions and recommended transactions and in response to such actions and successful execution and confirmation of placed transactions, generating and presenting to the user or financial advisor a revised hierarchical portfolio that incorporates the accepted suggestions and confirmed transactions.

24. The method of claim 1, wherein the view comprises an Al view including Al suggestions containing context-specific promotional advertisements or recommendations for products, including financial products or consumer products.

25. The method of claim 1, further comprising determining, based on the received input from the client device, the type of input; and
    in response to a restructuring input type, assembling a restructuring Al view;
    in response to an allocation input type, assembling an allocation Al view;
    in response to a positioning input type, assembling a positioning Al view; and
    in response to a consolidation input type, assembling a consolidation Al view.

26. The method of claim 1, wherein the client device is a single or dual display smart device.

27. The method of claim 26, wherein the single or dual display smart device is a smart phone, tablet, computer, smart television, wall computer, virtual reality headset, mixed reality headset, or augmented reality smart glasses.

28. The method of claim 1, wherein the individual suggestions are represented by one or more media types.

29. The method of claim 28, wherein the one or more media types include application, audio, hologram, hypertext, image, model, text, video, or voice types.

30. The method of claim 1, wherein the method further comprises recording, by the computer system, the snapshot of the hierarchical portfolio and the snapshot of the revised hierarchical portfolio on a private or public blockchain.

31. A computer system for providing personalized, context-specific financial advice based on stored information for a hierarchical portfolio of assets owned by a user, the assets being organized based on a set of one or more hierarchical dimensions, the computer system comprising:
    a communication device connected to a network;
    a memory device storing executable instructions; and
    one or more processors coupled to the communication device and the memory device;
    wherein the executable instructions, when executed by the one or more processors, cause the computer system to perform operations comprising:
        receive, via the communication device, a first type of request, from a client device, regarding the hierarchical portfolio owned by the user;
        process the first type of request, including accessing the hierarchical portfolio information and compiling a data input package comprising user data associated with the user and financial data;
        process the data input package by machine learning algorithms running as trained machine learning models on one or more machine learning servers;
        generate, as an output of the machine learning models, individual suggestions for changing the structure or content of the hierarchical portfolio subject to constraints or conditions related to the user data;
        determine location data for the individual suggestions, the location data including structural positions of portfolio items within the hierarchical portfolio;
        assemble a first type of view of the hierarchical portfolio based on the first type of request, the first type of view including the individual suggestions and the location data for the individual suggestions;
        transmit the first type of view to the client device, via the communication device, for overlay of the first type of view upon a depiction of the hierarchical portfolio wherein the individual suggestions are displayed at locations corresponding to the portfolio items to which they refer; and
        transform the hierarchical portfolio to a revised hierarchical portfolio, create a snapshot of the hierarchical portfolio and a snapshot of the revised hierarchical portfolio, update the first type of view to include references to the snapshots, and record the updated first type of view on a private or public blockchain.

32. The system of claim 31, wherein the operations further comprise record the view on a blockchain.

33. The system of claim 31, wherein the operations further comprise make a cryptocurrency payment related to the view via a blockchain network.

34. The system of claim 31, wherein the suggestions for changing the hierarchical portfolio include recommended transactions to buy assets, sell assets, or transfer assets, or any combination thereof and the operations further comprise:
    receive an input message from the client device, the input message including a set of placed transactions; and
    submit the placed transactions to an electronic trading platform.

35. A non-transitory computer-readable medium for providing personalized, context-specific financial advice based on stored information for a hierarchical portfolio of assets owned by a user, the assets being organized based on a set of one or more hierarchical dimensions, the medium comprising executable instructions stored thereon that, when executed by one or more processors of a computer system, cause the computer system to:
    receive a first type of request, from a client device, regarding the hierarchical portfolio owned by the user;
    process the first type of request, including accessing the hierarchical portfolio information and compiling a data input package comprising user data associated with the user and financial data;
    process the data input package by machine learning algorithms running as trained machine learning models on one or more machine learning servers;
    generate, as an output of the machine learning models, individual suggestions for changing the structure or content of the hierarchical portfolio subject to constraints or conditions related to the user data;
    determine location data for the individual suggestions, the location data including structural positions of portfolio items within the hierarchical portfolio;
    assemble a first type of view of the hierarchical portfolio based on the first type of request, the first type of view including the individual suggestions and the location data for the individual suggestions;
    transmit the first type of view to the client device for overlay of the first type of view upon a depiction of the hierarchical portfolio wherein the individual suggestions are displayed at locations corresponding to the portfolio items to which they refer; and transform the hierarchical portfolio to a revised hierarchical portfolio, create a snapshot of the hierarchical portfolio and a snapshot of the revised hierarchical portfolio, update the first type of view to include references to the snapshots, and record the updated first type of view on a private or public blockchain.

36. The medium of claim 35, wherein the medium further comprises executable instructions stored thereon that cause the computer system to record the view on a blockchain.

37. The medium of claim 35, wherein the medium further comprises executable instructions stored thereon that cause the computer system to make a cryptocurrency payment related to the view via a blockchain network.

38. The medium of claim 35, wherein the suggestions for changing the hierarchical portfolio include recommended transactions to buy assets, sell assets, or transfer assets, or any combination thereof and the medium further comprises executable instructions stored thereon that cause the computer system to:

receive an input message from the client device, the input message including a set of placed transactions; and submit the placed transactions to an electronic trading platform.

39. A computer-implemented method of providing personalized, context-specific financial advice based on stored information for a hierarchical portfolio of assets owned by a user, the assets being organized based on a set of one or more hierarchical dimensions, the method comprising:

receiving, at a computer system, a first type of request, from a client device, regarding the hierarchical portfolio owned by the user;

processing, by the computer system, the first type of request, including determining structural positions of portfolio items within the hierarchical portfolio;

enriching, by the computer system, the hierarchical portfolio with additional data attributes and values;

processing the hierarchical portfolio by machine learning algorithms running as trained machine learning models on one or more machine learning servers;

generating, as an output of the machine learning models, individual artificial intelligence suggestions for changing the structure or content of the hierarchical portfolio to optimize the portfolio;

determining, by the computer system, location data for the individual AI suggestions, including mapping the individual AI suggestions to specific structural positions of portfolio items in the hierarchical portfolio;

assembling, by the computer system, a first type of view of the hierarchical portfolio based on the first type of request, the first type of view including the individual AI suggestions and the location data for the individual AI suggestions;

transmitting, from the computer system, the first type of view to the client device for overlay of the first type of view upon a depiction of the hierarchical portfolio wherein the individual AI suggestions are mapped to locations corresponding to the portfolio items to which they refer; and transforming, by the computer system, the hierarchical portfolio to a revised hierarchical portfolio, creating a snapshot of the hierarchical portfolio and a snapshot of the revised hierarchical portfolio, updating the first type of view to include references to the snapshots, and recording the updated first type of view on a private or public blockchain.

* * * * *